US008298070B2

(12) United States Patent
Kato et al.

(10) Patent No.: US 8,298,070 B2
(45) Date of Patent: Oct. 30, 2012

(54) GAMING MACHINE THAT EXECUTES FREE GAME AND THE PLAY METHOD

(75) Inventors: Yoichi Kato, Tokyo (JP); Kensaku Yoshikawa, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 399 days.

(21) Appl. No.: 12/474,935

(22) Filed: May 29, 2009

(65) Prior Publication Data

US 2010/0124981 A1 May 20, 2010

Related U.S. Application Data

(60) Provisional application No. 61/114,833, filed on Nov. 14, 2008, provisional application No. 61/114,772, filed on Nov. 14, 2008, provisional application No. 61/114,839, filed on Nov. 14, 2008.

(51) Int. Cl.
*A63F 9/24* (2006.01)
*A63F 13/00* (2006.01)
*G06F 17/00* (2006.01)

(52) U.S. Cl. .......................................... 463/20; 463/21

(58) Field of Classification Search .................. 463/20, 463/21

See application file for complete search history.

(56) References Cited

U.S. PATENT DOCUMENTS 6,012,983 A 1/2000 Walker et al.
6,093,102 A 7/2000 Bennett
6,960,133 B1 11/2005 Marks et al.
2002/0025846 A1* 2/2002 Bennett et al. .................. 463/20
2003/0222402 A1* 12/2003 Olive ........................... 273/292
2005/0261015 A1* 11/2005 Schwagmann et al. ....... 455/518
2008/0045312 A1 2/2008 Kato
2008/0058070 A1 3/2008 Kato
2008/0076494 A1 3/2008 Kato
2008/0305851 A1 12/2008 Kato
2010/0029369 A1* 2/2010 Pacey ............................ 463/20

OTHER PUBLICATIONS

U.S. Appl. No. 12/206,460, filed Sep. 8, 2008, Kato.
U.S. Appl. No. 12/403,811, filed Mar. 13, 2009, Kato.
U.S. Appl. No. 12/404,778, filed Mar. 16, 2009, Kato.

* cited by examiner

*Primary Examiner* — William M. Brewster
(74) *Attorney, Agent, or Firm* — Edwards Wildman Palmer LLP

(57) ABSTRACT

A gaming machine is arranged as follows: on condition that a game medium is betted, plural symbols including a specific symbol are rearranged based on a symbol randomly selected from the plural symbols; a base game in which a game medium with an amount determined in accordance with the rearranged symbols is run; if in the base game the specific symbol is rearranged with a first predetermined condition, a special game in which a free game is repeated plural times, in the free game a special status in which the specific symbol is added to the plural symbols being established and a game medium with an amount determined in accordance with the rearranged symbols; and another free game is added and made runnable if in the special game the specific symbol is rearranged with a second predetermined condition.

14 Claims, 131 Drawing Sheets

FIG. 9

BASE GAME SYMBOL TABLE

| | | FIRST COLUMN (L1) | SECOND COLUMN (L2) | THIRD COLUMN (L3) | FOURTH COLUMN (L4) | FIFTH COLUMN (L5) |
|---|---|---|---|---|---|---|
| CODE NUMBER | RANDOM NUMBER | SYMBOL | SYMBOL | SYMBOL | SYMBOL | SYMBOL |
| 0 | 0-3277 | J | WILD | A | Q | J |
| 01 | 3278-6555 | Q | A | J | J | A |
| 02 | 6556-9833 | BAT | Q | BAT | BAT | BAT |
| 03 | 9834-13111 | J | HAMMER | SWORD | Q | J |
| 04 | 13112-16389 | Q | SWORD | RHINOCEROS | K | A |
| 05 | 16390-19667 | RHINOCEROS | WILD | BAT | BAT | BUFFALO |
| 06 | 19668-22945 | A | BUFFALO | FEATURE | A | RHINOCEROS |
| 07 | 22946-26223 | DEER | DEER | A | K | FEATURE |
| 08 | 26224-29501 | SWORD | K | J | HAMMER | K |
| 09 | 29502-32779 | HAMMER | RHINOCEROS | HAMMER | Q | HAMMER |
| 10 | 32780-36057 | A | WILD | A | DEER | Q |
| 11 | 36058-39335 | Q | A | Q | SWORD | BAT |
| 12 | 39336-42613 | SWORD | HAMMER | DEER | FEATURE | K |
| 13 | 42614-45891 | RHINOCEROS | DEER | K | K | DEER |
| 14 | 45892-49169 | K | J | BUFFALO | SWORD | SWORD |
| 15 | 49170-52447 | A | SWORD | Q | DEER | J |
| 16 | 52448-55725 | HAMMER | SWORD | FEATURE | A | WILD |
| 17 | 55726-59003 | J | BAT | A | HAMMER | HAMMER |
| 18 | 59004-62281 | Q | WILD | HAMMER | BUFFALO | SWORD |
| 19 | 62282-65535 | BUFFALO | FEATURE | SWORD | RHINOCEROS | Q |

RANGE OF RANDOM NUMBERS:0-65535

FIG. 10

BONUS GAME SYMBOL TABLE

| | | THIRD COLUMN(L3) |
|---|---|---|
| CODE NUMBER | RANDOM NUMBER | SYMBOL |
| 0 | 0-2848 | FEATURE |
| 1 | 2849-5696 | A |
| 2 | 5697-8544 | J |
| 3 | 8545-11392 | BAT |
| 4 | 11393-14240 | SWORD |
| 5 | 14241-17088 | RHINOCEROS |
| 6 | 17089-19936 | BAT |
| 7 | 19937-22784 | FEATURE |
| 8 | 22785-25632 | A |
| 9 | 25633-28480 | J |
| 10 | 28481-31328 | HAMMER |
| 11 | 31329-34176 | A |
| 12 | 34177-37024 | FEATURE |
| 13 | 37025-39872 | Q |
| 14 | 39873-42720 | DEER |
| 15 | 42721-45568 | K |
| 16 | 45569-48416 | BUFFALO |
| 17 | 48417-51264 | Q |
| 18 | 51265-54112 | FEATURE |
| 19 | 54113-56960 | A |
| 20 | 56961-59808 | HAMMER |
| 21 | 59809-62656 | FEATURE |
| 22 | 62657-65535 | SWORD |

RANGE OF RANDOM NUMBERS: 0-65535

FIG. 11

BONUS GAME SYMBOL TABLE

| | | THIRD COLUMN(L3) |
|---|---|---|
| CODE NUMBER | RANDOM NUMBER | SYMBOL |
| 0 | 0-3277 | FEATURE |
| 1 | 3278-6555 | J |
| 2 | 6556-9833 | BAT |
| 3 | 9834-13111 | SWORD |
| 4 | 13112-16389 | RHINOCEROS |
| 5 | 16390-19667 | BAT |
| 6 | 19668-22945 | FEATURE |
| 7 | 22946-26223 | A |
| 8 | 26224-29501 | J |
| 9 | 29502-32779 | HAMMER |
| 10 | 32780-36057 | A |
| 11 | 36058-39335 | FEATURE |
| 12 | 39336-42613 | DEER |
| 13 | 42614-45891 | K |
| 14 | 45892-49169 | BUFFALO |
| 15 | 49170-52447 | Q |
| 16 | 52448-55725 | FEATURE |
| 17 | 55726-59003 | A |
| 18 | 59004-62281 | HAMMER |
| 19 | 62282-65535 | FEATURE |

RANGE OF RANDOM NUMBERS: 0-65535

FIG. 12

CODE NUMBER DETERMINATION TABLE

| RANDOM NUMBER | CODE NUMBER |
|---|---|
| 0-3277 | 0 |
| 3278-6555 | 1 |
| 6556-9833 | 2 |
| 9834-13111 | 3 |
| 13112-16389 | 4 |
| 16390-19667 | 5 |
| 19668-22945 | 6 |
| 22946-26223 | 7 |
| 26224-29501 | 8 |
| 29502-32779 | 9 |
| 32780-36057 | 10 |
| 36058-39335 | 11 |
| 39336-42613 | 12 |
| 42614-45891 | 13 |
| 45892-49169 | 14 |
| 49170-52447 | 15 |
| 52448-55725 | 16 |
| 55726-59003 | 17 |
| 59004-62281 | 18 |
| 62282-64281 | 19 |
| 64282-65535 | END |

RANGE OF RANDOM NUMBERS: 0-65535

FIG. 13

PAYOUT TABLE

| | THREE | FOUR | FIVE |
|---|---|---|---|
| A | 100 | 200 | 1000 |
| K | 100 | 200 | 1000 |
| Q | 100 | 200 | 1000 |
| J | 100 | 200 | 1000 |
| SWORD | 200 | 500 | 2000 |
| HAMMER | 200 | 500 | 2000 |
| BAT | 200 | 500 | 3000 |
| DEER | 300 | 600 | 3000 |
| RHINOCEROS | 300 | 1000 | 4000 |
| BUFFALO | 400 | 1500 | 5000 |
| WILD | 500 | 2000 | 10000 |
| FEATURE | 40 | 200 | 600 |

FEATURE: (FREE GAME)

FREE GAME IS RUN WHEN THREE "FEATURE" ARE REARRANGED

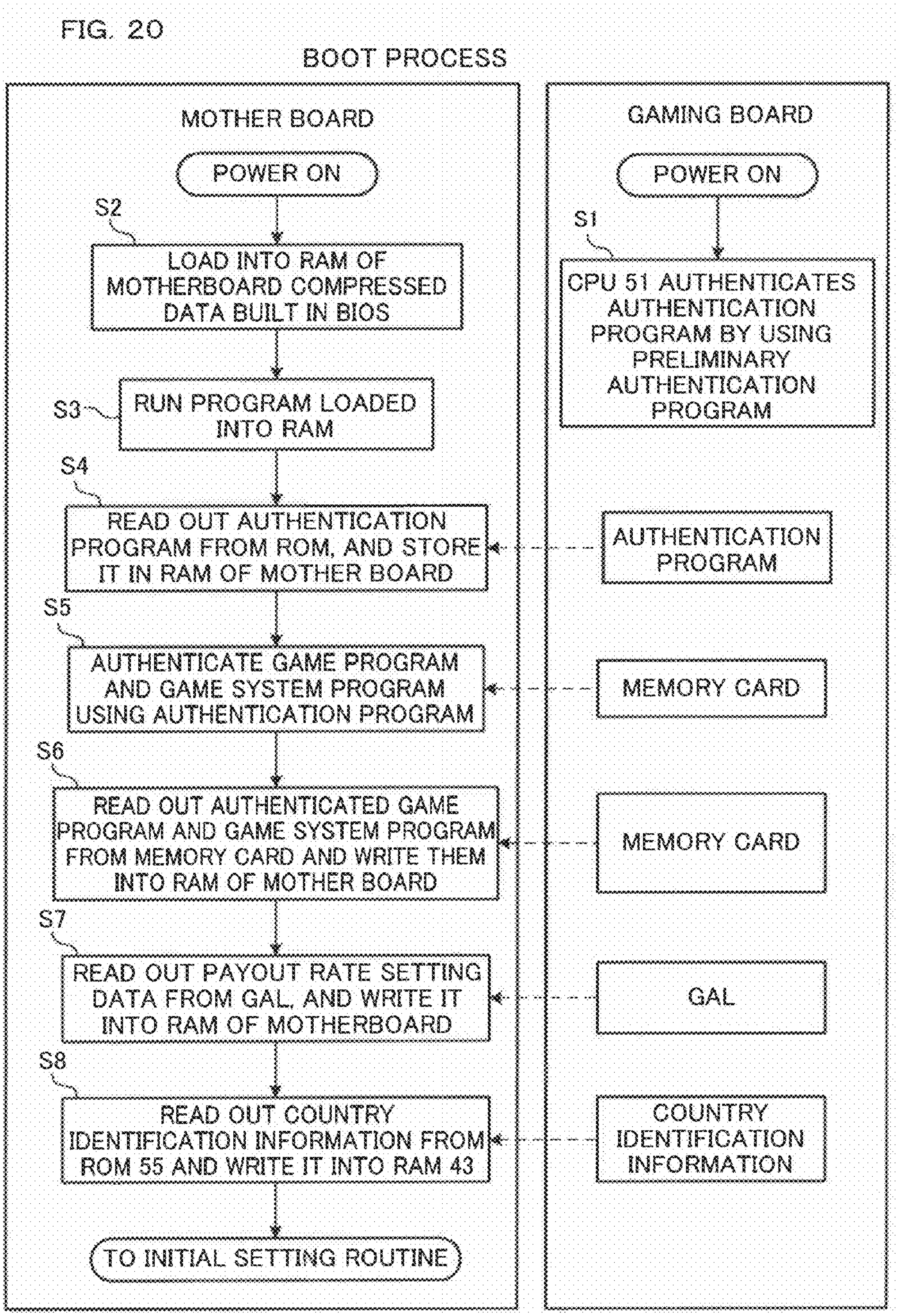
FIG. 20
BOOT PROCESS
MOTHER BOARD
GAMING BOARD
POWER ON
POWER ON
S1
CPU 51 AUTHENTICATES AUTHENTICATION PROGRAM BY USING PRELIMINARY AUTHENTICATION PROGRAM
S2
LOAD INTO RAM OF MOTHERBOARD COMPRESSED DATA BUILT IN BIOS
S3
RUN PROGRAM LOADED INTO RAM
S4
READ OUT AUTHENTICATION PROGRAM FROM ROM, AND STORE IT IN RAM OF MOTHER BOARD
AUTHENTICATION PROGRAM
S5
AUTHENTICATE GAME PROGRAM AND GAME SYSTEM PROGRAM USING AUTHENTICATION PROGRAM
MEMORY CARD
S6
READ OUT AUTHENTICATED GAME PROGRAM AND GAME SYSTEM PROGRAM FROM MEMORY CARD AND WRITE THEM INTO RAM OF MOTHER BOARD
MEMORY CARD
S7
READ OUT PAYOUT RATE SETTING DATA FROM GAL, AND WRITE IT INTO RAM OF MOTHERBOARD
GAL
S8
READ OUT COUNTRY IDENTIFICATION INFORMATION FROM ROM 55 AND WRITE IT INTO RAM 43
COUNTRY IDENTIFICATION INFORMATION
TO INITIAL SETTING ROUTINE

FIG. 30

ORDINARY BONUS GAME SYMBOL TABLE

| | | THIRD COLUMN(L3) |
|---|---|---|
| CODE NUMBER | RANDOM NUMBER | SYMBOL |
| 0 | 0-2519 | FEATURE |
| 1 | 2520-5040 | A |
| 2 | 5041-7561 | J |
| 3 | 7562-10081 | BAT |
| 4 | 10082-12602 | SWORD |
| 5 | 12603-15123 | FEATURE |
| 6 | 15124-17643 | RHINOCEROS |
| 7 | 17644-20164 | BAT |
| 8 | 20165-22685 | FEATURE |
| 9 | 22686-25205 | A |
| 10 | 25206-27726 | J |
| 11 | 27727-30247 | HAMMER |
| 12 | 30248-32767 | A |
| 13 | 32768-35288 | FEATURE |
| 14 | 35289-37809 | Q |
| 15 | 37810-40329 | DEER |
| 16 | 40330-42850 | K |
| 17 | 42851-45371 | BUFFALO |
| 18 | 45372-47891 | FEATURE |
| 19 | 47892-50412 | Q |
| 20 | 50413-52933 | FEATURE |
| 21 | 52934-55453 | A |
| 22 | 55454-57974 | FEATURE |
| 23 | 57975-60495 | HAMMER |
| 24 | 60496-63015 | FEATURE |
| 25 | 63016-65535 | SWORD |

RANGE OF RANDOM NUMBERS：0-65535

FIG. 31

MAXIMUM-BET BONUS GAME SYMBOL TABLE

| | | THIRD COLUMN(L3) |
|---|---|---|
| CODE NUMBER | RANDOM NUMBER | SYMBOL |
| 0 | 0-2259 | FEATURE |
| 1 | 2260-4520 | A |
| 2 | 4521-6781 | J |
| 3 | 6782-9042 | BAT |
| 4 | 9043-11303 | SWORD |
| 5 | 11304-13564 | FEATURE |
| 6 | 13565-15825 | RHINOCEROS |
| 7 | 15826-18086 | BAT |
| 8 | 18087-20347 | FEATURE |
| 9 | 20348-22608 | FEATURE |
| 10 | 22609-24868 | A |
| 11 | 24869-27129 | J |
| 12 | 27130-29390 | HAMMER |
| 13 | 29391-31651 | A |
| 14 | 31652-33912 | FEATURE |
| 15 | 33913-36173 | Q |
| 16 | 36174-38434 | FEATURE |
| 17 | 38435-40695 | DEER |
| 18 | 40696-42956 | K |
| 19 | 42957-45217 | BUFFALO |
| 20 | 45218-47477 | FEATURE |
| 21 | 47478-49738 | Q |
| 22 | 49739-51999 | FEATURE |
| 23 | 52000-54260 | A |
| 24 | 54261-56521 | FEATURE |
| 25 | 56522-58782 | FEATURE |
| 26 | 58783-61043 | HAMMER |
| 27 | 61044-63304 | FEATURE |
| 28 | 63305-65565 | SWORD |

RANGE OF RANDOM NUMBERS：0-65535

FIG. 33

BONUS GAME SYMBOL TABLE

| | | FIRST COLUMN(L1) |
|---|---|---|
| CODE NUMBER | RANDOM NUMBER | SYMBOL |
| 0 | 0~2184 | J |
| 1 | 2185~4369 | Q |
| 2 | 4370~6553 | BAT |
| 3 | 6554~8737 | WILD |
| 4 | 8738~10921 | J |
| 5 | 10922~13105 | Q |
| 6 | 13106~15289 | RHINOCEROS |
| 7 | 15280~17473 | WILD |
| 8 | 17474~19657 | A |
| 9 | 18658~21841 | DEER |
| 10 | 21842~24025 | FEATURE |
| 11 | 24026~26209 | SWORD |
| 12 | 26210~28393 | HAMMER |
| 13 | 28394~30577 | A |
| 14 | 30577~32761 | WILD |
| 15 | 32762~34945 | Q |
| 16 | 34946~37129 | SWORD |
| 17 | 37130~39313 | WILD |
| 18 | 39314~41497 | RHINOCEROS |
| 19 | 41498~43681 | K |
| 20 | 43682~45865 | A |
| 21 | 45866~48049 | WILD |
| 22 | 48050~50233 | HAMMER |
| 23 | 50234~52417 | J |
| 24 | 52418~54601 | WILD |
| 25 | 54602~56785 | Q |
| 26 | 56786~58969 | FEATURE |
| 27 | 58970~61153 | WILD |
| 28 | 61154~63337 | BUFFALO |
| 29 | 63338~65535 | WILD |

• • •

| | | FIFTH COLUMN(L5) |
|---|---|---|
| CODE NUMBER | RANDOM NUMBER | SYMBOL |
| 0 | 0~2184 | WILD |
| 1 | 2185~4369 | J |
| 2 | 4370~6553 | A |
| 3 | 6554~8737 | FEATURE |
| 4 | 8738~10921 | WILD |
| 5 | 10922~13105 | BAT |
| 6 | 13106~15289 | J |
| 7 | 15280~17473 | A |
| 8 | 17474~19657 | BUFFALO |
| 9 | 18658~21841 | WILD |
| 10 | 21842~24025 | RHINOCEROS |
| 11 | 24026~26209 | FEATURE |
| 12 | 26210~28393 | K |
| 13 | 28394~30577 | WILD |
| 14 | 30577~32761 | FEATURE |
| 15 | 32762~34945 | WILD |
| 16 | 34946~37129 | HAMMER |
| 17 | 37130~39313 | Q |
| 18 | 39314~41497 | BAT |
| 19 | 41498~43681 | K |
| 20 | 43682~45865 | WILD |
| 21 | 45866~48049 | DEER |
| 22 | 48050~50233 | SWORD |
| 23 | 50234~52417 | J |
| 24 | 52418~54601 | WILD |
| 25 | 54602~56785 | WILD |
| 26 | 56786~58969 | HAMMER |
| 27 | 58970~61153 | SWORD |
| 28 | 61154~63337 | Q |
| 29 | 63338~65535 | WILD |

RANGE OF RANDOM NUMBERS:0~65535

FIG. 34

ADDITIONAL WILD SYMBOL COUNT DETERMINATION TABLE

| INCREASES IN THE NUMBER OF WILD SYMBOLS | RANDOM NUMBER |
|---|---|
| 40 | 0-13106 |
| 50 | 13107-26214 |
| 60 | 26215-45875 |
| 70 | 45876-58981 |
| 90 | 58982-65535 |

RANGE OF RANDOM NUMBERS:0-65535

FIG. 39

BONUS-GAME ADDED TRIGGER SYMBOL TABLE

| | | FIRST COLUMN(L1) |
|---|---|---|
| CODE NUMBER | RANDOM NUMBER | SYMBOL |
| 0 | 0~1872 | J |
| 1 | 1873~3744 | Q |
| 2 | 3745~5656 | BAT |
| 3 | 5657~7488 | WILD |
| 4 | 7489~9360 | J |
| 5 | 9361~11232 | Q |
| 6 | 11233~13104 | RHINOCEROS |
| 7 | 13105~14976 | WILD |
| 8 | 14977~16848 | A |
| 9 | 16849~18720 | DEER |
| 10 | 18721~20592 | FEATURE |
| 11 | 20593~22464 | FEATURE |
| 12 | 22465~24336 | SWORD |
| 13 | 24337~26209 | HAMMER |
| 14 | 26210~28080 | A |
| 15 | 28081~29952 | WILD |
| 16 | 29953~31824 | Q |
| 17 | 31825~33696 | FEATURE |
| 18 | 33697~35568 | SWORD |
| 19 | 35569~37440 | WILD |
| 20 | 37441~39312 | RHINOCEROS |
| 21 | 39313~41184 | K |
| 22 | 41185~43056 | A |
| 23 | 43057~44928 | WILD |
| 24 | 44929~46800 | FEATURE |
| 25 | 46801~48672 | HAMMER |
| 26 | 48673~50544 | J |
| 27 | 50545~52416 | WILD |
| 28 | 52417~54288 | Q |
| 29 | 54289~56160 | FEATURE |
| 30 | 56161~58032 | WILD |
| 31 | 58033~59904 | BUFFALO |
| 32 | 59905~61777 | WILD |
| 33 | 61778~63648 | FEATURE |
| 34 | 63649~65535 | FEATURE |

• • •

| | | FIFTH COLUMN(L5) |
|---|---|---|
| CODE NUMBER | RANDOM NUMBER | SYMBOL |
| 0 | 0~2184 | WILD |
| 1 | 2185~4369 | J |
| 2 | 4370~6553 | A |
| 3 | 6554~8737 | WILD |
| 4 | 8738~10921 | WILD |
| 5 | 10922~13105 | BAT |
| 6 | 13106~15289 | J |
| 7 | 15280~17473 | A |
| 8 | 17474~19657 | BUFFALO |
| 9 | 18658~21841 | WILD |
| 10 | 21842~24025 | RHINOCEROS |
| 11 | 24026~26209 | FEATURE |
| 12 | 26210~28393 | K |
| 13 | 28394~30577 | WILD |
| 14 | 30578~32761 | WILD |
| 15 | 32762~34945 | WILD |
| 16 | 34946~37129 | HAMMER |
| 17 | 37130~39313 | Q |
| 18 | 39314~41497 | BAT |
| 19 | 41498~43681 | K |
| 20 | 43682~45865 | WILD |
| 21 | 45866~48049 | DEER |
| 22 | 48050~50233 | SWORD |
| 23 | 50234~52417 | J |
| 24 | 52418~54601 | WILD |
| 25 | 54602~56785 | WILD |
| 26 | 56786~58969 | HAMMER |
| 27 | 58970~61153 | SWORD |
| 28 | 61154~63337 | Q |
| 29 | 63338~65535 | WILD |

RANGE OF RANDOM NUMBERS: 0~65535

FIG. 40

ADDITIONAL TRIGGER SYMBOL COUNT DETERMINATION TABLE

| ADDITIONAL TRIGGER SYMBOL COUNT | RANDOM NUMBER |
|---|---|
| 2 | 0-13106 |
| 4 | 13107-26214 |
| 6 | 26215-39321 |
| 8 | 39322-52428 |
| 10 | 52429-65535 |

RANGE OF RANDOM NUMBERS:0-65535

FREE RESCUE GAME STARTED!!
CREDIT
136980
BET
500
WIN
0
WILD
+0
FEATURE
+0
400
401
402
403
404
16
28
310c (310)
310a (310)
310b (310)
SMALL BONUS
BIG BONUS
IF NO MAXIMUM BET IS MADE IN BASE GAMES COUNTED
FIRST FREE RESCUE GAME!!
WILD
+5
FEATURE
+5
IF MAXIMUM BET IS MADE IN BASE GAMES COUNTED
SECOND FREE RESCUE GAME!!
WILD
+10
FEATURE
+20

FIG. 55 SYMBOL CODES AT THE INITIAL STAGE

| | | FIRST COLUMN | SECOND COLUMN | THIRD COLUMN | FOURTH COLUMN | FIFTH COLUMN |
|---|---|---|---|---|---|---|
| CODE NO. | RANDOM NUMBER | SYMBOLS | SYMBOLS | SYMBOLS | SYMBOLS | SYMBOLS |
| 00 | 0-3277 | J | WILD | A | Q | J |
| 01 | 3278-6555 | Q | A | J | J | A |
| 02 | 6558-9833 | CLUB | Q | CLUB | CLUB | CLUB |
| 03 | 9834-13111 | J | WILD | 10 | Q | J |
| 04 | 13112-16389 | Q | WILD | REINDEER | k | A |
| 05 | 16390-19667 | REINDEER | WILD | CLUB | CLUB | BUFFALO |
| 06 | 19668-22945 | A | BUFFALO | FEATURE | A | REINDEER |
| 07 | 22946-26223 | RHINO | RHINO | A | K | FEATURE |
| 08 | 26224-29501 | 10 | K | J | 9 | K |
| 09 | 29502-32779 | 9 | REINDEER | 9 | Q | 9 |
| 10 | 32780-36057 | A | WILD | A | RHINO | Q |
| 11 | 36058-39335 | Q | A | Q | 10 | CLUB |
| 12 | 39336-42613 | 10 | 9 | RHINO | FEATURE | K |
| 13 | 42614-45891 | REINDEER | RHINO | K | K | RHINO |
| 14 | 45892-49169 | K | J | BUFFALO | 10 | 10 |
| 15 | 49170-52447 | A | WILD | Q | BUFFALO | J |
| 16 | 52448-55725 | WILD | 10 | FEATURE | A | WILD |
| 17 | 55726-59003 | J | CLUB | A | WILD | WILD |
| 18 | 59004-62281 | Q | WILD | WILD | BUFFALO | WILD |
| 19 | 62282-65535 | BUFFALO | FEATURE | WILD | REINDEER | Q |

RANGE OF RANDOM NUMBERS: 0 TO 65535

FIG. 56

| SYMBOLS | THE NUMBER OF SYMBOLS REARRANGED | | | |
|---|---|---|---|---|
| | TWO | THREE | FOUR | FIVE |
| 10 | 2 | 4 | 6 | 8 |
| J | 3 | 6 | 9 | 12 |
| Q | 30 | 60 | 90 | 120 |
| K | 10 | 20 | 30 | 40 |
| CLUB | 5 | 10 | 15 | 20 |
| REINDEER | 8 | 16 | 24 | 32 |
| RHINO | 15 | 30 | 45 | 60 |
| BUFFALO | 25 | 50 | 75 | 100 |
| FEATURE | FEATURE GAME (*) | | | |

* FEATURE GAME IS RUN WHEN THREE OR MORE ARE REARRANGED

FIG. 57

ADDITIONAL WILD SYMBOL COUNT DETERMINATION TABLE

| THE NUMBER OF ADDITIONAL WILD SYMBOLS | RANDOM NUMBER |
|---|---|
| 10 | 0~13106 |
| 20 | 13107~26214 |
| 30 | 26215~39321 |
| 40 | 39322~52428 |
| 50 | 52429~65535 |

(RANGE OF RANDOM NUMBERS: 0 TO 65535)

FIG. 58

SYMBOL COLUMN DETERMINATION TABLE

| SYMBOL COLUMN NO. | RANDOM NUMBER |
|---|---|
| 1 | 0～13106 |
| 2 | 13107～26214 |
| 3 | 26215～39321 |
| 4 | 39322～52428 |
| 5 | 52429～65535 |

(RANGE OF RANDOM NUMBERS: 0 TO 65535)

FIG. 59

CODE NO. DETERMINATION TABLE

| RANDOM NUMBER | CODE NO. |
|---|---|
| 0～2978 | 00 |
| 2979～5957 | 01 |
| 5958～8936 | 02 |
| 8937～11915 | 03 |
| 11916～14894 | 04 |
| 14895～17873 | 05 |
| 17874～20852 | 06 |
| 20853～23831 | 07 |
| 23832～26810 | 08 |
| 26811～29789 | 09 |
| 29790～32768 | 10 |
| 32769～35747 | 11 |
| 35748～38726 | 12 |
| 38727～41705 | 13 |
| 41706～44684 | 14 |
| 44685～47663 | 15 |
| 47664～50642 | 16 |
| 50643～53621 | 17 |
| 53622～56600 | 18 |
| 56601～59579 | 19 |
| 59580～62558 | 20 |
| 62559～65535 | END |

FIG. 60A

SYMBOL CODES WHEN TEN WILD SYMBOLS ARE ADDED

| FIRST COLUMN | | | SECOND COLUMN | | | THIRD COLUMN | | |
|---|---|---|---|---|---|---|---|---|
| CODE NO. | RANDOM NUMBER | SYMBOL | CODE NO. | RANDOM NUMBER | SYMBOL | CODE NO. | RANDOM NUMBER | SYMBOL |
| 00 | 0~2849 | J | 00 | 0~3119 | WILD | 00 | 0~2978 | A |
| 01 | 2850~5700 | Q | 01 | 3120~6240 | A | 01 | 2979~5957 | J |
| 02 | 5701~8551 | CLUB | 02 | 6241~9361 | Q | 02 | 5958~8936 | CLUB |
| 03 | 8552~11402 | J | 03 | 9362~12482 | WILD | 03 | 8937~11915 | 10 |
| 04 | 11403~14253 | Q | 04 | 12483~15603 | WILD | 04 | 11916~14894 | REINDEER |
| 05 | 14254~17104 | REINDEER | 05 | 15604~18723 | WILD | 05 | 14895~17873 | CLUB |
| 06 | 17105~19955 | A | 06 | 18724~21844 | BUFFALO | 06 | 17874~20852 | WILD |
| 07 | 19956~22806 | RHINO | 07 | 21845~24965 | RHINO | 07 | 20853~23831 | FEATURE |
| 08 | 22807~22657 | 10 | 08 | 24966~28086 | K | 08 | 23832~26810 | A |
| 09 | 22658~28508 | 9 | 09 | 28087~31207 | REINDEER | 09 | 26811~29789 | J |
| 10 | 28509~31359 | A | 10 | 31208~34328 | WILD | 10 | 29790~32768 | 9 |
| 11 | 31360~34210 | Q | 11 | 34329~37449 | A | 11 | 32769~35747 | A |
| 12 | 34211~37061 | 10 | 12 | 37450~40570 | WILD | 12 | 35748~38726 | Q |
| 13 | 37062~39912 | WILD | 13 | 40571~43691 | 9 | 13 | 38727~41705 | WILD |
| 14 | 39913~42763 | FEATURE | 14 | 43692~46812 | RHINO | 14 | 41706~44684 | RHINO |
| 15 | 42764~45614 | K | 15 | 46813~49933 | J | 15 | 44685~47663 | K |
| 16 | 45615~48465 | A | 16 | 49934~53054 | WILD | 16 | 47664~50642 | BUFFALO |
| 17 | 48466~51316 | WILD | 17 | 53055~56175 | 10 | 17 | 50643~53621 | Q |
| 18 | 51317~54167 | J | 18 | 56176~59296 | CLUB | 18 | 53622~56600 | FEATURE |
| 19 | 54168~57018 | Q | 19 | 59297~62417 | WILD | 19 | 56601~59579 | A |
| 20 | 57019~59869 | BUFFALO | 20 | 62418~65535 | FEATURE | 20 | 59580~62558 | WILD |
| 21 | 59870~62720 | WILD | | | | 21 | 62559~65535 | WILD |
| 22 | 62721~65535 | WILD | | | | | | |

(RANGE OF RANDOM NUMBERS: 0 TO 65535)

FIG. 60B

| FOURTH COLUMN | | | FIFTH COLUMN | |
|---|---|---|---|---|
| RANDOM NUMBER | SYMBOL | CODE NO. | RANDOM NUMBER | SYMBOL |
| 0~2978 | Q | 00 | 0~2978 | J |
| 2979~5957 | J | 01 | 2979~5957 | J |
| 5958~8936 | CLUB | 02 | 5958~8936 | CLUB |
| 8937~11915 | Q | 03 | 8937~11915 | J |
| 11916~14894 | K | 04 | 11916~14894 | A |
| 14895~17873 | CLUB | 05 | 14895~17873 | BUFFALO |
| 17874~20852 | A | 06 | 17874~20852 | REINDEER |
| 20853~23831 | K | 07 | 20853~23831 | FEATURE |
| 23832~26810 | 9 | 08 | 23832~26810 | K |
| 26811~29789 | Q | 09 | 26811~29789 | 9 |
| 29790~32768 | RHINO | 10 | 29790~32768 | Q |
| 32769~35747 | WILD | 11 | 32769~35747 | CLUB |
| 35748~38726 | WILD | 12 | 35748~38726 | K |
| 38727~41705 | 10 | 13 | 38727~41705 | RHINO |
| 41706~44684 | FEATURE | 14 | 41706~44684 | 10 |
| 44685~47663 | K | 15 | 44685~47663 | J |
| 47664~50642 | 10 | 16 | 47664~50642 | WILD |
| 50643~53621 | BUFFALO | 17 | 50643~53621 | WILD |
| 53622~56600 | A | 18 | 53622~56600 | WILD |
| 56601~59579 | WILD | 19 | 56601~59579 | WILD |
| 59580~62558 | BUFFALO | 20 | 59580~62558 | WILD |
| 62559~65535 | REINDEER | 21 | 62559~65535 | Q |

FIG. 61A

SYMBOL CODES WHEN WILD AND FEATURE SYMBOLS ARE ADDED IN FIRST FREE RESCUE GAME

| | FIRST COLUMN | | SECOND COLUMN | | THIRD COLUMN | |
|---|---|---|---|---|---|---|
| CODE NO. | RANDOM NUMBER | SYMBOL | RANDOM NUMBER | SYMBOL | RANDOM NUMBER | SYMBOL |
| 00 | 0~2849 | J | 0~3119 | WILD | 0~2978 | A |
| 01 | 2850~5700 | Q | 3120~6240 | A | 2979~5957 | J |
| 02 | 5701~8551 | CLUB | 6241~9361 | Q | 5958~8936 | CLUB |
| 03 | 8552~11402 | J | 9362~12482 | WILD | 8937~11915 | 10 |
| 04 | 11403~14253 | Q | 12483~15603 | WILD | 11916~14894 | REINDEER |
| 05 | 14254~17104 | REINDEER | 15604~18723 | WILD | 14895~17873 | CLUB |
| 06 | 17105~19955 | A | 18724~21844 | BUFFALO | 17874~20852 | WILD |
| 07 | 19956~22806 | RHINO | 21845~24965 | RHINO | 20853~23831 | FEATURE |
| 08 | 22807~22657 | 10 | 24966~28086 | K | 23832~26810 | A |
| 09 | 22658~28508 | 9 | 28087~31207 | REINDEER | 26811~29789 | J |
| 10 | 28509~31359 | A | 31208~34328 | WILD | 29790~32768 | 9 |
| 11 | 31360~34210 | Q | 34329~37449 | A | 32769~35747 | A |
| 12 | 34211~37061 | 10 | 37450~40570 | FEATURE | 35748~38726 | Q |
| 13 | 37062~39912 | WILD | 40571~43691 | 9 | 38727~41705 | FEATURE |
| 14 | 39913~42763 | REINDEER | 43692~46812 | RHINO | 41706~44684 | RHINO |
| 15 | 42764~45614 | K | 46813~49933 | J | 44685~47663 | K |
| 16 | 45615~48465 | A | 49934~53054 | WILD | 47664~50642 | BUFFALO |
| 17 | 48466~51316 | WILD | 53055~56175 | 10 | 50643~53621 | Q |
| 18 | 51317~54167 | J | 56176~59296 | CLUB | 53622~56600 | FEATURE |
| 19 | 54168~57018 | Q | 59297~62417 | WILD | 56601~59579 | A |
| 20 | 57019~59869 | BUFFALO | 62418~65535 | FEATURE | 59580~62558 | WILD |
| 21 | 59870~62720 | FEATURE | | | 62559~65535 | WILD |
| 22 | 62721~65535 | WILD | | | | |

(RANGE OF RANDOM NUMBERS: 0 TO 65535)

FIG. 61B

SYMBOL CODES WHEN WILD AND FEATURE SYMBOLS ARE ADDED IN FIRST FREE RESCUE GAME

| FOURTH COLUMN | | FIFTH COLUMN | |
|---|---|---|---|
| RANDOM NUMBER | SYMBOL | RANDOM NUMBER | SYMBOL |
| 0～2978 | Q | 0～2978 | J |
| 2979～5957 | J | 2979～5957 | J |
| 5958～8936 | CLUB | 5958～8936 | CLUB |
| 8937～11915 | Q | 8937～11915 | J |
| 11916～14894 | K | 11916～14894 | A |
| 14895～17873 | CLUB | 14895～17873 | BUFFALO |
| 17874～20852 | A | 17874～20852 | REINDEER |
| 20853～23831 | K | 20853～23831 | FEATURE |
| 23832～26810 | 9 | 23832～26810 | K |
| 26811～29789 | Q | 26811～29789 | 9 |
| 29790～32768 | RHINO | 29790～32768 | Q |
| 32769～35747 | WILD | 32769～35747 | CLUB |
| 35748～38726 | FEATURE | 35748～38726 | K |
| 38727～41705 | 10 | 38727～41705 | RHINO |
| 41706～44684 | FEATURE | 41706～44684 | 10 |
| 44685～47663 | K | 44685～47663 | J |
| 47664～50642 | 10 | 47664～50642 | WILD |
| 50643～53621 | BUFFALO | 50643～53621 | WILD |
| 53622～56600 | A | 53622～56600 | WILD |
| 56601～59579 | WILD | 56601～59579 | FEATURE |
| 59580～62558 | BUFFALO | 59580～62558 | WILD |
| 62559～65535 | REINDEER | 62559～65535 | Q |

(RANGE OF RANDOM NUMBERS: 0 TO 65535)

FIG. 62A

SYMBOL CODES WHEN WILD AND FEATURE SYMBOLS ARE ADDED IN SECOND FREE RESCUE GAME

| FIRST COLUMN | | | SECOND COLUMN | | | THIRD COLUMN | | |
|---|---|---|---|---|---|---|---|---|
| CODE NO. | RANDOM NUMBER | SYMBOL | CODE NO. | RANDOM NUMBER | SYMBOL | CODE NO. | RANDOM NUMBER | SYMBOL |
| 00 | 0~2849 | J | 00 | 0~3119 | WILD | 00 | 0~2978 | A |
| 01 | 2850~5700 | FEATURE | 01 | 3120~6240 | A | 01 | 2979~5957 | FEATURE |
| 02 | 5701~8551 | CLUB | 02 | 6241~9361 | FEATURE | 02 | 5958~8936 | CLUB |
| 03 | 8552~11402 | J | 03 | 9362~12482 | WILD | 03 | 8937~11915 | FEATURE |
| 04 | 11403~14253 | FEATURE | 04 | 12483~15603 | WILD | 04 | 11916~14894 | REINDEER |
| 05 | 14254~17104 | REINDEER | 05 | 15604~18723 | WILD | 05 | 14895~17873 | CLUB |
| 06 | 17105~19955 | A | 06 | 18724~21844 | BUFFALO | 06 | 17874~20852 | WILD |
| 07 | 19956~22806 | RHINO | 07 | 21845~24965 | RHINO | 07 | 20853~23831 | FEATURE |
| 08 | 22807~22657 | 10 | 08 | 24966~28086 | WILD | 08 | 23832~26810 | A |
| 09 | 22658~28508 | FEATURE | 09 | 28087~31207 | REINDEER | 09 | 26811~29789 | J |
| 10 | 28509~31359 | A | 10 | 31208~34328 | WILD | 10 | 29790~32768 | FEATURE |
| 11 | 31360~34210 | Q | 11 | 34329~37449 | WILD | 11 | 32769~35747 | FEATURE |
| 12 | 34211~37061 | 10 | 12 | 37450~40570 | FEATURE | 12 | 35748~38726 | Q |
| 13 | 37062~39912 | WILD | 13 | 40571~43691 | 9 | 13 | 38727~41705 | FEATURE |
| 14 | 39913~42763 | REINDEER | 14 | 43692~46812 | RHINO | 14 | 41706~44684 | RHINO |
| 15 | 42764~45614 | K | 15 | 46813~49933 | J | 15 | 44685~47663 | K |
| 16 | 45615~48465 | A | 16 | 49934~53054 | WILD | 16 | 47664~50642 | BUFFALO |
| 17 | 48466~51316 | WILD | 17 | 53055~56175 | FEATURE | 17 | 50643~53621 | WILD |
| 18 | 51317~54167 | FEATURE | 18 | 56176~59296 | CLUB | 18 | 53622~56600 | FEATURE |
| 19 | 54168~57018 | Q | 19 | 59297~62417 | WILD | 19 | 56601~59579 | A |
| 20 | 57019~59869 | BUFFALO | 20 | 62418~65535 | FEATURE | 20 | 59580~62558 | WILD |
| 21 | 59870~62720 | FEATURE | | | | 21 | 62559~65535 | WILD |
| 22 | 62721~65535 | WILD | | | | | | |

(RANGE OF RANDOM NUMBERS: 0 TO 65535)

FIG. 62B

SYMBOL CODES WHEN WILD AND FEATURE SYMBOLS ARE ADDED IN SECOND FREE RESCUE GAME

| FOURTH COLUMN | | FIFTH COLUMN | |
|---|---|---|---|
| RANDOM NUMBER | SYMBOL | RANDOM NUMBER | SYMBOL |
| 0~2978 | Q | 0~2978 | J |
| 2979~5957 | J | 2979~5957 | FEATURE |
| 5958~8936 | CLUB | 5958~8936 | CLUB |
| 8937~11915 | FEATURE | 8937~11915 | J |
| 11916~14894 | K | 11916~14894 | FEATURE |
| 14895~17873 | CLUB | 14895~17873 | BUFFALO |
| 17874~20852 | A | 17874~20852 | REINDEER |
| 20853~23831 | FEATURE | 20853~23831 | FEATURE |
| 23832~26810 | 9 | 23832~26810 | K |
| 26811~29789 | Q | 26811~29789 | 9 |
| 29790~32768 | RHINO | 29790~32768 | FEATURE |
| 32769~35747 | WILD | 32769~35747 | CLUB |
| 35748~38726 | FEATURE | 35748~38726 | FEATURE |
| 38727~41705 | 10 | 38727~41705 | RHINO |
| 41706~44684 | FEATURE | 41706~44684 | WILD |
| 44685~47663 | K | 44685~47663 | J |
| 47664~50642 | WILD | 47664~50642 | WILD |
| 50643~53621 | BUFFALO | 50643~53621 | WILD |
| 53622~56600 | A | 53622~56600 | WILD |
| 56601~59579 | WILD | 56601~59579 | FEATURE |
| 59580~62558 | BUFFALO | 59580~62558 | WILD |
| 62559~65535 | REINDEER | 62559~65535 | Q |

(RANGE OF RANDOM NUMBERS: 0 TO 65535)

FIRST FREE RESCUE GAME

SECOND FREE RESCUE GAME

FIG. 77

FEATURE GAME ADDITIONAL WILD SYMBOL COUNT DETERMINATION TABLE

| THE NUMBER OF ADDITIONAL WILD SYMBOLS | RANDOM NUMBER |
|---|---|
| 40 | 0～13106 |
| 50 | 13107～26214 |
| 60 | 26215～45874 |
| 70 | 45875～58982 |
| 90 | 58983～65535 |

(RANGE OF RANDOM NUMBERS: 0 TO 65535)

FIG. 78

RE-TRIGGER RATIO FOR EACH GAME TYPE

| GAME TYPE | RE-TRIGGER RATIO PER SPIN |
|---|---|
| BASIC GAME | APPROXIMATELY 1/150 |
| FEATURE GAME | APPROXIMATELY 1/30 TO 1/40 |
| FEATURE GAME (MAXIMUM BET HAS BEEN MADE) | APPROXIMATELY 1/20 TO 1/26 |

FIG. 79

THE NUMBER OF ADDITIONAL WILD SYMBOLS AND THE NUMBER OF ADDITIONAL FEATURE SYMBOLS FOR EACH GAME TYPE

| TYPE OF GAME | THE NUMBER OF ADDITIONAL WILD SYMBOLS | THE NUMBER OF ADDITIONAL FEATURE SYMBOLS |
|---|---|---|
| FEATURE GAME | 40 TO 90 | 12 |
| FEATURE GAME (MAXIMUM BET HAS BEEN MADE) | 40 TO 90 | 18 |
| FREE RESCUE SPIN GAME | 60 TO 110 | 18 |
| FREE RESCUE SPIN GAME (MAXIMUM BET HAS BEEN MADE) | 60 to 110 | 24 |

FIG. 80A

SYMBOL CODES WHEN 40 WILD SYMBOLS AND 12 FEATURE SYMBOLS ARE ADDED (IN FEATURE GAME)

| | FIRST COLUMN | | SECOND COLUMN | | THIRD COLUMN | |
|---|---|---|---|---|---|---|
| CODE NO. | RANDOM NUMBER | SYMBOL | RANDOM NUMBER | SYMBOL | RANDOM NUMBER | SYMBOL |
| 00 | 0~2849 | WILD | 0~3119 | WILD | 0~2978 | WILD |
| 01 | 2850~5700 | Q | 3120~6240 | WILD | 2979~5957 | WILD |
| 02 | 5701~8551 | CLUB | 6241~9361 | FEATURE | 5958~8936 | CLUB |
| 03 | 8552~11402 | FEATURE | 9362~12482 | WILD | 8937~11915 | FEATURE |
| 04 | 11403~14253 | WILD | 12483~15603 | WILD | 11916~14894 | REINDEER |
| 05 | 14254~17104 | REINDEER | 15604~18723 | WILD | 14895~17873 | CLUB |
| 06 | 17105~19955 | A | 18724~21844 | BUFFALO | 17874~20852 | WILD |
| 07 | 19956~22806 | RHINO | 21845~24965 | RHINO | 20853~23831 | FEATURE |
| 08 | 22807~25657 | WILD | 24966~28086 | K | 23832~26810 | WILD |
| 09 | 25658~28508 | WILD | 28087~31207 | REINDEER | 26811~29789 | WILD |
| 10 | 28509~31359 | WILD | 31208~34328 | WILD | 29790~32768 | WILD |
| 11 | 31360~34210 | Q | 34329~37449 | WILD | 32769~35747 | WILD |
| 12 | 34211~37061 | 10 | 37450~40570 | WILD | 35748~38726 | Q |
| 13 | 37062~39912 | WILD | 40571~43691 | WILD | 38727~41705 | WILD |
| 14 | 39913~42763 | REINDEER | 43692~46812 | RHINO | 41706~44684 | RHINO |
| 15 | 42764~45614 | K | 46813~49933 | FEATURE | 44685~47663 | FEATURE |
| 16 | 45615~48465 | FEATURE | 49934~53054 | WILD | 47664~50642 | BUFFALO |
| 17 | 48466~51316 | WILD | 53055~56175 | WILD | 50643~53621 | WILD |
| 18 | 51317~54167 | WILD | 56176~59296 | CLUB | 53622~56600 | FEATURE |
| 19 | 54168~57018 | WILD | 59297~62417 | WILD | 56601~59579 | A |
| 20 | 57019~59869 | BUFFALO | 62418~65535 | FEATURE | 59580~62558 | WILD |
| 21 | 59870~62720 | WILD | | | 62559~65535 | WILD |
| 22 | 62721~65535 | WILD | | | | |

(RANGE OF RANDOM NUMBERS: 0 TO 65535)

FIG. 80B

| FOURTH COLUMN | | FIFTH COLUMN | |
|---|---|---|---|
| RANDOM NUMBER | SYMBOL | RANDOM NUMBER | SYMBOL |
| 0～2978 | WILD | 0～2978 | WILD |
| 2979～5957 | WILD | 2979～5957 | WILD |
| 5958～8936 | CLUB | 5958～8936 | WILD |
| 8937～11915 | WILD | 8937～11915 | FEATURE |
| 11916～14894 | FEATURE | 11916～14894 | FEATURE |
| 14895～17873 | CLUB | 14895～17873 | BUFFALO |
| 17874～20852 | WILD | 17874～20852 | REINDEER |
| 20853～23831 | WILD | 20853～23831 | FEATURE |
| 23832～26810 | WILD | 23832～26810 | K |
| 26811～29789 | Q | 26811～29789 | WILD |
| 29790～32768 | RHINO | 29790～32768 | WILD |
| 32769～35747 | WILD | 32769～35747 | CLUB |
| 35748～38726 | WILD | 35748～38726 | K |
| 38727～41705 | FEATURE | 38727～41705 | RHINO |
| 41706～44684 | FEATURE | 41706～44684 | WILD |
| 44685～47663 | FEATURE | 44685～47663 | FEATURE |
| 47664～50642 | 10 | 47664～50642 | WILD |
| 50643～53621 | BUFFALO | 50643～53621 | WILD |
| 53622～56600 | A | 53622～56600 | WILD |
| 56601～59579 | WILD | 56601～59579 | WILD |
| 59580～62558 | BUFFALO | 59580～62558 | WILD |
| 62559～65535 | REINDEER | 62559～65535 | Q |

(RANGE OF RANDOM NUMBERS: 0 TO 65535)

FIG. 81A

SYMBOL CODES WHEN 40 WILD SYMBOLS AND 18 FEATURE SYMBOLS ARE ADDED
(IN FEATURE GAME; MAXIMUM BET HAS BEEN MADE)

| | FIRST COLUMN | | SECOND COLUMN | | THIRD COLUMN | |
|---|---|---|---|---|---|---|
| CODE NO. | RANDOM NUMBER | SYMBOL | RANDOM NUMBER | SYMBOL | RANDOM NUMBER | SYMBOL |
| 00 | 0~2849 | WILD | 0~3119 | WILD | 0~2978 | WILD |
| 01 | 2850~5700 | Q | 3120~6240 | WILD | 2979~5957 | WILD |
| 02 | 5701~8551 | CLUB | 6241~9361 | FEATURE | 5958~8936 | CLUB |
| 03 | 8552~11402 | FEATURE | 9362~12482 | WILD | 8937~11915 | FEATURE |
| 04 | 11403~14253 | WILD | 12483~15603 | WILD | 11916~14894 | REINDEER |
| 05 | 14254~17104 | REINDEER | 15604~18723 | WILD | 14895~17873 | CLUB |
| 06 | 17105~19955 | A | 18724~21844 | BUFFALO | 17874~20852 | WILD |
| 07 | 19956~22806 | RHINO | 21845~24965 | RHINO | 20853~23831 | FEATURE |
| 08 | 22807~25657 | WILD | 24966~28086 | FEATURE | 23832~26810 | WILD |
| 09 | 25658~28508 | WILD | 28087~31207 | REINDEER | 26811~29789 | WILD |
| 10 | 28509~31359 | WILD | 31208~34328 | WILD | 29790~32768 | WILD |
| 11 | 31360~34210 | Q | 34329~37449 | WILD | 32769~35747 | WILD |
| 12 | 34211~37061 | FEATURE | 37450~40570 | WILD | 35748~38726 | Q |
| 13 | 37062~39912 | WILD | 40571~43691 | WILD | 38727~41705 | WILD |
| 14 | 39913~42763 | REINDEER | 43692~46812 | RHINO | 41706~44684 | RHINO |
| 15 | 42764~45614 | K | 46813~49933 | FEATURE | 44685~47663 | FEATURE |
| 16 | 45615~48465 | FEATURE | 49934~53054 | WILD | 47664~50642 | BUFFALO |
| 17 | 48466~51316 | WILD | 53055~56175 | WILD | 50643~53621 | WILD |
| 18 | 51317~54167 | WILD | 56176~59296 | CLUB | 53622~56600 | FEATURE |
| 19 | 54168~57018 | WILD | 59297~62417 | WILD | 56601~59579 | FEATURE |
| 20 | 57019~59869 | BUFFALO | 62418~65535 | FEATURE | 59580~62558 | WILD |
| 21 | 59870~62720 | WILD | | | 62559~65535 | WILD |
| 22 | 62721~65535 | WILD | | | | |

(RANGE OF RANDOM NUMBERS: 0 TO 65535)

FIG. 81B

| FOURTH COLUMN | | FIFTH COLUMN | |
|---|---|---|---|
| RANDOM NUMBER | SYMBOL | RANDOM NUMBER | SYMBOL |
| 0~2978 | WILD | 0~2978 | WILD |
| 2979~5957 | WILD | 2979~5957 | WILD |
| 5958~8936 | CLUB | 5958~8936 | WILD |
| 8937~11915 | WILD | 8937~11915 | FEATURE |
| 11916~14894 | FEATURE | 11916~14894 | FEATURE |
| 14895~17873 | CLUB | 14895~17873 | BUFFALO |
| 17874~20852 | WILD | 17874~20852 | REINDEER |
| 20853~23831 | WILD | 20853~23831 | FEATURE |
| 23832~26810 | WILD | 23832~26810 | FEATURE |
| 26811~29789 | Q | 26811~29789 | WILD |
| 29790~32768 | RHINO | 29790~32768 | WILD |
| 32769~35747 | WILD | 32769~35747 | CLUB |
| 35748~38726 | WILD | 35748~38726 | FEATURE |
| 38727~41705 | FEATURE | 38727~41705 | RHINO |
| 41706~44684 | FEATURE | 41706~44684 | WILD |
| 44685~47663 | FEATURE | 44685~47663 | FEATURE |
| 47664~50642 | 10 | 47664~50642 | WILD |
| 50643~53621 | BUFFALO | 50643~53621 | WILD |
| 53622~56600 | FEATURE | 53622~56600 | WILD |
| 56601~59579 | WILD | 56601~59579 | WILD |
| 59580~62558 | BUFFALO | 59580~62558 | WILD |
| 62559~65535 | REINDEER | 62559~65535 | Q |

(RANGE OF RANDOM NUMBERS: 0 TO 65535)

FIG. 96 BASE GAME SYMBOL TABLE

| | | FIRST COLUMN(L1) | SECOND COLUMN(L2) | THIRD COLUMN(L3) | FOURTH COLUMN(L4) | FIFTH COLUMN(L5) |
|---|---|---|---|---|---|---|
| CODE NO. | RANDOM NUMBER | SYMBOL | SYMBOL | SYMBOL | SYMBOL | SYMBOL |
| 0 | 0~3277 | J | WILD | A | Q | J |
| 1 | 3278~6555 | Q | A | J | J | A |
| 2 | 6556~9833 | BAT | Q | BAT | BAT | BAT |
| 3 | 9834~13111 | J | HAMMER | SWORD | Q | J |
| 4 | 13112~16389 | Q | SWORD | RHINOCEROS | K | A |
| 5 | 16390~19667 | RHINOCEROS | WILD | BAT | BAT | BUFFALO |
| 6 | 19668~22945 | A | BUFFALO | FEATURE | A | RHINOCEROS |
| 7 | 22946~26223 | DEER | DEER | A | K | FEATURE |
| 8 | 26224~29501 | SWORD | K | J | HAMMER | K |
| 9 | 29502~32779 | HAMMER | RHINOCEROS | HAMMER | Q | HAMMER |
| 10 | 32780~36057 | A | WILD | A | DEER | Q |
| 11 | 36058~39335 | Q | A | Q | SWORD | BAT |
| 12 | 39336~42613 | SWORD | HAMMER | DEER | FEATURE | K |
| 13 | 42614~45891 | RHINOCEROS | DEER | K | K | DEER |
| 14 | 45892~49169 | K | J | BUFFALO | SWORD | SWORD |
| 15 | 49170~52447 | A | SWORD | Q | DEER | J |
| 16 | 52448~55725 | HAMMER | SWORD | FEATURE | A | WILD |
| 17 | 55726~59003 | J | BAT | A | HAMMER | HAMMER |
| 18 | 59004~62281 | Q | WILD | HAMMER | BUFFALO | SWORD |
| 19 | 62282~65535 | BUFFALO | FEATURE | SWORD | RHINOCEROS | Q |

RANGE OF RANDOM NUMBERS: 0~65535

FIG. 97

BONUS GAME SYMBOL TABLE

| | | FIRST COLUMN (L1) |
|---|---|---|
| CODE NO. | RANDOM NUMBER | SYMBOL |
| 0 | 0~2184 | J |
| 1 | 2185~4369 | Q |
| 2 | 4370~6553 | BAT |
| 3 | 6554~8737 | WILD |
| 4 | 8738~10921 | J |
| 5 | 10922~13105 | Q |
| 6 | 13106~15289 | RHINOCEROS |
| 7 | 15290~17473 | WILD |
| 8 | 17474~19657 | A |
| 9 | 18658~21841 | DEER |
| 10 | 21842~24025 | WILD |
| 11 | 24026~26209 | SWORD |
| 12 | 26210~28393 | HAMMER |
| 13 | 28394~30577 | A |
| 14 | 30578~32761 | WILD |
| 15 | 32762~34945 | Q |
| 16 | 34946~37129 | SWORD |
| 17 | 37130~39313 | WILD |
| 18 | 39314~41497 | RHINOCEROS |
| 19 | 41498~43681 | K |
| 20 | 43682~45865 | A |
| 21 | 45866~48049 | WILD |
| 22 | 48050~50233 | HAMMER |
| 23 | 50234~52417 | J |
| 24 | 52418~54601 | WILD |
| 25 | 54602~56785 | Q |
| 26 | 56786~58969 | WILD |
| 27 | 58970~61153 | WILD |
| 28 | 61154~63337 | BUFFALO |
| 29 | 63338~65535 | WILD |

• • •

| | | FIFTH COLUMN(L5) |
|---|---|---|
| CODE NO. | RANDOM NUMBER | SYMBOL |
| 0 | 0~2184 | WILD |
| 1 | 2185~4369 | J |
| 2 | 4370~6553 | A |
| 3 | 6554~8737 | WILD |
| 4 | 8738~10921 | WILD |
| 5 | 10922~13105 | BAT |
| 6 | 13106~15289 | J |
| 7 | 15290~17473 | A |
| 8 | 17474~19657 | BUFFALO |
| 9 | 18658~21841 | WILD |
| 10 | 21842~24025 | RHINOCEROS |
| 11 | 24026~26209 | FEATURE |
| 12 | 26210~28393 | K |
| 13 | 28394~30577 | WILD |
| 14 | 30578~32761 | WILD |
| 15 | 32762~34945 | WILD |
| 16 | 34946~37129 | HAMMER |
| 17 | 37130~39313 | Q |
| 18 | 39314~41497 | BAT |
| 19 | 41498~43681 | K |
| 20 | 43682~45865 | WILD |
| 21 | 45866~48049 | DEER |
| 22 | 48050~50233 | SWORD |
| 23 | 50234~52417 | J |
| 24 | 52418~54601 | WILD |
| 25 | 54602~56785 | WILD |
| 26 | 56786~58969 | HAMMER |
| 27 | 58970~61153 | SWORD |
| 28 | 61154~63337 | Q |
| 29 | 63338~65535 | WILD |

RANGE OF RANDOM NUMBERS : 0~65535

FIG. 98

BONUS GAME SYMBOL TABLE

| | | FIRST COLUMN (L1) |
|---|---|---|
| CODE NO. | RANDOM NUMBER | SYMBOL |
| 0 | 0-1872 | J |
| 1 | 1873-3744 | Q |
| 2 | 3745-5656 | BAT |
| 3 | 5657-7488 | WILD |
| 4 | 7489-9360 | J |
| 5 | 9361-11232 | Q |
| 6 | 11233-13104 | RHINOCEROS |
| 7 | 13105-14976 | WILD |
| 8 | 14977-16848 | A |
| 9 | 16849-18720 | DEER |
| 10 | 18721-20592 | WILD |
| 11 | 20593-22464 | FEATURE |
| 12 | 22465-24336 | SWORD |
| 13 | 24337-26209 | HAMMER |
| 14 | 26210-28080 | A |
| 15 | 28081-29952 | WILD |
| 16 | 29953-31824 | Q |
| 17 | 31825-33696 | FEATURE |
| 18 | 33697-35568 | SWORD |
| 19 | 35569-37440 | WILD |
| 20 | 377441-39312 | RHINOCEROS |
| 21 | 39313-41184 | K |
| 22 | 41185-43056 | A |
| 23 | 43057-44928 | WILD |
| 24 | 44929-46800 | FEATURE |
| 25 | 46801-48672 | HAMMER |
| 26 | 48673-50544 | J |
| 27 | 50545-52416 | WILD |
| 28 | 52417-54288 | Q |
| 29 | 54289-56160 | WILD |
| 30 | 56161-58032 | WILD |
| 31 | 58033-59904 | BUFFALO |
| 32 | 59905-61777 | WILD |
| 33 | 61778-63648 | FEATURE |
| 34 | 63649-65535 | FEATURE |

• • •

| | | FIFTH COLUMN(L5) |
|---|---|---|
| CODE NO. | RANDOM NUMBER | SYMBOL |
| 0 | 0-2184 | WILD |
| 1 | 2185-4369 | J |
| 2 | 4370-6553 | A |
| 3 | 6554-8737 | WILD |
| 4 | 8738-10921 | WILD |
| 5 | 10922-13105 | BAT |
| 6 | 13106-15289 | J |
| 7 | 15290-17473 | A |
| 8 | 17474-19657 | BUFFALO |
| 9 | 18658-21841 | WILD |
| 10 | 21842-24025 | RHINOCEROS |
| 11 | 24026-26209 | FEATURE |
| 12 | 26210-28393 | K |
| 13 | 28394-30577 | WILD |
| 14 | 30578-32761 | WILD |
| 15 | 32762-34945 | WILD |
| 16 | 34946-37129 | HAMMER |
| 17 | 37130-39313 | Q |
| 18 | 39314-41497 | BAT |
| 19 | 41498-43681 | K |
| 20 | 43682-45865 | WILD |
| 21 | 45866-48049 | DEER |
| 22 | 48050-50233 | SWORD |
| 23 | 50234-52417 | J |
| 24 | 52418-54601 | WILD |
| 25 | 54602-56785 | WILD |
| 26 | 56786-58969 | HAMMER |
| 27 | 58970-61153 | SWORD |
| 28 | 61154-63337 | Q |
| 29 | 63338-65535 | WILD |

RANGE OF RANDOM NUMBERS
:0-65535

FIG. 99 BONUS GAME SYMBOL TABLE

| | | FIRST COLUMN(L1) | SECOND COLUMN(L2) | THIRD COLUMN(L3) | FOURTH COLUMN(L4) | FIFTH COLUMN(L5) |
|---|---|---|---|---|---|---|
| CODE NO. | RANDOM NUMBER | SYMBOL | SYMBOL | SYMBOL | SYMBOL | SYMBOL |
| 0 | 0-3277 | J | WILD | A | Q | WILD |
| 1 | 3278-6555 | WILD | A | J | J | WILD |
| 2 | 6556-9833 | BAT | WILD | BAT | BAT | WILD |
| 3 | 9834-13111 | J | HAMMER | SWORD | Q | WILD |
| 4 | 13112-16389 | WILD | WILD | WILD | K | WILD |
| 5 | 16390-19667 | RHINOCEROS | WILD | BAT | BAT | WILD |
| 6 | 19668-22945 | A | BUFFALO | WILD | A | WILD |
| 7 | 22946-26223 | WILD | WILD | A | K | FEATURE |
| 8 | 26224-29501 | SWORD | K | J | HAMMER | WILD |
| 9 | 29502-32779 | WILD | WILD | WILD | Q | WILD |
| 10 | 32780-36057 | A | WILD | A | DEER | WILD |
| 11 | 36058-39335 | WILD | A | Q | SWORD | WILD |
| 12 | 39336-42613 | SWORD | WILD | WILD | FEATURE | WILD |
| 13 | 42614-45891 | WILD | DEER | K | K | WILD |
| 14 | 45892-49169 | WILD | WILD | BUFFALO | SWORD | WILD |
| 15 | 49170-52447 | A | SWORD | Q | DEER | WILD |
| 16 | 52448-55725 | WILD | WILD | FEATURE | A | WILD |
| 17 | 55726-59003 | J | BAT | A | HAMMER | WILD |
| 18 | 59004-62281 | Q | WILD | HAMMER | BUFFALO | WILD |
| 19 | 62282-65535 | BUFFALO | FEATURE | SWORD | RHINOCEROS | WILD |

RANGE OF RANDOM NUMBERS: 0-65535

FIG. 100

SYMBOL COLUMN DETERMINATION TABLE

| SYMBOL COLUMN NO. | RANDOM NUMBER |
|---|---|
| 1 | 0-13106 |
| 2 | 13107-26214 |
| 3 | 26215-39321 |
| 4 | 39322-52428 |
| 5 | 52429-65535 |

RANGE OF RANDOM NUMBERS:0-65535

FIG. 101

CODE NO. DETERMINATION TABLE

| | |
|---|---|
| RANDOM NUMBER | CODE NO. |
| 0~3277 | 0 |
| 3278~6555 | 1 |
| 6558~9833 | 2 |
| 9834~13111 | 3 |
| 13112~16389 | 4 |
| 16390~19667 | 5 |
| 19668~22945 | 6 |
| 22946~26223 | 7 |
| 26224~29501 | 8 |
| 29502~32779 | 9 |
| 32780~36057 | 10 |
| 36058~39335 | 11 |
| 39336~42613 | 12 |
| 42614~45891 | 13 |
| 45892~49169 | 14 |
| 49170~52447 | 15 |
| 52448~55725 | 16 |
| 55726~59003 | 17 |
| 59004~62281 | 18 |
| 62282~64281 | 19 |
| 64282~65535 | END |

RANGE OF RANDOM NUMBERS: 0~65535

FIG. 102

ADDITIONAL WILD SYMBOL
COUNT DETERMINATION TABLE

| INCREASES IN THE NUMBER OF WILD SYMBOLS | RANDOM NUMBER |
|---|---|
| 10 | 0~13106 |
| 30 | 13107~26214 |
| 50 | 26215~39321 |
| 70 | 39322~52428 |
| 90 | 52429~65535 |

RANGE OF RANDOM NUMBERS : 0~65535

FIG. 103

ADDITIONAL TRIGGER SYMBOL COUNT DETERMINATION TABLE

| INCREASES IN THE NUMBER OF TRIGGER SYMBOLS | RANDOM NUMBER |
|---|---|
| 2 | 0-13106 |
| 4 | 13107-26214 |
| 6 | 26215-39321 |
| 8 | 39322-52428 |
| 10 | 52429-65535 |

RANGE OF RANDOM NUMBERS : 0-65535

FIG. 104

PAYOUT TABLE

| | THREE | FOUR | FIVE |
|---|---|---|---|
| A | 100 | 200 | 1000 |
| K | 100 | 200 | 1000 |
| Q | 100 | 200 | 1000 |
| J | 100 | 200 | 1000 |
| SWORD | 200 | 500 | 2000 |
| HAMMER | 200 | 500 | 2000 |
| BAT | 200 | 500 | 3000 |
| DEER | 300 | 600 | 3000 |
| RHINOCEROS | 300 | 1000 | 4000 |
| BUFFALO | 400 | 1500 | 5000 |
| WILD | 500 | 2000 | 10000 |
| FEATURE | 40 | 200 | 600 |

FEATURE: (FREE GAME) FREE GAME IS RUN WHEN THREE OR MORE "FEATURE" ARE REARRANGED

FIG. 105

DIVISIONAL STAGE COUNT DETERMINATION TABLE

| THE NUMBER OF DIVISIONAL STAGES | RANDOM NUMBER |
|---|---|
| 0 | 0-13106 |
| 1 | 13107-26214 |
| 2 | 26215-39321 |
| 3 | 39322-52428 |
| 4 | 52429-65535 |

RANGE OF RANDOM NUMBERS: 0-65535

FIG. 123

INCREASING PATTERN TABLE

| TOTAL INCREASE | INCREASING PATTERN |
|---|---|
| 10 | 10 |
| 30 | 10⇒10⇒10 |
| 50 | 10⇒10⇒30 |
| 70 | 20⇒10⇒10⇒10⇒20 |
| 90 | 10⇒20⇒20⇒20⇒20 |

GAMING MACHINE THAT EXECUTES FREE GAME AND THE PLAY METHOD

CROSS REFERENCE TO RELATED APPLICATION

The present application claims priority from provisional application No. 61/114,839, which was filed on Nov. 14, 2008, provisional application No. 61/114,772, which was filed on Nov. 14, 2008, provisional application No. 61/114,833, which was filed on Nov. 14, 2008, the entire disclosure of which is herein incorporated by reference.

BACKGROUND OF THE INVENTION

1. Field of the Invention

The present invention relates to a gaming machine and playing method thereof capable of running a free game.

2. Description of Related Art

There have been known gaming machines configured to display plural types of symbols scrolled and then stopped, and to award a predetermined amount of game media (e.g. a predetermined amount of coins or money) according to a combination of symbols presented after stopping the scroll. Such gaming machines are disclosed in the specifications of U.S. Pat. No. 6,960,133, No. 6,012,983, and No. 6,093,102, for example.

Among those gaming machines is a gaming machine which runs a free game when a predetermined condition (e.g. rearrangement of a particular symbol during a slot game) is met during a game. The free game is a game playable without a need of betting a game media.

Further, for example, there are also a free game so-called rescue game which is run for the purpose of returning game media to a player who has played a game predetermined number of times.

Since the free game is played without consuming a game medium, players in general plays a game with a strong hope for occurrence of the free game. However, in cases where the free game is repetitively run more than once upon meeting a predetermined condition, the free game which is repeated in the same manner is not so interesting.

The present invention is made in view of the above problem, and the object thereof is to provide a gaming machine and a gaming method thereof capable of giving a player an expectation and satisfaction even during repeated free games.

SUMMARY OF THE INVENTION

The present invention provides a gaming machine structured as follows.

Namely, the gaming machine includes a symbol display device which rearranges plural symbols including a specific symbol; and a controller programmed to execute the following steps of:

(a1) on condition that a game medium is bet, running a base game in which a predetermined amount of game media is awarded according to the symbols rearranged on the symbol display device;

(a2) if in the base game the specific symbol is rearranged with a first predetermined condition, establishing a special status in which the specific symbol is added to the plural symbols;

(a3) when in the base game the specific symbol is rearranged with the first predetermined condition, running a special game in which a free game is repeated plural times in the special status, the free game being arranged so that it is possible to reduce the number of betted game media to be smaller than the number in the base game and a game medium is awarded with an amount determined in accordance with the symbols rearranged by the symbol display device; and (a4) if in the special game the specific symbol is rearranged with a second predetermined condition, further adding a free game and making the free game runnable.

According to this arrangement, when in a base game a specific symbol is rearranged with a first predetermined condition, a special game constituted by plural free games is run in a special status in which a specific symbol is added to plural symbols rearranged by a symbol display device. The number of specific symbols during the special game is therefore larger than the number in the base game, and hence the possibility of the rearrangement of the specific symbol is increased in the special game. When in a free game in the special game a specific symbol is rearranged with a second predetermined condition, another free game is made runnable for the player. That is to say, the special game is a free game with can be run with the betting of a fewer amount of game media, and is hence a game in which the probability of the addition of another free game is high. Since the possibility of the rearrangement with the second predetermined condition is increased in the special game, the player obtains expectation and satisfaction in the special game, with the result that the player deepens his/her interest in the game.

The gaming machine of the present invention may further include a bet receiving device which receives, in the base game, betting of a game medium within a predetermined range, wherein, the controller executes the step (a2) when an amount of the game medium received by the bet receiving device is not lower than a predetermined value within the predetermined range.

According to this arrangement, the bet receiving device allows a game medium to be betted within a predetermined range in a base game, and a special status in which a specific symbol is added to plural symbols in a special game is established only when the number of betted game media received by the bet receiving device is not lower than a predetermined value within the predetermined range and the specific symbol is rearranged with the first predetermined condition. In other words, the player is allowed to run a free game in which the probability of the addition of another free game is high, only when s/he bets a game medium with an amount not lower than a predetermined value within a predetermined range. This encourages the player to bet a predetermined number or more game media, so as to increase the gain of the gaming machine administrator.

In addition, the gaming machine of the present invention may further include a bet receiving device which receives, in the base game, betting of a game medium within a predetermined range, wherein, the controller executes the step (a2) when an amount of the game medium received by the bet receiving device is at a maximum within the predetermined range.

According to this arrangement, the bet receiving device allows a game medium to be betted within a predetermined range in a base game, and a special status in which a specific symbol is added to plural symbols in a special game is established only when the number of betted game media received by the bet receiving device is at the maximum within the predetermined range and the specific symbol is rearranged with a first predetermined condition. In other words, the player is allowed to run a free game in which the addition of another free game is highly probable, only when s/he bets the maximum number of game media within a predetermined range. This encourages the player to bet the maximum bettable number of game media, so as to increase the gain of the gaming machine administrator.

In addition, the gaming machine of the present invention may further include a bet receiving device which receives, in the base game, betting of a game medium within a predetermined range, wherein, the controller further adds the specific symbol to the plural symbols in the special status, when an amount of the game medium received by the bet receiving device is not lower than a predetermined value within the predetermined range.

According to this arrangement, the bet receiving device allows a game medium to be betted within a predetermined range in a base game. Furthermore, a specific symbol is further added to the symbols in the special status when an amount of the game medium received by the bet receiving device is not lower than a predetermined value within the predetermined range, after the special status in which a specific symbol is added to the plural symbols is established when the specific symbol is rearranged in the first predetermined condition. In other words, the player is allowed to run a free game in which the addition of another free game is highly probable, only when s/he bets a predetermined number or more game media within a predetermined range. This encourages the player to bet a predetermined number or more game media, so as to increase the gain of the gaming machine administrator.

In addition, the gaming machine of the present invention may further include a bet receiving device which receives, in the base game, betting of a game medium within a predetermined range, wherein, the controller further adds the specific symbol to the plural symbols in the special status, when an amount of the game medium received by the bet receiving device is at a maximum within the predetermined range.

According to this arrangement, the bet receiving device allows a game medium to be betted within a predetermined range in a base game. Furthermore, a specific symbol is further added to the symbols in the special status when an amount of the game medium received by the bet receiving device is at the maximum within the predetermined range, after the special status in which a specific symbol is added to the plural symbols is established when the specific symbol is rearranged in the first predetermined condition. In other words, the player is allowed to run a free game in which the addition of another free game is highly probable, only when s/he bets the maximum number of game media within a predetermined range. This encourages the player to bet the maximum bettable number of game media, so as to increase the gain of the gaming machine administrator.

In addition the gaming machine of the present invention may be arranged such that the symbol display device rearranges the plural symbols after a symbol column constituted by the plural symbols are displayed and scrolled, and in the step (a2), when in the base game the specific symbol is rearranged with the first predetermined condition, the controller changes the symbol column, which is displayed and scrolled by the symbol display device, from a symbol column for the base game to a symbol column for the special game which column has more specific symbols than the symbol column for the base game.

According to this arrangement, when a specific symbol is rearranged with a first predetermined condition in a base game, the symbol column displayed and scrolled by the symbol display device is changed from a symbol column for the base game to a symbol column for the special game which column has more specific symbols than the symbol column for the base game. This makes it easy to shift the plural symbols rearranged by the symbol display device to the special status.

In addition, the gaming machine of the present invention may be arranged such that, when in the special game the specific symbol is rearranged with the second predetermined condition, the controller further adds the specific symbol to the plural symbols with the special status in the special game.

According to this arrangement, when in a free game of a special game a specific symbol is rearranged with a second predetermined condition, a specific symbol is further added to plural symbols to be rearranged. Therefore, as the specific symbol is rearranged with the second predetermined condition in the free game, the probability that the specific symbol is rearranged with the second predetermined condition is increased in the subsequent free games in the special game. This provides the player with expectation and satisfaction in the special game In addition, the gaming machine of the present invention is arranged so that in the step (a4), when the specific symbol is rearranged with the second predetermined condition in the special game, the controller further adds another free game and make the free game runnable, until reaching a predetermined upper limit.

According to this arrangement, regarding a free game repeated plural times in the special game, there is a predetermined upper limit in the number of free games added when the specific symbol is rearranged with the second predetermined condition. This prevents free games from limitlessly added, thereby protecting the profit of the gaming machine administrator.

Further, the present invention provides a playing method of a gaming machine, comprising the steps of:

on condition that a game medium is betted, rearranging plural symbols including a specific symbol based on a symbol randomly selected from the plural symbols, and awarding a game medium with an amount determined in accordance with the rearranged symbols;

if in the base game the specific symbol is rearranged with a first predetermined condition, establishing a special status in which the specific symbol is added to the plural symbols;

when in the base game the specific symbol is rearranged with the first predetermined condition, running a special game in which a free game is repeated plural times in the special status, the free game being arranged so that it is possible to reduce the number of betted game media to be smaller than the number in the base game, plural symbols including a specific symbol are rearranged based on a symbol randomly selected from the plural symbols, and a game medium is awarded with an amount determined in accordance with the rearranged symbols; and if in the special game the specific symbol is rearranged with the second predetermined condition, adding another free game and making the free game runnable.

According to this arrangement, when in a base game a specific symbol is rearranged with a first predetermined condition, a special game constituted by plural free games is run in a status in which plural symbols rearranged by a symbol display device includes an additional specific symbol. The number of specific symbols during the special game is therefore larger than the number in the base game, and hence the possibility of the rearrangement of the specific symbol is increased in the special game. When in a free game in the special game a specific symbol is rearranged with a second predetermined condition, another free game is made runnable for the player. That is to say, the special game is a free game with can be run with the betting of a fewer amount of game media, and is hence a game in which the probability of the addition of another free game is high. This provides the player with expectation and satisfaction in the special game, thereby attracting the player's interest in the game.

A gaming machine of the present invention is a gaming machine including: a bet receiving device which receives a bet of game media within a range of a minimum bet to a maximum bet; and a controller.

wherein the controller is programmed to perform the processes of:

(b1) running a base game requiring a bet of a predetermined amount of game media, in which game a predetermined amount of game media is awarded according to a predetermined symbol combination;

(b2) when a first predetermined condition is met during the base game, counting the number of base games run thereafter;

(b3) when the number of base games counted reaches a predetermined number of times, running a free rescue game which is runnable with a bet of a less amount of game media than the base game running; and (b4) determining whether a bet of a predetermined amount or more has been entered in any of the base games counted via the bet receiving device, and when it is determined that a bet of a predetermined amount or more is entered, running a special free rescue game which is more advantageous to the player than the free rescue game, and which is runnable with a bet of a less amount of game media than the free rescue game.

In the structure, when the first predetermined condition is met during a base game, the number of subsequent base games run are counted. When the number of counted base game reaches a predetermined number of times, there is determined whether or not a bet of a predetermined amount or more has been entered by the player. When it is determined that a bet of the predetermined amount or more has been entered, a special free rescue game is run which is more advantageous to the player than the free rescue game. With this, the player is more motivated to make a bet of the predetermined amount or more, to play the special free rescue game which is more advantageous to the player. As a result, a large number of game media is trafficked, leading to the gain of the gaming facility. Further, a player having made a bet of the predetermined amount or more is given more advantages than a player who did not make such a bet. Thus, there will be no feeling of unfairness attributed to the difference between the bet amount.

Further, the present invention may be as follows. Namely, a gaming machine of the present invention is a gaming machine including: a bet receiving device which receives a bet of game media within a range of a minimum bet to a maximum bet; and a controller.

wherein the controller performs the processes of:

(c1) running a base game requiring a bet of a predetermined amount of game media, in which game a predetermined amount of game media is awarded according to a predetermined symbol combination;

(c2) when a first predetermined condition is met during the base game, counting the number of base games run thereafter;

(c3) when the number of base games counted reaches a predetermined number of times, running a free rescue game which is runnable with a bet of a less amount of game media than the base game running; and (c4) determining whether a maximum bet has been entered in any of the base games counted via the bet receiving device, and when it is determined that a maximum bet has been entered, running a special free rescue game which is more advantageous to the player than the free rescue game, and which is runnable with a bet of a less amount of game media than the free rescue game.

In the structure, when the first predetermined condition is met during a base game, the number of subsequent base games run are counted. When the number of counted base game reaches a predetermined number of times, there is determined whether or not a maximum bet has been entered by the player. When it is determined that a maximum bet has been entered, a special free rescue game is run which is more advantageous to the player than the free rescue game. With this, the player is more motivated to make a maximum bet, to play the special free rescue game which is more advantageous to the player. As a result, a large number of game media is trafficked, leading to the gain of the gaming facility. Further, a player having made a maximum bet is given more advantages than a player who did not make a maximum bet. Thus, there will be no feeling of unfairness attributed to the difference between the bet amount.

Further, the present invention may as follows.

Namely, a gaming machine of the present invention is a gaming machine including: a symbol display device which rearranges plural symbols including a specific symbol; a bet receiving device which receives a bet of game media within a range of a minimum bet to a maximum bet; and a controller.

wherein the controller performs the processes of:

(d1) on condition that a game medium is bet, running a base game in which a predetermined amount of game media is awarded according to the symbols rearranged on the symbol display device;

(d2) when a first predetermined condition is met during the base game, counting the number of base games run thereafter;

(d3) when the number of base games counted reaches a predetermined number of times, running a free rescue game which is runnable with a bet of a less amount of game media than the base game running, and which is configured to award an amount of game media according to the symbols rearranged on the symbol display device; and (d4) determining whether a bet of a predetermined amount or more has been entered in any of the base games counted via the bet receiving device, and when it is determined that a bet of a predetermined amount or more has been entered, running a special free rescue game which includes more specific symbols and is more advantageous to the player than the free rescue game, and which is runnable with a bet of a less amount of game media than the free rescue game.

In the structure, when the first predetermined condition is met during a base game, the number of subsequent base games run are counted. When the number of counted base game reaches a predetermined number of times, there is determined whether or not a bet of a predetermined amount or more has been entered by the player. When it is determined that a bet of the predetermined amount or more has been entered, a special free rescue game is run which includes more specific symbols and is more advantageous to the player than the free rescue game. With this, the player is more motivated to make a bet of the predetermined amount or more, to play the special free rescue game which is more advantageous to the player. As a result, a large number of game media is trafficked, leading to the gain of the gaming facility. Further, a player having made a bet of the predetermined amount or more is given more advantages than a player who did not make such a bet. Thus, there will be no feeling of unfairness attributed to the difference between the bet amount.

Further, the present invention may as follows. Namely, a gaming machine of the present invention is a gaming machine including: a symbol display device which rearranges plural symbols including a specific symbol; a bet receiving device which receives a bet of game media within a range of a minimum bet to a maximum bet; and a controller.

wherein the controller is programmed to perform the processes of:

(e1) running a base game requiring a bet of a predetermined amount of game media, in which game a predetermined amount of game media is awarded according to symbols rearranged on the symbol display device;

(e2) when a first predetermined condition is met during the base game, counting the number of base games run thereafter;

(e3) when the number of base games counted reaches a predetermined number of times, running a free rescue game which is runnable with a bet of a less amount of game media than the base game running, and which is configured to award an amount of game media according to the symbols rearranged on the symbol display device; and (e4) determining whether a maximum bet has been entered in any of the base games counted via the bet receiving device, and when it is determined that a maximum bet has been entered, running a special free rescue game which includes more specific symbols and is more advantageous to the player than the free rescue game, and which is runnable with a bet of a less amount of game media than the free rescue game.

In the structure, when the first predetermined condition is met during a base game, the number of subsequent base games run are counted. When the number of counted base game reaches a predetermined number of times, there is determined whether or not a maximum bet has been entered by the player. When it is determined that a maximum bet has been entered, a special free rescue game is run which includes more specific symbols and is more advantageous to the player than the free rescue game. With this, the player is more motivated to make a maximum bet, to play the special free rescue game which is more advantageous to the player. As a result, a large number of game media is trafficked, leading to the gain of the gaming facility. Further, a player having made a maximum bet is given more advantages than a player who did not make a maximum bet. Thus, there will be no feeling of unfairness attributed to the difference between the bet amount.

Further, the present invention may as follows. The gaming machine of the present invention may further include a player-operable rescue requesting button, wherein, when the rescue requesting button is operated during a base game, the controller starts counting the number of subsequent base games run.

In the structure, when the player operates the rescue requesting button during a base game, the number of subsequent base games run are counted. This allows the player to decide to which one of the free rescue game and the special free rescue game the transition occurs. Thus, the player may be able to experience the excitement and fun of involvement in the game, and be encouraged to bet more game media.

A playing method of the present invention may be as follows.

Namely, a playing method of the present invention is for a gaming machine having a bet receiving device which receives a bet of game media within a range of a minimum bet to a maximum bet, the method including the steps of:

(f1) running a base game requiring a bet of a predetermined amount of game media, in which game a predetermined amount of game media is awarded according to a predetermined symbol combination;

(f2) when a first predetermined condition is met during the base game, counting the number of base games run thereafter;

(f3) when the number of base games counted reaches a predetermined number of times, running a free rescue game which is runnable with a bet of a less amount of game media than the base game running; and (f4) determining whether a bet of a predetermined amount or more has been entered in any of the base games counted via the bet receiving device, and when it is determined that a bet of a predetermined amount or more is entered, running a special free rescue game which is more advantageous to the player than the free rescue game, and which is runnable with a bet of a less amount of game media than the free rescue game.

In the structure, when the first predetermined condition is met during a base game, the number of subsequent base games run are counted. When the number of counted base game reaches a predetermined number of times, there is determined whether or not a bet of a predetermined amount or more has been entered by the player. When it is determined that a bet of the predetermined amount or more has been entered, a special free rescue game is run which is more advantageous to the player than the free rescue game. With this, the player is more motivated to make a bet of the predetermined amount or more, to play the special free rescue game which is more advantageous to the player. As a result, a large number of game media is trafficked, leading to the gain of the gaming facility. Further, a player having made a bet of the predetermined amount or more is given more advantages than a player who did not make such a bet. Thus, there will be no feeling of unfairness attributed to the difference between the bet amount.

The present invention provides a gaming machine having the following structure. Namely, the gaming machine includes a symbol display device which rearranges plural symbols, and a controller programmed to execute the following processes of (g1) to (g6).

(g1) running a base game requiring a bet of a predetermined amount of game media, in which game a predetermined amount of game media is awarded according to symbols rearranged on the symbol display device;

(g2) running a free game runnable with a bet of less game media than the base game, in which free game a predetermined amount of game media is awarded according to symbols rearranged on the symbol display device;

(g3) running the base game by rearranging symbols selected from a group of symbols on the symbol display device;

(g4) when a predetermined condition is met in the base game, increasing the number of specific symbols in the group of symbols;

(g5) displaying, on the symbol display device, stepwise increases in the number of specific symbols in the group of symbols; and (g6) when the predetermined condition is met in the base game, running a special game in which a plural games are run as the free game, running a special game in which the free game is repeated more than once according to a game repeat count, with the number of specific symbols in the group of symbols increased.

The symbol display device shows that the number of specific symbols in the group of symbols is increased stepwise. Thus, before or during the free game, the player is excited and wonders how long the number keeps increasing. As a result, the free game which is repetitively run is made more interesting.

Further, the specific symbols in the present invention may include a wild symbol substitutable for any type of symbol, and a trigger symbol serving as a trigger for starting at least the special game.

Further, the gaming machine in the present invention may be adapted so that: the specific symbols include a wild symbol substitutable for any type of symbol, and a trigger symbol serving as a trigger for starting at least the special game; and in (g4), when the predetermined condition is met in the base game, the controller randomly selects the wild symbol or the trigger symbol, and increases stepwise the number of wild symbols or trigger symbols according to the selection made. Thus, the free game which is repetitively run is made even more interesting.

Further, the gaming machine in the present invention may include a symbol count display device which displays thereon the number of specific symbols. This enables a player to directly confirm the number of specific symbols.

Further, a gaming method of the present invention for a gaming machine includes the steps of: running a base game requiring a bet of a predetermined amount of game media, in which game a predetermined amount of game media is awarded according to symbols rearranged;

running a free game runnable with a bet of less game media than the base game, in which game a predetermined amount of game media is awarded according to symbols rearranged;

running the base game by rearranging symbols selected from the group of symbols;

when a predetermined condition is met in the base game, increasing the number of specific symbols in the group of symbols;

displaying stepwise increases in the number of specific symbols in the group of symbols; and when the predetermined condition is met in the base game, running a special game in which the free game is repeated a plural number of times according to a game repeat count, while the number of specific symbols in the group of symbols is increased.

The symbol display device shows that the number of specific symbols in the group of symbols is increased stepwise. Thus, before or during the free game, the player is excited and wonders how long the number keeps increasing. As a result, the free game which is repetitively run is made more interesting.

Further, the present invention provides a gaming machine structured as follows. Namely, the gaming machine includes a symbol display device which rearranges plural symbols including specific symbols, and a controller programmed to execute the following processes of (h1) to (h6).

(h1) running a base game requiring a bet of a predetermined amount of game media, in which game a predetermined amount of game media is awarded according to symbols rearranged on the symbol display device;

(h2) running a free game runnable with a bet of less game media than the base game, in which free game a predetermined amount of game media is awarded according to symbols rearranged on the symbol display device;

(h3) running the base game by rearranging symbols randomly selected from a group of symbols on the symbol display device;

(h4) when a specific symbol is rearranged in such a manner as to satisfy a first predetermined condition during the base game, increasing stepwise at an interval the number of specific symbols in the group of symbols;

(h5) when a specific symbol is rearranged in such a manner as to satisfy the first predetermined condition during the base game, running a special game in which the free game is repeated a predetermined number of times corresponding to a game repeat count; and (h6) determining a gaming result in relation to the number of specific symbols rearranged in the special game.

In the structure, when a specific symbol is rearranged so as to satisfy a predetermined condition in the base game, a special game which runs a free game more than once is run while increasing stepwise at an interval the number of specific symbols in the group of symbols. Thus, when a specific symbol is rearranged in a free game during the special game, the gaming result is determined in relation to the number of specific symbols rearranged. The player therefore stands higher chances of winning a gain. As a result, a player is able to enjoy more and expect more from the free game repeated.

Further, the specific symbols in the present invention may include a wild symbol substitutable for any type of symbol, and a trigger symbol serving as a trigger for starting at least the special game.

With the structure, it is more likely that the wild symbol substitutable for any type of symbol and the trigger symbol serving as a trigger for starting at least the special game are rearranged. The player's expectation and satisfaction for and from the free game repeated is further improved.

Further, the controller of the present invention may execute a process of increasing stepwise at an interval the number of wild symbols in the group of symbols, as a gaming result of the special game.

This structure in which the number of wild symbols is increased stepwise gives a player a hope for a possible increase in the number of wild symbols, and a satisfaction at the time of recognizing that the number of wild symbols has increased.

Further, the controller of the present invention may execute a process of increasing stepwise at an interval the number of trigger symbols in the group of symbols, as a gaming result of the special game.

This structure in which the number of trigger symbols increases stepwise gives a player a hope for a possible increase in the number of trigger symbols and a satisfaction at the time of recognizing the increase in the number of trigger symbols.

Further, the specific symbols in the present invention may include a wild symbol substitutable for any type of symbol, and a trigger symbol serving as a trigger for starting at least the special game. In (h4), when a specific symbol is rearranged so as to satisfy a predetermined condition in the base game, the controller may randomly select the wild symbol or the trigger symbol, and increase stepwise at an interval the number of wild symbols or trigger symbols according to the selection made.

This structure gives a player a hope for a possible increase in the number of wild symbols or trigger symbols at the time of transition from the base game to the special game.

Further, the gaming machine of the present invention may include a symbol count display device which displays thereon the number of specific symbols in the group of symbols.

This structure displays on the symbol display device the number of specific symbols in the rearranged symbols, thereby enabling the player to directly confirm increases in the number of specific symbols. Therefore, the player is able to attain sufficient hope and satisfaction by visually confirming on the symbol display device an increase in the number of specific symbols before and after the beginning of the special game.

Further, the present invention provides a gaming method for a gaming machine, structured as follows. Namely, the gaming method for a gaming machine includes the steps of: running a base game requiring a bet of a game medium, in which game symbols randomly selected from a group of symbols including specific symbols are rearranged, and an amount of game media according to symbols rearranged is awarded; when a specific symbol is rearranged so as to satisfy a predetermined condition in the base game, increasing stepwise at an interval the number of specific symbols in the group of symbols; when a specific symbol is rearranged so as to satisfy a predetermined condition in the base game, running a special game in which a free game is run a predetermined number of times corresponding to a game repeat count, the free game, without a bet of game medium, rearranging symbols randomly selected from the group of symbols and awarding an amount of game medium according to symbols having been rearranged; and determining a gaming result in relation to the number of specific symbols rearranged in the special game.

In the structure, when a specific symbol is rearranged so as to satisfy a predetermined condition in the base game, a special game which runs a free game more than once is run while increasing stepwise at an interval the number of specific symbols in the group of symbols. Thus, when a specific symbol is rearranged in a free game during the special game, the gaming result is determined in relation to the number of specific symbols rearranged. The player therefore stands higher chances of winning a gain. As a result, a player is able to enjoy more and expect more from the free game repeated.

BRIEF DESCRIPTION OF THE DRAWINGS

FIG. 9 is an explanatory diagram of a base game symbol table.

FIG. 10 is an explanatory diagram of a bonus game symbol table of first embodiment.

FIG. 11 is an explanatory diagram of a bonus game symbol table of first embodiment.

FIG. 12 is an explanatory diagram of a code No. determination table.

FIG. 13 is an explanatory diagram of a payout table.

FIG. 20 is a flowchart of a boot process.

FIG. 30 is an explanatory diagram illustrating an ordinary bonus game symbol table of the modification of first embodiment.

FIG. 31 is an explanatory diagram illustrating a maximum-bet bonus game symbol table of the modification of first embodiment.

FIG. 33 is an explanatory diagram illustrating a bonus game symbol table of second embodiment.

FIG. 34 is an explanatory diagram of an additional wild symbol count determination table of second embodiment.

FIG. 39 is an explanatory diagram illustrating a bonus-game added trigger symbol table of third embodiment.

FIG. 40 is an explanatory diagram of an additional trigger symbol count determination table of third embodiment.

FIG. 55 shows a base game symbol table indicating each symbol in a symbol column formed by display blocks, and code No. and random number associated with the symbol.

FIG. 56 shows relation between an amount of payout and the type and number of symbols arranged on a payline.

FIG. 57 shows an additional wild symbol count determination table.

FIG. 58 shows a symbol column determination table.

FIG. 59 shows a code No. determination table.

FIG. 60A shows an exemplary feature game symbol table indicating each symbol in a symbol column formed by display blocks, and code No. and random number associated with the symbol.

FIG. 60B shows an exemplary feature game symbol table indicating each symbol in a symbol column formed by display blocks, and code No. and random number associated with the symbol.

FIG. 61A shows an exemplary first free rescue game symbol table indicating each symbol in a symbol column formed by display blocks in a first free rescue game, and code No. and random number associated with the symbol.

FIG. 61B shows an exemplary first free rescue game symbol table indicating each symbol in a symbol column formed by display blocks in a first free rescue game, and code No. and random number associated with the symbol.

FIG. 62A shows an exemplary second free rescue game symbol table indicating each symbol in a symbol column formed by display blocks in a second free rescue game, and code No. and random number associated with the symbol.

FIG. 62B shows an exemplary second free rescue game symbol table indicating each symbol in a symbol column formed by display blocks in a second free rescue game, and code No. and random number associated with the symbol.

FIG. 77 shows an exemplary feature game additional wild symbol count determination table of fifth embodiment.

FIG. 78 shows a table indicating re-trigger ratio for each game type, in relation to fifth embodiment.

FIG. 79 shows a table indicating the number of additional wild symbols and feature symbols for each game type, in relation to fifth embodiment.

FIG. 80A shows an exemplary feature game symbol table indicating each symbol in a symbol column formed by display blocks during the feature game of fifth embodiment, and code No. and random number associated with the symbol.

FIG. 80B shows an exemplary feature game symbol table indicating each symbol in a symbol column formed by display blocks during the feature game of fifth embodiment, and code No. and random number associated with the symbol.

FIG. 81A shows an exemplary feature game symbol table indicating each symbol in a symbol column formed by display blocks during the feature game of fifth embodiment, and code No. and random number associated with the symbol.

FIG. 81B shows an exemplary feature game symbol table indicating each symbol in a symbol column formed by display blocks during the feature game of fifth embodiment, and code No. and random number associated with the symbol.

FIG. 96 is an explanatory diagram of a base game symbol data table.

FIG. 97 is an explanatory diagram of a bonus game symbol table.

FIG. 98 is an explanatory diagram of a bonus game symbol table.

FIG. 99 is an explanatory diagram of a bonus game symbol table.

FIG. 100 is an explanatory diagram of a symbol column determination table.

FIG. 101 is an explanatory diagram of a code No. determination table.

FIG. 102 is an explanatory diagram of an additional wild symbol count determination table.

FIG. 103 is an explanatory diagram of an additional trigger symbol count determination table.

FIG. 104 is an explanatory diagram of a payout table.

FIG. 105 is an explanatory diagram of a divisional stage count determination table.

FIG. 107 is an explanatory diagram illustrating a display state of the symbol display device.

FIG. 108 is an explanatory diagram illustrating a display state of the symbol display device.

FIG. 109 is an explanatory diagram illustrating a display state of the symbol display device.

FIG. 110 is an explanatory diagram illustrating a display state of the symbol display device.

FIG. 111 is an explanatory diagram illustrating a display state of the symbol display device.

FIG. 112 is an explanatory diagram illustrating a display state of the symbol display device.

FIG. 113 is an explanatory diagram illustrating a display state of the symbol display device.

FIG. 114 is an explanatory diagram illustrating a display state of the symbol display device.

FIG. 115 is a flowchart illustrating a base game running process.

FIG. 116 is a flowchart of a base game symbol determination process.

FIG. 117 is a flowchart of a bonus game running process.

FIG. 118 is a flowchart of an additional wild symbol count determining process.

Figure 119:
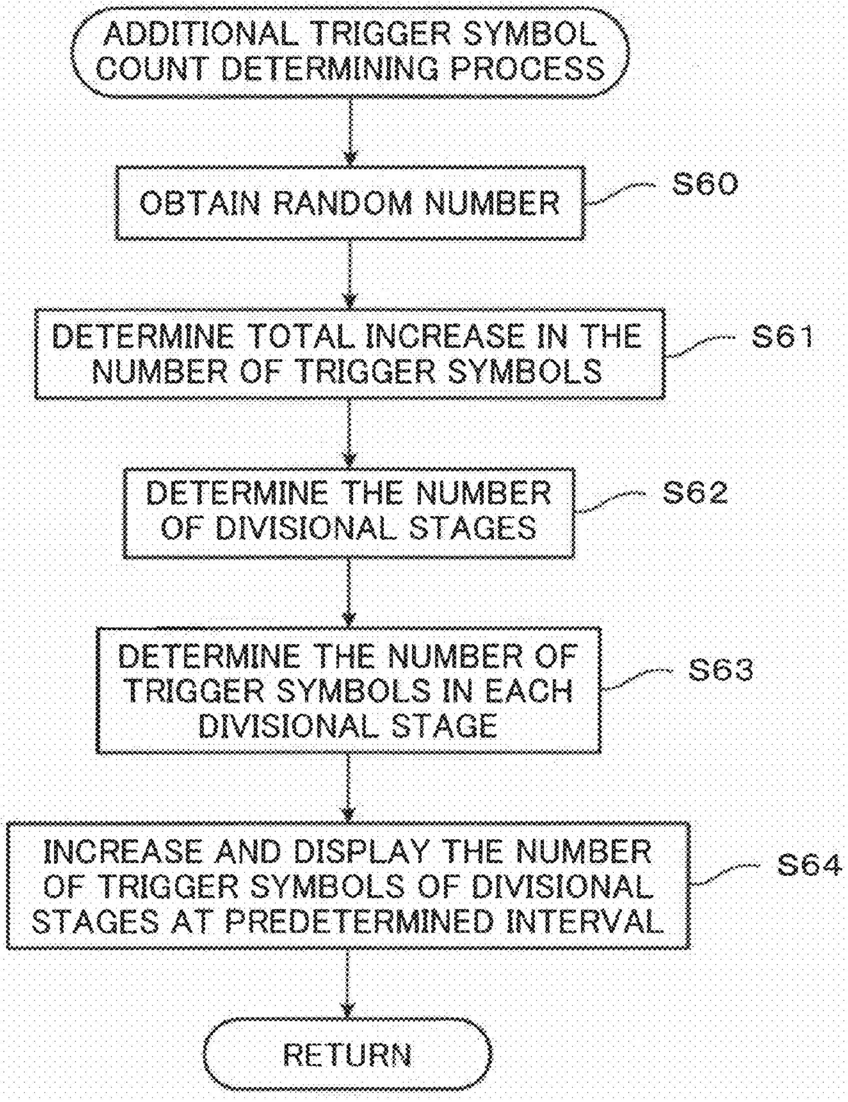

FIG. 119 is a flowchart of an additional trigger symbol count determining process.

Figure 120:
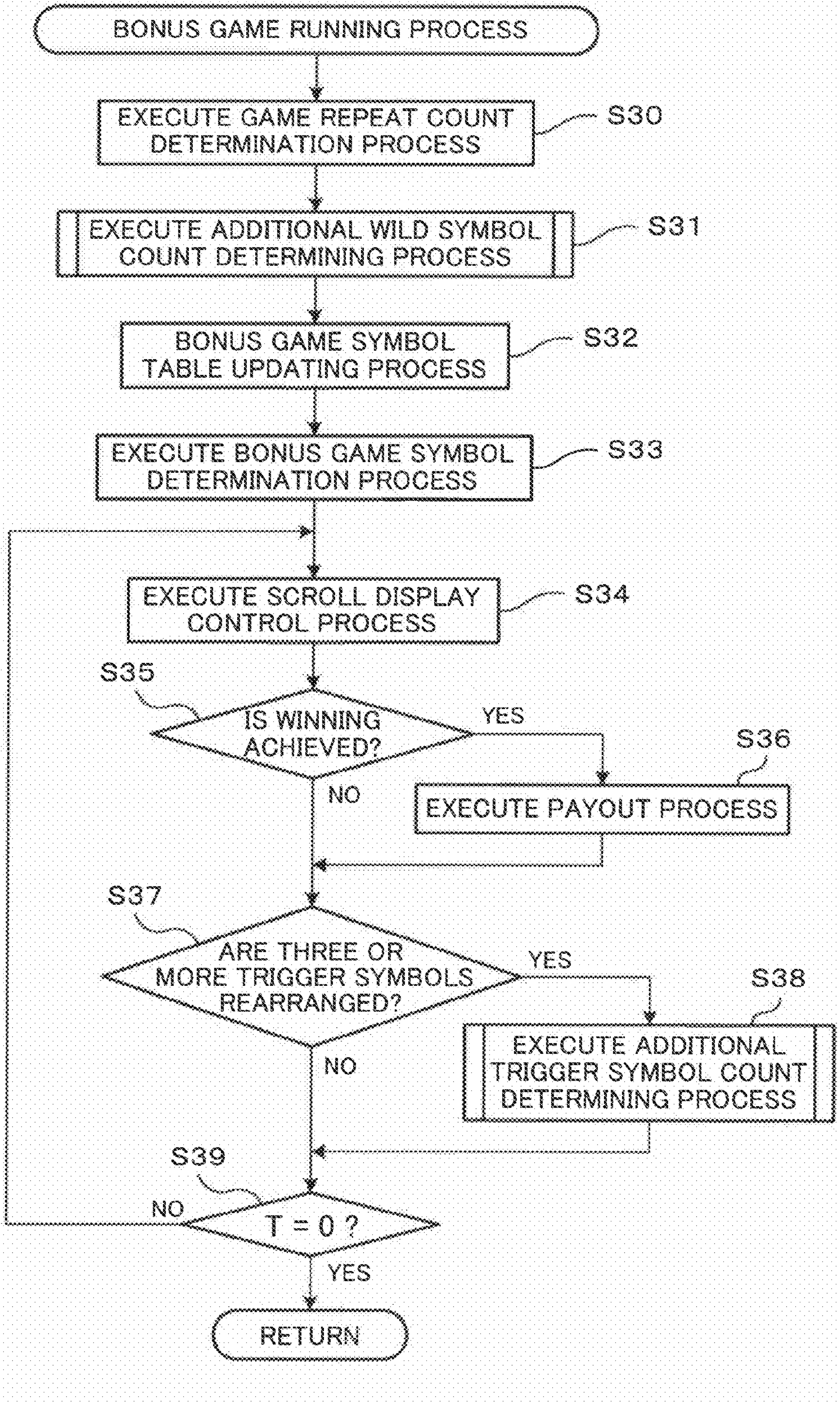

FIG. 120 is a flowchart of a bonus game running process.

Figure 121:
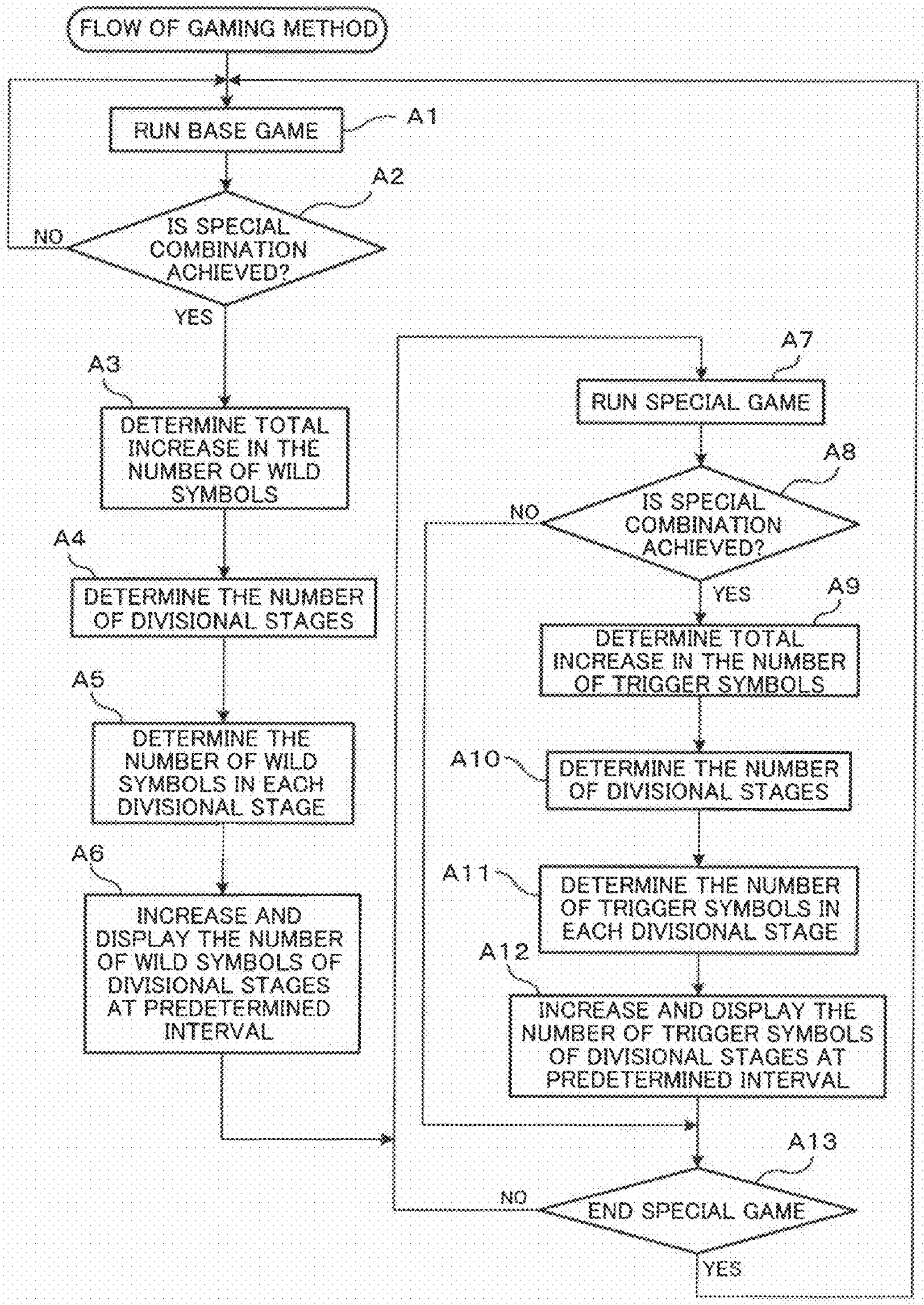

FIG. 121 is a flowchart illustrating the playing method of the gaming machine.

Figure 122:
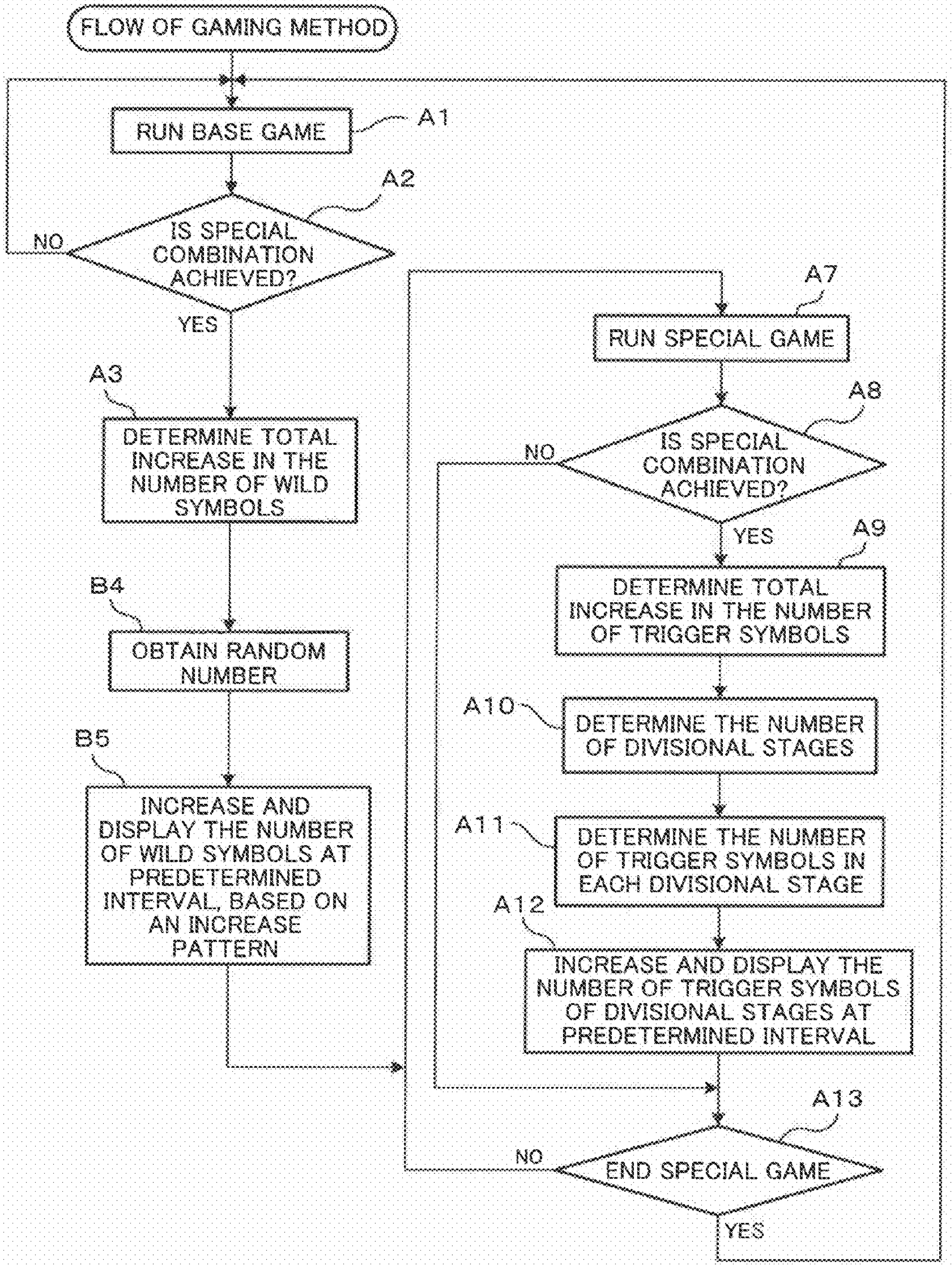

FIG. 122 is a flowchart illustrating the playing method of the gaming machine.

FIG. 123 is an explanatory diagram of an increasing pattern table.

DESCRIPTION OF THE PREFERRED EMBODIMENTS

The following describes, with reference to FIGS. 1 to 45, first to third embodiment of a slot machine and a playing method thereof, according to the present invention. Note that the reference numbers given to each member and symbols indicating steps of flowcharts in the above mentioned drawings, and description referring to these reference numbers and symbols refers to members and steps which are described in the above mentioned embodiments, and do not refer to those described in other embodiments.

First Embodiment

The following will describe a gaming machine and a playing method thereof of first embodiment of the present invention.

(Gaming Machine Overview)

Figure 1:
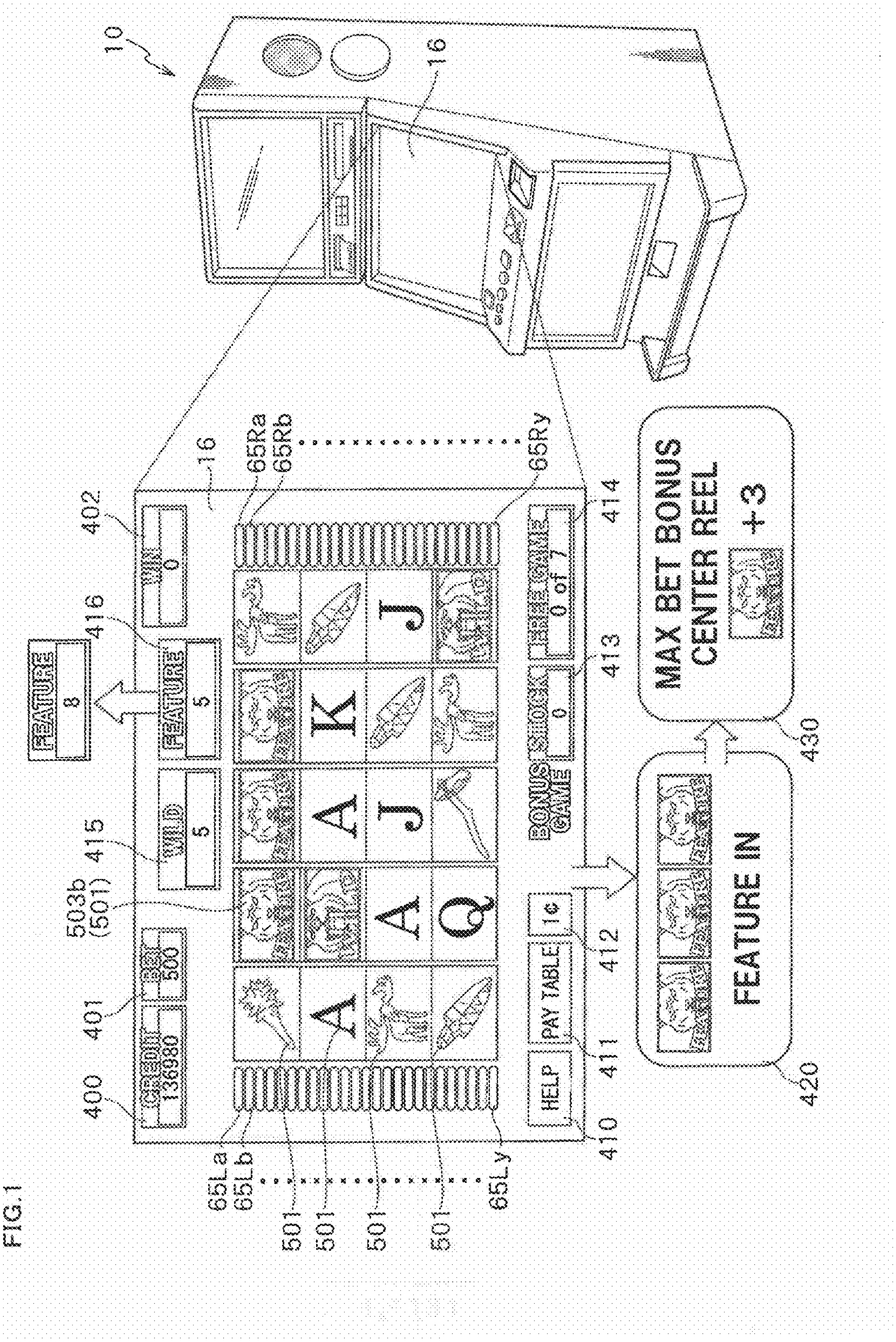
FIG. 1 is an explanatory diagram illustrating a playing method of a gaming machine.
Figure 4:
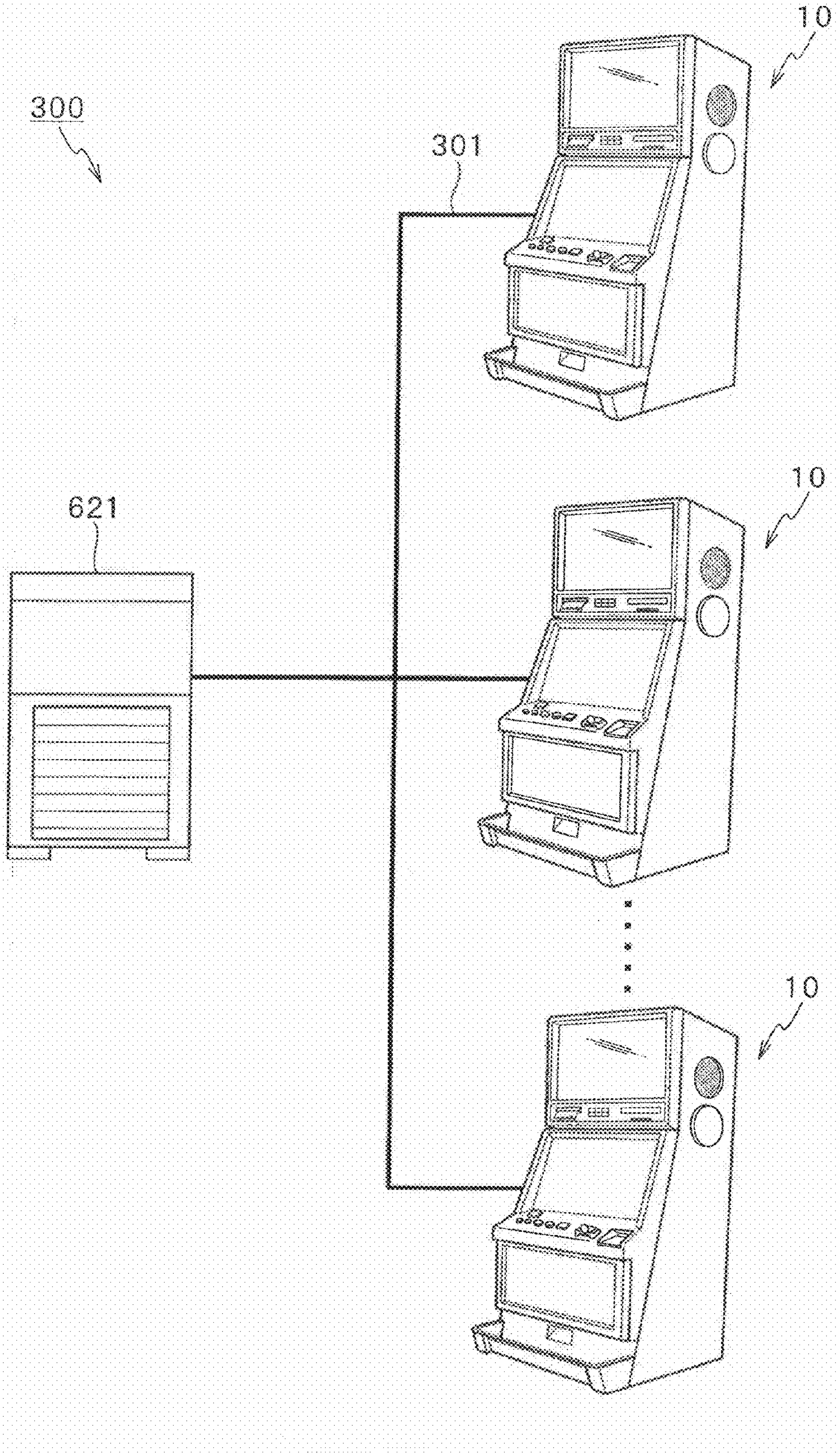
FIG. 4 is a schematic diagram illustrating a system of the gaming machine.

As illustrated in FIG. 1, the gaming machine 300 of the present invention has a slot machine 10 capable of adding a specific symbol 503 to plural symbols 501 in a special game constituted by plural free games. This slot machine 10 in the present embodiment may be an independent slot machine 10 intended for a single player, or, as shown in FIG. 4, a slot machine 10 connected to and in communication with another slot machine 10 so as that the and the other slot machines 10 as a whole enable participation of plural players. The present embodiment deals with a case where the entire structure and system enables participation of plural players, and where each slot machine 10 is capable of serving as an independent gaming machine 300.

Specifically, the slot machine 10 includes, as a first arrangement, a symbol display device 16 which rearranges symbols 501 including a specific symbol 503, and a controller programmed to execute the following processes of (a1) to (a4).

In (a1), a base game, which awards game medium according to symbols 501 rearranged on the symbol display device 16, is run on condition that a game medium is bet. In (a2), when a specific symbol 503 is rearranged so as to satisfy a first predetermined condition in the base game, a special status is established in which status the specific symbol 501 is added to the symbols 503. In (a3), when the specific symbol 503 is rearranged so as to satisfy the first predetermined condition in the base game, a special game is run. In this special game, a free game is repeated more than once with the aforesaid special status. In each free game the number of betted game media may be lower than the number in the base game, and game medium is awarded with the amount determined according to symbols 501 rearranged on the symbol display device 16. In (a4), when a specific symbol 503 is rearranged so as to satisfy a second predetermined condition in the special game, an additional free game becomes playable.

In the free game, the number of betted game media may be lower than the number in the base game, and game medium is awarded with the amount determined according to symbols

501 rearranged on the symbol display device 16. In other words, the number of consumed game media in the free game is lower than the number in the base game. To the contrary, a later-mentioned "base game" is a game which is run on condition that the number of betted game media is larger than the number of game media in the free game, and which awards an amount of game media according to symbols 501 rearranged. In other words, "base game" is a game which starts when game media larger in number than those in the free game are consumed.

In the embodiment discussed below, a free game starts without the premise of the betting of game medium. In other words, a free game is runnable without consuming game medium. However, a free game may be differently arranged on condition that it starts when game media larger in number than those in the base game are betted. To put it differently, when the number of betted game media is lower than the number in the base game, a case where the betting of game medium is unnecessary (i.e. the number of betted game media may be zero) is included.

The expression "rearrange" means dismissing an arrangement of symbols 501, and once again arranging symbols 501. An "arrangement" in this specification means a state of symbols 501, which can be visually confirmed by a player. Further, "special game" is a game in which a free game is repeated plural times with the aforesaid special status. A "specific symbol 503" and ordinary symbols 502 constitute symbols 501. That is, the "symbols 501" is a superordinate conception of the specific symbol 503 and ordinary symbols 502.

The specific symbol 503 is a symbol serving as a trigger for starting at least a special game. In other words, the specific symbol 503 is a trigger symbol serving as a trigger for shifting from the base game to the special game. The specific symbol 503 also serves as a trigger for adding a playable free game to the special game.

The "first predetermined condition" is a condition in which symbols 501 rearranged in the base game include at least a specific symbol 503 and the rearranged specific symbol 503 satisfies predetermined conditions regarding the number, position, and relative positions between the specific symbols 503. On the other hand, the "second predetermined condition" is a condition in which symbols 501 rearranged in the special game include at least a specific symbol 503 and the rearranged specific symbol 503 satisfies predetermined conditions of the number, position, and relative positions between the specific symbols 503. The second predetermined condition and the first predetermined condition may be the same or different from each other. Hereinafter, the realization of the second predetermined condition may be referred to as the realization of re-trigger.

The "special status" is a status of symbols 501, which is set for random selection of symbols 501 in the base game. In other words, the special status is a status of the symbols 501 which are the selection targets, and in this status no specific symbol 503 is added to rearranged symbols 501. In the special status, the plural symbols 501 are arranged so that a specific symbol 503 is added to symbols 501 of the base game (hereinafter, these symbols will be referred to as symbols in an ordinary status). To put it differently, the symbols 501 in the special status include more special symbols 503 than the symbols 501 in the ordinary status. For this reason, when the specific symbol 503 is rearranged with the first predetermined condition in the base game, the number of specific symbol 503 is increased in the symbols 501.

The phrase "an additional free game is runnable" indicates that a runnable free game is added when the symbols 501, which are rearranged in a special game including plural free games, satisfy the second predetermined condition. In the embodiment described below, a special game having plural free games is triggered when the second predetermined condition is established. The present invention, however, is not limited to this. Alternatively, the number of free games in the currently-running special game is increased as the second predetermined condition is established.

The game medium is a game value for running a base game, and is a coin, a bill, or electronic information equivalent to them. Note that the game medium in the present invention is not particularly limited. Examples of the game medium includes medals, tokens, electronic money, and tickets. The ticket is not particularly limited, and a later-mentioned ticket with a barcode may be adopted for example.

The slot machine 10 having the above-described arrangements realizes a playing method which is arranged such that a specific symbol 503 is added to plural symbols 501 in a special game constituted by plural free games. That is to say, the present invention includes a control method of adding a specific symbol 503 to plural symbols 501 in a special game constituted by plural free games, and the slot machine 10 is made operable at least by this control method.

More specifically, the playing method (control method) of the slot machine 10 includes the following steps:

a step of running a base game which is arranged so that, on condition that a game medium is betted, plural symbols 501 are rearranged according to a symbol 501 randomly chosen from the symbols 501 including a specific symbol 503, and an amount of game medium in accordance with the rearranged symbols 501 is awarded;

a step which is arranged so that, when a specific symbol is rearranged with the first predetermined condition in a base game, a special status in which a specific symbol 503 is added to plural symbols 501 is established;

a step which is arranged so that, when a specific symbol 503 is rearranged with the first predetermined condition in a base game, a special game is run in which special game a free game with the special status is repeated plural times, in the free game the number of betted game media may be lower than the number in the base game, plural symbols 501 are rearranged based on a symbol 501 randomly selected from the plural symbols 501, and an amount of game media according to the rearranged symbol 501 is awarded; and a step which is arranged so that, when a specific symbol 503 is rearranged with the second predetermined condition in the special game, an additional free game is made runnable.

To date, there is another arrangement in which the number of free games may be increased when another predetermined condition is met during a free game. However, the probability that the number of free games is increased is constant and typically low. The arrangement therefore fails to deliver a sufficient expectation and satisfaction. With the slot machine 10 having the first arrangement and the playing method (control method) including the above mentioned steps, a special game which includes plural free games is run, when a specific symbol 503 is rearranged in the base game so as to satisfy the first predetermined condition. In this special game, the number of specific symbols 503 is increased in the group of symbols 501 rearranged on the symbol display device. On this account, the number of specific symbols 503 while the special game is run is larger than the number in the base game, and hence the probability that a specific symbol 503 is rearranged in the special game is increased. When a specific symbol 503 is rearranged with the second predetermined condition in a free game in the special game, the player is allowed to play an additional free game. In other words, the special game is a free game runnable without the bet of game medium, and is a game in which the probability of further addition of another free game is high. This provides the player with expectation and satisfaction in the special game, thereby attracting the player's interest in the game.

Alternatively, in addition to the first arrangement, the slot machine 10 may include a second arrangement in which the special status is established only when the maximum bettable number of game media are betted. More specifically, the slot machine 10 is further provided with a bet receiving device which receives betted game media within a predetermined range, in a base game, and the slot machine 10 has a second arrangement with which the controller of the slot machine 10 executes the step (a2) when the number of betted game media received by the bet receiving device is at the maximum within the predetermined range.

In the second arrangement, the controller may execute the step (a2) when the betted game media received by the bet receiving device have a predetermined value within a predetermined range.

With the slot machine 10 having the first and second arrangements, the presence of the bet receiving device allows the player to bet game media within a predetermined range in a base game, and a special status in which a specific symbol is added to plural symbols 501 in the special game is established only when a specific symbol 503 is rearranged with the first predetermined condition while the betted game media received by the bet receiving device are at the maximum (equal to or more than a predetermined value) within the predetermined range. In other words, the player is allowed to run a free game with which the addition of another free game is highly likely, only when the number of betted game media is at the maximum (not lower than a predetermined value) within a predetermined range. This encourages the player to bet the maximum-bettable number of game media (not lower than a predetermined value), so as to increase the gain of the gaming machine administrator.

In addition to the first arrangement, the slot machine 10 may include a modification of the second arrangement, with which the addition of a specific symbol 503 to the symbols 501 in the special status is further allowed when the maximum-bettable game media are betted. More specifically, the slot machine 10 may further include a bet receiving device which allows for the betting of game media within a predetermined range in a base game, and the controller may further add a specific symbol 503 to the symbols 501 in the special status when the number of betted game media received by the bet receiving device is at the maximum within the predetermined range.

The controller of the modification of the second arrangement may be arranged so as to add a specific symbol 503 to the symbols 501 in the special status, when the number of betted game media received by the bet receiving device is not smaller than a predetermined value within a predetermined range.

The slot machine 10 having the first arrangement and the modification of the second arrangement allows the player, by the bet receiving device, to bet on a base game a game medium which falls within a predetermined range in number. Furthermore, after a specific symbol 503 is rearranged in the first predetermined condition so that the special status in which a specific symbol 503 is added to plural symbols of the special game is established, another specific symbol 503 is further added to the symbols 501 in the special status if the number of betted game media received by the bet receiving device is at the maximum (not smaller than a predetermined value) within a predetermined range. In other words, the player is allowed to run a free game with which the addition of another free game is highly likely, only when the number of betted game media is at the maximum (not lower than a predetermined value) within a predetermined range. This encourages the player to bet the maximum-bettable number of game media (not lower than a predetermined value), so as to increase the gain of the gaming machine administrator.

In addition to the first arrangement, the slot machine 10 may have a third arrangement in which, in the special game, the symbol display device 16 displays and scrolls a symbol column for the special game, which column has more specific symbols 503 than the symbol column for the base game. More specifically, the symbol display device 16 of the slot machine 10 rearranges plural symbols 501 after displaying and scrolling the symbol column constituted by the plural symbols 501. When in the step (a2) a specific symbol 503 is rearranged with the first predetermined condition in the base game, the controller may change the symbol column displayed and scrolled by the symbol display device 16 from the symbol column for the base game to the symbol column for the special game which column has more specific symbols than the symbol column for the base game.

The slot machine 10 having the first and third arrangements above operates as follows. When a specific symbol is rearranged with the first predetermined condition in the base game, the symbol column displayed and scrolled by the symbol display device is changed from the symbol column for the base game to the symbol column for the special game which column has more specific symbols 503 than the symbol column for the base game. This makes it possible to easily shift the symbols 501 rearranged by the symbol display device 16 to the special status.

In addition to the first arrangement, the slot machine 10 may have a fourth arrangement in which, when a specific symbol 503 is rearranged with the second predetermined condition in the special game, another specific symbol 503 is further added to the symbols 501 of the special game, which are in the special status.

The slot machine 10 having the first and fourth arrangements above operates as follows. When a specific symbol 503 is rearranged with the second predetermined condition in a free game in the special game, a specific symbol 503 is further added to the symbols 501 to be rearranged. Therefore, as a specific symbol 503 is rearranged with the second predetermined condition in a free game, the probability that a specific symbol 503 is rearranged with the second predetermined condition is increased in subsequent free games in the special game. This further enhances the entertainment characteristic.

In addition to the first and fourth arrangements, the slot machine 10 may further have a fifth arrangement with which the number of free games to be added in the special game has an upper limit. More specifically, according to the fifth arrangement, when a specific symbol 503 is rearranged with the second predetermined condition in the special game in the step (a4), the controller of the slot machine 10 may further make another free game runnable until reaching a predetermined upper limit.

In the slot machine 10 having the first, fourth, and fifth arrangements, there is an upper limit in the number of additional free games repeated in the special game. This prevents free games from limitlessly added, thereby protecting the profit of the gaming machine administrator.

(Functional Blocks of Gaming Machine 300)

Figure 2:
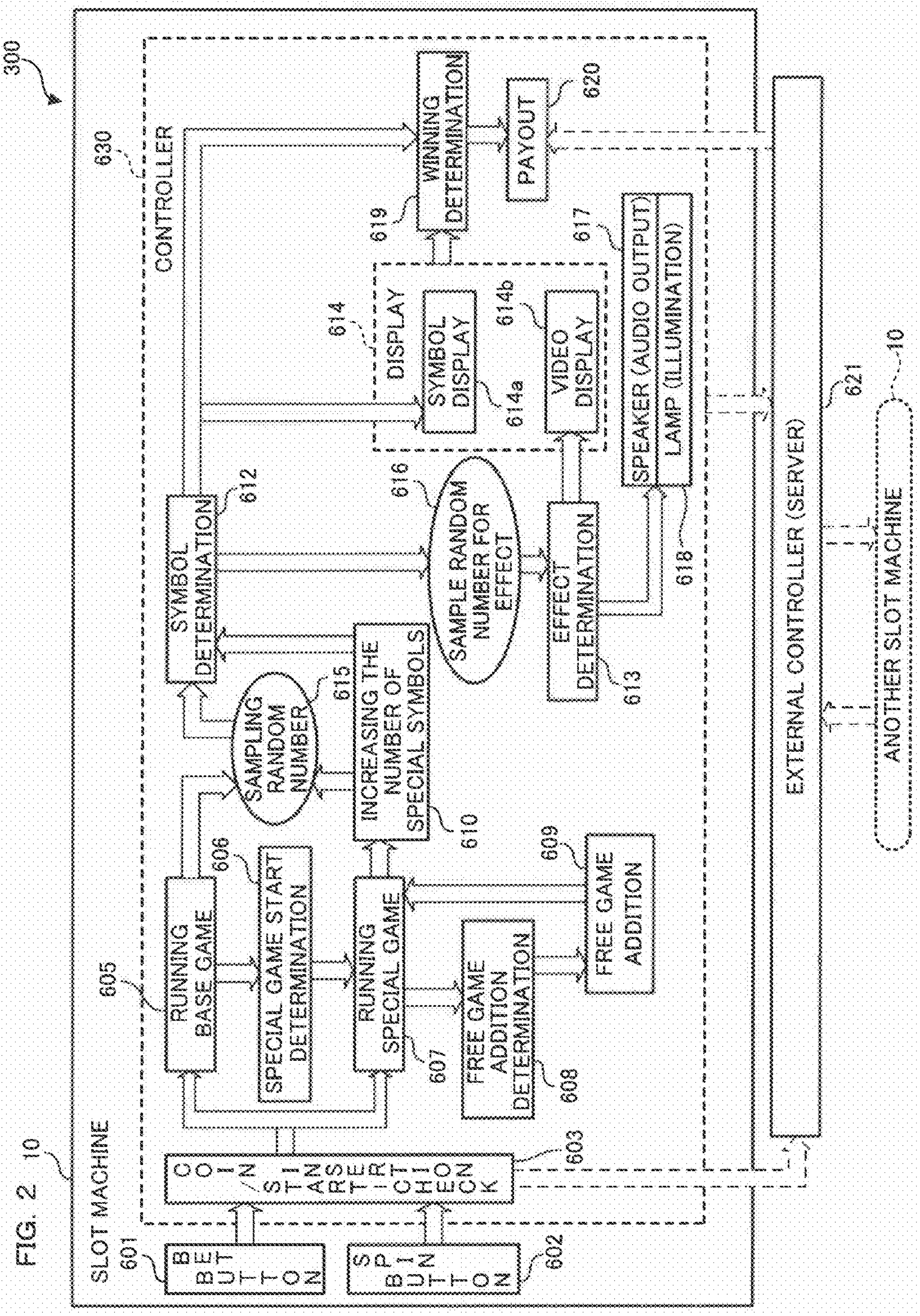
FIG. 2 is a block diagram of the gaming machine.

As illustrated in FIG. 2, the gaming machine 300 structured as described above includes plural slot machines 10 connected to and in communication with an external controller 621. In other words, the gaming machine of the present invention may include, as shown in FIG. 2, plural slot machines 10 and an external controller 621. In the present embodiment the functions of the controller of the gaming machine of the present invention are the features of the slot machine 10. The present invention however is not limited to this. The functions of the controller may be the features of the slot machine 10 and the external controller 621 or may be the features of only the external controller 621.

Each slot machine 10 includes a bet button unit 601, a spin button unit 602, a display unit 614, and a controller 630 which controls these units.

The bet button unit 601 has a function of accepting a player's operation for entering a bet. The spin button unit 602 has a function of accepting a player's operation for starting a game. The display unit 614 has a function of displaying, in the form of a still image, various symbols 501, numerical values, marks, or the like, and displaying moving pictures such as an effect video. The display unit 614 has a symbol display region 614*a* and a video display region 614*b*. The symbol display region 614*a* displays symbols 501, as illustrated in FIG. 1. The video display region 614*b* displays various effect video information to be displayed during a game, in the form of moving image or still image.

The game controller 630 includes: a coin insertion/start-check unit 603; a base game running unit 605; a special game start determination unit 606; a special game running unit 607; a free game addition determining unit 608; a free game addition unit 609; a specific symbol increasing unit 610; a random number sampling unit 615; a symbol determining unit 612; an effect-use random number sampling unit 616; an effect determining unit 613; a speaker unit 617; a lamp unit 618; a winning determining unit 619; and a payout unit 620.

The base game running unit 605 has a function of running a base game on condition that the bet button unit 601 is operated. The special game start determination unit 606 determines whether to run a special game, based on a combination of rearranged symbols 501 resulted from the base game. That is, the special game start determination unit 606 has functions of: (a) determining that the player is entitled to a special game, when a trigger symbol 503*b* is rearranged so as to satisfy the first predetermined condition; and (b) activating the special game running unit 607 so as to run a special game from the subsequent unit game.

Note that a unit game includes a series of operations performed within a period between a start of receiving a bet and a point where a winning may be resulted. For example, bet reception, rearrangement of symbols 501 having been stopped, and payout process to award a payout are performed once each within a single unit game of the base game.

The special game running unit 607 has a function of running the special game which is started simply by operating the spin button unit 602, and which repeats more than once with the aforesaid special status. The special game running unit 607 also has a function of outputting special game running information to the specific symbol increasing unit 610 and the free game addition determining unit 608. The specific symbol increasing unit 610 has: a function of detecting a start of the special game based on the special game running information; a function of adding a specific symbol 503 to symbols 501; and a function of outputting the symbol-increase information of the added specific symbol 503 to the symbol determining unit 612.

The symbol determining unit 612 has: a function of determining symbols 501 to be rearranged, by using a random number given by the random number sampling unit 615; a function of rearranging selected symbols 501 on the symbol display region 614*a* of the display unit 614; a function of outputting information of the symbols 501 rearranged, to the winning determining unit 619; a function of, based on symbol-increase information from the specific symbol increasing unit 610, adding a specific symbol 503 as one of the symbols 501 from which symbols to be rearranged are selected; a function of replacing at least one of the symbols 501 with at least one specific symbol 503 having been added; and a function of outputting an effect designation signal to the effect-use random number sampling unit 616, based on the conditions of the rearrangement of the symbols 501.

The effect-use random number sampling unit 616 has functions of, when receiving the effect instruction signal from the symbol determining unit 612, sampling an effect-use random number; and outputting an effect-use random number to the effect determining unit 613. The effect determining unit 613 has: a function of determining an effect by using the effect-use random number; a function of outputting, to a video display region 614*b* of the display unit 614, video information in the effect thus determined; and a function of outputting audio information and illumination information to the speaker unit 617 and the lamp unit 618, respectively.

The winning determining unit 619 has a function of determining whether a winning is resulted when information of symbols 501 rearranged and displayed on the display unit 614 is given; a function of calculating a payout when it is determined that a winning has resulted, based on the winning combination; and a function of outputting to the payout unit 620 a payout signal which is based on the amount of payout.

Further, the free game addition determining unit 608 which receives special game running information from the special game running unit 607 has: a function of determining whether a specific symbol 503 is rearranged with the second predetermined condition in the special game, based on the information given from the symbol determining unit 612 and the winning determining unit 619; and a function of outputting determination result information to the free game addition unit 609. The free game addition unit 609 has a function of further adding a free game and making it runnable, based on the determination result information.

(Operation of Gaming Machine 300)

Figure 3:
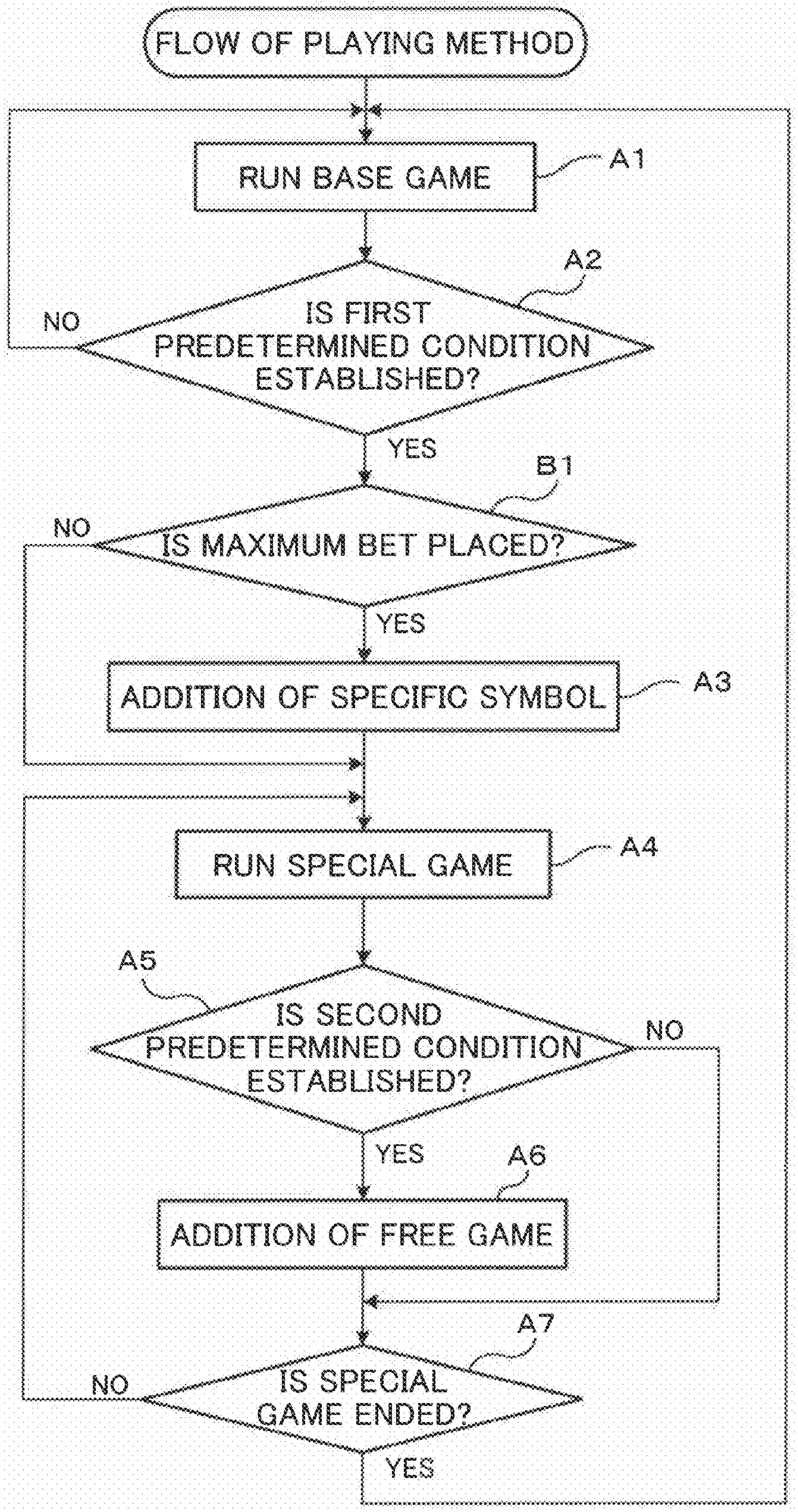
FIG. 3 is a flowchart illustrating the playing method of the gaming machine of first embodiment.

The following describes, with reference to the flowchart of FIG. 3, an operation of the gaming machine 300 having the above described functional blocks. It is noted that first embodiment assumes that the gaming machine 300 has the aforesaid first and second arrangements.

First, a base game is run (A1). Specifically, a series of the following operations are performed.

(Coin Insertion/Start-Checking)

First, the gaming machine 300 checks if the bet button unit 601 is pressed by a player, and if the spin button unit 602 is pressed by the player.

(Symbol Determination)

Next, when the player presses the spin button unit 602, the gaming machine 300 samples a random number for symbol determination. Then, for each video reel displayed on the display unit 614, the gaming machine 300 determines symbols 501 to be presented to the player when scrolling of symbol columns is stopped.

(Symbol Display)

Next, the gaming machine 300 starts scrolling the symbol column on the video reels, and stops the scrolling so as to present to the player the selected symbols 501.

(Winning Determination)

When the scrolling of the symbol columns on the video reels is stopped, the gaming machine 300 determines whether the combination of the symbols 501 presented to the player relates to a winning.

(Payout)

Next, when it is determined that the combination of the symbols 501 presented to the player relates to a winning, the gaming machine 300 awards a benefit to the player according to the combination of the symbols 501.

For example, when the combination of symbols 501 displayed relates to payout of coins, the gaming machine 300 pays out to the player a predetermined number of coins according to the combination of the symbols 501.

Subsequently, it is determined whether the rearranged symbols 501 satisfy the first predetermined condition (A2). If the first predetermined condition is not satisfied (A2: NO), A1 is re-executed and the base game is repeated.

On the other hand, if the first predetermined condition is satisfied (A2: YES), it is determined whether the number of betted game media is at the maximum acceptable number (hereinafter, this may be referred to as "maximum bet") (B1).

In the step B1, whether the number of betted game media is at the maximum acceptable number is determined. The present invention however is not limited to this. For example, whether at least a predetermined number of game media is bet within an acceptable range may be determined.

If the number of game media is at the maximum bet (B1: YES), a specific symbol 503 is added to the symbols 501 (A3). In other words, the symbols 501 shift to the special status with which the number of specific symbols 503 is larger than the number in the ordinary status. Thereafter, a bonus game is run as a special game. The first predetermined condition therefore functions as a trigger to run a bonus game. If the number is not at the maximum bet (B1: NO) or after the step A3, the special game starts (A4).

More specifically, when the combination of symbols 501 related to triggering of a bonus game is displayed (A2: YES), the gaming machine 300 starts a bonus game (special game) (A4). In the present embodiment, the free game is repeated a predetermined number of times in the bonus game. That is, symbols to be stopped are randomly selected a predetermined number of times without consumption of coins. The condition in which a combination of the symbols 501 related to the triggering of a bonus game is displayed and the start of the bonus game (special game) is allowed may be referred to as "feature-in".

Note that the "bonus game" is a synonym of "special game" and "feature game", in this specification. In the present embodiment, the bonus game is a game in which a free game is repeated. However, the bonus game is not particularly limited and may be any type of game, provided that the bonus game is more advantageous than the base game for a player. Another bonus game may be adopted in combination, provided that the player is given a more advantageous playing conditions than the base game. For example, the bonus game may be a game that provides a player with a chance of winning more coins than the base game or a game that provides a player with a higher chance of winning coins than the base game. Alternatively, the bonus game may be a game that consumes less number of coins than the base game. Further, the bonus game may be a game that provides a combination of these and other advantageous conditions to a player.

Further, when the group of symbols 501 includes a symbol related to triggering a jackpot, and when a symbol combination related to triggering a jackpot is displayed, the gaming machine 300 awards a jackpot prize to the player. A jackpot in this specification is a function of (i) partially accumulating coins consumed by a player of each slot machine 10 as a jackpot prize, and (ii) when the jackpot trigger is established in a slot machine 10, awarding the jackpot prize through that slot machine 10.

In each game, the gaming machine 300 calculates an amount accumulated as a jackpot prize (accumulation amount) and transmits the accumulation amount to the external controller 621. The external controller 621 adds to the jackpot prize the accumulation amount received from each slot machine 10.

Further, the gaming machine 300 may have a benefit such as mystery bonus or insurance, in addition to the above mentioned benefit.

Mystery bonus is a predetermined amount of payout awarded to a winner of a special lottery. When the spin button unit 602 is pressed, the gaming machine 300 samples a random number for a mystery bonus, and determines whether or not a mystery bonus is achieved by means of lottery.

Insurance is a function provided for the purpose of salvaging a player when the bonus game is not run for a long period of time. In the present embodiment, whether to activate the insurance is selectable by a player. The insurance is activated in exchange of a predetermined amount of game media for purchasing the insurance.

When the insurance is activated, the gaming machine 300 starts counting the number of games played. Then, when the counted number of games played reaches a predetermined number without any award of a large amount of game media from a bonus game or the like, the gaming machine 300 awards an amount of game media set as the insurance.

(Determination of Effect)

The gaming machine 300 provides an effect in the form of an image displayed on the display unit 614, illumination by the lamp unit 618, or a sound produced from the speaker unit 617. The gaming machine 300 samples an effect-use random number and determines an effect, based on symbols 501 having been determined through a lottery, or the like.

When the special game is run as above, it is determined whether, in a free game in this special game, the rearranged symbols 501 satisfy the second predetermined condition (A5). If the second predetermined condition is satisfied (A5: YES), a runnable free game is added (A6). If the second predetermined condition is not satisfied (A5: NO) or after the step A6, it is determined whether the special game has been finished (A7). If the special game has not ended (A7: NO), the process goes back to A4 and the special game is run. On the other hand, if the special game has ended, the process goes back to A1 and the base game is run.

(System Structure of Gaming Machine 300)

As shown in FIG. 4, the gaming machine 300 includes plural slot machines 10 and an external controller 621 connected to the slot machines 10 via a communication line 301.

The external controller 621 is for controlling the slot machines 10. In the present embodiment, the external controller 621 is a so-called hall-server provided in a gaming facility having plural slot machines 10.

Each slot machine 10 is given a unique identification number. The external controller 621 identifies the source of data from any gaming machine 10, by referring to the identification number The identification number is also used for designating the destination, when transmitting data from the external controller 621 to any slot machine 10.

Note that the gaming machine 300 may be built in plural gaming facilities or a single gaming facility such as a casino where various games are provided. Further, when building the gaming machine 300 in a single gaming facility, the system of the gaming machine 300 may be built in each floor or each section of the gaming facility. The communication line 301 may be wired or wireless. For example, an exclusive line, switched line, or the like may be adopted.

(Specific Structure of Gaming Machine 300)

Next, the following describes the specific structure of the gaming machine 300.

Figure 5:
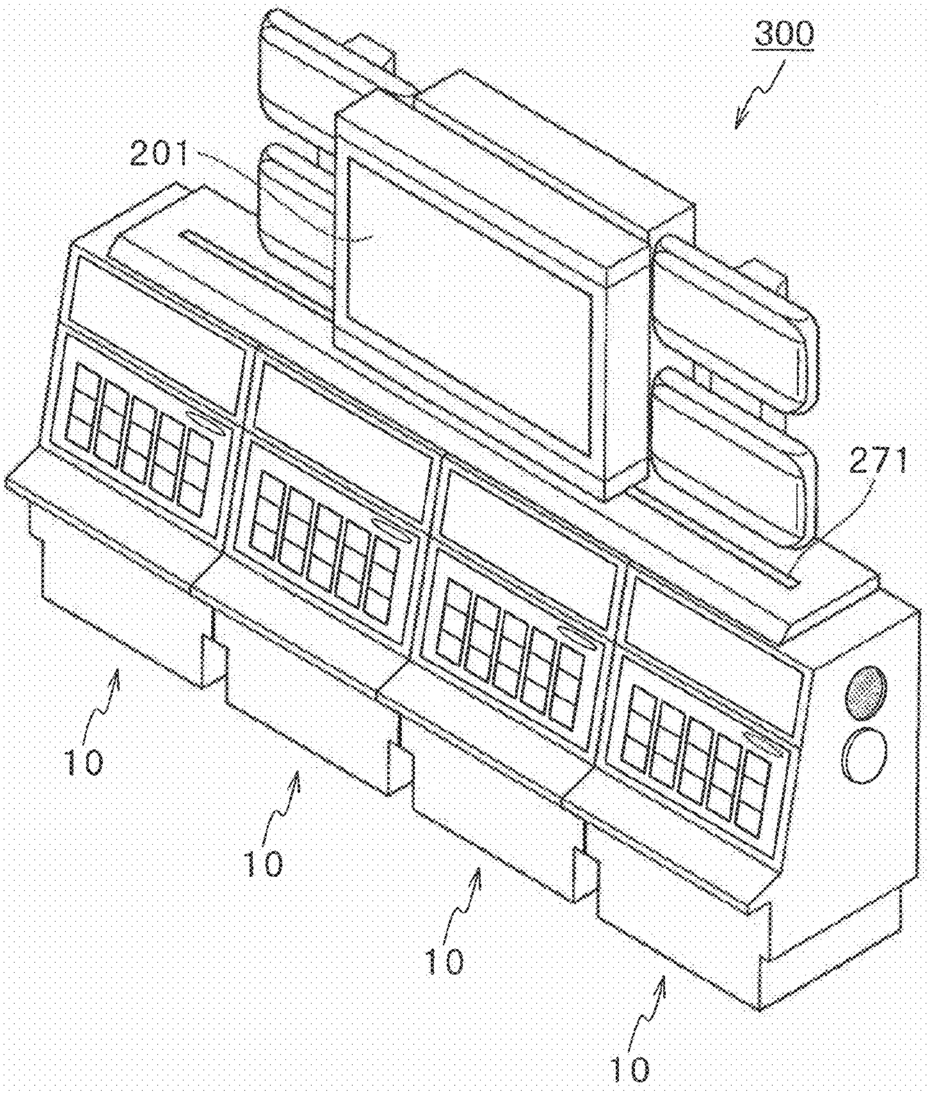
FIG. 5 is a perspective view illustrating the entire gaming machine.

As illustrated in FIG. 5, the gaming machine 300 has a shared display 201, a rail 271, a not-shown drive motor, and the not-shown external controller 621. The shared display 201 is connected to and in communication with the slot machines 10 each of which is a terminal device capable of running a game independently of the others. This shared display 201 displays an image related to a shared game. The rail 271 and the drive motor move the shared display 201 to immediately above any of the slot machines 10.

(Mechanical Structure of Slot Machine 10)

Figure 6:
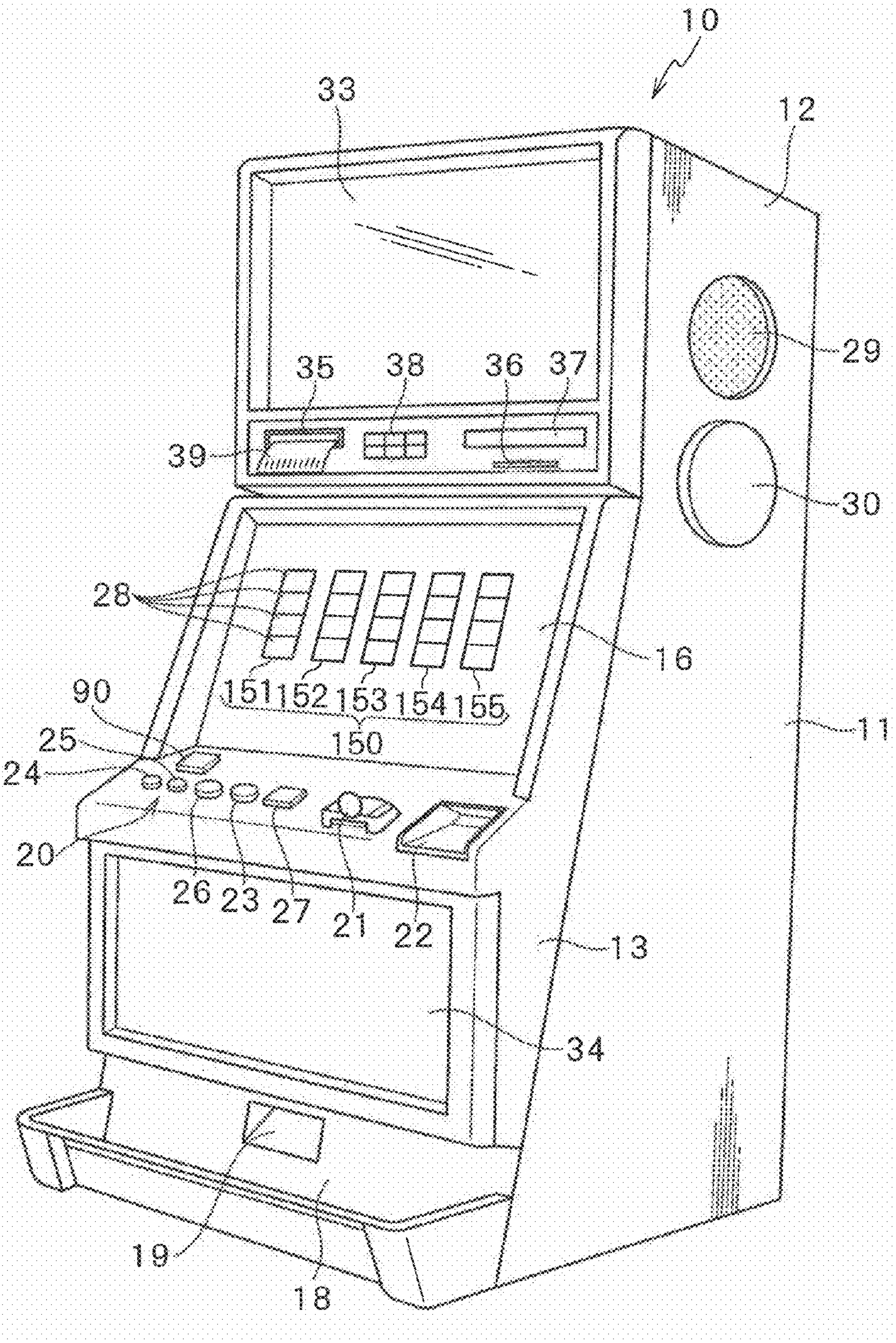
FIG. 6 is a perspective view of a slot machine in the gaming machine.

As shown in FIG. 6, the slot machine 10 includes: a cabinet 11, a top box 12 provided above the cabinet 11, and a main door 13 provided on the front surface of the cabinet 11.

The main door 13 has a symbol display device 16 which is also referred to as lower image display panel. The symbol display device 16 includes a transparent liquid crystal panel. The symbol display device 16 has a display window 150 at its center portion. The display window 150 includes 20 display blocks 28 which are arranged in five columns and four rows. The columns form pseudo reels 151 to 155, each having four display blocks 28. The four display blocks 28 in each of the pseudo reels 151 to 155 are displayed as if all the display blocks 28 are moving downward at various speed. This enables rearrangement in which symbols 501 respectively displayed in the display blocks 28 are scrolled in a longitudinal direction and stopped thereafter. In the present embodiment, the symbol display device 16 rearranges the symbols 501 in such a way that the symbols 501 are scrolled in a longitudinal direction and then automatically stopped.

Figure 7:
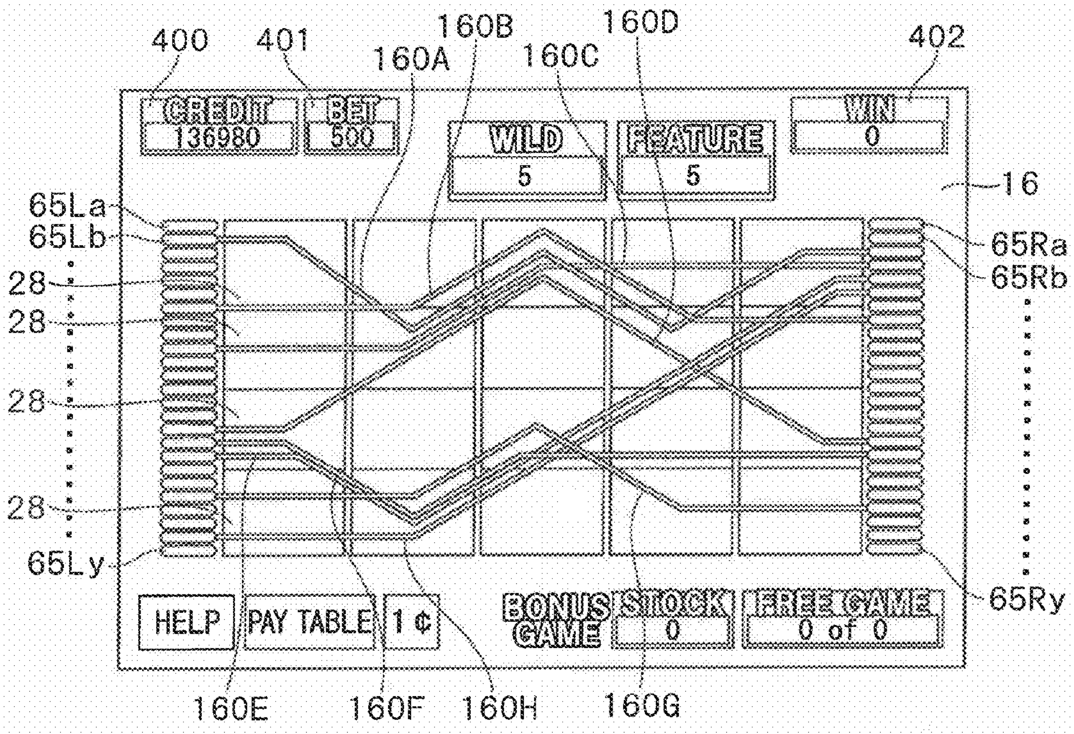
FIG. 7 is an explanatory diagram of a payline.

On both sides of the display window 150 are payline occurrence columns which are symmetrically arranged. As illustrated in FIG. 7, a payline occurrence column on the left when viewed from the front side includes 25 payline occurrence parts 65L (65La, 65Lb, 65Lc, 65Ld, 65Le, 65Lf, 65Lg, 65Lh, 65Li, 65Lj, 65Lk, 65Ll, 65Lm, 65Ln, 65Lo, 65Lp, 65Lq, 65Lr, 65Ls, 65Lt, 65Lu, 65Lv, 65Lw, 65Lx, and 65Ly).

On the other hand, a payline occurrence column on the right when viewed from the front side includes 25 payline occurrence parts 65R (65Ra, 65Rb, 65Rc, 65Rd, 65Re, 65Rf, 65Rg, 65Rh, 65Ri, 65Rj, 65Rk, 65Rl, 65Rm, 65Rn, 65Ro, 65Rp, 65Rq, 65Rr, 65Rs, 65Rt, 65Ru, 65Rv, 65Rw, 65Rx, and 65Ry).

Each payline occurrence part 65L is paired with one of the payline occurrence parts 65R. For each pair of the payline occurrence parts 65L and 65R, there is a prescribed payline 160 which extends from the payline occurrence part 65L to the payline occurrence part 65R paired with that payline occurrence part 65L.

The payline 160A connects the payline occurrence part 65Lb with the payline occurrence part 65Rc. The payline 160B connects the payline occurrence part 65Lg with the payline occurrence part 65Rh. The payline 160C connects the payline occurrence part 65Lj with the payline occurrence part Rd. The payline 160D connects the payline occurrence part 65Lp with the payline occurrence part Rq. The payline 160E connects the payline occurrence part 65Lr with the payline occurrence part Re. The payline 160F connects the payline occurrence part 65Lq with the payline occurrence part Rr. The payline 160G connects the payline occurrence part 65Lu with the payline occurrence part 65Rv. The payline 160H connects the payline occurrence part 65Lx with the payline occurrence part 65Rf.

In FIG. 7, only eight paylines 160 are shown for the sake of simplicity. In the present embodiment, however, there are actually 25 paylines 160.

Each payline 160 is activated when the payline 160 connects a pair of payline occurrence parts 65L and 65R. The payline 300 otherwise is inactive. The number of active paylines 300 is determined base on the bet amount. When the number of bet is at the maximum (i.e. maximum bet), 25 paylines 160, i.e. all paylines 160 are activated. Each activated payline 160 forms various winning combinations of symbols 501. The winning combination is detailed later.

The present embodiment deals with a case where the slot machine 10 is a video slot machine. However, the slot machine 10 of the present invention may partially adopt a mechanical reel in place of the pseudo reels 151 to 155.

Further, a not-shown touch panel 69 is disposed at the front of the symbol display device 16, and a player is able to input various instructions by operating the touch panel 69. From the touch panel 69, an input signal is transferred to the main CPU 41.

Below the symbol display device 16 are a control panel 20, a coin receiving slot 21, and a bill validator 22. The control panel 20 includes plural buttons 23 to 27 and 90 by which a player is able to input an instruction related to progression of a game. The coin receiving inlet 21 receives a coin and takes it into the cabinet 11.

The control panel 20 has: a start button 23, a change button 24, a cashout button 25, a 1-bet button 26, a maximum bet button 27, and an insurance bet button 90. The start button 23 is for inputting an instruction to start scrolling symbols. A change button 24 is used when requesting a gaming facility staff member to exchange money. The cashout button 25 is for inputting an instruction to pay out credited coins to a coin tray 18.

The 1-bet button 26 is for inputting an instruction to bet a single coin out of the credited coins. The maximum bet button 27 is for inputting an instruction to bet the maximum number of coins bettable in one game (500 coins in this embodiment), out of the credited coins. The insurance bet button 90 is for inputting an instruction of transition from the non-insured mode to the insured mode.

The bill identifier 22 is for validating the legitimacy of a bill input, and takes into the cabinet 11 those recognized as legitimate. The bill identifier 22 may be also capable of reading a barcode on a later-mentioned barcode-attached ticket 39. On the lower front surface of the main door 13, that is, below the control panel 20, there is provided a belly glass 34 with a character or the like of the slot machine 10 being drawn thereon.

On the front surface of the top box 12 is an upper image display panel 33. The upper image display panel 33 has a liquid crystal panel, and displays thereon an image or text which provides introduction to the game, the rules of the game, or the like information.

Further, the top box 12 is provided with speakers 29. Below the upper image display panel 33 are a ticket printer 35, a card reader 36, a data displayer 37, and a key pad 38. The ticket printer 35 prints on a ticket a barcode and outputs the ticket as a barcode-attached ticket 39. A barcode is encoded data containing a credit amount, date and time, an identification number of the slot machine 10, or the like. A player is able to exchange the barcode-attached ticket 39 with bill or the like at a predetermined location in the gaming facility (e.g. change booth of a casino).

The card reader 36 reads/writes data from/into a smart card. The smart card is carried by a player, and stores therein data for identifying the player, data relating to a history of games played by the player, or the like. The smart card may store data of coins, bill, or a credit card. Further, it is possible to adopt a magnet stripe card instead of the smart card. The data displayer 37 includes a fluorescent display or the like, and displays the data read by the card reader 36 and the data input by the player through the key pad 38. The key pad 38 is for entering instructions or data relating to issuing of a ticket or the like.

(Electric Structure of Slot Machine 10)

Figure 8:
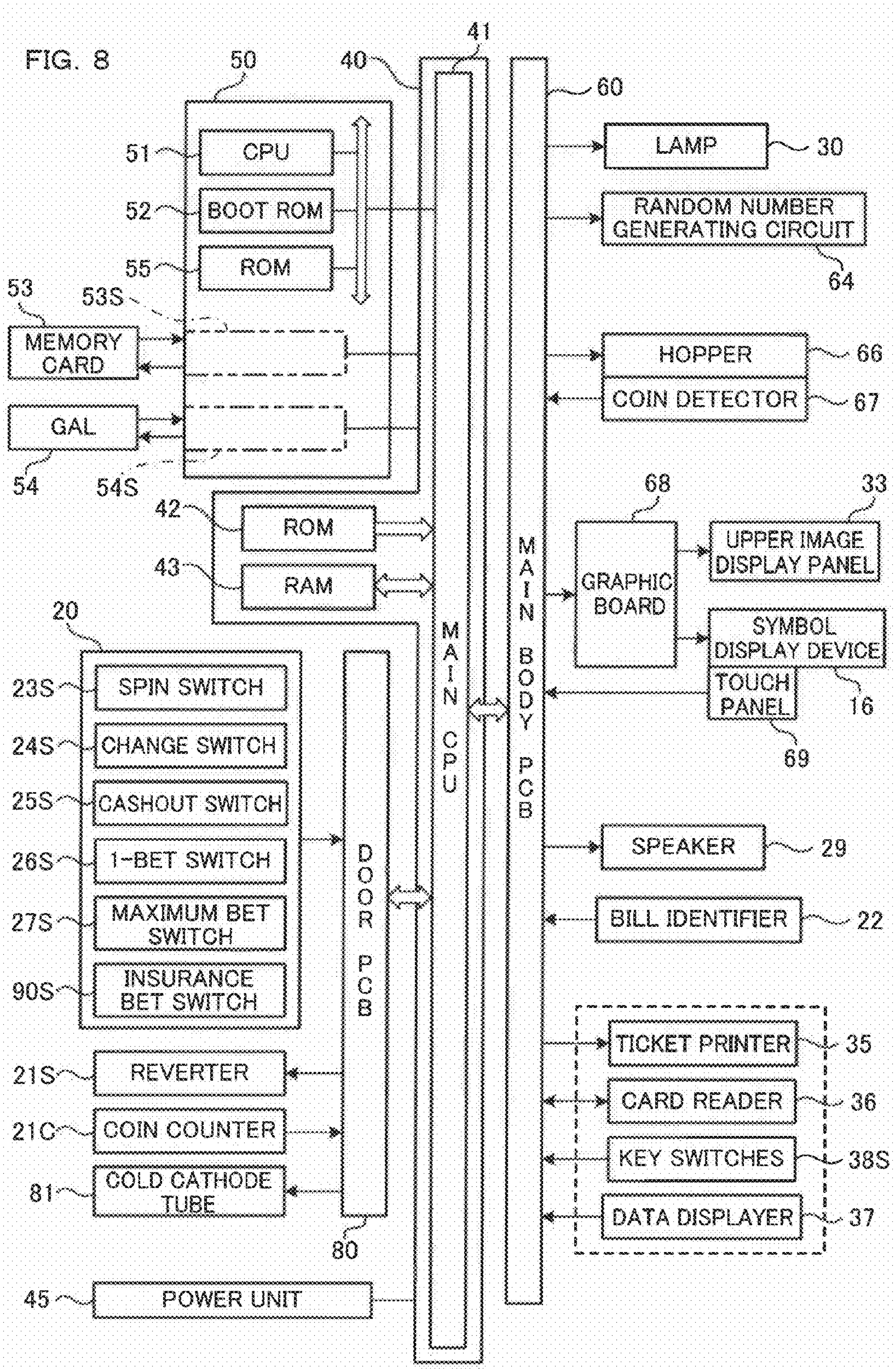
FIG. 8 is a block diagram illustrating a control circuit of the gaming machine.

FIG. 8 is a block diagram illustrating the internal structure of the slot machine 10 illustrated in FIG. 6. The gaming board 50 is provided with a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 is made of an involatile memory such as a compact flash (®) or the like, and stores a game program. The game program includes a symbol determining program. The symbol determining program is a program for determining symbols to be rearranged on the display blocks 28.

The card slot 53S is structured so as to allow the memory card 53 to be attached to or detached from the card slot 53S. This card slot 53S is connected to the motherboard 40 through an IDE bus. Thus, the type and content of a game run by a slot machine 10 can be modified by detaching the memory card 53 from the card slot 53S, write a different game program into the memory card 53, and inserting the memory card 53 back into the card slot 53S. The game program includes a program according to a game progress.

The game program also includes data such as: base game symbol table data representing a base game symbol table (see FIG. 9) which indicates how symbols in symbol columns on the display block, code Nos., and random numbers are associated with one another; payout table data (see FIG. 13) which indicates how the types and number of symbols 501 rearranged on the payline 160 and an amount of payout are associated with one another; and code No. determination table data (see FIG. 12) which indicates how random numbers for determining code Nos. are associated with the code Nos.

The CPU 51, the ROM 55 and the boot ROM 52 connected through an internal bus are connected to the motherboard 40 through the PCI bus. The PCI bus communicates signals between the motherboard 40 and the gaming board 50 and supplies power from the motherboard 40 to the gaming board 50.

The motherboard 40 is structured by using a marketed general-purpose motherboard which is a printed circuit board having basic components of a personal computer, and includes: a main CPU 41; a ROM (Read Only Memory) 42; and a RAM (Random Access Memory) 43. The motherboard 40 corresponds to the controller of the present invention.

The ROM 42 is made of a memory device such as a flash memory, and stores permanent data and a program such as BIOS (Basic Input/Output System) which is run by the main CPU 41. Running the BIOS by the main CPU 41 initializes predetermined peripherals and starts loading of a game program in a memory card 53 via the gaming board 50. Note that, in the present invention, the ROM 42 may be rewritable or non-rewritable.

The RAM 43 stores data used during operation of the main CPU 41 and a program such as a symbol determining program. Further, the RAM 43 is capable of storing a game program.

Further, the RAM 43 stores data such as a credit amount, and an input amount and a payout amount for each game (unit game). Further, the RAM 43 stores a symbol table data (see FIGS. 9, 10, and 11) indicating a symbol table which indicates how a symbol of a display block forming a symbol column, a code No., and a random number are associated with one another.

Further, the RAM 43 has a free game count storage area, a total game count storage area, a total payout amount storage area, and a trigger symbol count storage area. The trigger symbol is also referred to as "feature symbol". In the free game count storage area is stored remaining game count data which indicates a remaining free game count T. In the total game count storage area is stored total game count data indicating a total game count C. The total game count C is the number of base games played after a transition to the insured mode. The trigger symbol count storage area stores trigger symbol count data indicating a trigger symbol count. The trigger symbol count is the total number of the trigger symbols that may be rearranged during a free game.

Further, the main RAM 43 is provided with a storage area for an insurance flag. Insurance flag is a flag which is activated when the insurance BET button 90 is pressed down. The insurance flag storage area is, for example, a storage area of a predetermined bits, and the insurance flag is turned on and off according to contents of the storage area. The insurance flag in the on state corresponds to the insured mode. The insurance flag in the off state corresponds to the non-insured mode.

When the bonus game is run in the insured mode, an increase in the number of trigger symbols and/or that of wild symbols may be greater than the non-insured mode. Further, when a bonus combination (special combination) is achieved during a bonus game, an increase in the number of trigger symbols and/or that of wild symbols in the insured mode may be greater than the non-insured mode.

The motherboard 40 is connected to a later-mentioned main body PCB (Printed Circuit Board) 60 and a door PCB 80 via USB. The motherboard 40 is also connected to the power unit 45.

To the main body PCB 60 and door PCB 80 are connected equipment and devices which generate input signals to be input to the main CPU 41 or which are controlled by control signals output from the main CPU 41. The man CPU 41 runs a game program stored in the RAM 43 based on an input signal input to the main CPU 41, thereby storing a result of a predetermined computation in the RAM 43 or transmitting control signals to the equipment and devices to control the same.

To the main PCB 60 are connected: a lamp 30, a hopper 66, a coin sensor 67, a graphic board 68, a speaker 29, a touch panel 69, a bill identifier 22, a ticket printer 35, a card reader 36, a key switches 38S, a data displayer 37, and a random number generating circuit 64. The lamp 30 flashes in a predetermined pattern, based on a control signal output from the main CPU 41.

The hopper 66 is installed inside the cabinet 11, and outputs a predetermined number of coins from the coin outlet 19 to the coin tray 18, based on a control signal output from the main CPU 41. The coin sensor 67, when detecting that a predetermined number of coins is output from the coin outlet 19, outputs an input signal to the main CPU 41.

The graphic board 68 controls image displaying on the upper image display panel 33 and the symbol display device 16, based on a control signal output from the main CPU 41. On the upper image display panel 33 and display blocks 28 of the symbol display device 16 are displayed symbols which are scrolled and stopped. The credit amount indicator 400 of the symbol display device 16 displays thereon a credit amount stored in the RAM 43. Further, the bet value indicator 401 of the symbol display device 16 displays the number of coins bet. Further, the payout indicator 402 of the symbol display device 16 displays the number of coins to be paid out. The graphic board 68 has a VDP (Video Display Processor) which generates image data based on control signal output from the main CPU 41, a video RAM which temporarily stores image data generated by the VDP, or the like. The image data used at the time of generating image data by the VDP is in a game program which is read out from the memory card 53 and stored in the RAM 43.

The bill identifier 22 validates whether a bill is legitimate, and only receives a legitimate bill into the cabinet 11. The bill identifier 22, when receiving a legitimate bill, outputs an input signal indicating the value of the bill to the main CPU 41. The main CPU 41 stores in the RAM 43 a credit amount corresponding to the value of the bill indicated by the input signal.

Based on a control signal from the main CPU 41, the ticket printer 35 prints on a ticket a barcode and outputs the ticket as a barcode-attached ticket 39. The barcode is encoded data containing the credit amount stored in the RAM 43, date, and the identification number of the slot machine 10. The card reader 36 reads out data from a smart card and transmits the data to the main CPU 41, or writes data into a smart card based on a control signal from the main CPU 41. The key switches 38S are provided to the key pad 38, and transmit a predetermined input signal to the main CPU 41 when a player operates the key pad 38. The data displayer 37 displays data read out by the card reader 36 based on a control signal from the main CPU 41, or data input by the player through the key pad 38.

The random number generating circuit 64 generates a random number at a predetermined timing. Note that random numbers generated by the random number generating circuit 64 ranges from 0 to 65535. The present embodiment deals with a case where the random number generating circuit 64 is provided and a random number (so-called hardware random number) is sampled from the random number generating circuit. However, the present invention may be adapted so that a random number is generated in a program (so-called software random number).

The door PCB 80 is connected to a control panel 20, a reverter 21S, a coin counter 21C and a cold cathode tube 81. The control panel 20 is provided with a start switch 23S corresponding to the start button 23, a change switch 24S corresponding to the change button 24, a cashout switch 25S corresponding to a cashout button 25, 1-bet switch 26S corresponding to the 1-bet button 26, a maximum bet switch 27S corresponding to the maximum bet button 27, and an insurance bet switch 90S corresponding to the insurance bet button 90. Each of the switches 235 to 275 and 90S outputs an input signal to the main CPU 41 when corresponding one of the buttons 23 to 27 and 90 is operated by the player.

The coin counter 21C is provided inside the coin receiving port 21, and validates whether a coin input by a player to the coin receiving port 21 is legitimate coin. Any non-legitimate coin is output from the coin outlet 19. Further, the coin counter 21C, when detecting a legitimate coin, outputs an input signal to the main CPU 41.

The reverter 21S operates based on a control signal from the main CPU 41, and delivers coins that are recognized as legitimate by the coin counter 21C into a not-shown cash box or hopper 66 in the slot machine 10. That is, when the hopper 66 is full of coins, legitimate coins are delivered by the reverter 21S to the cash box. On the other hand, if the hopper 66 is not full of coins, legitimate coins are delivered to the hopper 66. The cold cathode tube 81 functions as a back light disposed at the back sides of the symbol display device 16 and the upper image display panel 33. This cold cathode tube 81 lights based on a control signal output from the CPU 41.

(Symbols, Combinations, or the Like)

Symbols displayed on the pseudo reels 151 to 155 of the slot machine 10 form symbol columns each including plural symbols 501. Each symbol 501 forming a symbol column is given any of the code Nos. 0 to 19 or more, as shown in FIGS. 9 to 11. Each symbol column has a combination of symbols 501 which are: “WILD”, “FEATURE”, “A”, “Q”, “J”, “K”, “BAT”, “HAMMER”, “SWORD”, “RHINOCEROS”, “BUFFALO”, and “DEER”.

Any three consecutive symbols 501 of a symbol column are displayed (arranged) in the uppermost stage, upper stage, lower stage, and lowermost stage of the corresponding one of the pseudo reels 151 to 155, respectively, thereby forming a symbol matrix of five columns and four rows on the display window 150. Symbols 501 forming a symbol matrix are scrolled at least when the start button 23 is pressed to start a game. The scrolling of the symbols 501 stops (symbols 501 are rearranged), when a predetermined period elapses after the start of scrolling.

Further, for each symbol 501, various winning combinations are set beforehand. Each winning combination means a winning is achieved. A winning combination is a combination of symbols 501 stopped on the payline 160, which is advantageous for a player. The wording “advantageous” means that: a predetermined number of coins according to the winning combination are paid out; the number of coins to be paid out is added to the credit; and a bonus game is started; or the like.

In the present embodiment, a winning combination is a combination of symbols 501 which are rearranged on an activated payline 160 and includes a predetermined number or more (three or more in the present embodiment) of at least one of the following symbols 501: “WILD”, “FEATURE”, “A”, “Q”, “J”, “K”, “BAT”, “HAMMER”, “SWORD”, “RHINOCEROS”, “BUFFALO”, and “DEER”. When a predetermined type of symbol 501 is set as a scatter symbol, a winning combination is regarded as to be formed if a predetermined number or more of scatter symbols are rearranged, irrespective of the activation/inactivation status of the payline 160.

Specifically, a winning combination with “FEATURE” (trigger symbols 503*b*) stopped on a payline 160 serves as a bonus trigger and causes (i) transition of the gaming state from the base game to the bonus game and (ii) a payout according to the bet amount. In other words, the first predetermined condition of the present embodiment is a condition in which a predetermined number or more trigger symbols 503*b* are rearranged on a payline 160.

Further, when the winning combination includes a symbol 501 “BAT” stopped on the payline 160 during the base game, there is paid out an amount of coins (value) which is a product of a basic payout amount multiplied by the bet amount. The paying out process is detailed later with reference to the payout table of FIG. 13. The wild symbol 503*a* (“WILD”) is a symbol substitutable for any type of symbol 501.

(Base Game Symbol Table)

FIG. 9 shows a table used for determining symbols 501 to be rearranged during a base game. The base game symbol table indicates a symbols 501 on a display block 28 forming a symbol column, a code No. associated with the symbol 501, and a number range associated with the code No. The number range is one of twenty ranges which cover 0 to 65535. Such a symbol column will be referred to as base-game symbol column.

Note that the above numbers may be equally divided into twenty ranges or unequally divided into twenty ranges. The latter case enables adjustment of a winning possibility for each type of symbols 501 by adjusting the associated range of random numbers. Further, the range of random numbers, which is associated with a specific symbol 503, i.e. "FEATURE" serving as the trigger symbol 503*b* or "WILD" serving as a wild symbol 503*a*, may be narrower than ranges of random numbers associated with other symbols 501. This allows easier adjustment of winning or losing, by adjusting the possibility of winning a valuable symbol 501.

For example, when a random number randomly selected for the first column is "10000", the symbol "J" whose code No. "3" is associated with a range of random numbers including "10000" is selected as a symbol to be rearranged in the first pseudo reel 151. Further, for example, when a random number randomly selected for the fourth column is "40000", the symbol "FEATURE" whose code No. "12" is associated with a range of random numbers including "40000" is selected as a symbol to be rearranged in the fourth pseudo reel 151.

The scrolling display stops in such a way that a symbol 501 associated with the code No. which is the target of rearrangement is rearranged in the uppermost stage of each of the pseudo reels 151-155 of the symbol display device 16. In other words, symbols 501 associated with the code No. which is the target of rearrangement and the code Nos. which are the second, the third, and the fourth from the target code No. are displayed on the display regions of the respective pseudo reels 151-155. For example, when the target of rearrangement in the first pseudo reel 151 is "J" with the code No. 3, the pseudo reel 151 displays "J" in the uppermost stage, "Q" with the code No. 4 in the upper stage, "RHINOCEROS" with the code No. 5 in the lower stage, and "A" with the code No. 6 in the lowermost stage.

(Bonus Game Symbol Table)

As described above, a bonus game is triggered when, in a base game, the "FEATURE" trigger symbol 503*b* stops so that a winning combination is established. In the base game, if the maximum bet is placed when the winning combination of the "FEATURE" trigger symbol 503*b* is established, a trigger symbol 503*b* is added to the symbol column in the bonus game.

FIGS. 10 and 11 are examples of a bonus game symbol table for use at the time of determining symbols 501 to be rearranged during a bonus game. As is the base game symbol table, the bonus game symbol table contains a symbol 501 of a display block 28 of a symbol column, a code No. associated with the symbol 501, and a number range associated with the code No. The number ranges cover 0 to 65535. These numbers 0 to 65535 are divided into the random number ranges as is the case of the base game symbol table.

More specifically, if in the base game the maximum bet is placed when the winning combination of trigger symbols 503*b* is established, three trigger symbols 503*b* are added to the symbol column of the pseudo reel 153. In other words, "special status" in the present embodiment indicates a case where three trigger symbols 503*b* are added to the symbol column of the pseudo reel 153. In FIGS. 10 and 11, the pseudo reels 151-155 except the pseudo reel 153 are not illustrated and the descriptions thereof are omitted, because they are identical with those in the base game symbol table (see FIG. 9).

It is noted that "addition of trigger symbol" indicates, for example, the following cases. For example, a trigger symbol 503*b* is inserted into a predetermined part of existing symbol data stored in the RAM 43. In another example, in existing symbol data stored in the RAM 43, the symbol 501 at a predetermined part is replaced with a trigger symbol 503*b*. In a further example, existing symbol data stored in the RAM 43 is entirely replaced with new symbol data which has been prepared in advance.

FIG. 10 shows an example of a symbol table for bonus games. The symbol table is stored in the RAM 43. The table shown in FIG. 10 is different from the base game symbol table shown in FIG. 9 in that a trigger symbol 503*b* is inserted in a part determined by lottery.

FIG. 11 shows an example of a symbol table for bonus games. The table shown in FIG. 11 is different from the base game symbol table shown in FIG. 9 in that a symbol 501 in a part determined by lottery is replaced by a trigger symbol 503*b*.

It is noted that a case where a symbol table is replaced by a new symbol table which has been prepared in advance will be described in second embodiment.

The part where the trigger symbol 503*b* is added is determined by lottery with reference to a later-described code No. determination table shown in FIG. 12. That is to say, a random number in the range of 0-65535 is sampled three times, and trigger symbols 503*b* are inserted in the parts indicted by the code Nos. associated with the three random numbers, respectively. For example, provided that the sampled random numbers are "1736", "38931", and "63459", trigger symbols 503*b* are inserted into the parts corresponding to the code Nos. "0", "11", and "10", respectively, as shown in FIG. 10.

Similarly, provided that the sampled random numbers are "1736", "38931", and "63459", the symbols 501 corresponding to the code Nos. "0", "11", and "19" respectively associated with the random numbers may replace the trigger symbols 503*b*, as shown in FIG. 11.

(Code No. Determination Table)

FIG. 12 shows a code No. determination table. The code No. determination table indicates a code No. and a random number associated with the code No. For example, when the random numbers for the first symbol column No. (the first column) are 40567, 63535, 65323, then "12", "end", and "end" are selected as the code No. s, respectively.

In the present embodiment, the special status indicates a status in which three trigger symbols 503*b* are added to the symbol column of the pseudo reel 153. The present invention, however, is not limited to this case. For example, to which pseudo reel trigger symbols 503*b* are added may be selected by lottery from the pseudo reels 151-155. Alternatively, the number of added trigger symbols 503*b* may be not three but 1, 2, 4, or more.

(Payout Table)

FIG. 13 is a payout table for managing payout awarded based on the winning combination. This payout table is stored in the ROM 242 of the main control board 71, and payout information is associated with each winning combination. For example, a payout corresponding to a winning combination including three "A" is "100". A payout corresponding to a winning combination including five "BUFFALO" is "5000". Note that the setting of payouts for the base game is the same as that of the free game; however, the present invention is not limited to this. That is, the setting of payouts may be different between the base game and the free game.

(Display State)

The following describes an exemplary display state of the symbol display device 16 in the operation of the slot machine 10.

(Base Game Screen: During Game)

Figure 14:
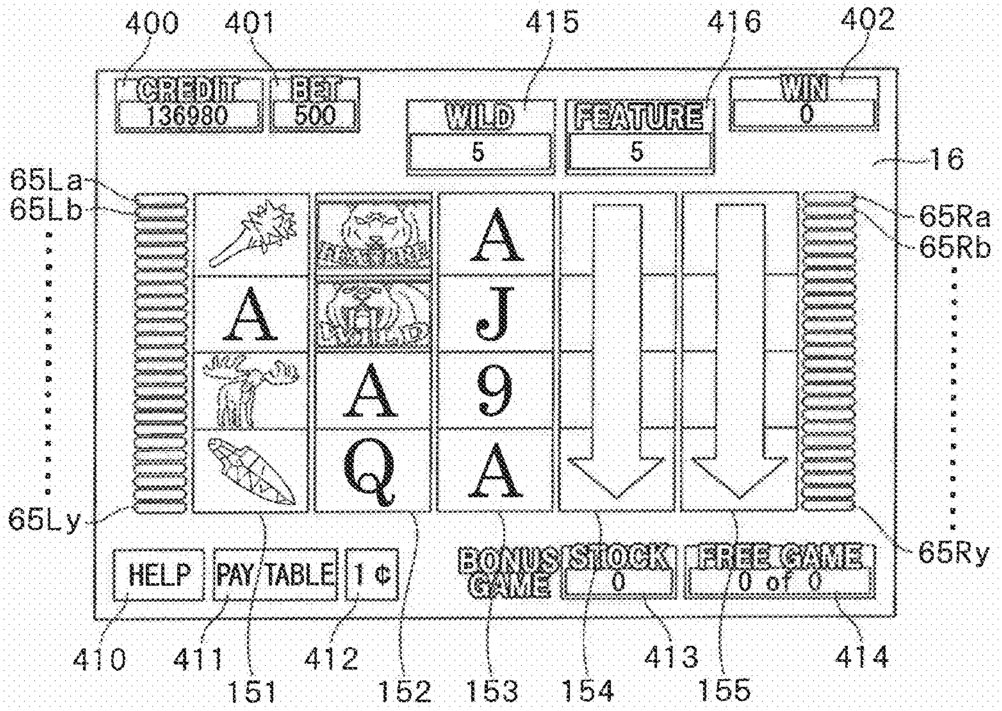
FIG. 14 is an explanatory diagram illustrating a display state of the symbol display device of first embodiment.

FIG. 14 illustrates an exemplary base game display screen which is a screen displayed on the symbol display device 16, during the base game.

More specifically, the base game screen is arranged in a center portion, and includes: a display window 150 having five pseudo reels 151 to 155, and payline occurrence parts 65L and 65R which are arranged on both sides of the display window 150 and symmetrical with respect to the display window 150. Note that FIG. 14 illustrates a base game screen in which first to third pseudo reels 151, 152, and 153 are stopped, while the fourth and fifth pseudo reels 154 and 155 are rotating.

Above the display window 150 are: credit amount indicator 400, a bet value indicator 401, a wild symbol count display unit 415, a trigger symbol count display unit 416, and a payout indicator 402. These units 400, 401, 415, 416, and 402 are sequentially arranged in this order from the left side to the right side of the player.

The credit amount indicator 400 displays a credit amount. The bet value indicator 401 displays a bet amount in a unit game in progress. The wild symbol count display unit 415 displays the number of wild symbols 503*a* in a unit game in progress. With this, it is possible to notify the player that there are five wild symbols 503*a* in the base game. The trigger symbol count display unit 416 displays the number of trigger symbols 503*b* in a unit game in progress. With this, it is possible to notify the player that there are five trigger symbols 503*b* in the base game. The payout indicator 402 displays the number of coins to be paid out when a winning combination is achieved.

Below the display window 150 are: a help button 410; a paytable button 411; a bet unit display unit 412; a stock display unit 413; and a free game count display unit 414. These units 410, 411, 412, 413, 414 are sequentially arranged in this order from the left side to the right side of the player.

The help button 410, when pressed by a player, activates a help mode. The help mode provides a player with information to solve his/her problem regarding the game. The paytable button 411, when pressed by a player, activates a payout display mode in which an amount of payout is displayed. The payout display mode displays an explanatory screen indicating relation of a winning combination to the odds.

The bet unit display unit 412 displays a bet unit (payout unit) at the current point. With the bet unit display unit 412, the player is able to know that, for example, the minimum game value required for participating in a unit game is one cent, and that s/he is able to raise his/her bet in increments of one cent.

The stock display unit 413 displays the number of bonus games carried over. Here, the "number of bonus games carried over" means the remaining number of bonus games runnable subsequently to the end of the currently-run bonus game. That is, when the stock display unit 413 displays "3", three more bonus games are runnable after the currently-run bonus game. Note that "0" is displayed during the base game.

The free game count display unit 414 displays the total number of times the bonus game is to be repeated, and how many times the bonus game has been repeated. That is, when the free game count display unit 414 displays "0 of 0", the total number of free games is 0; that is, the game running is not a bonus game. In the meanwhile, when the free game count display unit 414 displays "5 of 8" during the bonus game, the total number of free games is eight, and the current game in progress is the fifth free game.

(Bonus-Win Screen in Base Game)

Figure 15:
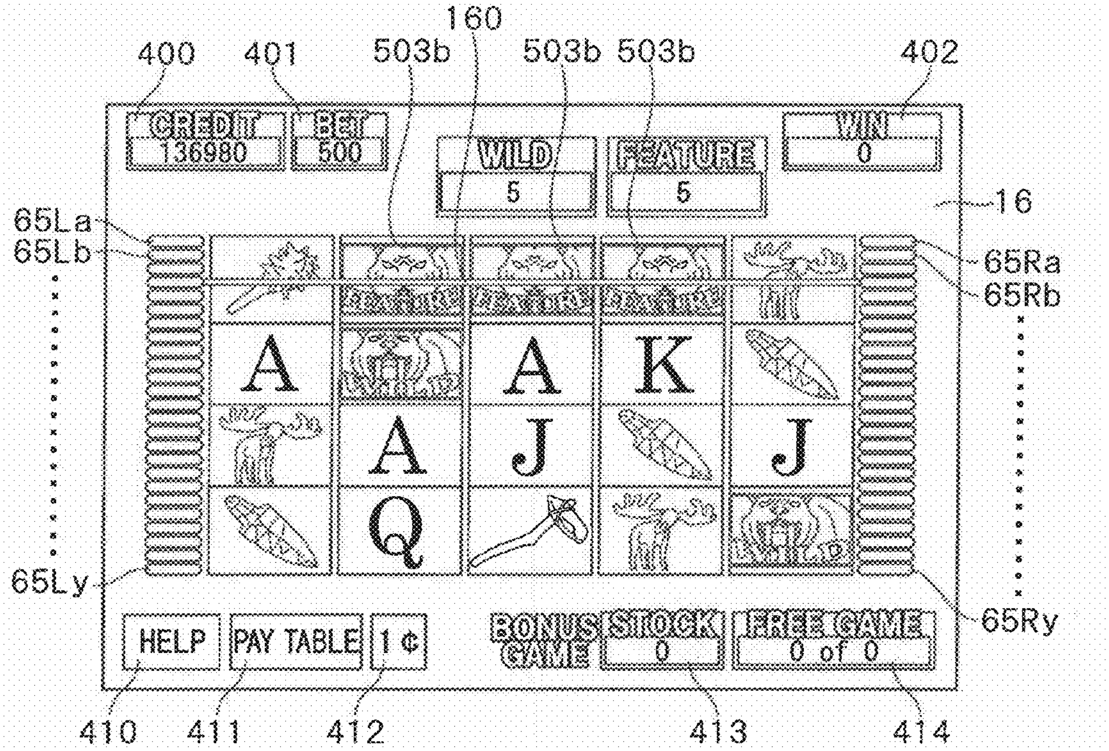
FIG. 15 is an explanatory diagram illustrating a display state of the symbol display device of first embodiment.

FIG. 15 shows a base game screen displayed when a bonus is won. More specifically, the base game screen shows that a bonus is won with three trigger symbols 503*b* being rearranged. The trigger symbol 503*b* preferably has a readable text such as "FEATURE", so as to make a player clearly understand that the symbol relates to winning of a bonus.

Figure 16:
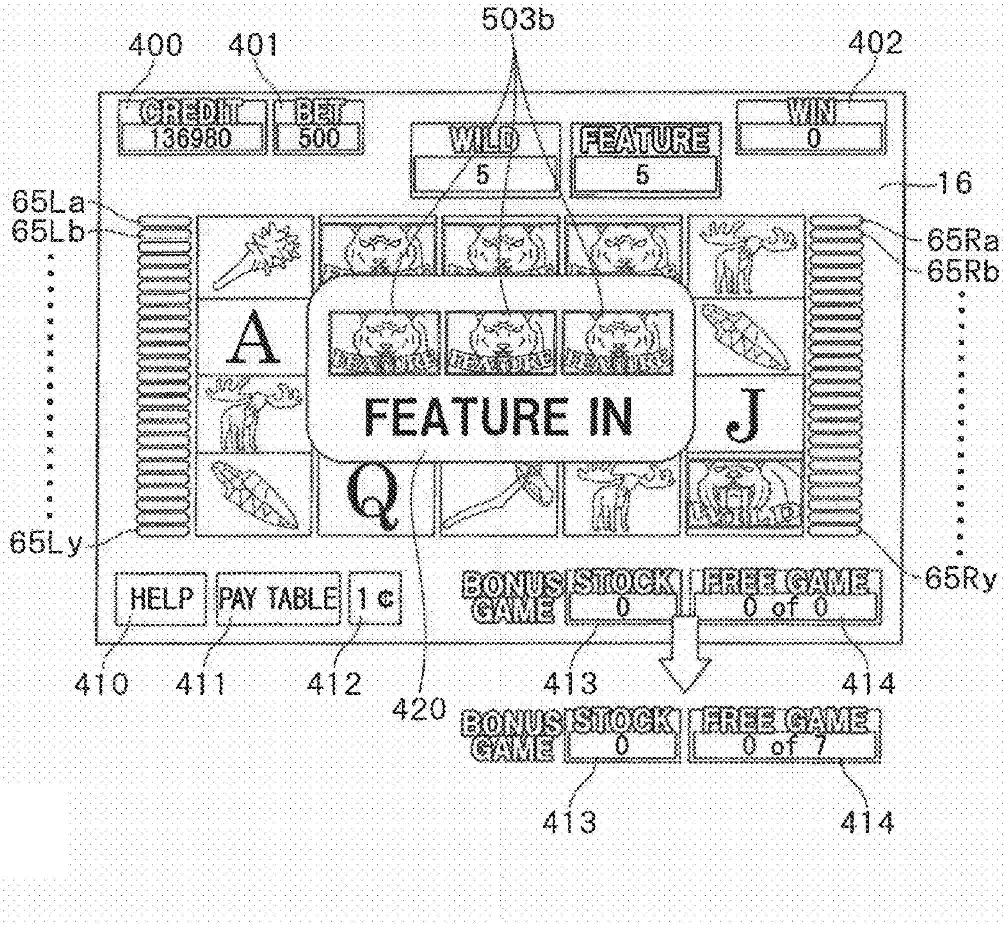
FIG. 16 is an explanatory diagram illustrating a display state of the symbol display device of first embodiment.

FIG. 16 shows a screen displayed for a predetermined period after a winning of bonus. More specifically, a bonus-win screen 420 indicating that a bonus is won pops up. Then, at the same time or immediately after the display of the bonus-win screen 420, the number "0" on the free game count display unit 414 is switched to "7". Thus, the player is able to know that s/he won a bonus, and that the game will transit to a bonus game in which the free game is repeated seven times. The number of repetition of free game in a bonus game is not limited to seven. The number may be determined by lottery.

Figure 17:
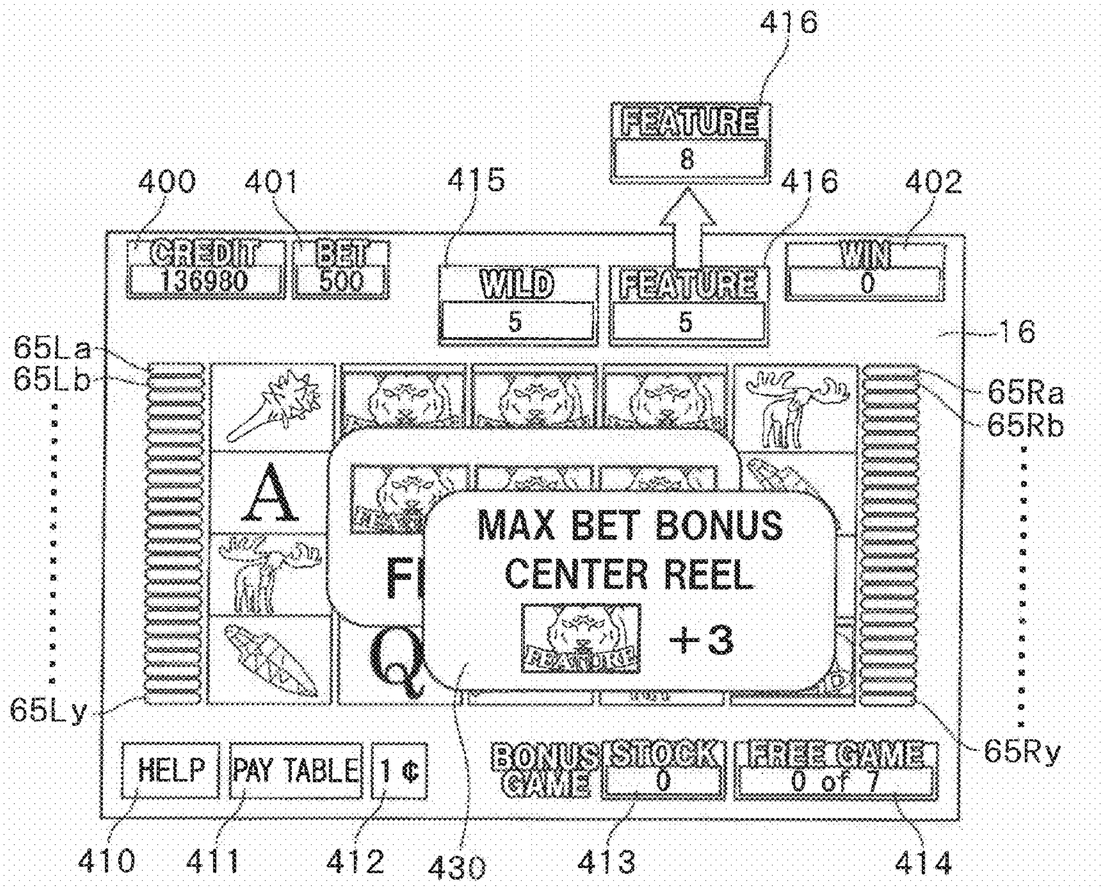
FIG. 17 is an explanatory diagram illustrating a display state of the symbol display device of first embodiment.

FIG. 17 shows a display state during a predetermined period of time after the bonus-win screen 420 in the case of the maximum bet is displayed, in a base game in which a bonus is won. More specifically, a trigger symbol addition screen 430 pops up. This screen 430 notifies that three trigger symbols 503*b* are added to the pseudo reel 153 (CENTER REEL) when the maximum bet is placed. Then, at the same time or immediately after the display of the trigger symbol addition screen 430, the total number of trigger symbols 503*b* on all of the pseudo reels 151-155 (display window 150) shown by the trigger symbol count display unit 416 is switched from "5" to "8". This allows the player to recognize that three trigger symbols 503*b* are added to the central pseudo reel 153 if the maximum bet is placed in a base game in which a bonus is won.

(Trigger Symbol Win Screen in Bonus Game)

Figure 18:
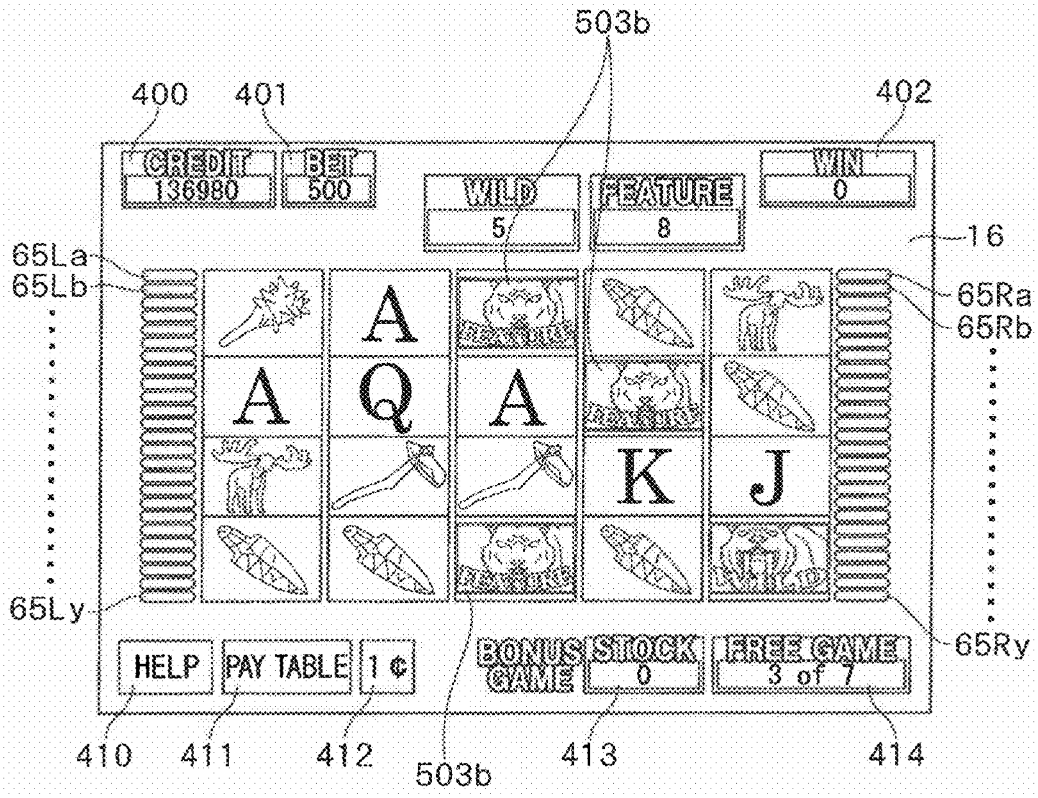
FIG. 18 is an explanatory diagram illustrating a display state of the symbol display device of first embodiment.

FIG. 18 shows the bonus game screen when winning by trigger symbols is achieved. In the bonus game, whether a winning combination of trigger symbols 503*b* is established or not is determined by the number of displayed trigger symbols 503*b*. That is to say, when a predetermined number or more (three or more in the present embodiment) of trigger symbols 503 is rearranged in the pseudo reels 151-155 (display window 150), a winning combination of trigger symbols 503*b* is established irrespective of the payline 160. In other words, the second predetermined condition of the present embodiment is such that a predetermined number or more of trigger symbols 503*b* is rearranged in all of the pseudo reels 151-155 (display window 150).

In the case of FIG. 18, three trigger symbols 503*b* are rearranged in the pseudo reels 151-155 (display window 150), indicating that a winning combination of trigger symbol 503*b* has been established.

This method of determining a winning combination, which is not associated with the payline 160, is termed "scatter symbol". The second predetermined condition, however, is not limited to this scatter symbol. The second predetermined condition may indicate a case that, in the same manner as the first predetermined condition, a predetermined number or more of symbols is rearranged on the payline 160. In addition, the first predetermined condition may also be the scatter symbol.

Figure 19:
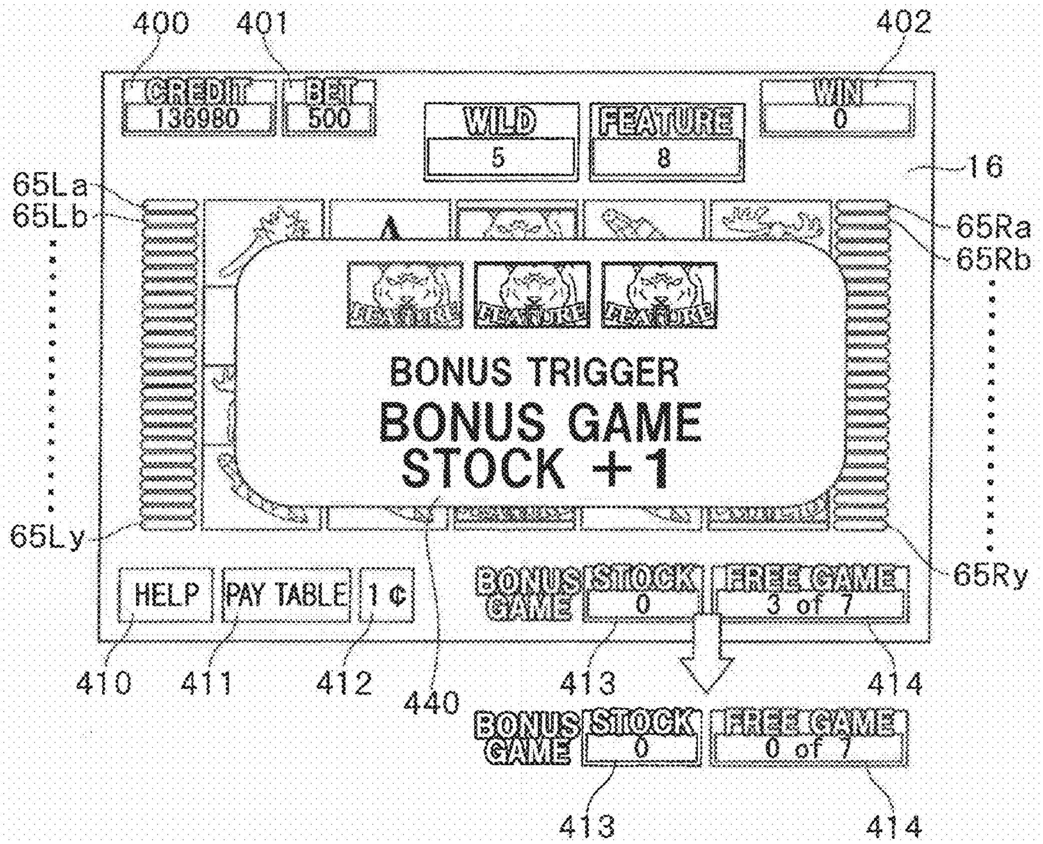
FIG. 19 is an explanatory diagram illustrating a display state of the symbol display device of first embodiment.

FIG. 19 shows a display state during a predetermined period of time after a winning combination of trigger symbols 503*b* is established, in a bonus game. More specifically, a trigger win screen 440 pops up. This screen 440 notifies that a winning combination of trigger symbols 503*b* is established and hence a runnable bonus game is added. Subsequently, at the same time or immediately after the display of the trigger win screen 440, the number indicated by the stock display unit 413 is changed from "0" to "1". Thus, the player is able to know that a bonus game in which the free game is repeated seven times is newly added. As such, a new runnable free game is added because trigger symbols 503*b* are rearranged in the second predetermined condition in a bonus game.

(Operations of Slot Machine 10)

Now, the operations carried out by the slot machine 10 will be described. After the boot process by the main CPU 41, the main CPU 41 reads out a game program from the memory card 53 to the RAM 43, so that the game proceeds.

(Operations of Slot Machine 10: Boot Process)

In response to power on, the main CPU 41 of the slot machine 10 executes a boot process routine shown in FIG. 20. This boot process is executed by the motherboard 40 and the gaming board 50. In this situation, the card slot 53S of the gaming board 50 holds the memory card 53 therein and the IC socket 54S is provided with the GAL 54.

First, as the power switch of the power unit 45 is turned on (i.e. power on), the motherboard 40 and the gaming board 50 are activated. The motherboard 40 and the gaming board 50 which have been activated execute different processes in parallel. That is to say, in the gaming board 50, the CPU 51 reads out preliminary authentication program stored in the boot ROM 52, and the program having been read out causes the CPU 51 to execute a preliminary authentication to confirm and verify that an authentication program is not falsified before the program is fetched into the motherboard 40 (S1). In the meanwhile, in the motherboard 40, the main CPU 41 executes the BIOS stored in the ROM 42 so as to expand, in the RAM 43, compressed data built in the BIOS (S2). Then the main CPU 41 execute the BIOS expanded in the RAM 43 so as to diagnose and initialize various peripherals (S3).

As the main CPU 41 is connected to the ROM 55 of the gaming board 50 via the PCI bus, the main CPU 41 reads out an authentication program stored in the ROM 55 and causes the RAM 43 to store the authentication program having been read out (S4). In doing so, the main CPU 41 derives a checksum through ADDSUM method (a standard check function) which is adopted in a standard BIOS, and stores the authentication program in RAM 43 while confirming if the operation of storing is carried out without an error.

Next, the main CPU 41 checks what is connected to the IDE bus. Then, the main CPU 41 accesses, via the IDE bus, to the memory cards 53 inserted into the card slot 53S, and reads out a game program and a game system program from the memory card 53. In this case, the CPU 41 reads out four bytes of data constituting the game program and the game system program at one time. Next, the CPU 41 authenticates the game program and the game system program read out to confirm and verify that these programs are not falsified, in accordance with the authentication program stored in the RAM 43 (S5).

When the authentication process properly ends, the main CPU 41 writes and stores the authenticated game program and game system program in the RAM 43 (S6).

Next, the main CPU 41 accesses, via the PCI bus, to the GAL 54 attached to the IC socket 54S, and reads out payout rate setting data from the GAL 54. The payout rate setting data read out is then written and stored in the RAM 43 (S7).

Next, the main CPU 41 reads out, via the PCI bus, country identification information stored in the ROM 55 of the gaming board 50. The country identification information read out is then stored in the RAM 43 (S8).

Figure 21:
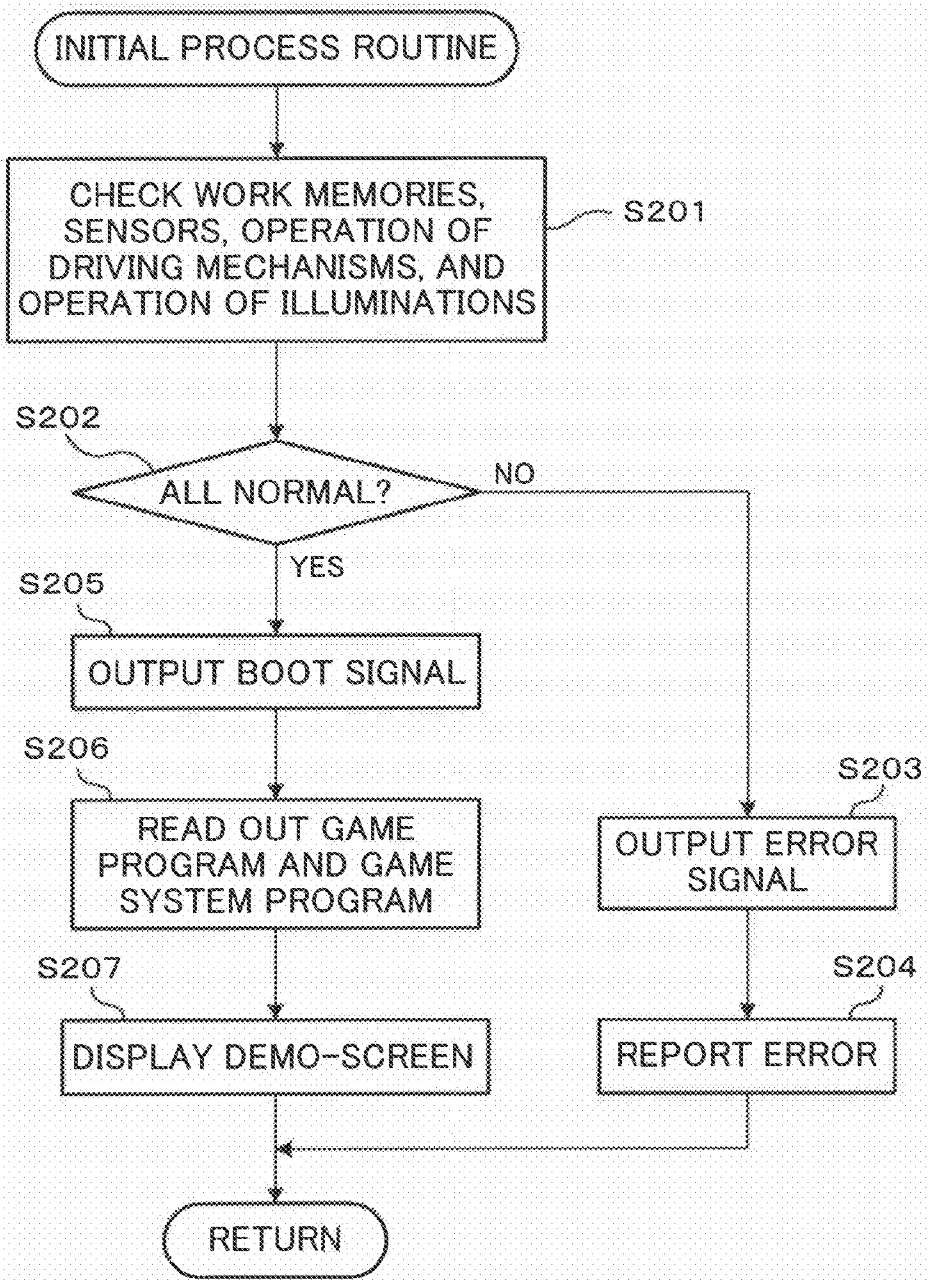
FIG. 21 is a flowchart of an initial process.

After this, the main CPU 41 serially reads out and run the game program and game system program so as to execute the initial process shown in FIG. 21.

(Operations of Slot Machine 10: Initial Process)

The following describes an initial process which takes place in the slot machine 10. After the execution of the boot process shown in FIG. 20, the main CPU 41 reads out from the RAM 43 and executes an initial process routine shown in FIG. 21.

First, the main CPU 41 checks operations of a work memory such as RAM 43, operations of sensors, operations of driving mechanisms, and operations of illuminations (S201). Then, the main CPU 41 determines if all the check results are normal (S202). If the main CPU 41 determines that the check results contain an error (S202: NO), an error signal is output (S203). Further, the error is notified in the form of illuminating the lamp 30 or the like (S204), and then the routine is ended.

On the other hand in S202, if the main CPU 41 determines that the check results are all normal (S202: YES), the main CPU 41 outputs a boot signal (S205). Then the main CPU 41 reads out a game program, a game system program and the like from the RAM 43 (S206). Thereafter, a demo-screen is displayed on the upper image display panel 33 or the like based on the programs having been read out (S207), and the execution of the routine is ended.

(Operations of Slot Machine 10: Base Game Running Process)

Figure 22:
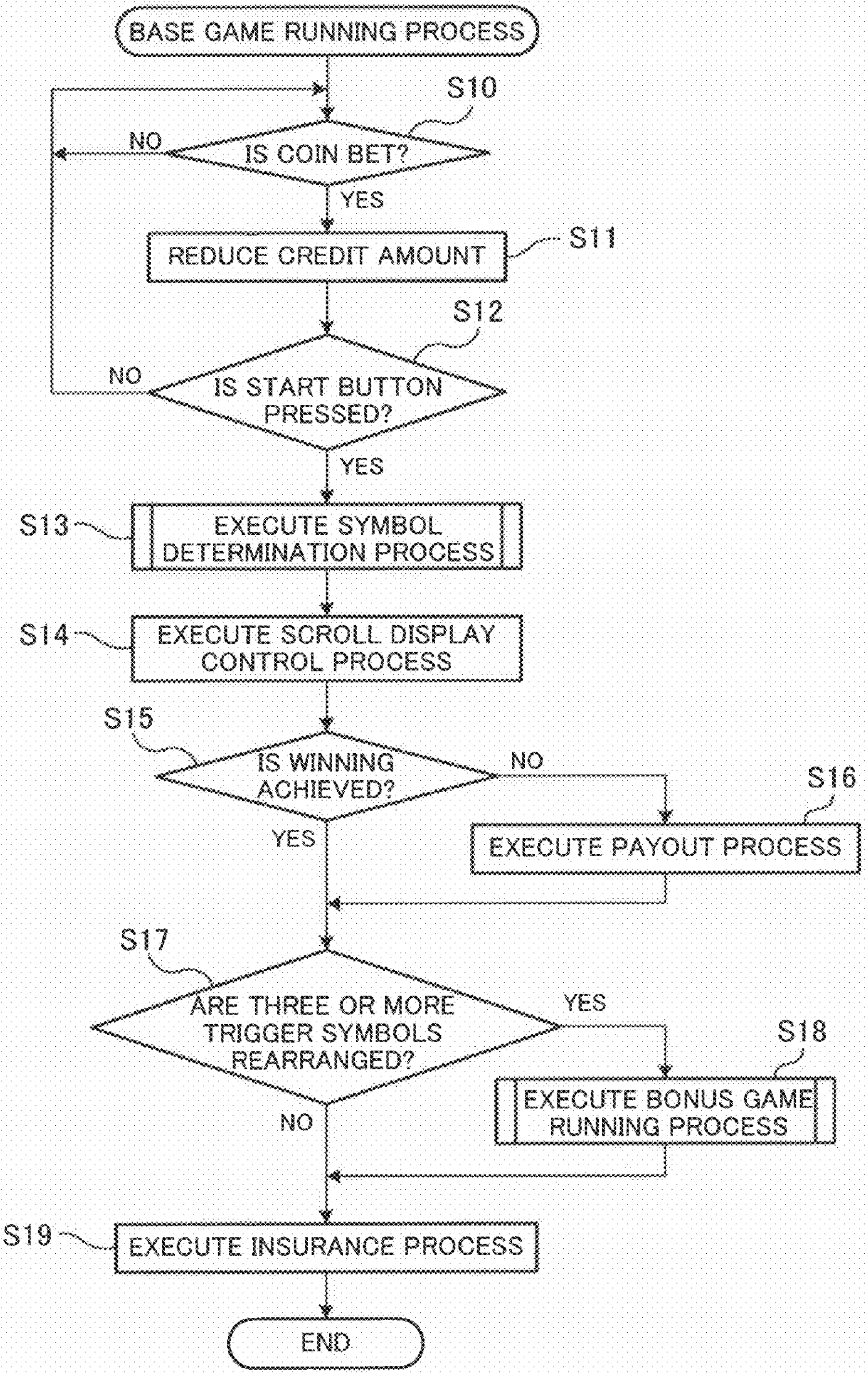
FIG. 22 is a flowchart illustrating a base game running process.

Now, a base game running process routine will be described with reference to FIG. 22. First, the main CPU 41 determines whether or a coin is bet (S10). In this process, the main CPU 41 determines whether an input signal is received. The input signal may be an input signal output from the 1-bet switch 26S when the 1-bet button 26 is operated, or an input signal output from the maximum bet switch 27S when the maximum bet button 27 is operated. When it is determined that no coin is bet, the process goes back to S10.

On the other hand in S10, if it is determined that a coin is bet, the main CPU 41 performs a process of reducing the credit amount stored in the RAM 43, by the amount of coins having been bet (S11). Note that when the number of coins bet surpasses the credit amount stored in the RAM 43, the process of reducing the credit amount in the RAM 43 is not performed and the process goes back to S10. Further, if the number of coins bet surpasses the maximum number of coins bettable in one game (500 coins in this embodiment), the process of reducing the credit amount in the RAM 43 is not performed and the process goes to S12.

Next, the main CPU 41 determines whether the start button 23 is pressed (S12). In this process, the main CPU 41 determines whether an input signal, which is output from the start switch 23S when the start button 23 is pressed, is received. If it is determined that the start button 23 is not pressed, the process goes back to S10. Note that when the start button 23 is not pressed (e.g. when the start button 23 is not pressed, and an instruction to end the game is input), the main CPU 41 cancels the result from the reduction in S11.

On the other hand in S12, if it is determined that the start button 23 is pressed, the main CPU 41 executes a base game symbol determining process (S13). In the base game symbol determining process, the main CPU 41 runs a symbol determining program stored in the RAM 43 to determine the code No. at the time of stopping the symbols. Specifically, the main CPU 41 obtains a random number, and determines the code No. at the time of stopping each symbol column formed by the display blocks 28, based on the random number obtained and the base game symbol table. The base game symbol determining process is detailed later with reference to the drawings.

Next, in S14, the main CPU 41 performs a scroll display control process. This process is a display control whereby scrolling of symbols is started and symbols determined in S13 are rearranged thereafter.

Next, the main CPU 41 determines whether a winning is achieved (S15). More specifically, in S15, the main CPU 41 counts the number of each type of symbols rearranged along each payline 160 in S14. Then, the main CPU 41 determines if there is a counted value which equals to or surpasses "3".

If it is determined that a winning is achieved, the main CPU 41 performs a process related to coin payout (S16). In this process, the main CPU 41 refers to the odds data stored in the RAM 43, and determines the amount of payout based on the number of certain symbols rearranged along the payline 160. The odds data is data indicating the number of certain symbols rearranged along the payline 160 and the associated amount of payout (see FIG. 13).

When it is determined that a winning is not achieved in S15, or after the process of S16, the main CPU 41 determines whether three or more trigger symbols 503*b* are rearranged on the payline 160 (S17). In S17, if it is determined that three or more trigger symbols 503*b* are rearranged, the main CPU 41 executes the bonus game running process (S18). In the bonus game running process, a free game is run plural times (in the present embodiment, seven times in a single bonus game). The bonus game running process is detailed later with reference to FIG. 24.

When it is determined that the number of trigger symbols 503*b* rearranged in the payline 160 is less than three in S17, or after the process of S18, the main CPU 41 executes an insurance process (S19). Here processes for salvaging the player such as the aforesaid insurance process are carried out. The insurance process is executed only when the insurance bet button 90 is pressed so that the transition from the non-insured mode to the insured mode is instructed.

(Operations of Slot Machine 10: Symbol Determining Process)

Figure 23:
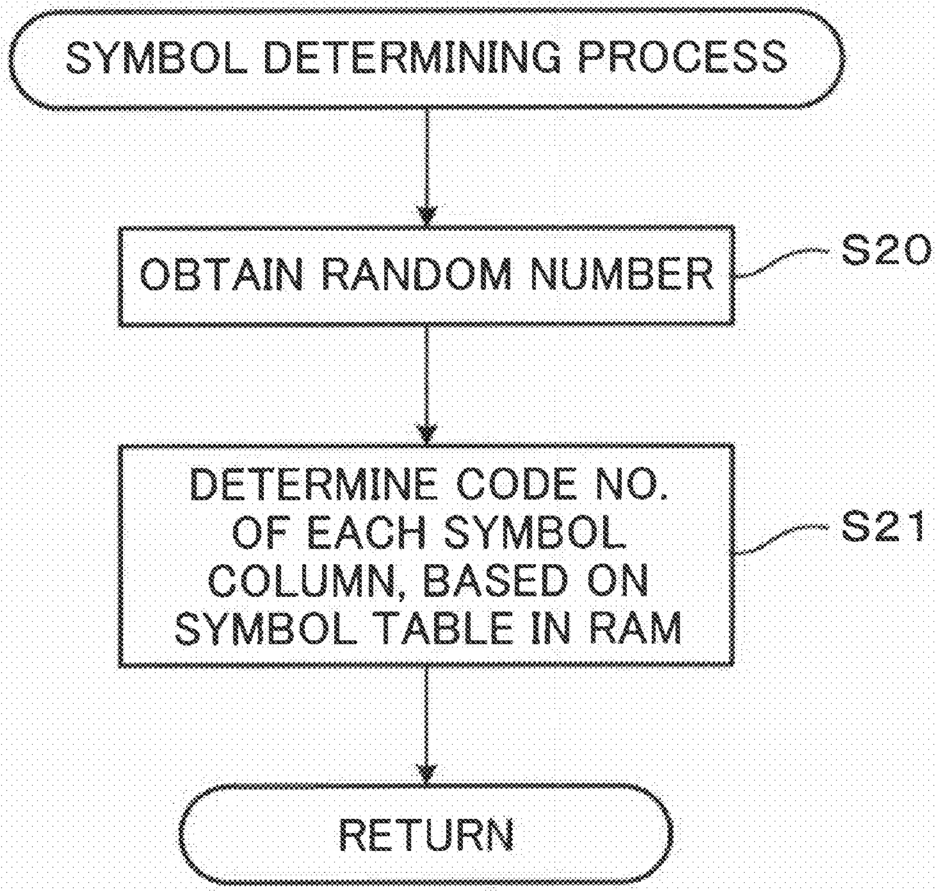
FIG. 23 is a flowchart of a symbol determining process.

FIG. 23 is a flowchart showing a sub routine of the symbol determining process. This process is executed by the main CPU 41 running a symbol determining program stored in the RAM 43.

First the main CPU 41 obtains a random number from the random number generating circuit 64 (S20). In this process, the main CPU 41 obtains five random numbers corresponding to the symbol columns of the display blocks 28.

Next, the main CPU 41 determines the code No. of each symbol column of the display block 28 at the time of stopping the symbols, based on the five random numbers obtained and the base game symbol table stored in the RAM 43 (S21). For example, in the base game the symbol table of the RAM 43 stores the base game symbol table shown in FIG. 9. When the random number for the first column is 23035, the code No. for the first column is determined to be 07. Note that the code No. of a symbol column corresponds to a code No. of a symbol rearranged in the first row of the display blocks 28, amongst those arranged in four rows. After the process of S21, the main CPU 41 ends this sub routine. This sub routine is also called when the symbols for the bonus game are determined. In doing so, the symbol table of the RAM 43 stores a bonus game symbol table shown in FIG. 10 or FIG. 11.

(Operations of Slot Machine 10: Bonus Game Running Process)

Figure 24:
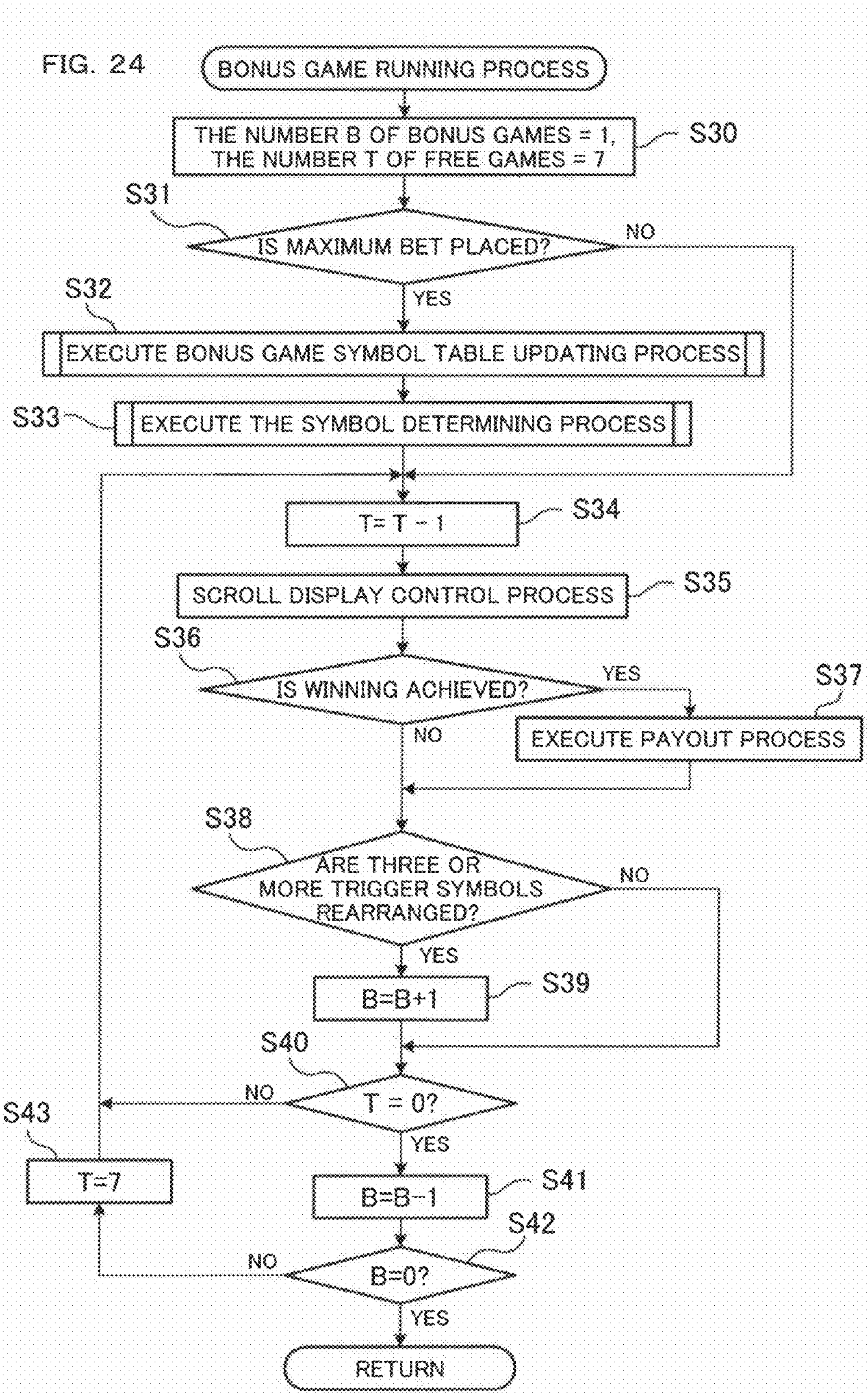
FIG. 24 is a flowchart of a bonus game running process of first embodiment.

Next, the following describes a bonus game running process, with reference to FIG. 24. FIG. 24 is a flowchart showing a sub routine of the bonus game running process. The bonus game running process allows the player to play without requiring a bet of a coin.

To begin with, the main CPU 41 sets the remaining number B of bonus games to B=1 and the remaining number T of free games to T=7 in the bonus game number storage area and the free game count storage area of the RAM 43, respectively (S30). Simultaneously, the main CPU 41 causes the symbol display device 16 to display a bonus-win screen 420 (see FIG. 16).

Subsequently, the main CPU 41 determines if the maximum bet of game media is placed (S31). If the maximum bet is placed (S31, YES), a bonus game symbol table updating process is executed (S32). In the bonus game symbol table updating process, the main CPU 41 carries out a process of adding a trigger symbol 503*b* to the pseudo reel 153. The bonus game symbol table updating process will be detained later with reference to FIG. 25. Note that, when a base game is run, the symbol table stored in the RAM 43 is a base game symbol table shown in FIG. 9.

In the step S32, the main CPU 41 executes a symbol addition effect process. More specifically, as shown in FIG. 17, the main CPU 41 causes the symbol display device 16 to display a trigger symbol addition screen 430.

Next, the main CPU 41 executes the symbol determining process which has been described with reference to FIG. 23 (S33). In the symbol determining process, the main CPU 41 runs a symbol determining program stored in the RAM 43 to determine the code No. at the time of stopping the symbols. More specifically, the main CPU 41 obtains a random number, and determines the code No. of each symbol column of the display blocks 28 at the time of stopping the symbols, based on the random number obtained and the bonus game symbol table.

Subsequently, in S34, the main CPU 41 updates the remaining number T of free games, which is stored in the RAM 43, to T−1. Next, in S35, the main CPU 41 performs a scroll display control process. This process is display control whereby scrolling of symbols is started and symbols determined in S33 are rearranged thereafter. In this way, it is possible to run a free game by consuming the number T of free games stored in the RAM 43.

Next, the main CPU 41 determines whether winning is achieved (S36). In S36, the main CPU 41 counts the number of each type of symbols rearranged in S35, along each payline 160. Then, the main CPU 41 determines if there is a counted value which equals to or surpasses "3".

If it is determined that a winning is achieved, the main CPU 41 performs a process related to coin payout (S37). Since the process above is identical with the step S16 described in relation to the base game running process shown in FIG. 22, it is not described here again.

When it is determined that a winning is not achieved in S36, or after the process of S37, the main CPU 41 determines whether three or more trigger symbols 503*b* are rearranged (S38). In this process, whether or not three or more trigger symbols 503*b* are rearranged in the display blocks 28 is determined, without taking into consideration the payline 160. If it is determined in S38 that three or more trigger symbols 503*b* are rearranged, the main CPU 41 sets the remaining number B of bonus games to B=B+1, in the bonus game number storage area of the RAM 43 (S39).

If it is determined in S38 that three or more trigger symbols 503*b* are not rearranged, or after executing S39, the main CPU 41 determines whether the remaining number T of free games in the free game count storage area of the RAM 43 is 0 or not (S40). If the remaining number T of free games is not 0, the main CPU 41 repeats the processes related to the free game from S34. When the remaining number T of free games is 0, the main CPU 41 sets the remaining number B of bonus games to B=B−1, in the bonus game number storage area of the RAM 43 (S41).

Thereafter, the main CPU 41 determines whether the remaining number B of bonus games, which number is stored in the bonus game number storage area of the RAM 43, is 0 or not (S42). When the remaining number B of bonus games is 0, the routine is ended. In the meanwhile, if the remaining number B of bonus games is not 0, the main CPU 41 sets the remaining number T of free games to 7 in the free game count storage area of the RAM 43, and repeats the processes in relation to the free game from S34.

As such, when the remaining number T of free games reaches 0, the remaining number B of bonus games is decreased by 1 and the remaining number T of free games is changed to 7. In other words, the free game is repeated as long as the remaining number T of free games is one or more, and the bonus game including plural free games is repeated as long as the remaining number B of bonus games is one or more.

(Operations of Slot Machine 10: Bonus Game Symbol Table Updating Process)

Figure 25:
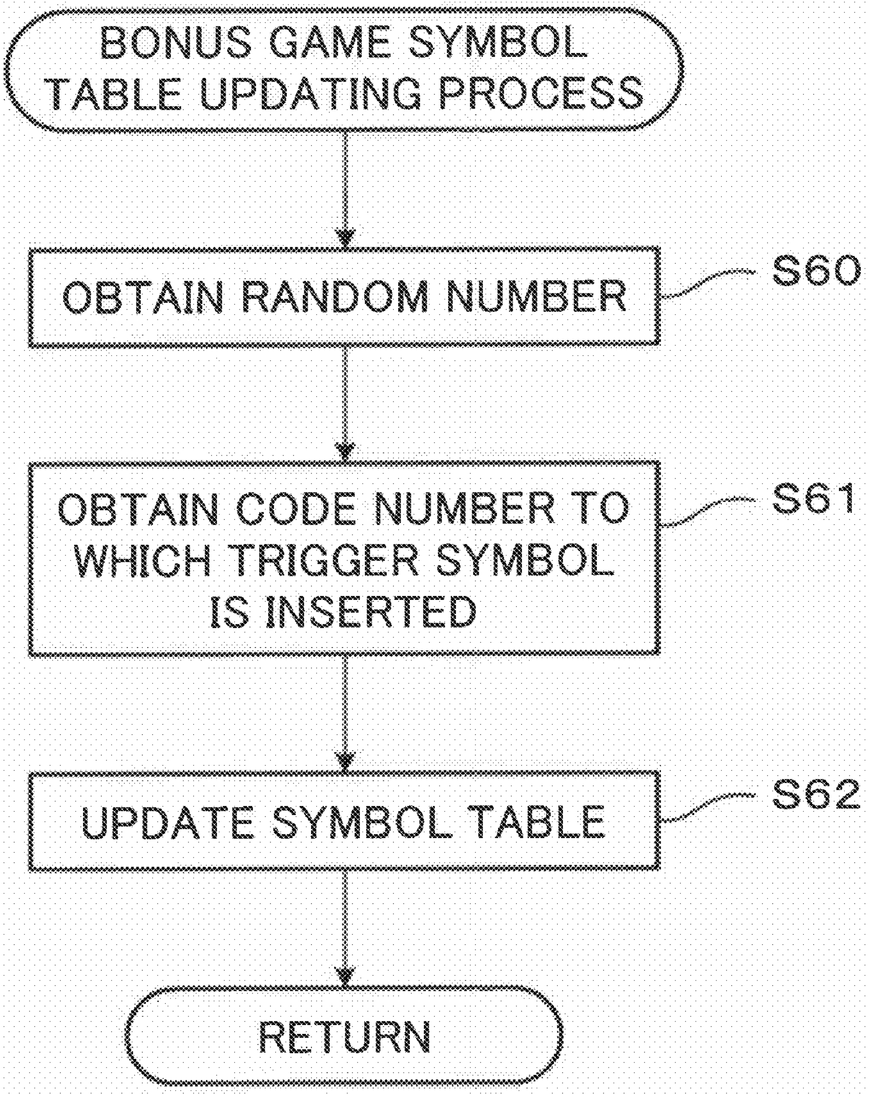
FIG. 25 is a flowchart of a bonus game symbol table updating process of first embodiment.

FIG. 25 is a flowchart showing a sub routine of the bonus game symbol table updating process. It is noted that the present embodiment describes how a trigger symbol **503*b* is added to the third pseudo reel 153 as shown in FIG. 10**.

First the main CPU 41 obtains three random numbers from the random number generating circuit 64 (S60). The main CPU 41 then obtains code Nos. at which trigger symbols **503*b* are inserted (S61). More specifically, which code Nos. correspond to the obtained random numbers is determined with reference to the random numbers and code Nos. shown in the symbol table of the RAM 43**.

The main CPU 41 then updates the symbol table of the RAM 43 (S62), and the routine is ended. More specifically, regarding the third symbol column of the symbol table which is stored in the symbol table of the RAM 43 and is for the base game, the trigger symbols **503*b* are inserted into the parts indicated by the three code Nos. In this way, the symbol table of the RAM 43 is updated to the symbol table for the bonus game. In addition, the total number of code Nos. regarding the third column of the symbol table of the RAM 43 is increased to 23 (No. 0-No. 22). Therefore, as a result of the update the random numbers are divided into 23 ranges. In the example of FIG. 10, the random numbers are almost evenly divided into 23 ranges. The present invention, however, is not limited to this arrangement. For example, when the code No. corresponding to an added trigger symbol 503*b* is associated with a wide range of random numbers, the probability that the trigger symbol 503*b* is rearranged is high in the third symbol column (central pseudo reel 153**).

Also in the arrangement above, in the process of S61 an additional trigger symbol is inserted in consideration of with which code No. each of the obtained random numbers is associated. Alternatively, for example, only a single random number is obtained and three trigger symbols are added altogether to the code No. associated with the obtained random number. In this case, when three trigger symbols are added to the left pseudo reel such as the first pseudo reel 151, the probability that a combination of symbols other than trigger symbols is established is low when three trigger symbols are rearranged on the screen. On the other hand, when three trigger symbols are added to the right pseudo reel such as the fifth pseudo reel, the possibility of re-trigger may be nonexistent even if three trigger symbols are rearranged on the screen. For the reason above, the addition of three trigger symbols altogether is preferably done to the central pseudo reel. When there are N pseudo reels (the first pseudo reel N1, the second pseudo reel N2, the third pseudo reel N3, and the last pseudo reel NN), the addition of trigger symbols is preferably done to the range of NS to N (N−(S−1)) provided that the re-trigger is carried out when S trigger symbols are displayed (second predetermined condition).

Modification of First Embodiment

As described above, the slot machine 10 is not necessarily arranged such that the special status of the symbol columns is allowed only when the maximum bettable number of game media are bet. For example, the slot machine 10 may be arranged such that, after the symbols 501 rearranged in the base game satisfies the first predetermined condition and the symbols 501 which are the selection targets shift to the special status, the addition of specific symbols 503 is further allowed when the maximum bettable number of game media are bet. In short, the slot machine 10 may have the aforesaid first arrangement and a modification of the second arrangement.

Figure 26:
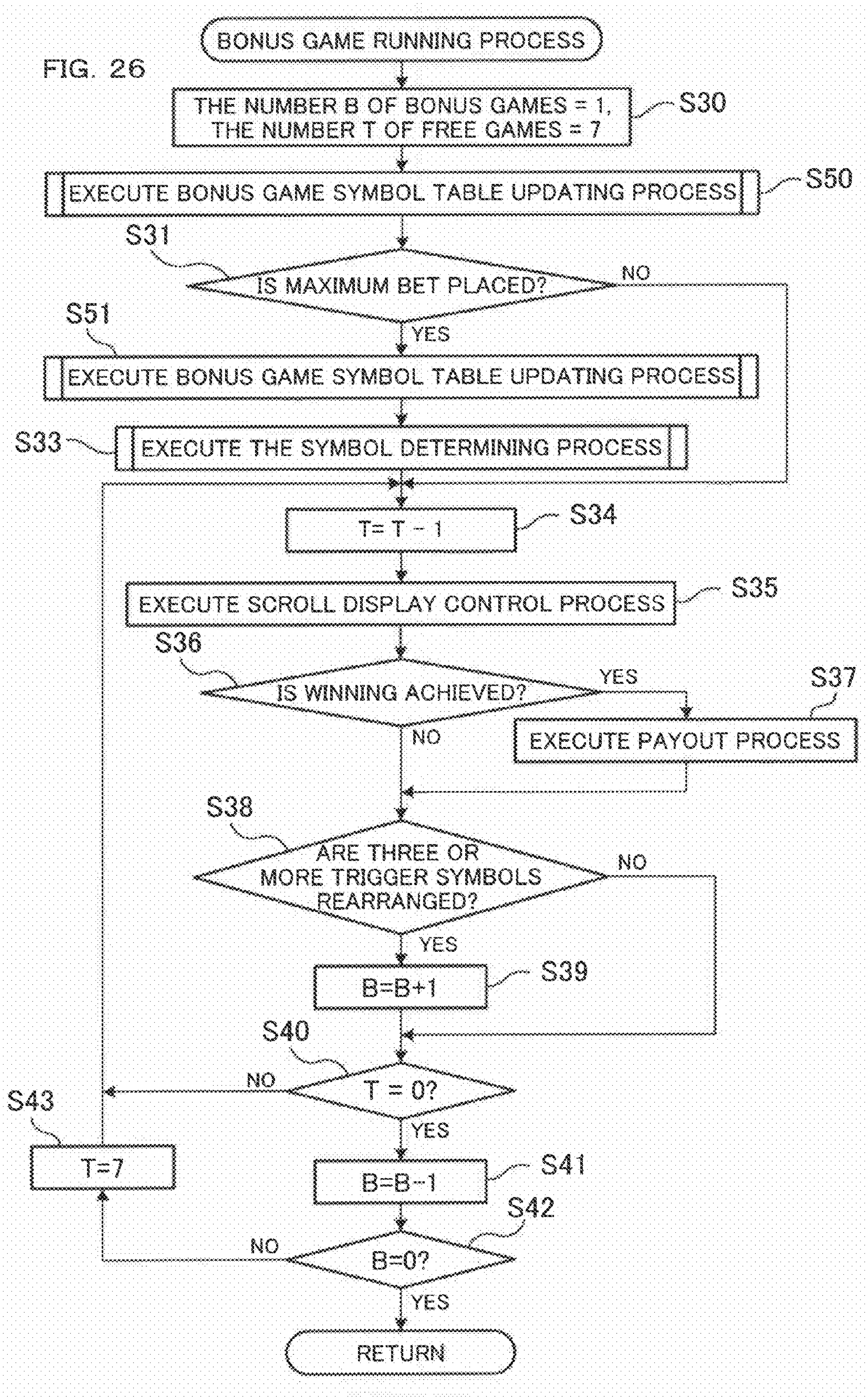
FIG. 26 is a flowchart of a bonus game running process of a modification of first embodiment.

The bonus game running process and the bonus game symbol table updating process of this slot machine 10 will be described with reference to FIG. 26 and FIG. 27.

(Operations of Slot Machine 10: Bonus Game Running Process)

First, the bonus game running process is described with reference to FIG. 26. FIG. 26 shows a flowchart of a sub routine of the bonus game running process of the modification of first embodiment.

To begin with, the main CPU 41 sets the remaining number B of bonus games to B=1 and the remaining number T of free games to T=7 in the bonus game number storage area and the free game count storage area of the RAM 43, respectively (S30). Simultaneously, the main CPU 41 causes the symbol display device 16 to display a bonus-win screen 420 (see FIG. 16).

Further, the main CPU 41 executes a bonus game symbol table updating process (S50). In doing so, the main CPU 41 stores, in the RAM 43 or the like, information indicating that a maximum bet determining process (S31) is the next process. In the present embodiment, the RAM 43 is provided with a region for storing a maximum bet determining process flag. The flag is turned on when the bonus game symbol table updating process starts and turned off when the step S31 is executed.

In the bonus game symbol table updating process of S50, the main CPU 41 carries out a process of updating the symbol columns of the bonus game from the ordinary status to the special status in which 6 trigger symbols **503*b* are added. This process will be detailed later with reference to FIG. 27. Furthermore, as shown in FIG. 28, the main CPU 41 notifies in S50 that 6 trigger symbols 503*b*** have been added.

Figure 28:
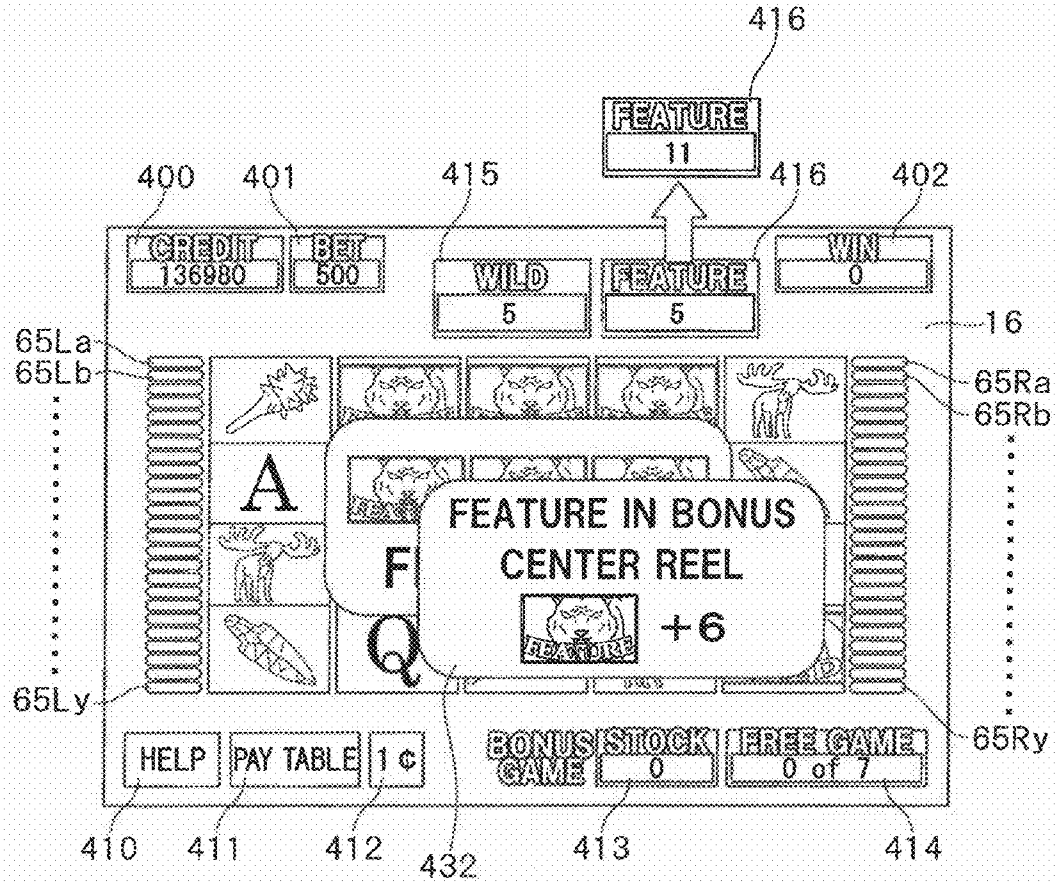
FIG. 28 is an explanatory diagram illustrating a display state of the symbol display device of the modification of first embodiment.

FIG. 28 shows the state during a predetermined period after the bonus-win screen 420 is displayed in the base game in which a bonus is won. More specifically, an ordinary trigger symbol addition screen 432 pops up, which notifies that six trigger symbols **503*b* are added to the pseudo reel 153 (CENTER REEL). At the same time or immediately after the display of the ordinary trigger symbol addition screen 432, the total number of trigger symbols 503*b* in all of the pseudo reels 150-155 (display window 150), which is shown by the trigger symbol count display unit 416, is switched from “5” to “11”. This allows the player to recognize that, in the bonus game, the symbols 501 which are the targets of rearrangement are in the special status in which 6 trigger symbols 503*b* have been added to the central pseudo reel 153**.

Subsequently, the main CPU 41 determines if the maximum bet of game media is placed (S31). If the maximum bet is not placed (S31: YES), the bonus game symbol table updating process is executed (S52).

In the bonus game symbol table updating process of S51, the main CPU 41 carries out a process of further adding trigger symbols **503*b* to the symbol column of the bonus game, which has already been in the special status indicating that 6 trigger symbols 503*b* have been added. This process will be detailed later with reference to FIG. 27. Furthermore, in S50 the main CPU 41 notifies, as shown in FIG. 29, that three trigger symbols 503*b*** are added.

Figure 29:
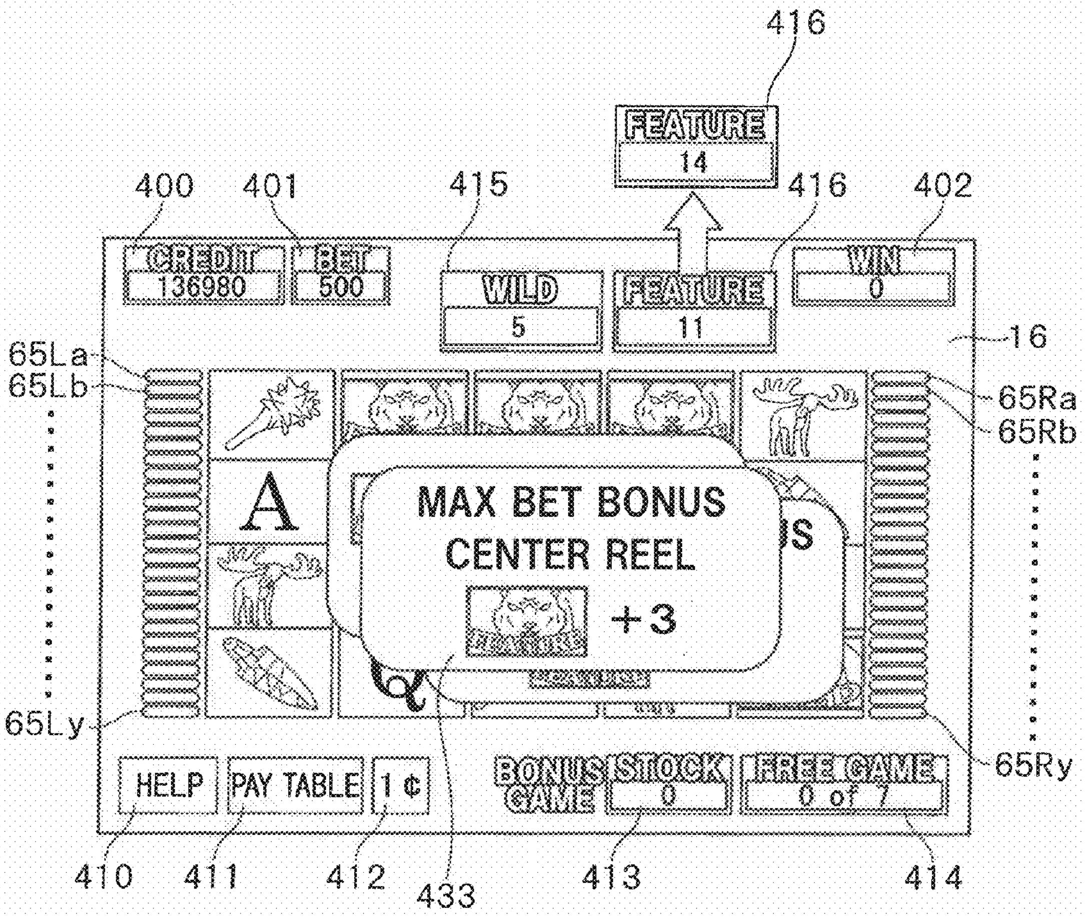
FIG. 29 is an explanatory diagram illustrating a display state of the symbol display device of the modification of first embodiment.

FIG. 29 shows the state during a predetermined period after a maximum bet trigger symbol addition screen 433 for the case where the maximum bet is placed is displayed in a base game in which a bonus is won. More specifically, the maximum bet trigger symbol addition screen 433 pops up, which indicates that three trigger symbols 503*b* are added to the pseudo reel 153 (CENTER REEL). At the same time or immediately after the display of the maximum bet trigger symbol addition screen 433, the total number of trigger symbols 503*b* in all of the pseudo reels 151-155 (display window 150), which is shown by the trigger symbol count display unit 416, is switched from "11" to "14". This allows the player to recognize that, in the bonus game, the symbols 501 which are the targets of rearrangement are in the special status in which 6 trigger symbols 503*b* have been added to the central pseudo reel 153.

(Operations of Slot Machine 10: Bonus Game Symbol Table Updating Process)

Figure 27:
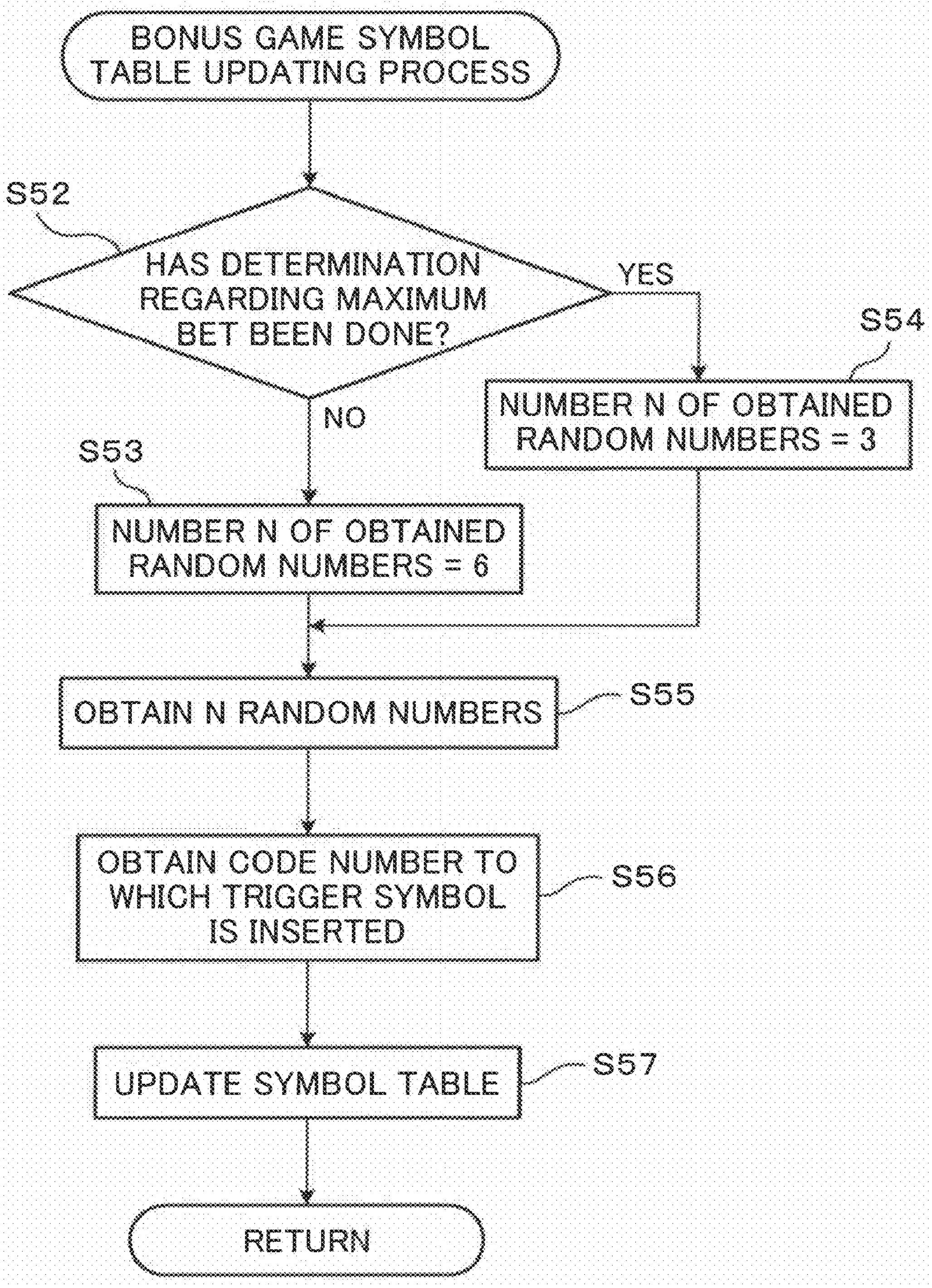
FIG. 27 is a flowchart of a bonus game symbol table updating process of the modification of first embodiment.

FIG. 27 is a flowchart of a sub routine of the bonus game symbol table updating process of the modification of first embodiment. This routine is called in S50 or in S51 in the bonus game running process of the modification of first embodiment shown in FIG. 26.

First, the main CPU 41 determines whether the determination as to whether the maximum bet is placed has been determined. In other words, it is determined in which step, S50 or S51, the routine is called during the bonus game running process of the modification of first embodiment shown in FIG. 26.

If the determination regarding the maximum bet has not been done (S52: NO), the main CPU 41 sets the number N of random numbers to be obtained to 6 (S54). On the other hand, if the determination regarding the maximum bet has been done (S52, YES), the main CPU 41 sets the number N of random numbers to be obtained to 3 (S53). The number of random numbers to be obtained indicates how many random numbers are to be obtained in the later-described step S55, and the number is stored in the RAM 43.

Thereafter, from the random number generating circuit 64, the main CPU 41 obtains N random numbers in accordance with the number of random numbers to be obtained (S55). The main CPU 41 then obtains code Nos. at which trigger symbols 503*b* are inserted (S61). More specifically, the main CPU 41 specifies N code Nos. respectively corresponding to the obtained random numbers, with reference to the correspondence between the random numbers and the code Nos. in the symbol table of the RAM 43.

The main CPU 41 then updates the symbol table of the RAM 43 (S57) and ends the routine. More specifically, regarding the third symbol column of the symbol table for the base game which table is stored in the symbol table of the RAM 43, trigger symbols 503*b* are inserted into the parts corresponding to the respective N code Nos. In this way, the symbol table of the RAM 43 is updated to the symbol table for the bonus game. Furthermore, the number of code Nos. is increased by N for the third column of the symbol table of the RAM 43. In connection with this, the number of the ranges dividing the random numbers is updated so that the number of the ranges is increased by N. That is to say, the number of ranges of random numbers is changed from 20 to 26 (code No. 0 to code No. 25) if the determination regarding the maximum bet has not been carried out. If the determination regarding the maximum bet has already been done, the number of ranges is changed from 26 to 29 (code No. 0 to code No. 28).

In the present embodiment, there are two types of symbol tables for the bonus game: an ordinary bonus game symbol table shown in FIG. 30, which is used before the determination regarding the maximum bet is carried out; and a maximum-bet bonus game symbol table shown in FIG. 31, which is used when it is determined that the maximum bet is placed.

FIG. 30 shows an example of the ordinary bonus game symbol table which is used when the first predetermined condition is established and "feature-in" is achieved. In FIG. 30, for the third symbol column (L3) of the base game symbol table shown in FIG. 9, trigger symbols 503*b* are inserted to the parts corresponding to the code No. 0, code No. 4, code No. code No. 11, code No. 15, code No. 18, and code No. 19.

FIG. 31 shows an example of the maximum-bet bonus game symbol table for the case of maximum bet, when the first predetermined condition is established and the feature-in is achieved. In FIG. 31, for the third symbol column (L3) of the ordinary bonus game symbol table shown in FIG. 30, trigger symbols 503*b* are inserted in the parts corresponding to the code No. 8, code No. 15, and code No. 22.

In this way, when the trigger symbols 503*b* are rearranged in the first predetermined condition in the base game, after the special status in which trigger symbols 503*b* are further added to the symbols 501 in the special game is established (in the present embodiment, after the total number of trigger symbols 503*b* is changed from 5 to 11), trigger symbols 503*b* are further added to the symbols 501 in the special status when the number of betted game media is equal to the maximum bettable number of game media (maximum bet). (In the present embodiment, the total number of trigger symbols 503*b* is changed from 11 to 14.)

Second Embodiment

Now, the following will describe second embodiment of a gaming machine of the present invention and a playing method thereof. The same symbols are given to the members that have the same functions as those in the foregoing first embodiment, and the descriptions of those members are omitted here as a matter of convenience.

(Operation of Gaming Machine 300)

Figure 32:
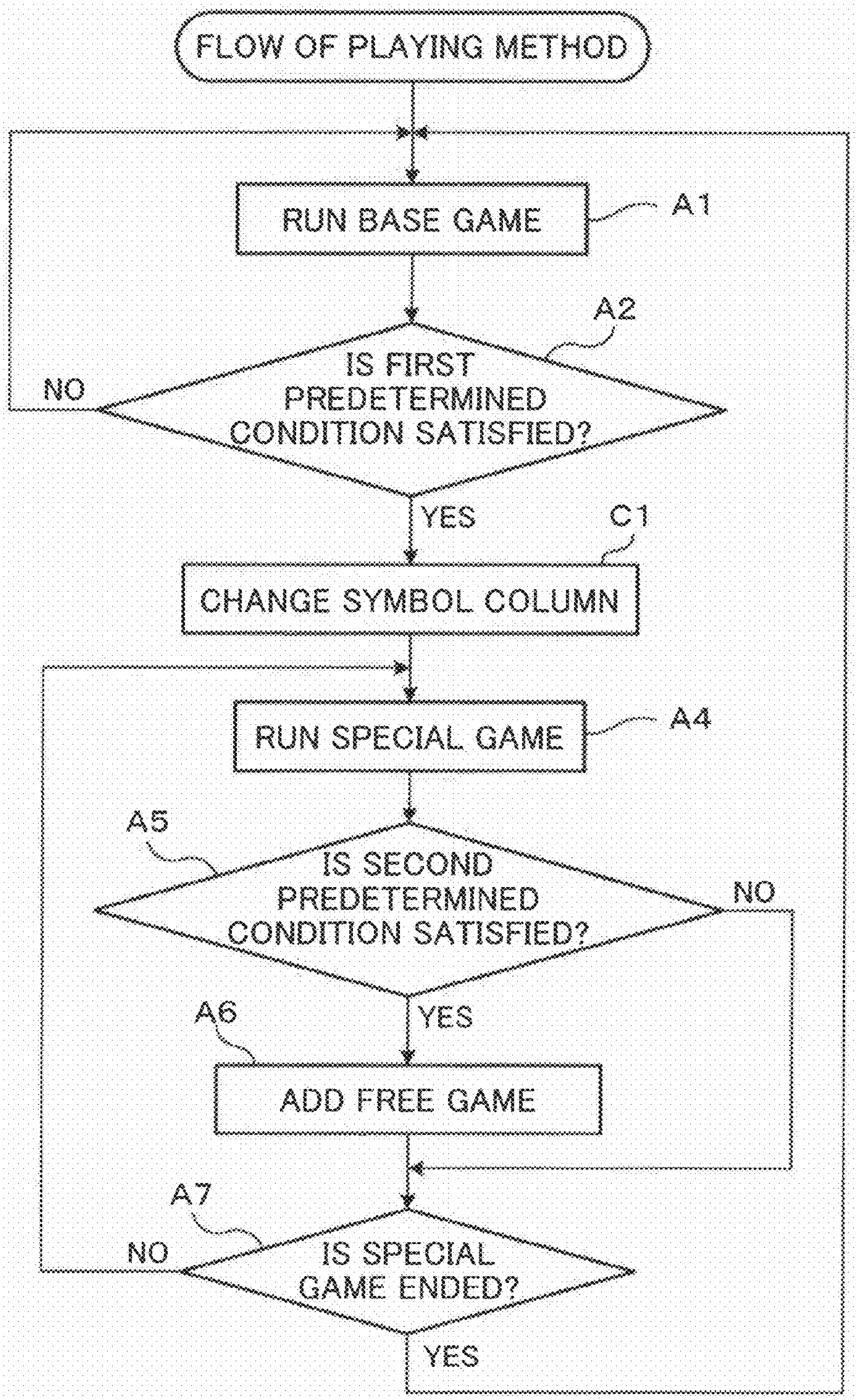
FIG. 32 is a flowchart illustrating the playing method of the gaming machine of second embodiment.

The following describes, with reference to the flowchart of FIG. 32, an operation of the gaming machine 300 having the above described functional blocks which have been described with reference to FIG. 2. It is noted that second embodiment assumes that the gaming machine 300 has the aforesaid first and third arrangements.

First, the gaming machine 300 runs a base game (A1) and determines whether the first predetermined condition is established (A2). These steps are not described here because they are identical with the steps carried out by the gaming machine 300 of first embodiment, which has already been described with reference to FIG. 3.

If it is determined in A2 that the first predetermined condition is satisfied (A2: YES), a symbol column for the base game is replaced with a symbol column for the special game (hereinafter, this symbol column may be referred to as a symbol column for bonus game).

The symbol column is constituted by symbols 501, and is scrolled by the symbol display device 16 in base games and special games. The symbol display device 16 rearranges the symbols 501 in such a way as to scroll and stop the symbol column.

The symbol column for the base game is displayed and scrolled by the symbol display device 16 in the base game. The symbol column for the special game is displayed and scrolled by the symbol display device 16 in the bonus game, and has more special symbols 503 than the symbol column for the base game.

Thereafter, the steps A4-A7 are carried out in the same manner as those of the gaming machine 300 of first embodiment having been described with reference to FIG. 3. To put differently, the differences between the present embodiment and first embodiment lie in the following points: the determination regarding the maximum bet in B1 is not carried out; the addition of specific symbols in A3 is not carried out; and the change of symbol column is carried out in C1.

In second embodiment, the following features are not described because they are identical with those in first embodiment: the system configuration of the gaming machine 300; the specific arrangement of the gaming machine 300; the mechanical structure of the slot machine 10; the electrical arrangement of the slot machine 10; and combinations of symbols.

(Base Game Symbol Table)

The base game symbol table is used for determining which symbols 501 are the targets of rearrangement in the base game. This table is not described in this embodiment because it is identical with the base game symbol table of first embodiment, which has been described with reference to FIG. 9. It is noted that the symbol columns of this base game symbol table are the symbol columns for the base game of the present invention.

(Bonus Game Symbol Table)

The start of a bonus game is triggered when, in a base game, "FEATURE" trigger symbols 503*b* are stopped so that a winning combination is established. When a winning combination of the "FEATURE" trigger symbols 503*b* is established in the base game, a wild symbol 503*a* and a trigger symbol 503*b* are added to a symbol column in a bonus game.

FIG. 33 shows an example of a bonus game symbol table for use at the time of determining symbols 501 to be rearranged during a bonus game. As is the base game symbol table, the bonus game symbol table contains a symbol 501 of a display block 28 of a symbol column, a code No. associated with the symbol 501, and a number range associated with the code No. The number ranges cover 0 to 65535. These numbers 0 to 65535 are divided into the random number ranges as is the case of the base game symbol table.

The bonus game symbol table shown in FIG. 33 is stored in the ROM 42 in advance. When a bonus game is run, the symbol table stored in the RAM 43 is replaced with the bonus game symbol table shown in FIG. 33.

In the bonus game, wild symbols 503*a* are added by a number determined by lottery, whereas the number of added trigger symbols 503*b* has been determined in advance. The bonus game symbol table of the present embodiment has been prepared in advance. More specifically, FIG. 33 shows the state where the table of FIG. 9 is changed so that eight wild symbols 503*a* are evenly added to symbol columns (L1) to (L5). FIG. 33 also shows the state where the table of FIG. 9 is changed so that 2 or 3 trigger symbols 503*b* are added to each of the symbol columns (L1) to (L5). (In the present embodiment, the predetermined number is 12). In the case of FIG. 33, 2 trigger symbols 503*b* are added to each of the symbol columns L1 and L5.

(Additional Wild Symbol Count Determination Table)

FIG. 34 shows an additional wild symbol count determination table. As shown in FIG. 34, the wild symbols 503*a* increase by a number determined by lottery. The number is one of "40", "50", "60", "70", and "90". The number of wild symbols 503*a* to be added corresponds to a random number sampled in the bonus game. For example, when a sampled random number is 4326, 40 wild symbols 503*a* are added and the bonus game symbol table shown in FIG. 33 is used. Further, the list of increases may be variable at a predetermined timing; e.g. at every unit game.

As the bonus game symbol table, the explanations above only deals with a case where 40 wild symbols 503*a* are added with reference to FIG. 33. In addition to this, the ROM 42 or the like stores in advance bonus game symbol tables corresponding to the cases where the numbers of wild symbols 503*a* are 50, 60, 70, and 90, respectively.

In the present embodiment, the information stored in advance indicates that the numbers of wild symbols 503*a* and trigger symbols 503*b* to be added are equal among the symbol columns. The present invention, however, is not limited to this arrangement. For example, the numbers of wild symbols 503*a* and trigger symbols 503*b* to be added are larger at the central symbol column than at the peripheral ones. The number of wild symbols 503*a* to be added and a predetermined number of trigger symbols 503*b* are not necessarily arranged as above.

The code No. determination table of FIG. 12 and the payout table of FIG. 13 are not explained here because they are identical with those of first embodiment.

Figure 35:
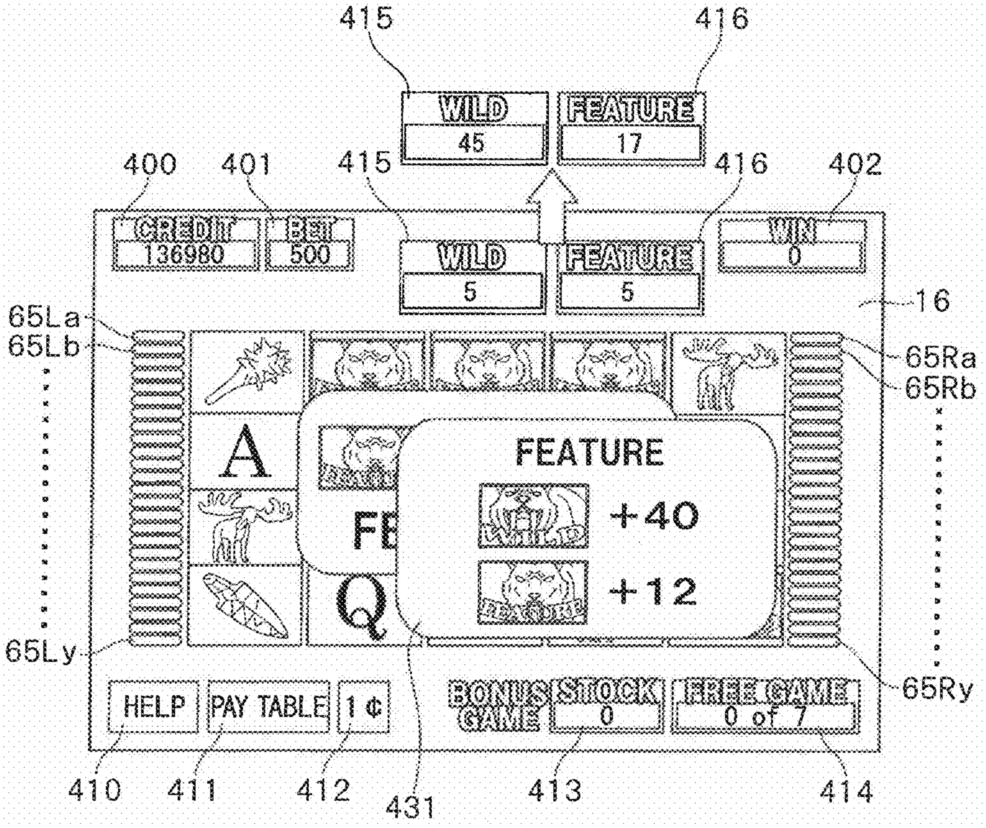
FIG. 35 is an explanatory diagram illustrating a display state of the symbol display device of second embodiment.

Regarding the display states, a symbol addition screen 431 of the present embodiment will be described with reference to FIG. 35. The present embodiment is different from first embodiment in that a symbol addition screen 431 is displayed in place of the trigger symbol addition screen 430. FIG. 35 shows a display state during a predetermined period of time after the bonus-win screen 420 of FIG. 16 is displayed. The symbol addition screen 431 is different from the trigger symbol addition screen 430 in that the screen 431 is displayed irrespective of a bet amount. The display states other than the above are not described here because they are identical with those in first embodiment.

As shown in FIG. 35, the symbol addition screen 431 pops up to notify that wild symbols 503*a* and trigger symbols 503*b* are added, along with the number of each symbol to be added. At the same time or immediately after the display of the symbol addition screen 431, the wild symbol count display unit 415 and the trigger symbol count display unit 416 are updated. More specifically, in the case of FIG. 35, the total number of wild symbols 503*a* in the pseudo reels 151-155 (display window 150) is switched from 5 to 45. In addition, the total number of trigger symbols 503*b* in the pseudo reels 151-155 (display window 150) is switched from 5 to 17. This allows the player to recognize that 40 wild symbols 503*a* and 12 trigger symbols 503*b* are added to the pseudo reels 151-155 (display window 150) when s/he wins a bonus.

(Operations of Slot Machine 10)

Now, operations carried out by the slot machine 10 of the present embodiment will be discussed. It is noted that the boot process, initial process, base game running process, and symbol determining process are not described here because they are identical with those of first embodiment.

(Operations of Slot Machine 10: Bonus Game Running Process)

Figure 36:
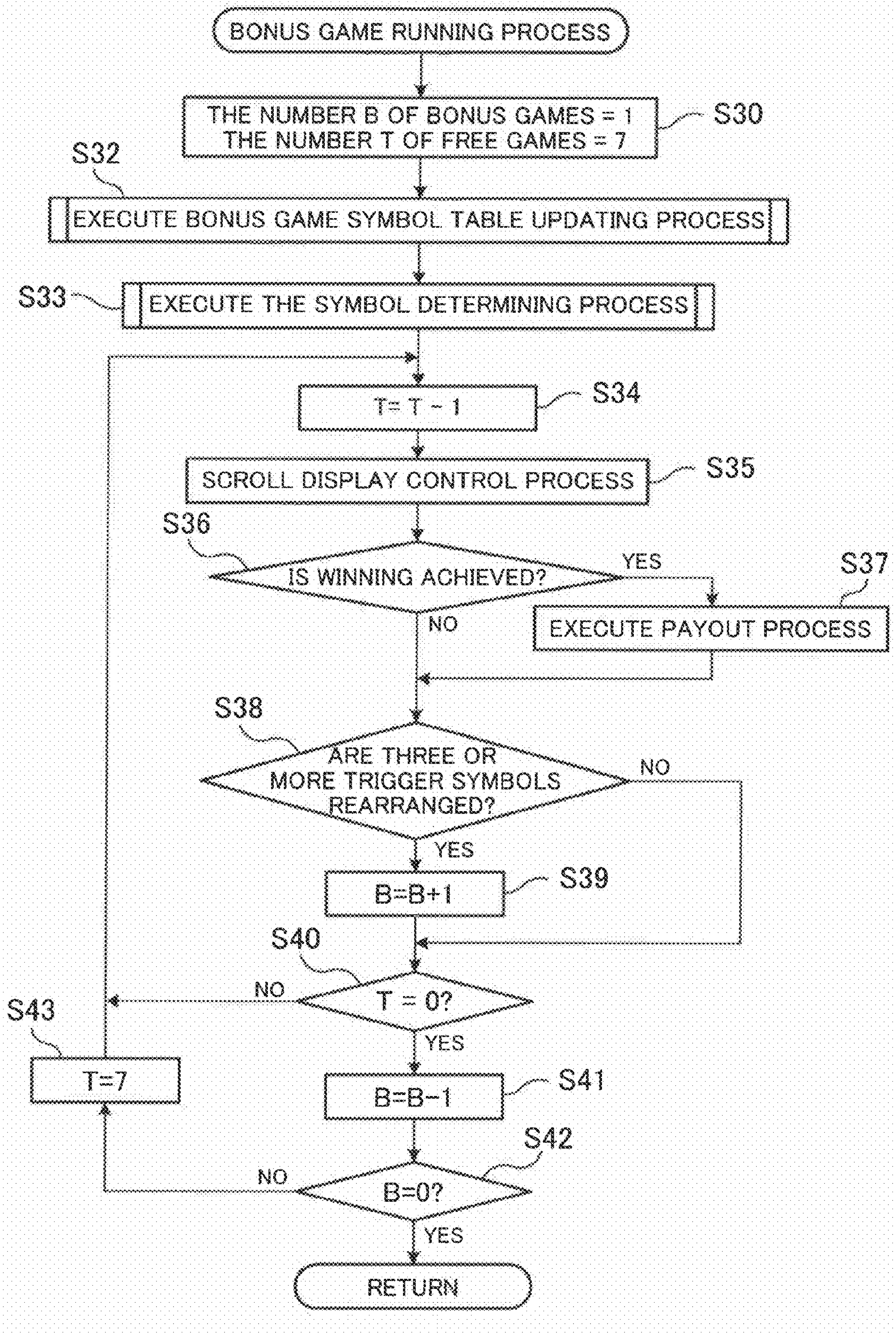
FIG. 36 is a flowchart of a bonus game running process of second embodiment.
Figure 37:
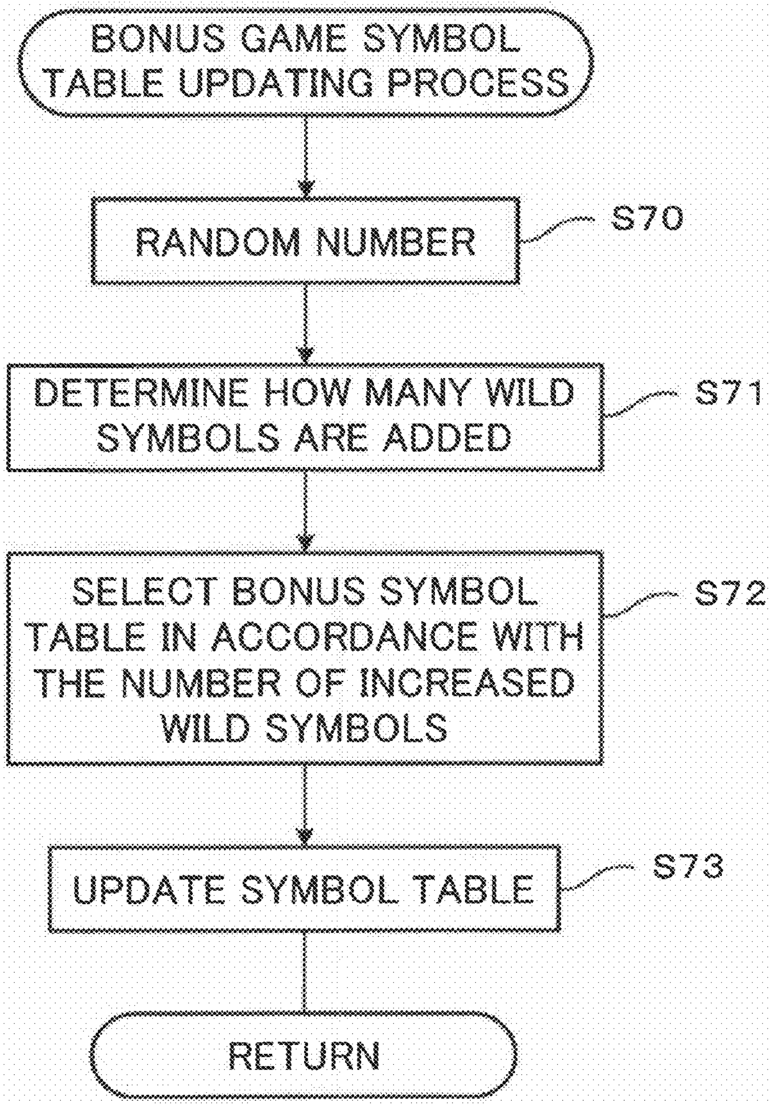
FIG. 37 is a flowchart of bonus game symbol table updating process of second embodiment.

Now, the following describes a bonus game running process of second embodiment with reference to FIG. 36. FIG. 36 is a flowchart showing a sub routine of the bonus game running process. The bonus game running process allows the player to play without requiring a bet of a coin.

The bonus game running process of second embodiment is different from the bonus game running process of first embodiment described with reference to FIG. 24 in that the main CPU 41 in S31 does not perform the process of determining whether the number of betted game media is equal to the maximum bettable number. In other words, the main CPU 41 carries out the process of adding trigger symbols 503*b* even when the number of game media placed as a bet is not at the maximum. This process of adding trigger symbols 503*b* is carried out in the bonus game symbol table updating process of FIG. 37. Therefore the explanation of the bonus game running process of second embodiment is not given here. It is noted that first embodiment is arranged so that the main CPU 41 causes the symbol display device 16 to display the trigger symbol addition screen 430 (see FIG. 17) in S32. On the other hand, in second embodiment displayed is a symbol addition screen 431 (see FIG. 35).

(Operations of Slot Machine 10: Bonus Game Symbol Table Updating Process) Now, a bonus game symbol table updating process routine of second embodiment will be described with reference to FIG. 37.

First the main CPU 41 obtains a random number from the random number generating circuit 64 (S70). In this process, the main CPU 41 obtains a single random number to determine how many wild symbols 503*a* are increased.

The main CPU 41 then determines how many wild symbols 503*a* are increased based on the obtained single random number and an additional wild symbol count determination table (see FIG. 34) stored in the RAM 43 (S71). For example, when the sampled wild symbol 503*a* is 4321, the number of wild symbols 503*a* to be increased is 40. The additional wild symbol count determination table of FIG. 34 shows that the probabilities of the respective increases in wild symbols are: about 20% for 40 symbols increase; about 20% for 50 symbols increase; about 30% for 60 symbols increase; about 20% for 70 symbols increase; and about 10% for 90 symbols increase. As such, the probability of 60 symbols increase is the highest. This lowers feelings of unfairness, thereby relieving the stress of the player. Also, the probability of 90 symbols increase with which the probability of winning a bonus is the highest is the lowest among the increases. This enhances the entertainment characteristic of the game.

The main CPU 41 then selects the bonus game symbol table corresponding to the determined increase in wild symbols 503*a* (S72). More specifically, a bonus game symbol table to be stored in advance for each increase in wild symbols as shown in FIG. 33 is selected.

Thereafter, the main CPU 41 updates the symbol table in the RAM 43 with the selected bonus game symbol table (S73), and ends the routine.

Third Embodiment

The following will describe a gaming machine and a playing method thereof of third embodiment of the present invention. The same components as in first or second embodiment will be denoted by the same reference numbers, without specific descriptions thereof.

(Operation of Gaming Machine 300)

Figure 38:
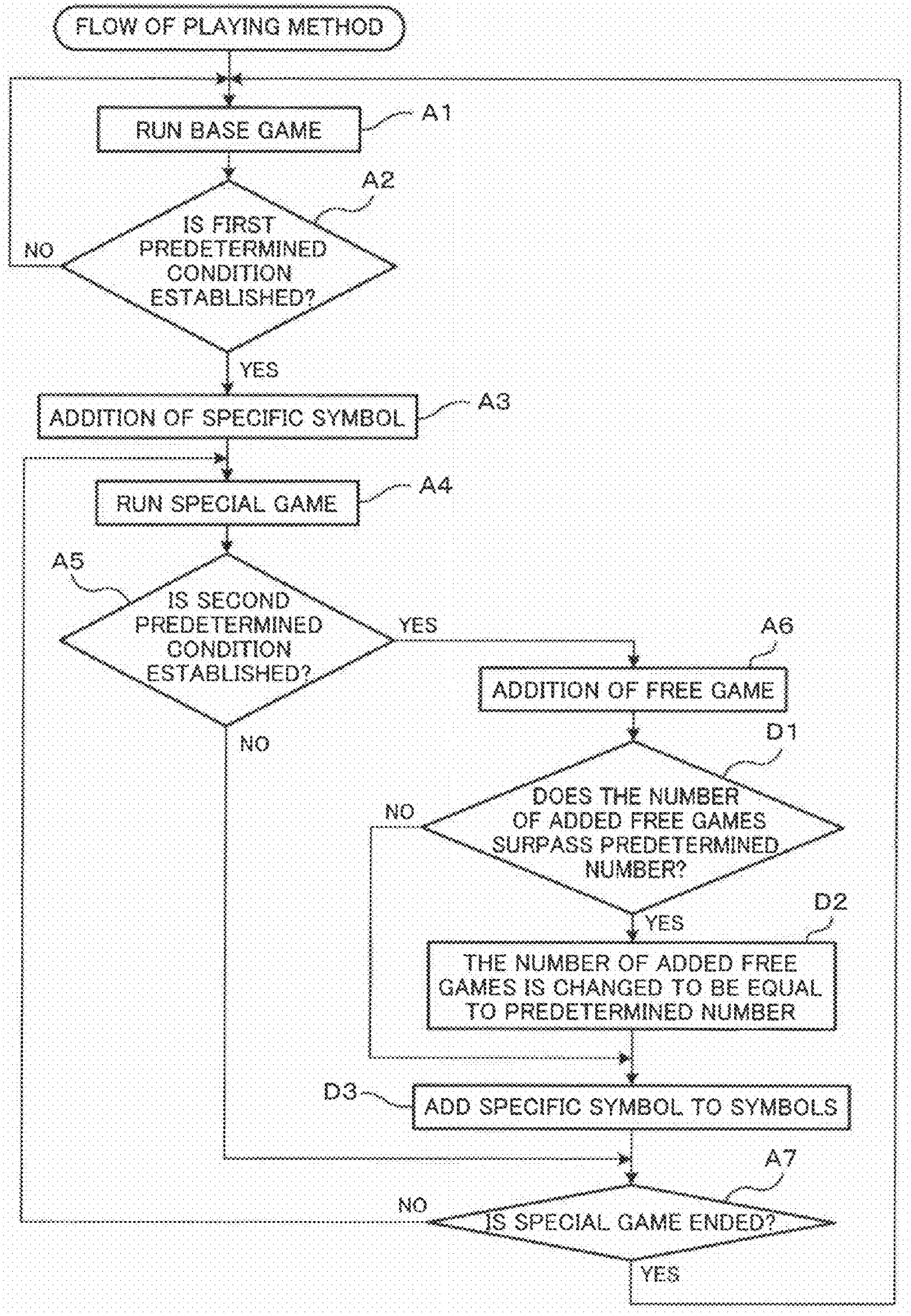
FIG. 38 is a flowchart illustrating the playing method of the gaming machine of third embodiment.

The following describes, with reference to the flowchart of FIG. 38, an operation of the gaming machine 300 having the functional blocks which have been described with reference to FIG. 2. It is noted that third embodiment assumes that the gaming machine 300 has the aforesaid first, fourth, and fifth arrangements.

The steps A1-A6 executed by the gaming machine 300 are not described here because these steps are included in the operations of the gaming machine 300 of first embodiment which has already been described with reference to FIG. 3, except that the determination regarding the maximum bet in B1 is not carried out in the present embodiment.

After the addition of free games in A6, it is determined whether the number of added free games exceeds a predetermined number (D1). If the number of added free games exceeds the predetermined number (D1: YES), the number is changed to be equal to the predetermined number (D2). If the number of added free games does not exceed the predetermined number (D1: NO) or after the step D2, a specific symbol is added to the symbols 501 which are the targets of rearrangement (D3). In other words, a specific symbol 503 (trigger symbol 503*b*) is further added to the symbols 501 to which a specific symbol 503 (trigger symbol 503*b*) has been added, when the special game is run.

Then, there is determined whether the special game has ended (A7). If the special game has not ended (A7: NO), the process goes back to A4 and the special game is run. On the other hand, if the special game has ended, the process goes back to A1 and the base game is run.

(Tables)

The base game symbol table, bonus game symbol table, code No. determination table, and payout table are not explained here because they are identical with those of second embodiment. It is noted that the bonus game symbol table and bonus-game added trigger symbol table are not stored in advance, unlike second embodiment.

(Bonus-Game Added Trigger Symbol Table)

FIG. 39 is a table for use at the time of determining symbols 501 to be rearranged during a bonus game. As is the base game symbol table and the bonus game symbol table, the bonus-game added trigger symbol table contains a symbol 501 of a display block 28 of a symbol column, a code No. associated with the symbol 501, and a number range associated with the code No. The number range is one of ranges which cover 0 to 65535. These numbers 0 to 65535 are divided into the random number ranges as is the case of the base game symbol table.

The bonus-game added trigger symbol table of FIG. 39 shows a case that five trigger symbols 503*b* are added to at least the first symbol column (Ll) in the bonus game symbol table. This achieves conditions whereby a trigger symbols 503*b* is more likely to be selected through random selection, in the first symbol column (Li).

The bonus-game added trigger symbol table is a symbol table which is used when the second predetermined condition is established in the bonus game. In other words, trigger symbols 503*b* are added to the bonus game symbol table.

(Additional Trigger Symbol Count Determination Table)

FIG. 40 shows an additional trigger symbol count determination table.

The additional trigger symbol count determination table indicates a list of additional trigger symbol counts and associated random numbers The list of increases in the number of trigger symbols includes five numbers: "2", "4", "6", "8", and "10". For example, when the random number is 17235, the additional trigger symbol count selected is "4". Note that the list of increases in the number of trigger symbols is not particularly limited provided that the list includes more than one integers of 1 or greater. Further, the list of increases, in the table, may be variable at a predetermined timing; e.g. at every unit game.

(Display State)

No descriptions are given for the display state because it is identical with the display state in second embodiment. It is noted that third embodiment is arranged so that an additional trigger symbol display screen 450 shown in FIG. 41 is displayed in addition to the display state of second embodiment.

(Bonus Game Screen: Additional Trigger Symbol Display Screen)

Figure 41:
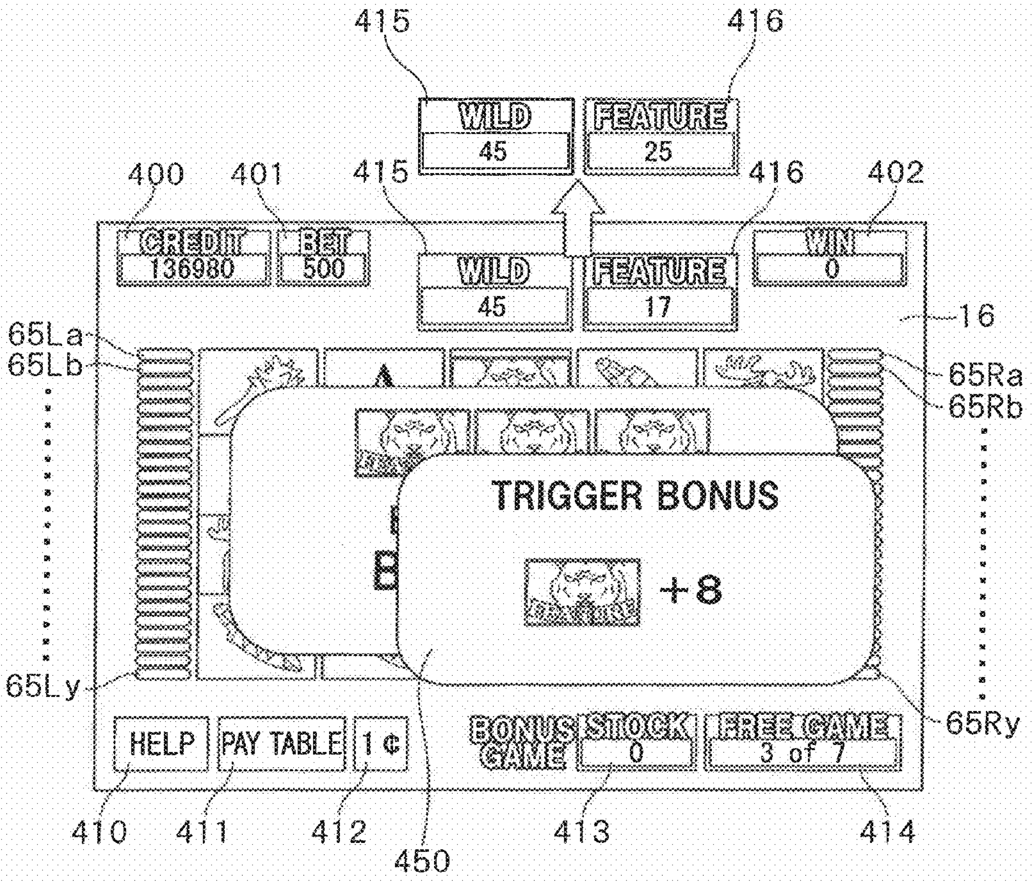
FIG. 41 is an explanatory diagram illustrating a display state of the symbol display device of third embodiment.

FIG. 41 shows a display state during a predetermined period of time after the trigger win screen 440 is displayed in the bonus game. More specifically, in the bonus game screen, an additional trigger symbol display screen 450 pops up to indicate that a trigger symbol 503*b* has been further added as a result of the establishment of a winning combination (second predetermined condition) of trigger symbols 503*b*. Thereafter, at the same time or immediately after the display of the additional trigger symbol display screen 450, addition is made to the trigger symbol count display unit 416. This allows the player to recognize that a winning combination of trigger symbols 503*b* is established in the bonus game and a trigger symbol 503*b* is further added.

(Operations of Slot Machine 10)

Now, operations carried out by the slot machine 10 of the present embodiment will be discussed. It is noted that the boot process, initial process, base game running process, and symbol determining process are not described here because they are identical with those of second embodiment.

(Operations of Slot Machine 10: Bonus Game Running Process)

Figure 42:
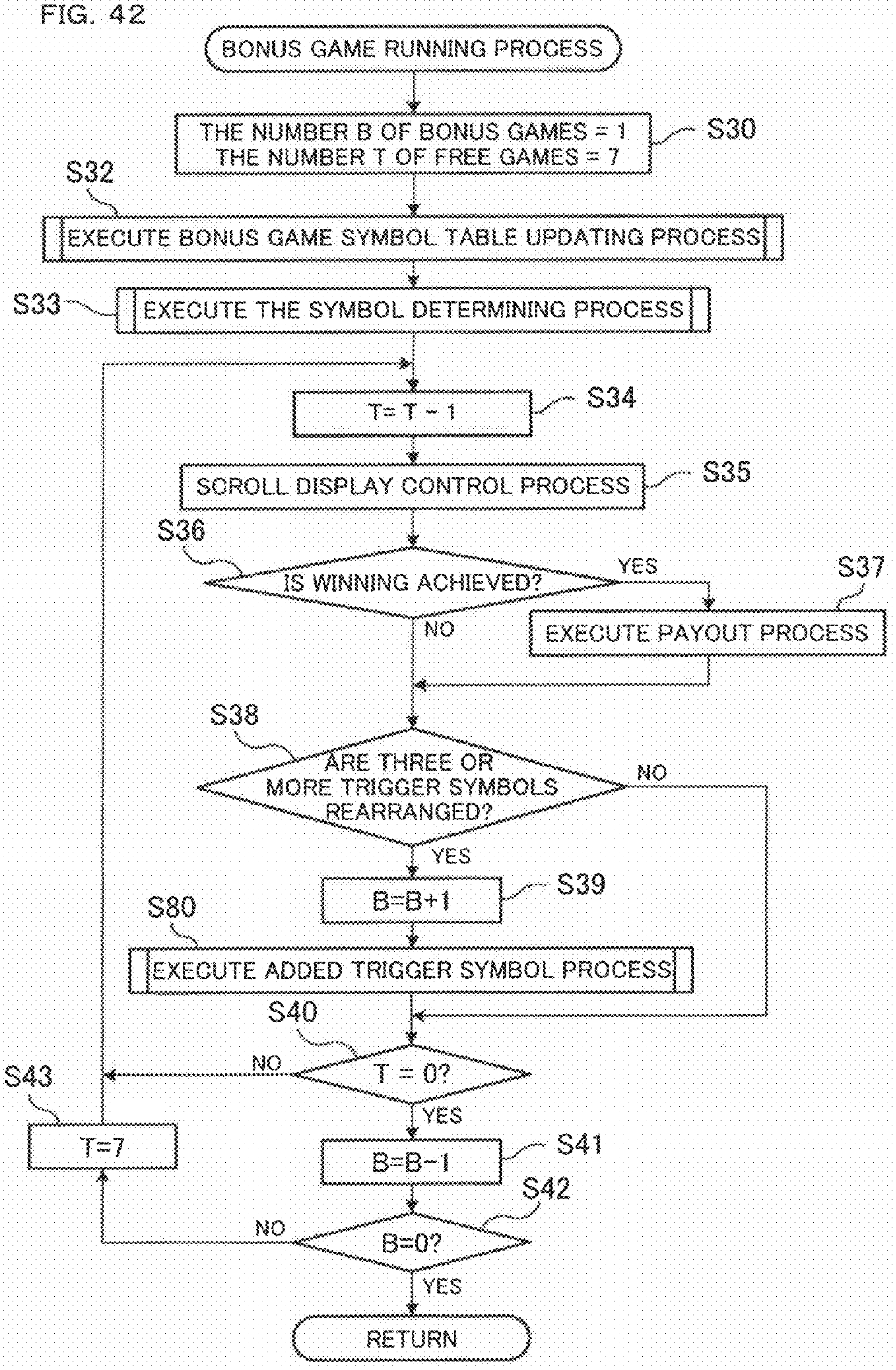
FIG. 42 is a flowchart of a bonus game running process of third embodiment.

Next, the following describes a bonus game running process of third embodiment with reference to FIG. 42. FIG. 42 is a flowchart showing a sub routine of the bonus game running process. The bonus game running process allows the player to play without requiring a bet of a coin.

Figure 44:
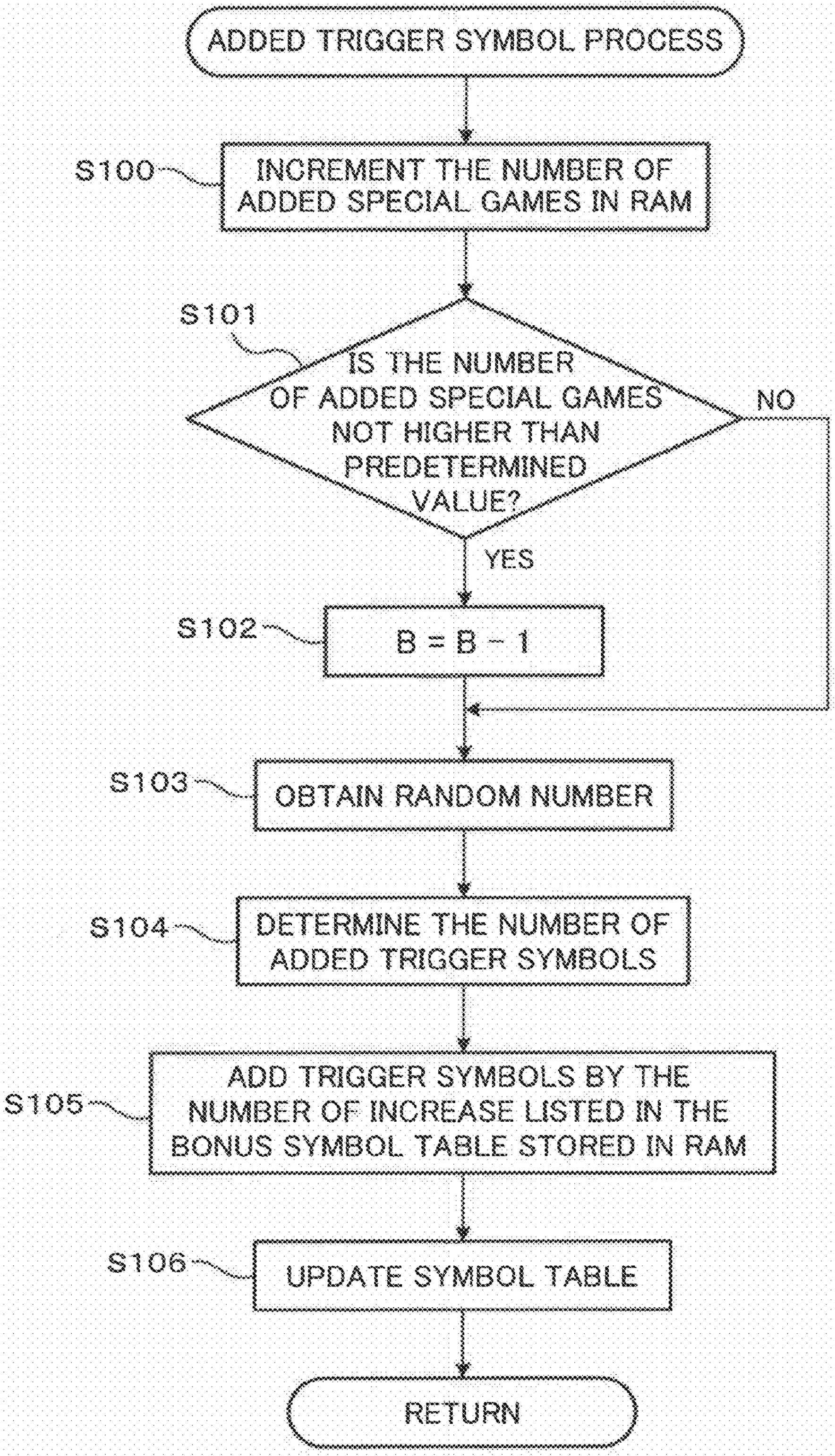
FIG. 44 is a flowchart of an added trigger symbol process of third embodiment.

The bonus game running process of third embodiment is identical with the bonus game running process of second embodiment which has been described with reference to FIG. 36, except that an added trigger symbol process (S80) which will be described later with reference to FIG. 44 is carried out after the remaining number B of bonus games is set at B=B+1 in the bonus game number storage area of the RAM 43 in S39. Therefore the bonus game running process of third embodiment is not described here.

(Operations of Slot Machine 10: Bonus Game Symbol Table Updating Process)

Figure 43:
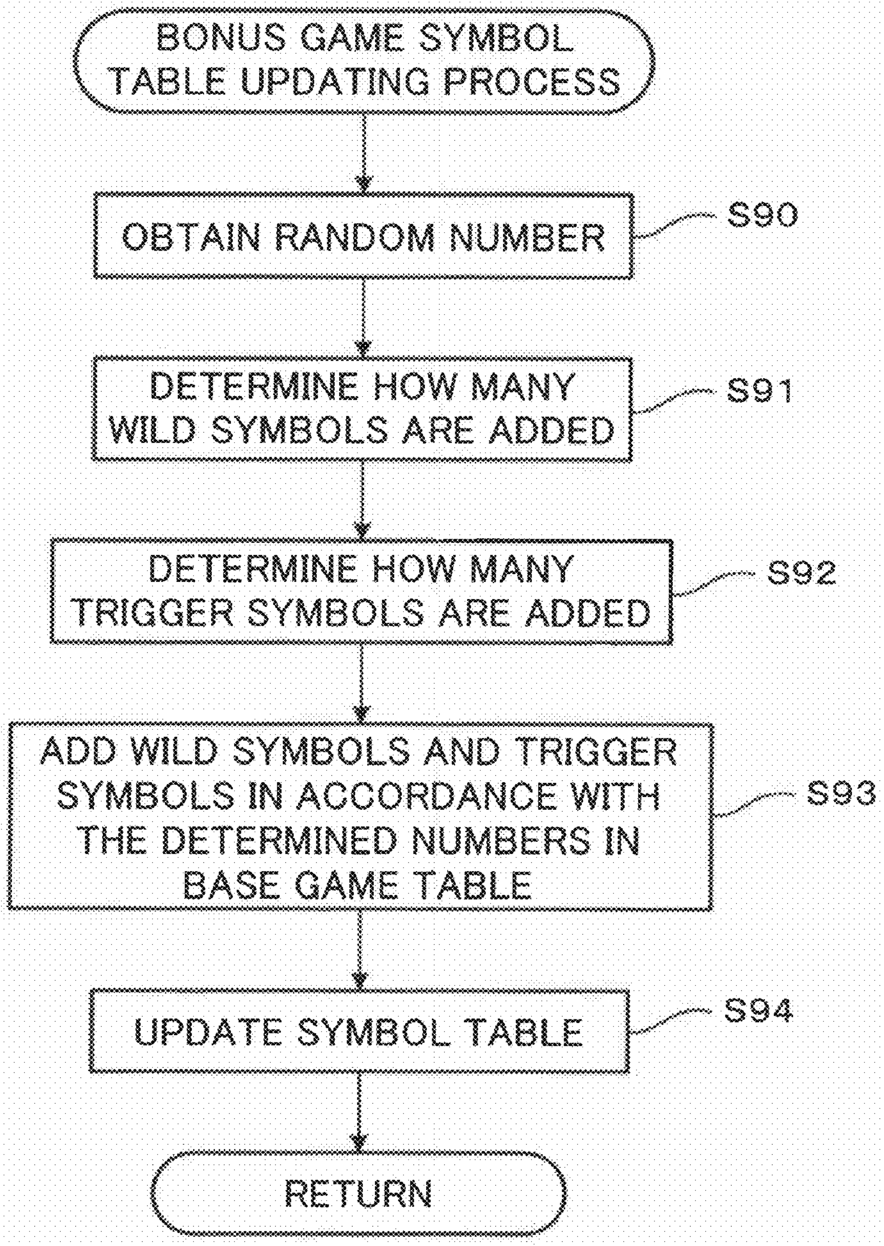
FIG. 43 is a flowchart of a bonus game symbol table updating process of third embodiment.

Now, a symbol determining process routine of third embodiment will be described with reference to FIG. 43.

First the main CPU 41 obtains a random number from the random number generating circuit 64 (S90). In accordance with the random number, the main CPU 41 determines the number of wild symbols to be increased and the number of trigger symbols to be increased, with reference to the additional wild symbol count determination table of FIG. 34 and the additional trigger symbol count determination table of FIG. 40 (S91, S92).

Thereafter, the main CPU 41 adds, to the base game table, wild symbols and trigger symbols whose numbers of increase have been determined (S93). In this process, to which symbol columns and code Nos. the addition is made is determined and wild symbols and trigger symbols are added, with the result that the bonus symbol table shown in FIG. 33 is created. The main CPU 41 then updates the symbol table in the RAM 43 with the bonus symbol table to which wild symbols and trigger symbols have been added (S94), and ends the routine.

(Added Trigger Symbol Process)

Now, an added trigger symbol process routine of third embodiment will be described with reference to FIG. 44.

First, the main CPU 41 increments the number of added special games in the RAM 43 (S100). This number of added special games counts how many special games are added in a single special game. The number of added special games is stored in a predetermined region in the RAM 43, and is reset to zero each time a special game ends. In the present embodiment, the number of added special games is restricted to a predetermined number (e.g. 3) or less.

Subsequently, the main CPU 41 determines whether the number of added special games is not greater than the predetermined number (S101). More specifically, it is determined whether the number of added special games stored in the RAM 43 is not greater than 3. When the number of added special games exceeds the predetermined number, the main CPU 41 sets the remaining number B of bonus games to B=B−1 (S102). In other words, when the number of added special games exceeds the predetermined number as a result of the addition of special games in the bonus game running process, the number of added special games is reduced to be equal to or lower than the predetermined number.

If in S101 the number of added special games is not greater than the predetermined number or after the step S102, the main CPU 41 obtains a random number (S103). The main CPU 41 then determines the additional trigger symbol count corresponding to the obtained random number, with reference to the additional trigger symbol count determination table (S104).

Thereafter, the main CPU 41 crates a bonus-game added trigger symbol table in such a way as to add trigger symbols 503*b* by the number of increase listed in the bonus game symbol table stored in the symbol table of the RAM 43 (S105). The main CPU 41 then updates the symbol table in the RAM 43 with the created bonus-game added trigger symbol table (S106), and ends the routine.

Although the descriptions above are divided into first to third embodiments, each embodiment is properly modifiable. For example, the embodiments may be combined in every possible way.

The present embodiment deals with a case where the number of payline 160 is 25; however, the number of paylines is not limited in the present invention. For example, the number of paylines may be 30.

The present embodiment deals with a case where winning of bonus is achieved when three or more trigger symbols are rearranged. However, winning of bonus is not limited to this. For example, winning of bonus may be achieved when a predetermined time has elapsed since the last bonus game has ended.

Further, in the present embodiment, the free game is a game in which display of symbols on display blocks 28 are varied and stopped, and then an amount of payout is determined according to the symbols having stopped or a combination of the stopped symbols (i.e. a game normally run in a slot machine). However, the free game of the present invention is not limited to this, and the free game may be different from a game run in a slot machine. Examples of the free game include: a card game such as poker, a shooting game, a fighting game, or the like. The free game may be a game that awards a game medium or a game awarding no game medium. Further, the following is also possible. Namely, a free game is run on condition that the number of base games counted during the insured mode reaches a predetermined number Then, when the number of base games counted during the insured mode once again reaches a predetermined number, a free game which is different from the previous free game is run. The free game in the present invention may be suitably designed, and is not particularly limited, as long as the free game requires no bet of a game medium.

The slot machine 10 of the present embodiment is arranged so that, a symbol column displayed by the symbol display device 16 is scrolled, the scroll is automatically stopped, and then the symbols are rearranged. The present invention, however, is not limited to this arrangement. For example, the slot machine 10 may be arranged so that the scroll of the symbol column by the symbol display device 16 is stopped in such a way that the buttons on the cabinet 11 and/or the touch panel 69, etc. are operated during the scroll. In this case, the symbols to be stopped may be determined by lottery or the like in advance.

Figure 45:
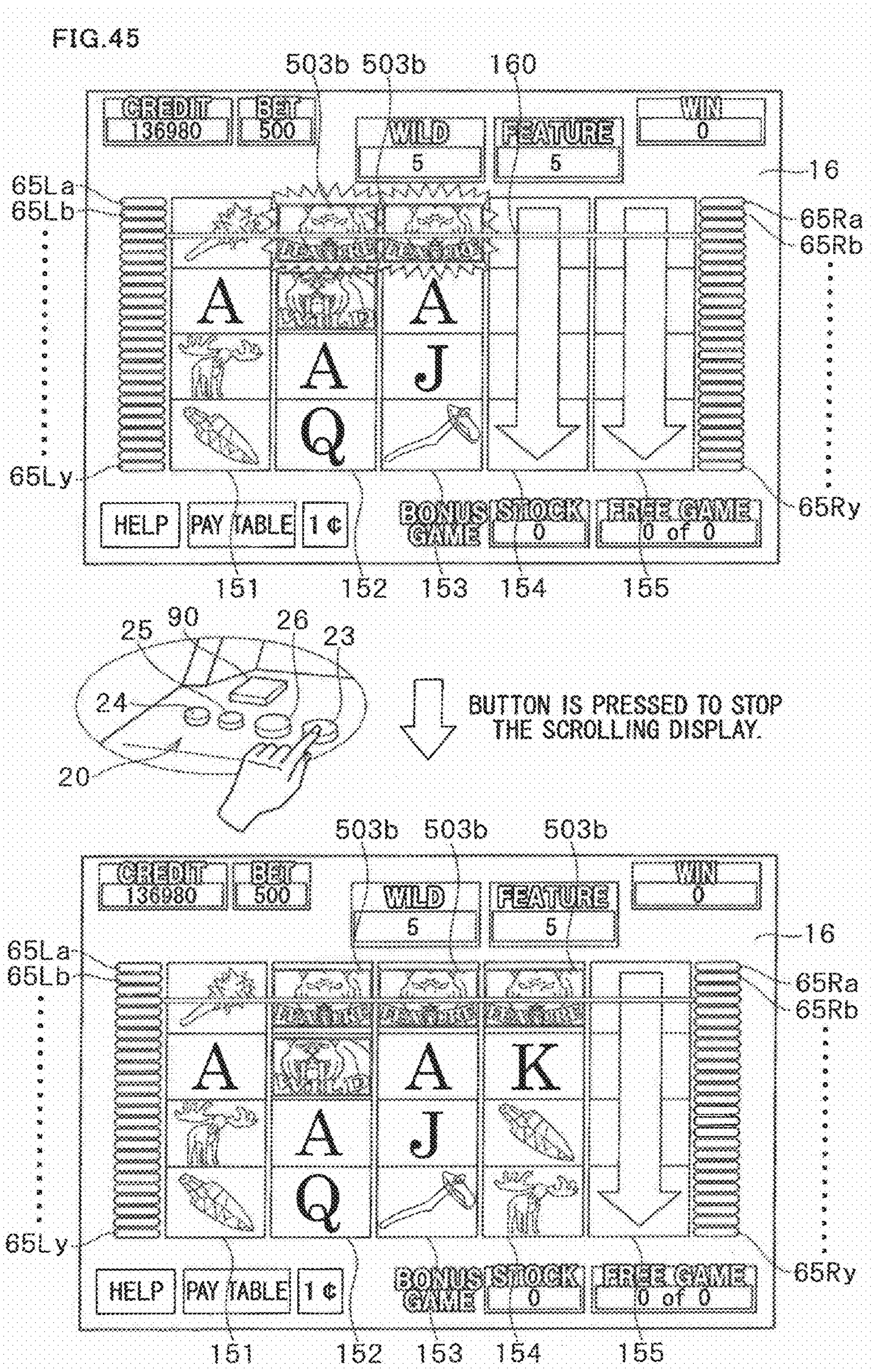
FIG. 45 is an explanatory diagram of the modification of the present invention.

FIG. 45 is an explanatory diagram of the aforesaid modification. The upper symbol display device 16 in FIG. 45 illustrates an exemplary base game screen which is a display screen displayed during the base game. In the example in FIG. 45, the pseudo reels 151, 152, and 153 of the first column (L1) to the third column (L3) have been stopped so that the symbols 501 have been rearranged. On the other hand, the pseudo reels 154 and 155 of the fourth column (L4) and the fifth column (L5) are being scrolled.

In the upper symbol display device 16 of FIG. 45, trigger symbols 503*b* are rearranged in the uppermost stage of the second pseudo reel 152 and in the upper most stage of the third pseudo reel 153, which reels have been stopped. That is to say, if the trigger symbol 503*b* is rearranged in the uppermost stage of the fourth pseudo reel 154, a predetermined number of (i.e. three) trigger symbols 503*b* are rearranged on the payline 160 passing through the uppermost stages of all pseudo reels 151-155, and hence a winning combination of trigger symbols is established.

In the modification, when the rearrangement of one more trigger symbol 503*b* will result in the establishment of winning combination of trigger symbols, the trigger symbols 503*b* which have already been rearranged are highlighted as shown in FIG. 45. (In the present embodiment, the display block 28 where the trigger symbol 503*b* has been rearranged is circled by a zigzag line.)

This notifies the player that the scrolling pseudo reel stops if s/he presses the start button 23.

Alternatively, the operation to stop the scroll may be accepted only when, for example, a winning combination of trigger symbols will be established as a result of the determination of symbols 501 to be stopped on the scrolling pseudo reel in the symbol determining process routine shown in FIG. 23.

After the already-rearranged trigger symbols 503*b* are highlighted, the player is allowed to press the start button 23 of the control panel 20 as shown in the center-left part of FIG. 45. That is to say, an operation signal is output in response to the operation of the start button 23, and this signal causes the scroll of the pseudo reel 154 to stop as shown in the lower part of FIG. 45. The example in FIG. 45 shows that a trigger symbol 503*b* is rearranged in the uppermost stage of the pseudo reel 154, with the result that a winning combination of trigger symbols is established.

Not limited to the example above, a text image or the like which requests the player to press the start button 23 may be displayed. In addition, the scroll is not necessarily stopped by the operation of the start button 23. The scroll may be stopped by operating the touch panel 69 or by an additionally-provided stop button.

In first embodiment and the modification of first embodiment, the main CPU 41 determines whether the maximum bet of game media is placed, after the first predetermined condition is established. Not limited to this, there are alternative arrangements. For example, the main CPU 41 may determine whether the number of betted game media is not lower than a predetermined number which falls within a predetermined bettable range.

In this case, the number of game media required to further add a trigger symbol in a bonus game is smaller than the case where the maximum bet is the condition of the addition. This lowers the requirement for the player, thereby attracting more customers.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

The following describes with reference to FIGS. 46 to 86 a fourth to fifth embodiment of a slot machine and a playing method thereof, according to the present invention. Note that the reference numbers given to each member and symbols indicating steps of flowcharts in the above mentioned drawings, and description referring to these reference numbers and symbols refers to members and steps which are described in the above mentioned embodiments, and do not refer to those described in other embodiments.

Fourth Embodiment

The following describes a gaming machine and playing method thereof of fourth embodiment, according to the present invention.

First, an overview of fourth embodiment is described with reference to FIG. 46.

Fourth Embodiment Overview

Figure 46:
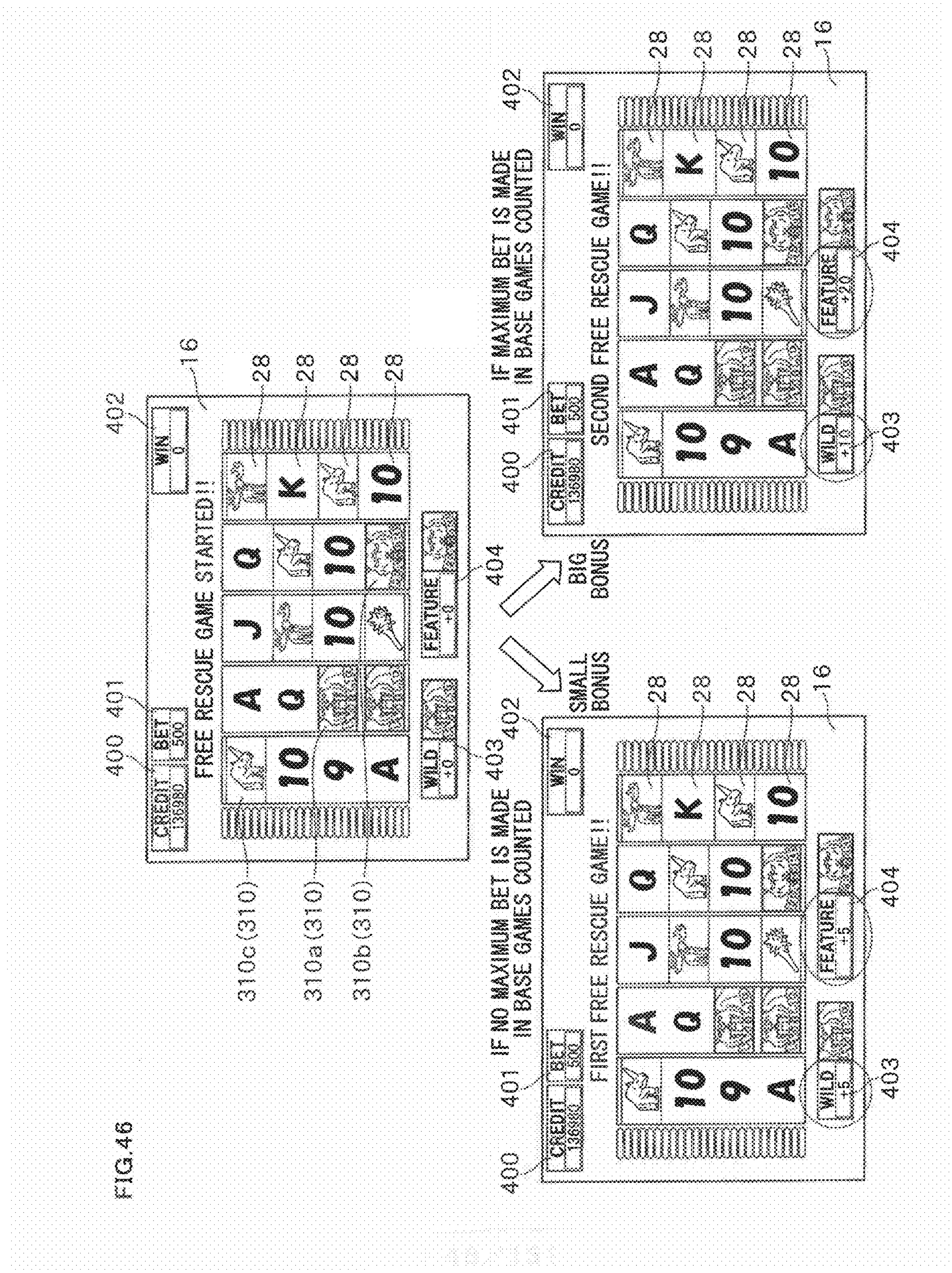
FIG. 46 shows an exemplary image displayed on the lower image display panel of a slot machine of fourth embodiment, according to the present invention.

FIG. 46 shows an exemplary image displayed on the lower image display panel 16 of a slot machine 10 of the present embodiment. A lower image display panel 16 has twenty display blocks 28 which are arranged in a matrix of five columns and four rows. On this lower image display panel 16 are displayed a credit amount indicator 400, a bet value indicator 401, and a payout indicator 402, additional wild symbol count display unit 403, and additional feature symbol count display unit 404. The credit amount indicator 400 indicates an amount of credited game medium (e.g. the number of coins). The bet value indicator 401 indicates the number of bet coins. The payout indicator 402 indicates an amount of game media paid out (e.g. the number of coins). The additional wild symbol count display unit 403 indicates the number of wild symbols 310*a* to be added when transition occurs from the base game to the later-mentioned feature game, or free rescue game. The additional feature symbol count display unit 404 indicates the number of feature symbols 310*b* to be added when transition occurs from the base game to the later-mentioned feature game, or free rescue game.

As illustrated in FIG. 46, a slot machine 10 of the present invention has bet buttons (1-bet button 26, maximum bet button 27) which receives a bet of game media ranging from 0 bet to maximum bet, the playing method of the slot machine 10 includes the steps of: (f1) running a base game, on condition that a bet of game media is entered, which pays out an amount of game media according to a symbol combination; (f2) when a rescue bet button 90 is operated by a player while the base game is running, start counting the number of subsequent base games run; (f3) when the number of base games run counts 1000 times, running a first free rescue game runnable with a less amount of bet than the base game, instead of the base game running; (f4) determining whether a maximum bet is entered in any of the base games counted, and when it is determined that a maximum bet is made, running a second free rescue game which is more advantageous to the player than the first free rescue game, and which is runnable with even a smaller amount of bet of game media.

Note that the above (f3) and (f4) may be simultaneously executed.

Note that "base game" is a game runnable on condition that a bet of game media is entered, which awards an amount of game media according to symbols 310 rearranged. In other words, "base game" is a game which starts on the premise that a game media is consumed.

The expression "rearrange" means dismissing an arrangement of symbols 310, and once again arranging symbols 310. An "arrangement" in this specification means a state of symbols 310, which can be visibly confirmed by a player.

The expression "bet" refers to an act of a player betting on at least one game medium for a unit game to play the game, or an amount of game media bet on the unit game. The "maximum bet" refers to an act of a player betting the maximum amount of game media (500 game media in the embodiment) which is acceptable in each game, or the maximum amount of game media bet on the unit game.

The above mentioned "first free rescue game" and "second free rescue game" are both subordinate concepts of "free rescue game". In the present embodiment, the "free rescue game" is runnable with a smaller amount of bet than the base game, so as to provide a player who has played a predetermined number of games with a chance of having some game media returned. Note that "a smaller amount of bet" encompasses betting of zero game media. The "free game" therefore may be a game runnable without a bet of game medium, which awards an amount of game media according to symbols 310 having been rearranged. In other words, "free game" is a game which is started without the premise of consuming a game medium.

The free rescue game is run when a player plays a base game 1000 times, and if the player operates a later-mentioned rescue bet button 90. At this time, the first free rescue game is run if the player did not enter a maximum bet in any of the 1000 base games counted. On the other hand, if the maximum bet is entered by the player in one or more of the 1000 base games counted, the second free rescue game which is more advantageous to the player than the first free rescue game is run. In the second free rescue game, there are more wild symbols 310*a* and more feature symbols 310*b* than those in the first free rescue game, and the player therefore more likely have game media returned. This is a point which makes the second free rescue game more advantageous to the player than the first free rescue game. Note that the 1000 base games which is the number of base games that has to be played before the "free rescue game" becomes runnable may be set to any given number of times, in the present invention. Further, the present embodiment deals with a case where the second free rescue game is run if the player entered a maximum bet in any of the 1000 base games counted. However, the present invention is not limited to this. For example, the second free rescue game is run only if the player has entered the maximum bet in all of the 1000 base games having been counted. In other words, it is possible that the second free rescue game is not run if the player did not enter the maximum bet in any of the 1000 base games counted.

Further, the "free game" which is the superordinate concept of the "free rescue game" is a game which is runnable without a bet of game media, and awards an amount of game media according to the symbols 310 rearranged. Thus, in contras to the base game, the "free game" in other word is a game which is started without the premise of consuming a game medium. Further, the wording "feature game" is a game in which the free game is repeated a predetermined number of times corresponding to a game repeat count.

The "wild symbols 310*a*" and "feature symbols 310*b*" in FIG. 46 forms a group of symbols 310, along with ordinary symbols 310*c*. That is, symbol 310 is a superordinate concept of the wild symbol 310*a*, feature symbols 310*b*, and ordinary symbols 310*c*. Each wild symbol 310*a* is a symbol substitutable for any type of symbols 310. Each feature symbols 310*b* is a symbol serving as a trigger for starting at least a feature game. That is, the feature symbol 310*b* triggers transition from the base game to the feature game.

As hereinabove mentioned, the first and second free rescue games are set so that these games are different in terms of advantages to the player. Specifically, before the start of the free rescue game, the additional wild symbol count display unit 403 and the additional feature symbol count display unit 404 both displays "0" (See the top diagram of the figure). This means that there is no additional wild symbols 310*a* or feature symbols 310*b*, before the start of the free rescue game (i.e., during the base game). It is understood from the lower left diagram of FIG. 1 that five wild symbols 310*a* and five feature symbols 310*b* are added when the first free rescue game is started. On the other hand, it is understood from the lower right diagram that, when the second free rescue game is started, 10 wild symbols 310*a* and 20 feature symbols 310*b* are added (see the lower right of the figure).

Incidentally, in the rescue game run for returning game media, every player is given a possibility of winning back the game media, which is not very different from the possibility given to a player, irrespective of the amount of game media having consumed in the base game. This causes a feeling of unfairness between players who consumed a large amount of game media and players who have consumed a small amount of game media. However, when the rescue bet button 90 is operated by a player during the base game, the base games played thereafter are counted. When the number of base games counted reaches 1000 times, there is determined whether the player has made a maximum bet in any of the 1000 base games. If it is determined that a maximum bet has been made, the second free rescue game which is more advantageous to the player than the first free rescue game is run. This motivates the player to make the maximum bet to play more advantageous second free rescue game. As a result, a large number of game media is trafficked, leading to the gain of the gaming facility. Further, a player having made a maximum bet is given more advantages than a player who did not make a maximum bet. Thus, there will be no feeling of unfairness attributed to the difference between the bet amount.

(Function Flow of Slot Machine)

Figure 47:
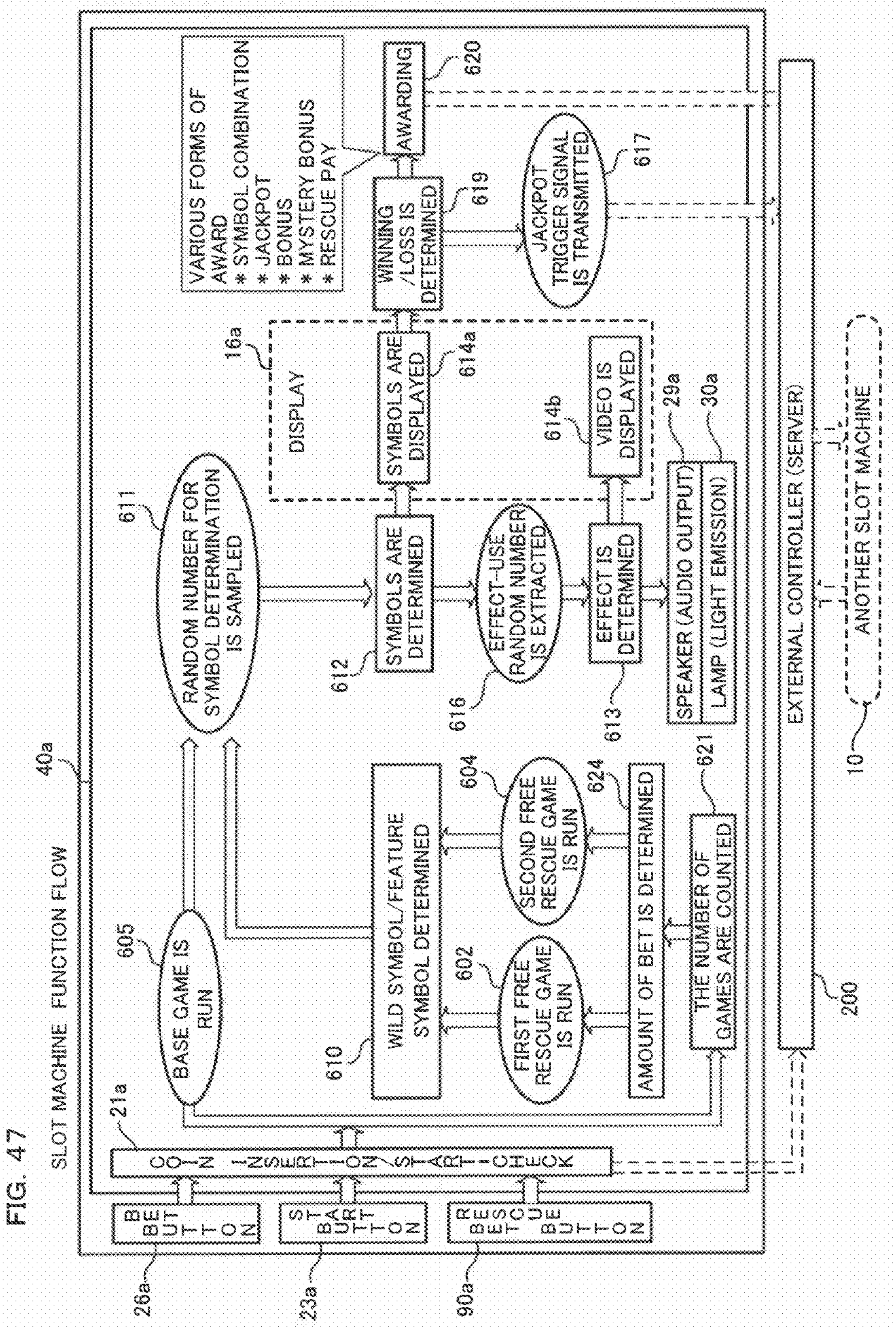
FIG. 47 shows a function flow of the slot machine of fourth embodiment.

As illustrated in FIG. 47, the slot machine 10 structured as described above is connected to an external controller 200 (server) which is also connected to other slot machines 10 and which is capable of performing data communications with each of the slot machines 10. Each slot machine 10 has a bet button unit 26*a*, a start button unit 23*a*, a display unit 16*a*, a rescue bet button unit 90*a*, and a game controller 40*a* controlling each of these units.

The bet button unit 26*a* has a function of accepting a player's operation for entering a bet amount. The start button unit 23*a* has a function of accepting a player's operation for starting a game. The display unit 16*a* has a function of displaying, in the form of a still image, various symbols 310, numerical values, marks, or the like, and displaying moving pictures such as an effect video. The display unit 16*a* has a symbol display region 614*a* and a video display region 614*b*. The symbol display region 614*a* displays symbols 310 shown in FIG. 46, and displays the number of additional wild symbols 310*a* and feature symbols 310*b*. The video display region 614*b* displays various effect video information to be displayed during a game, in the form of moving image or still image.

The game controller 40*a* includes: a coin insertion/start-check unit 21*a*, a base game running unit 605, a symbol determination random number sampling unit 611, a symbol determining unit 612, an effect-use random number sampling unit 616, an effect determining unit 613, a speaker unit 29*a*, a lamp unit 30*a*, a winning determining unit 619, a payout unit 620, a jackpot trigger signal transmitting unit 617, a first free rescue game running unit 602, a second free rescue game running unit 604, a bet amount determining unit 624, and a played-game counting unit 621.

The base game running unit 605 has a function of running a base game on condition that the bet button unit 26*a* is operated.

The symbol determining unit 612 has: a function of determining symbols 310 to be rearranged, by using a random number given by the symbol determination random number sampling unit 611; a function of rearranging selected symbols 310 on the symbol display region 614*a* of the display unit 16*a*; a function of outputting information of the symbols 310 rearranged, to the winning determining unit 619; a function of replacing partially or entirely the symbols 301, in the group of symbols 310 from which symbols 310 to be rearranged are determined, with the additional wild symbols 310*a* or feature symbols 310*b* the numbers of which have been increased based on the additional number of wild symbols 310*a* and that of feature symbols 310*b* determined by the wild symbol/feature symbol determining unit 610; and a function of outputting an effect designation signal to the effect-use random number sampling unit 616, based on the rearrangement of symbols 310.

The effect-use random number sampling unit 616 has functions of, when receiving the effect instruction signal from the symbol determining unit 612, sampling an effect-use random number; and outputting an effect-use random number to the effect determining unit 613. The effect determining unit 613 has: a function of determining an effect by using the effect-use random number; a function of outputting, to a video display region 614*b* of the display unit 16*a*, video information in the effect thus determined; and a function of outputting audio information and illumination information to the speaker unit 29*a* and the lamp unit 30*a*, respectively.

The winning determining unit 619 has a function of determining whether a winning is resulted when information of symbols 310 rearranged and displayed on the display unit 16*a* is given; a function of calculating a payout when it is determined that a winning has resulted, based on the winning combination; a function of outputting to the payout unit 620 a payout signal which is based on the amount of payout; and a function of outputting a jackpot signal to the jackpot trigger signal transmitting unit 617, when awarding of a jackpot is determined in the process of determining whether a winning has resulted.

The jackpot trigger signal transmitting unit 617 outputs a jackpot awarding signal to the external controller 200, based on a jackpot signal from the winning determining unit 619 so as to award a jackpot prize to the player from the external controller 200.

The played-game counting unit 621 has a function of counting reception of a start signal from the start button unit 23*a*, after a rescue signal is received from the rescue bet button unit 90*a*, and transmitting a bet amount signal to the bet amount determining unit 624; and a function of transmitting a bet amount determining signal to the bet amount determining unit 624, when the count reaches 1000. The bet amount determining signal includes an instruction to cause the bet amount determining unit 624 to determine the bet amount in each of the 1000 games counted by the played-game counting unit 621.

The bet amount determining unit 624 has a function of storing that information in a storage area every time the bet amount signal is received from the played-game counting unit 621; a function of determining, upon receiving the bet amount determining signal whether the bet amounts stored in the storage area contains a maximum bet, based on the bet amount determining signal; and transmitting a rescue game running signal to the first free rescue game running unit 602 if the bet amounts in the storage area contains a maximum bet, while transmitting the rescue game running signal to the second free rescue game running unit 604 if the maximum bets in the storage area contains no maximum bet.

The first free rescue game running unit 602 has a function of running the first free rescue game when receiving the rescue game running signal from the bet amount determining unit 624, while the second free rescue game running unit 604 has a function of running the second free rescue game when receiving the rescue game running signal from the bet amount determining unit 624.

The wild symbol/feature symbol determining unit 610 has a function of determining the number of additional wild symbols 310*a* and feature symbol 310*b* when the first or second free rescue game is run, and transmitting an additional symbol signal containing information of the symbols to the symbol determination random number sampling unit 611.

(Mechanical Structure of Gaming Machine)

Next, the following describes a structure of a gaming machine 1 including slot machines 10 each having the above mentioned functions, and the external controller 200.

Figure 48:
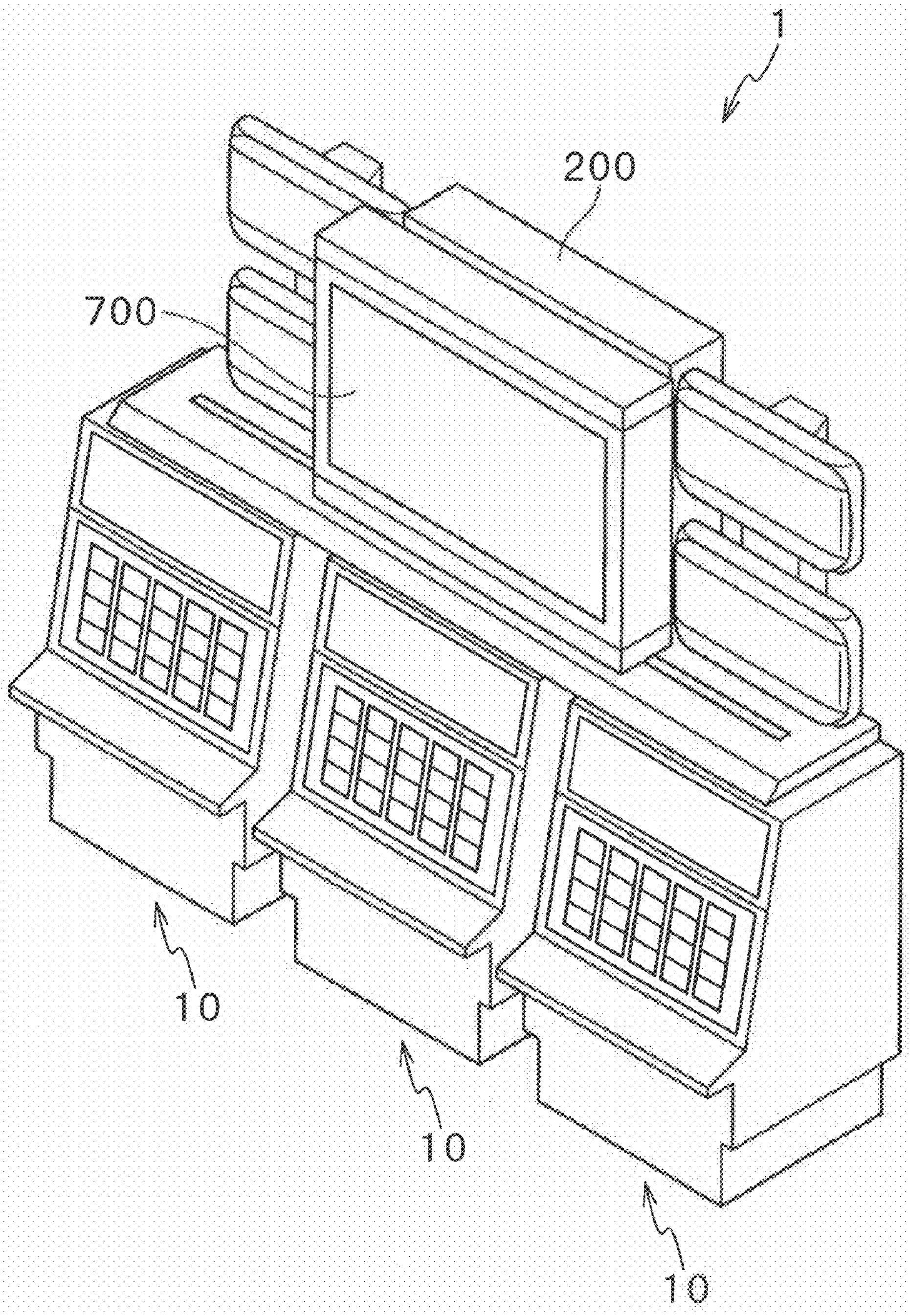
FIG. 48 is a perspective view illustrating an external appearance of a gaming machine having a slot machine of fourth embodiment, according to the present invention.

The gaming machine 1 is set up in a gaming facility such as casino. As illustrated in FIG. 48, the gaming machine 1 has a plurality of slot machines 10 each capable of running a base game independently of the other slot machines 10; an external controller 200 connected to and in communication with the slot machines 10, which is capable of running a jackpot game, and a common display 700 which displays an effect image related to the jackpot game.

(Overview of Gaming System)

Figure 49:
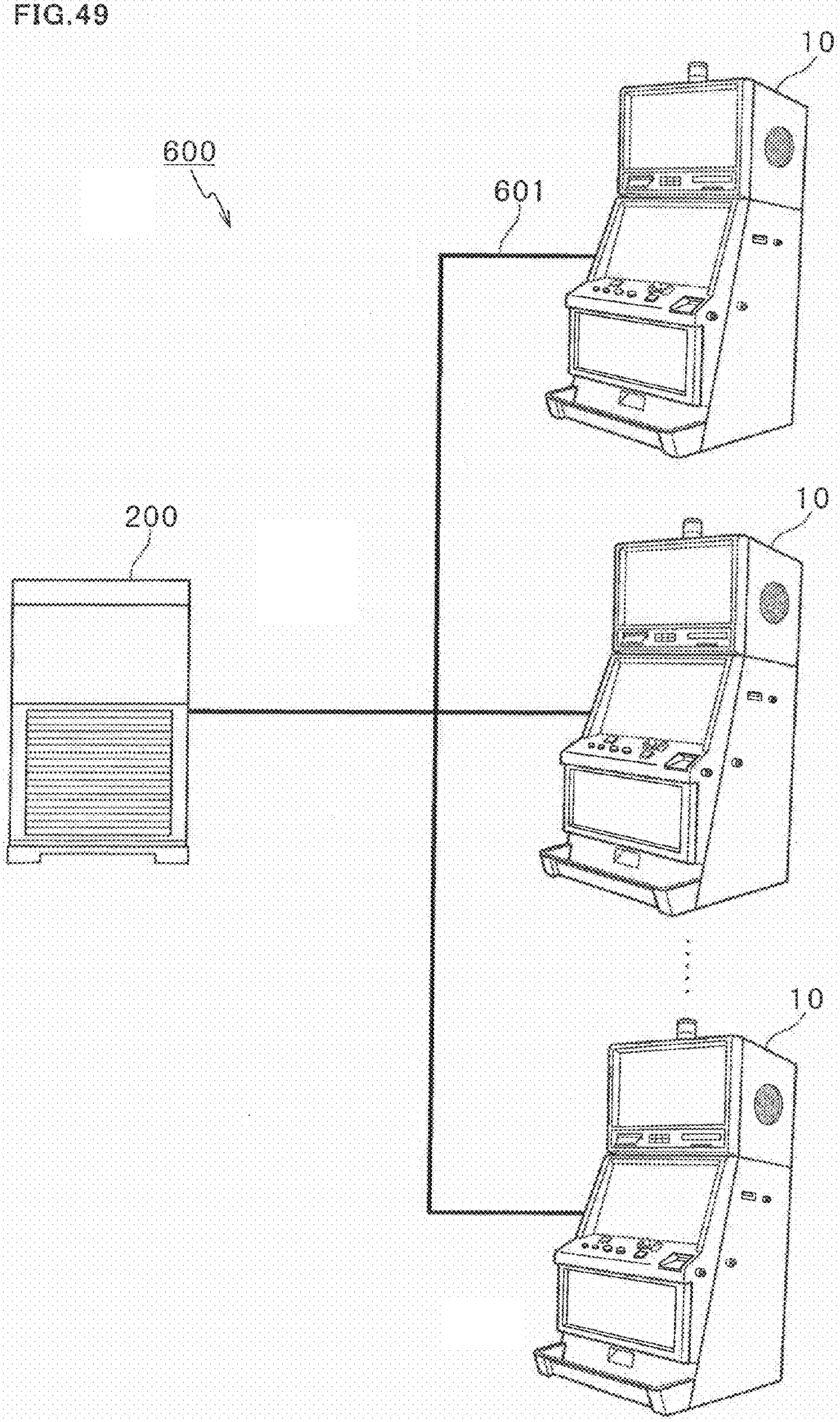
FIG. 49 schematically illustrates a gaming system having the slot machine of fourth embodiment, according to the present invention.

Next, the following describes a gaming system 600 including the gaming machine 1, with reference to FIG. 49. The gaming system 600 includes plural slot machines 10, and an external controller 200 connected to the slot machines 10 via a communication line 601. The external controller 200 is for controlling the slot machines 10. In the present embodiment, the external controller 200 is a so-called hall-server provided in a gaming facility having plural slot machines 10. Each slot machine 10 is given a unique identification number. The external controller 200 identifies the source of data from any slot machine 10, by referring to the identification number. The identification number is also used for designating the destination, when transmitting data from the external controller 200 to any slot machine 10. Note that the gaming system 600 may be built in plural gaming facilities or a single gaming facility such as a casino where various games are provided. Further, when building the gaming system 600 in a single gaming facility, the center server 200 may be built in each floor or each section of the gaming facility. The communication line 601 may be wired or wireless. For example, an exclusive line, switched line, or the like may be adopted.

(Mechanical Structure of Slot Machine)

Figure 50:
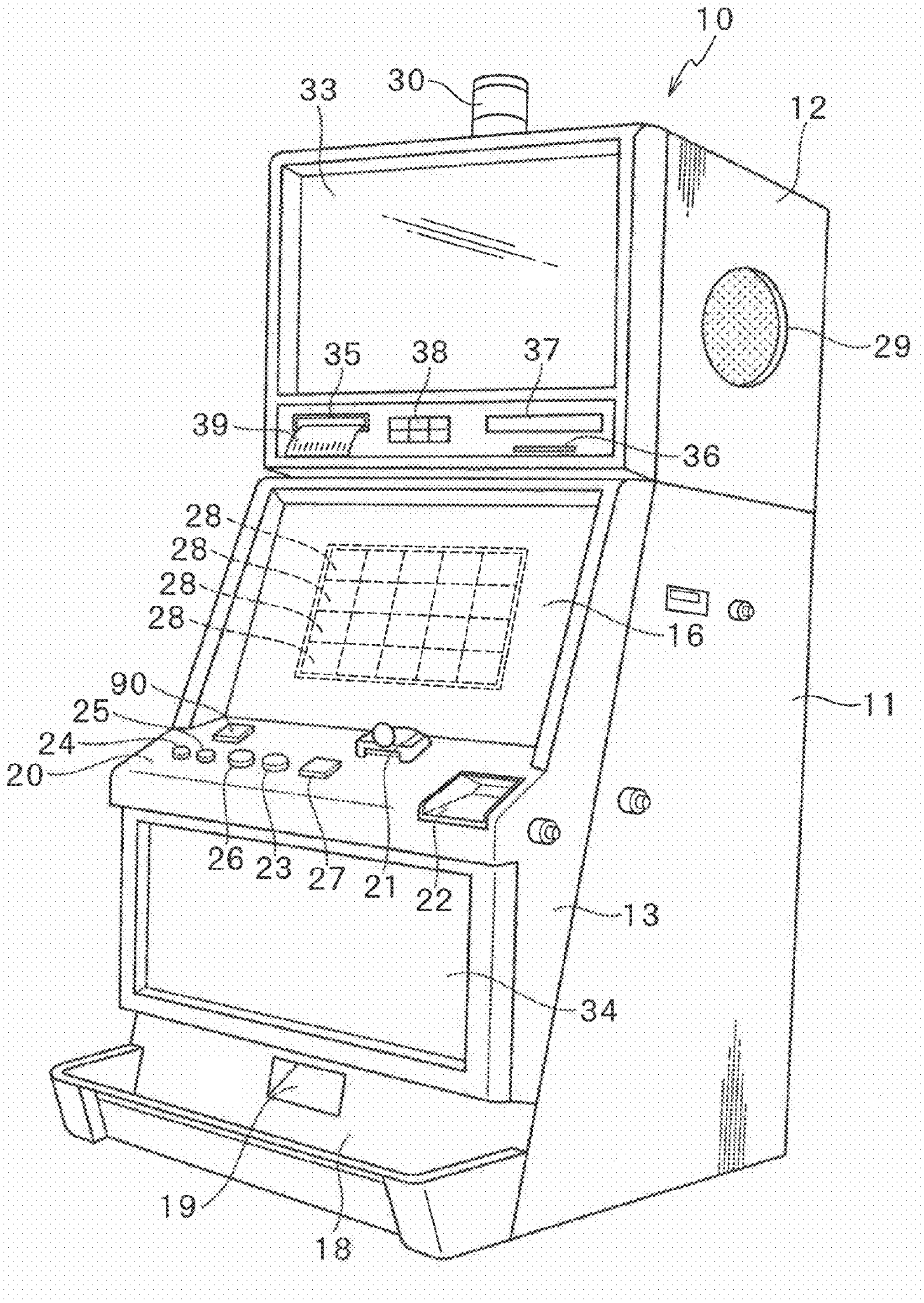
FIG. 50 is a perspective view illustrating an external appearance of the slot machine of fourth embodiment, according to the present invention.

The following describes a mechanical structure of each slot machine 10. FIG. 50 is a perspective view illustrating an external appearance of the slot machine 10. The slot machine 10 is set up in a gaming facility such as casino. The slot machine 10 runs a unit game when a game media is spent. The game medium is a coin, bill, or valuable information corresponding to these. Note that the game medium in the present invention is not particularly limited. Examples of the game medium includes medals, tokens, electronic money, and tickets. The ticket is not particularly limited, and a later-mentioned ticket with a barcode may be adopted for example.

The slot machine 10 includes: a cabinet 11, a top box 12 provided above the cabinet 11, and a main door 13 provided on the front surface of the cabinet 11.

The main door 13 has a lower image display panel 16. The lower image display panel 16 is made of a transparent liquid crystal panel, and has display blocks 28 arranged in five columns and four rows. In each display block 28 is arranged a single symbol 310. The lower image display panel 16 equates to a symbol display device of the present invention. The present embodiment deals with a case where the slot machine 10 is a video slot machine. Further, although the illustration is omitted, the lower image display panel 16 displays various images related to effect, in addition to those mentioned hereinabove.

Further, a not-shown touch panel 69 is disposed at the front of the lower image display panel 16, and a player is able to input various instructions by operating the touch panel 69. From the touch panel 69, an input signal is transferred to the main CPU 41.

Below the lower image display panel 16 are control panel 20, a coin receiving port 21, and a bill identifier 22. The control panel 20 includes plural buttons 23 to 27 and 90 by which a player is able to input an instruction related to progression of a game. The coin receiving port 21 receives a coin and takes it into the cabinet 11.

The control panel 20 has: a start button 23, a change button 24, a cashout button 25, a 1-bet button 26, a maximum bet button 27, and an rescue bet button 90. The start button 23 is for inputting an instruction to start scrolling symbols 310. A change button 24 is used when requesting a gaming facility staff member to exchange money. The cashout button 25 is for inputting an instruction to pay out credited coins to a coin tray 18.

The 1-bet button 26 is for inputting an instruction to bet a single coin out of the credited coins. The maximum bet button 27 is for inputting an instruction to bet the maximum number of coins bettable in one game (500 coins in this embodiment), out of the credited coins. The rescue bet button 90 is for inputting an instruction of transition from the non-rescue mode to the rescue mode.

The bill identifier 22 is for validating the legitimacy of a bill input, and takes into the cabinet 11 those recognized as legitimate. The bill validator 22 may be also capable of reading a barcode on a later-mentioned barcode-attached ticket 39. On the lower front surface of the main door 13, that is, below the control panel 20, there is provided a belly glass 34 with a character or the like of the slot machine 10 being drawn thereon.

On the front surface of the top box 12 is an upper image display panel 33. The upper image display panel 33 has a liquid crystal panel, and displays thereon an image or text which provides introduction to the game, the rules of the game, or the like information.

Further, the top box 12 is provided with speakers 29. Below the upper image display panel 33 are a ticket printer 35, a card reader 36, a data displayer 37, and a key pad 38. The ticket printer 35 prints on a ticket a barcode and outputs the ticket as a barcode-attached ticket 39. A barcode is encoded data containing a credit amount, date and time, an identification number of the slot machine 10, or the like. A player is able to exchange the barcode-attached ticket 39 with bill or the like at a predetermined location in the gaming facility (e.g. change booth of a casino).

The card reader 36 reads/writes data from/into a smart card. The smart card is carried by a player, and stores therein data for identifying the player, data relating to a history of games played by the player, or the like. The smart card may store data of coins, bill, or a credit card. Further, it is possible to adopt a magnet stripe card instead of the smart card. The data displayer 37 includes a fluorescent display or the like, and displays the data read by the card reader 36 and the data input by the player through the key pad 38. The key pad 38 is for entering instructions or data relating to issuing of a ticket or the like.

(Electric Structure of Slot Machine)

Figure 51:
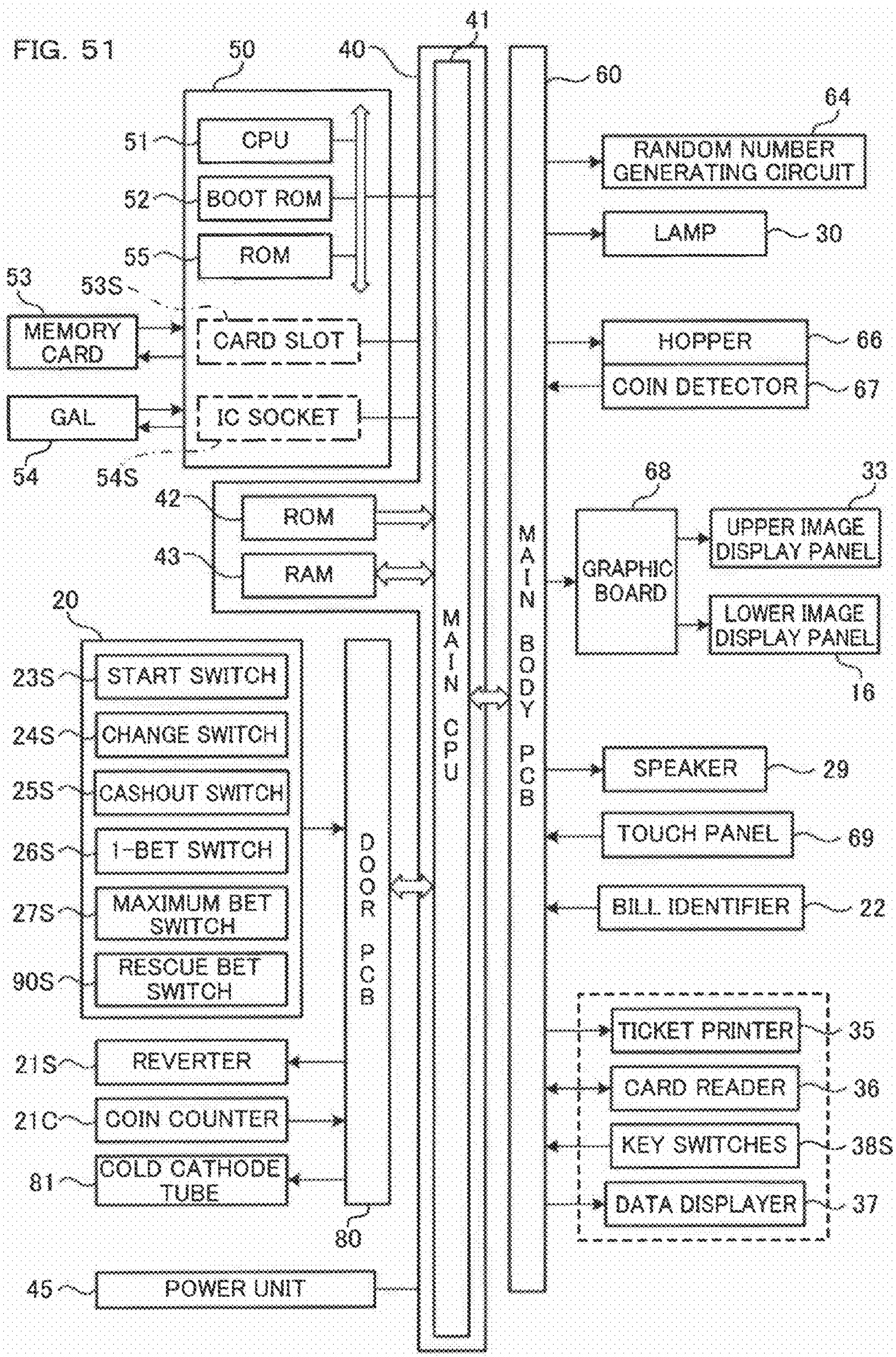
FIG. 51 is a block diagram illustrating an internal structure of the slot machine of fourth embodiment, according to the present invention.

FIG. 51 is a block diagram illustrating the internal structure of the slot machine 10 illustrated in FIG. 50. The gaming board 50 is provided with a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 is made of an involatile memory such as a compact flash (®) or the like, and stores a game program. The game program includes a symbol determining program. The symbol determining program is a program for determining symbols 310 to be rearranged on the display blocks 28.

The card slot 53S is structured so as to allow the memory card 53 to be attached/detached to/from the card slot 53S. This card slot 53S is connected to the motherboard 40 through an IDE bus. Thus, the type and content of a game run by a slot machine 10 can be modified by detaching the memory card 53 from the card slot 53S, write a different game program into the memory card 53, and inserting the memory card 53 back into the card slot 53S. The game program includes a program according to a game progress.

The game program includes odds data (see FIG. 56) and data of, for example, the following tables: a base game symbol table (see FIG. 55), an additional wild symbol count determination table (see FIG. 57), a symbol code No. determination table (see FIG. 58) indicating the symbol column determination table, a code No. determination table data indicating the code No. determination table (FIG. 59). The base game symbol table indicates (i) a symbol of a display block forming a symbol column and (ii) a code No. and a random number associated with the symbol. The odds data indicates the number and types of symbols rearranged on a payline 300 (see FIG. 53) and a corresponding amount of payout.

The CPU 51, the ROM 55 and the boot ROM 52 connected through an internal bus are connected to the motherboard 40 through the PCI bus. The PCI bus communicates signals between the motherboard 40 and the gaming board 50 and supplies power from the motherboard 40 to the gaming board 50.

The motherboard 40 is structured by using a marketed general-purpose motherboard which is a printed circuit board having basic components of a personal computer, and includes: a main CPU 41; a ROM (Read Only Memory) 42; and a RAM (Random Access Memory) 43. The motherboard 40 corresponds to the game controller 40*a* of the present invention.

The ROM 42 is made of a memory device such as a flash memory, and stores permanent data and a program such as BIOS (Basic Input/Output System) which is run by the main CPU 41. Running the BIOS by the main CPU 41 initializes predetermined peripherals and starts loading of a game program in a memory card 53 via the gaming board 50. Note that, in the present invention, the ROM 42 may be rewritable or non-rewritable.

The RAM 43 stores data used during operation of the main CPU 41 and a program such as a symbol determining program. Further, the RAM 43 is capable of storing a game program.

Further, the RAM 43 stores the following pieces of data: a credit amount; data of an input amount and a payout amount for each game; the number of wild symbols 310*a* added in a free rescue game; and the number of feature symbols 310*b* added in a free rescue game. Further, the RAM 43 stores a feature game symbol table data (see FIGS. 60A, 60B) indicating a symbol table; a first free rescue game symbol table data (see FIGS. 61A, 61B) indicating a first free rescue game symbol table; and a second free rescue game symbol table data (see FIGS. 62A, 62B) indicating a second free rescue game symbol table, or the like. Each table indicates how a symbol of a display block forming a symbol column, a code No., and a random number are associated with one another.

Further, the RAM 43 has a free game count storage area, a total game count storage area, and a total payout amount storage area, a feature symbol count storage area, and a wild symbol count storage area. In the free game count storage area is stored remaining game count data which indicates a remaining free game count T. In the total game count storage area is stored total game count data indicating a total game count C. The total game count C is the number of base games played after a transition to the rescue mode. In the total payout amount storage area is stored total payout amount data indicating a free rescue game total payout amount. The free rescue game total payout amount is a total of payout amount determined during the free rescue game. In the feature symbol count storage area is stored feature symbol count data indicating the number of feature symbols in total. The number of feature symbols in total means the total number of feature symbols 310*b* rearranged in the display blocks 28, during the free rescue game. In the wild symbol count storage area is stored wild symbol count data indicating the number of the wild symbols in total. The number of wild symbols in total means the total number of wild symbols 310*a* rearranged in the display blocks 28, during the free rescue game.

Further, the main RAM 43 is provided with a storage area for a rescue flag. The rescue flag is a flag which turns on when the rescue bet button 90 is pressed down. The rescue flag storage area is, for example, a storage area of a predetermined bits, and the rescue flag is turned on and off according to contents of the storage area. The rescue flag in the on state corresponds to the rescue mode. The rescue flag in the off state corresponds to the non-rescue mode.

The motherboard 40 is connected to a later-mentioned main body PCB (Printed Circuit Board) 60 and a door PCB 80 via USB. The motherboard 40 is also connected to the power unit 45.

To the main body PCB 60 and door PCB 80 are connected equipment and devices which generate input signals to be input to the main CPU 41 or which are controlled by control signals output from the main CPU 41. The man CPU 41 runs a game program stored in the RAM 43 based on an input signal input to the main CPU 41, thereby storing a result of a predetermined computation in the RAM 43 or transmitting control signals to the equipment and devices to control the same.

To the main PCB 60 are connected: a lamp 30, a hopper 66, a coin sensor 67, a graphic board 68, a speaker 29, a touch panel 69, a bill validator 22, a ticket printer 35, a card reader 36, a key switches 38S, a data displayer 37, and a random number generating circuit 64. The lamp 30 flashes in a predetermined pattern, based on a control signal output from the main CPU 41.

The hopper 66 is installed inside the cabinet 11, and outputs a predetermined number of coins from the coin outlet 19 to the coin tray 18, based on a control signal output from the main CPU 41. The coin sensor 67, when detecting that a predetermined number of coins is output from the coin outlet 19, outputs an input signal to the main CPU 41.

The graphic board 68 controls image displaying on the upper image display panel 33 and the lower image display panel 16, based on a control signal output from the main CPU 41. On the upper image display panel 33 and display blocks 28 of the lower image display panel 16 are displayed symbols 310 which are scrolled and stopped. The credit amount indicator 400 of the lower image display panel 16 displays thereon a credit amount stored in the RAM 43. Further, on the additional wild symbol count display unit 403 and additional feature symbol count display unit 404 are displayed the number of wild symbols 310*a* and the feature symbols 310*b* which are added at the time of free rescue game, and which are stored in the RAM 43. Further, the bet value indicator 401 of the lower image display panel 16 displays the number of coins bet. Further, the payout indicator 402 of the lower image display panel 16 displays the number of coins paid out. The graphic board 68 has a VDP (Video Display Processor) which generates image data based on control signal output from the main CPU 41, a video RAM which temporarily stores image data generated by the VDP, or the like. The image data used at the time of generating image data by the VDP is in a game program which is read out from the memory card 53 and stored in the RAM 43.

The bill validator 22 validates whether a bill is legitimate, and only receives a legitimate bill into the cabinet 11. The bill validator 22, when receiving a legitimate bill, outputs an input signal indicating the value of the bill to the main CPU 41. The main CPU 41 stores in the RAM 43 a credit amount corresponding to the value of the bill indicated by the input signal.

Based on a control signal from the main CPU 41, the ticket printer 35 prints on a ticket a barcode and outputs the ticket as a barcode-attached ticket 39. The barcode is encoded data containing the credit amount stored in the RAM 43, date, and the identification number of the slot machine 10. The card reader 36 reads out data from a smart card and transmits the data to the main CPU 41, or writes data into a smart card based on a control signal from the main CPU 41. The key switches 38S are provided to the key pad 38, and transmit a predetermined input signal to the main CPU 41 when a player operates the key pad 38. The data displayer 37 displays data read out by the card reader 36 based on a control signal from the main CPU 41, or data input by the player through the key pad 38.

The random number generating circuit 64 generates a random number at a predetermined timing. Note that random numbers generated by the random number generating circuit 64 ranges from 0 to 65535.

The door PCB 80 is connected to a control panel 20, a reverter 21S, a coin counter 21C and a cold cathode tube 81. The control panel 20 is provided with a start switch 23S corresponding to the start button 23, a change switch 24S corresponding to the change button 24, a cashout switch 25S corresponding to a cashout button 25, 1-bet switch 26S corresponding to the 1-bet button 26, a maximum bet switch 27S corresponding to the maximum bet button 27, and a rescue bet switch 90S corresponding to the rescue bet button 90. Each of the switches 23S to 27S and 90S outputs an input signal to the main CPU 41 when corresponding one of the buttons 23 to 27 and 90 is operated by the player.

The coin counter 21C is provided inside the coin receiving port 21, and validates whether a coin input by a player to the coin receiving port 21 is legitimate coin. Any non-legitimate coin is output from the coin outlet 19. Further, the coin counter 21C, when detecting a legitimate coin, outputs an input signal to the main CPU 41.

The reverter 21S operates based on a control signal from the main CPU 41, and delivers coins that are recognized as legitimate by the coin counter 21C into a not-shown cash box or hopper 66 in the slot machine 10. That is, when the hopper 66 is full of coins, legitimate coins are delivered by the reverter 21S to the cash box. On the other hand, if the hopper 66 is not full of coins, legitimate coins are delivered to the hopper 66. The cold cathode tube 81 functions as a back light disposed at the back sides of the lower image display panel 16 and the upper image display panel 33. This cold cathode tube 81 lights based on a control signal output from the CPU 41.

(Electric Structure of External Controller)

Figure 52:
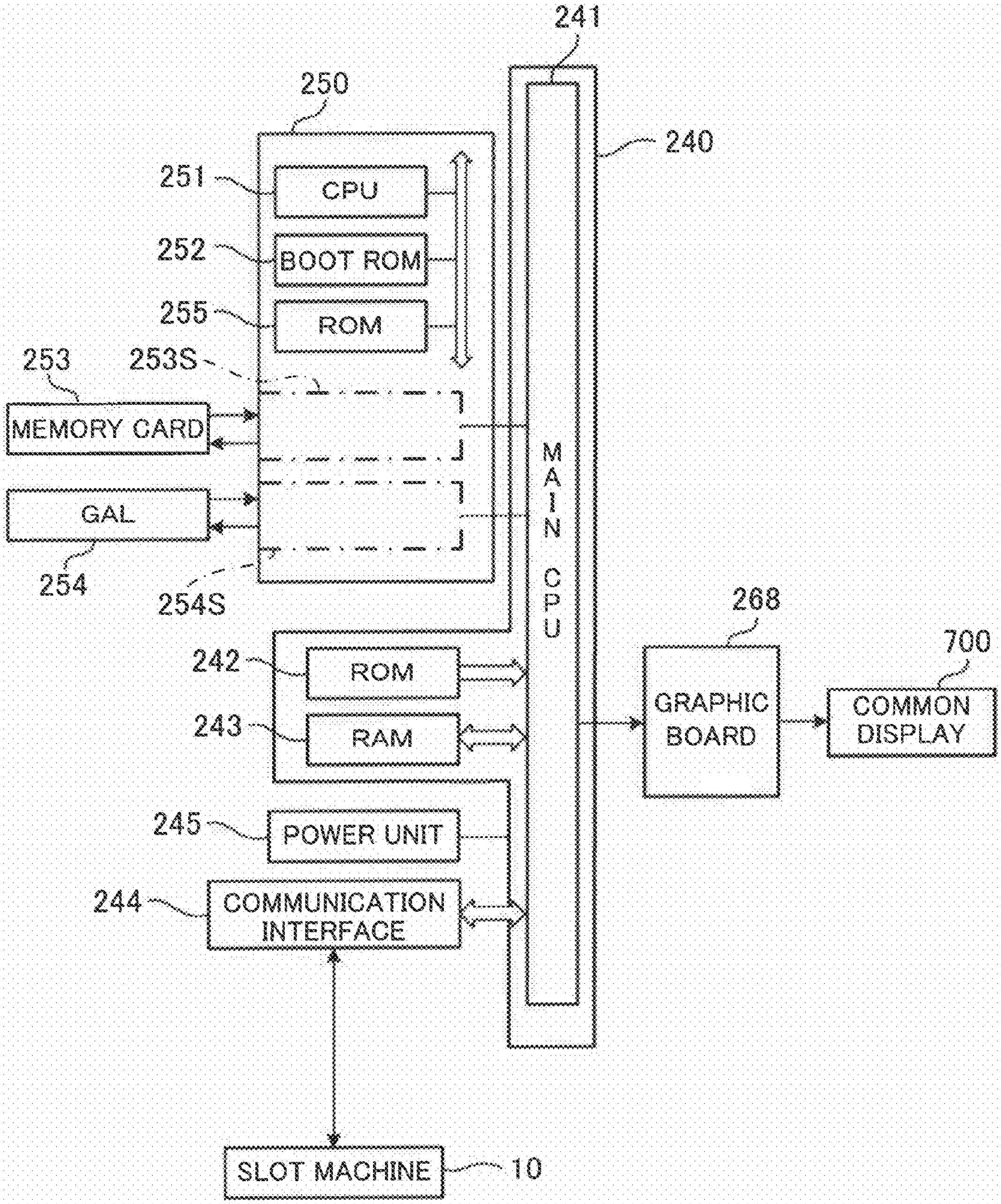
FIG. 52 is a block diagram illustrating an internal structure of a server of fourth embodiment, according to the present invention.

FIG. 52 is a block diagram illustrating an electric structure of the external controller 200. The external controller 200 is provided therein with a control unit. As illustrated in FIG. 52, the control unit has a motherboard 240, a gaming board 250, an actuator, or the like.

The gaming board 250 has the same structure as that of the above-mentioned gaming board 50. The motherboard 240 has the same structure as that of the above-mentioned motherboard 40.

The motherboard 240 has a main CPU 241, a ROM 242, and a RAM 243.

The main CPU 241 runs various programs or performs various calculations. The ROM 242 stores permanent data and a program which is run by the main CPU 241. In the R AM 243 is stored data and programs used when the main CPU 241 operates.

Further, the external controller 200 has a graphic board 268 which serves as a main actuator.

The graphic board 268 has the same structure as that of the above-mentioned graphic board 68, except in that the graphic board 268 controls displaying of an image on the common display 700 based on a control signal output from the main CPU 241.

Further, the external controller 200 has a power unit 245 and a communication interface 244.

The power unit 245 has a role of supplying power to the motherboard 240. The communication interface 244 is for enabling communication among the slot machines 10 and the motherboard 40 through a communication line.

(Operation of Slot Machine)

The following describes various operations of the slot machine 10.

(Base Game Running Process)

Figure 63:
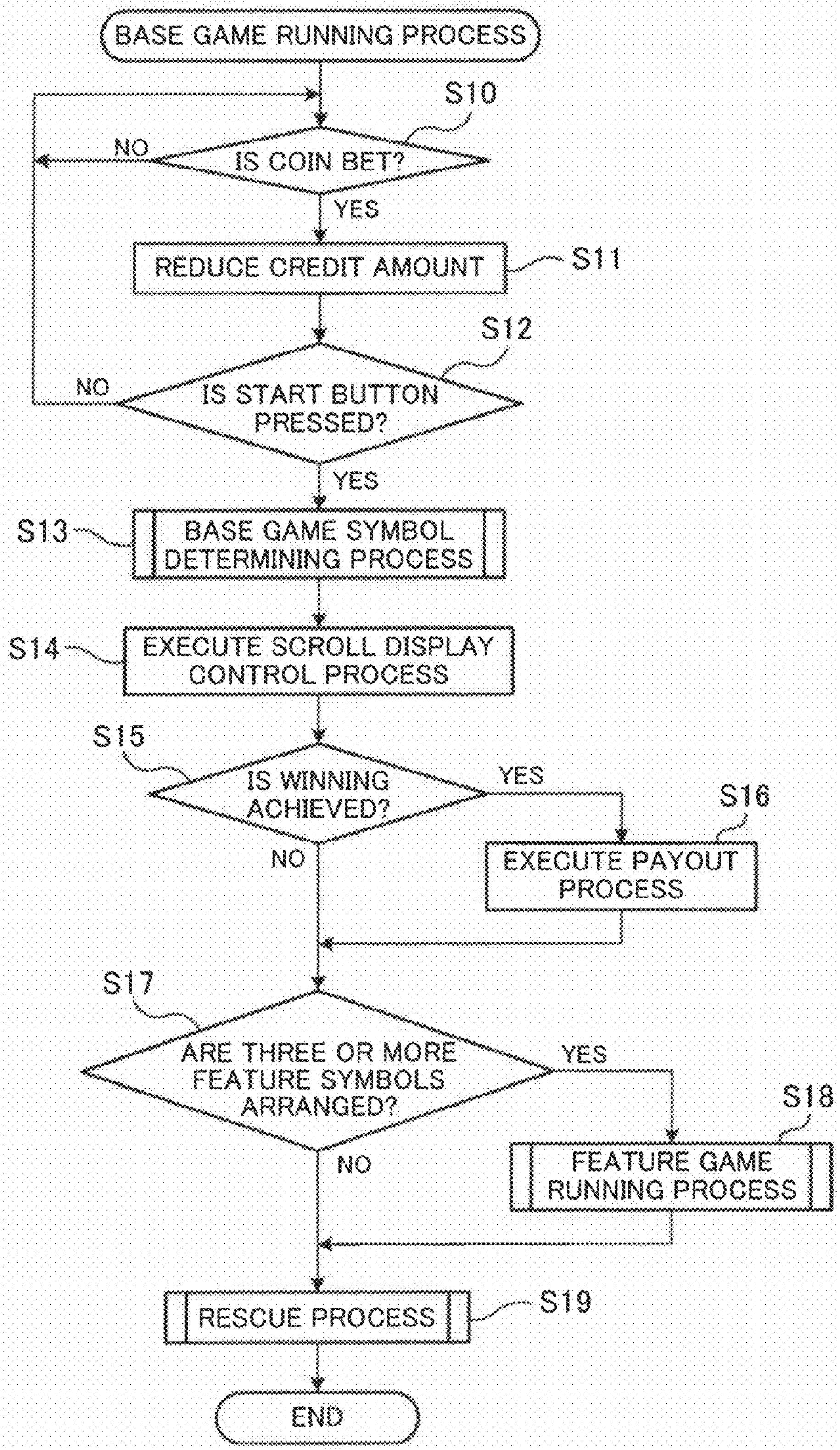
FIG. 63 shows a flowchart of a base game running process.

FIG. 63 shows a flowchart of a base game running process.

First, the main CPU 41 determines whether or not a coin is bet (S10).

In this process, the main CPU 41 determines whether an input signal is received. The input signal may be an input signal output from the 1-bet switch 26S when the 1-bet button 26 is operated, or an input signal output from the maximum bet switch 27S when the maximum bet button 27 is operated. When it is determined that no coin is bet (S10: No), the S10 is re-executed.

On the other hand in S10, if it is determined that a coin is bet, the main CPU 41 performs a process of reducing the credit amount stored in the RAM 43, by the amount of coins having been bet (S11).

Next, the main CPU 41 determines whether the start button 23 is pressed (S12). In this process, the main CPU 41 determines whether an input signal output from the start switch 23S is received, when the start button 23 is pressed. If it is determined that the start button 23 is not pressed (S12: No), the process goes back to S10. Note that when the start button 23 is not pressed (e.g. when the start button 23 is not pressed, and an instruction to end the game is input), the main CPU 41 cancels the result from the reduction in S11.

On the other hand in S12, if it is determined that the start button 23 is pressed, the main CPU 41 executes a base game symbol determining process (S13).

FIG. 55 shows a base game symbol table indicating each symbol in a symbol column formed by display blocks, and code No. and random number associated with the symbol. Note that the first column is the leftmost column of the display blocks 28. In the base game symbol determining process, the main CPU 41 determines a code No. at the time of stopping the symbols, by running a symbol determining program stored in the RAM 43. Specifically, the main CPU 41 obtains a random number, and determines the code No. at the time of stopping each symbol column formed by the display blocks 28, based on the random number obtained and the base game symbol table. The base game symbol determining process is detailed later with reference to the drawings.

As illustrated in FIG. 55, there are 14 wild symbols 310*a* in the base game symbol table. The wild symbol 310*a* is a symbol substitutable for any symbol 310.

Next, in S14, the main CPU 41 performs a scroll display control process. This process is a display control whereby scrolling of symbols 310 is started and symbols 310 determined in S13 are rearranged thereafter.

Next, the main CPU 41 determines whether a winning is achieved (S15).

Figure 53:
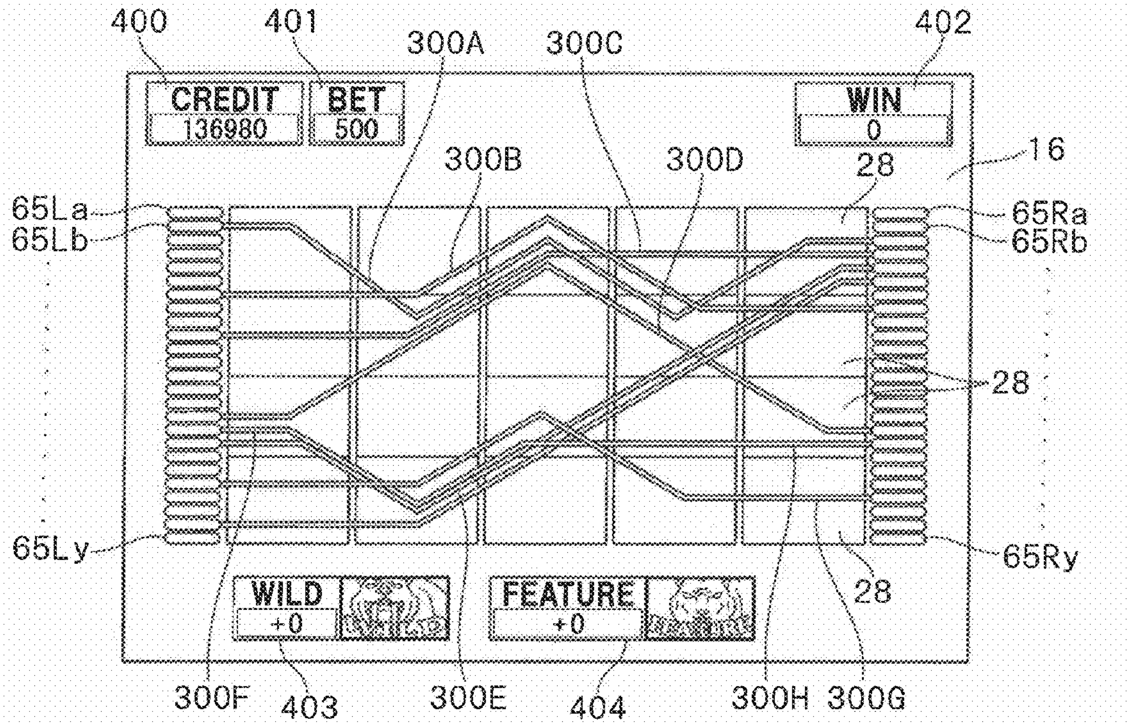
FIG. 53 shows an exemplary image displayed on the lower image display panel of a slot machine of fourth embodiment, according to the present invention.

The following describes achievement of winnings of the present embodiment. FIG. 53 shows an exemplary image displayed on the lower image display panel 16 of a slot machine 10 of an embodiment, according to the present invention. FIG. 56 shows relation between an amount of payout and the type and number of symbols 310 arranged on a payline.

On the left of the display blocks 28 are 25 payline occurrence parts 65L (65La to 65Ly), as illustrated in FIG. 53. Similarly, on the other hand, 25 payline occurrence parts 65R (65Ra to 65Ry) are arranged on the right of the display blocks 28.

Each payline occurrence part 65L is paired with one of the payline occurrence parts 65R. For each pair of the payline occurrence parts 65L and 65R, there is a prescribed payline 300 which extends from the payline occurrence part 65L to the payline occurrence part 65R paired with that payline occurrence part 65L. The payline 300A extends from the payline occurrence part 65Lb to payline occurrence part 65Rc. The payline 300B extends from the payline occurrence part 65Lg to payline occurrence part 65Rh. The payline 300C connects the payline occurrence part 65Lj with the payline occurrence part Rd. The payline 300D connects the payline occurrence part 65Lp with the payline occurrence part Rq. The payline 300E connects the payline occurrence part 65Lr with the payline occurrence part Re. The payline 300F connects the payline occurrence part 65Lq with the payline occurrence part Rr. The payline 300G connects the payline occurrence part 65Lu with the payline occurrence part 65Rv. The payline 300H connects the payline occurrence part 65Lx with the payline occurrence part 65Rf. Although there are 25 paylines 300, FIG. 53 only shows eight paylines 300 for the sake of easier understanding.

In the present embodiment, a winning is achieved when at least one type of symbols 310 out of "10", "J", "Q", "K", "REINDEER", "RHINO", "CLUB", and "BUFFALO" is rearranged in two or more display blocks 28 along a single payline 300. The wild symbol 310*a* is a symbol substitutable for any symbol 310. That is, when one "10" and one "WILD" is displayed along a single payline, it is deemed that two "10" symbols are arranged on the payline.

More specifically, in S15, the main CPU 41 counts the number of each type of symbols 310 rearranged along each payline 300 in S14. Then, the main CPU 41 determines if there is a counted value which equals or surpasses "2".

If it is determined that a winning is achieved, the main CPU 41 performs a process related to coin payout (S16). In this process, the main CPU 41 refers to the odds data stored in the RAM 43, and determines the amount of payout based on the number of certain symbols rearranged along the payline 300. The odds data is data indicating the number of certain symbols 310 rearranged along the payline 300 and the associated amount of payout (see FIG. 56). Note that the payout is doubled every "WILD" arranged on a winning-achieved payline 300. That is, if three "WILD" is displayed along the winning-achieved payline 300, the payout is eight times the original payout amount.

The present embodiment deals with a case where it is determined that a winning is achieved when at least one type of symbols 310 out of "10", "J", "Q", "K", "REINDEER", "RHINO", "CLUB", and "BUFFALO" is rearranged in two or more display blocks 28 along a single payline 300. The present embodiment however is not limited to this. For example, the paylines 300 may be omitted from the present invention, and it is possible to determine that a winning is achieved when at least one type of symbols 310 out of "10", "J", "Q", "K", "REINDEER", "RHINO", "CLUB", and "BUFFALO" is rearranged in any two or more display blocks 28.

Figure 54A:
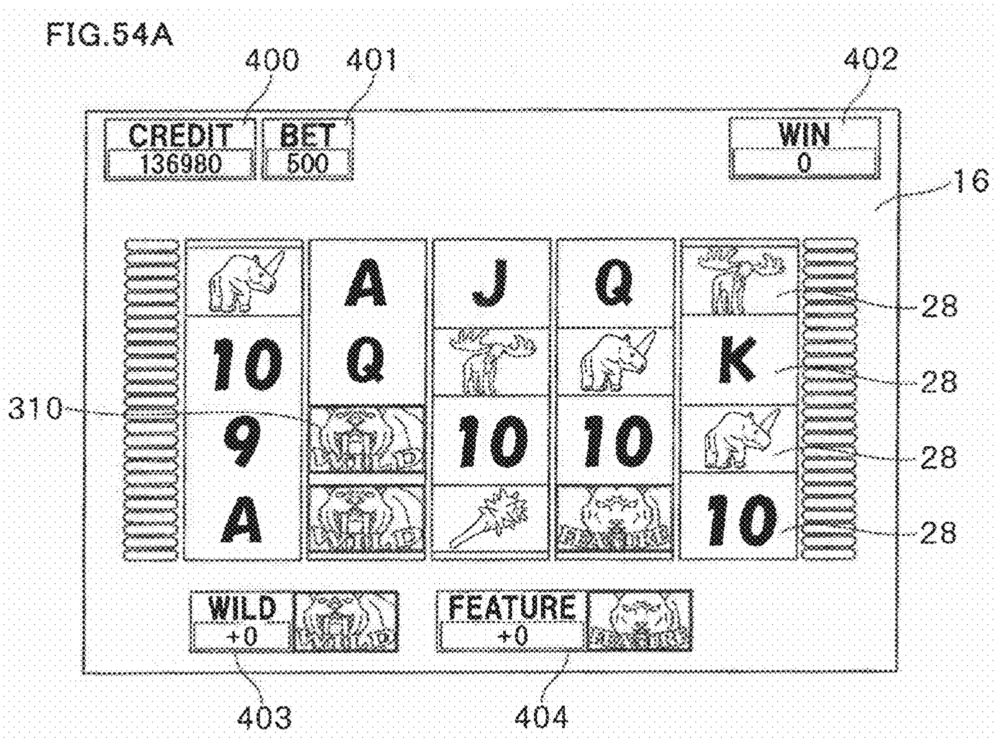
FIG. 54A shows an exemplary image displayed on the lower image display panel of a slot machine of fourth embodiment, according to the present invention.
Figure 54B:
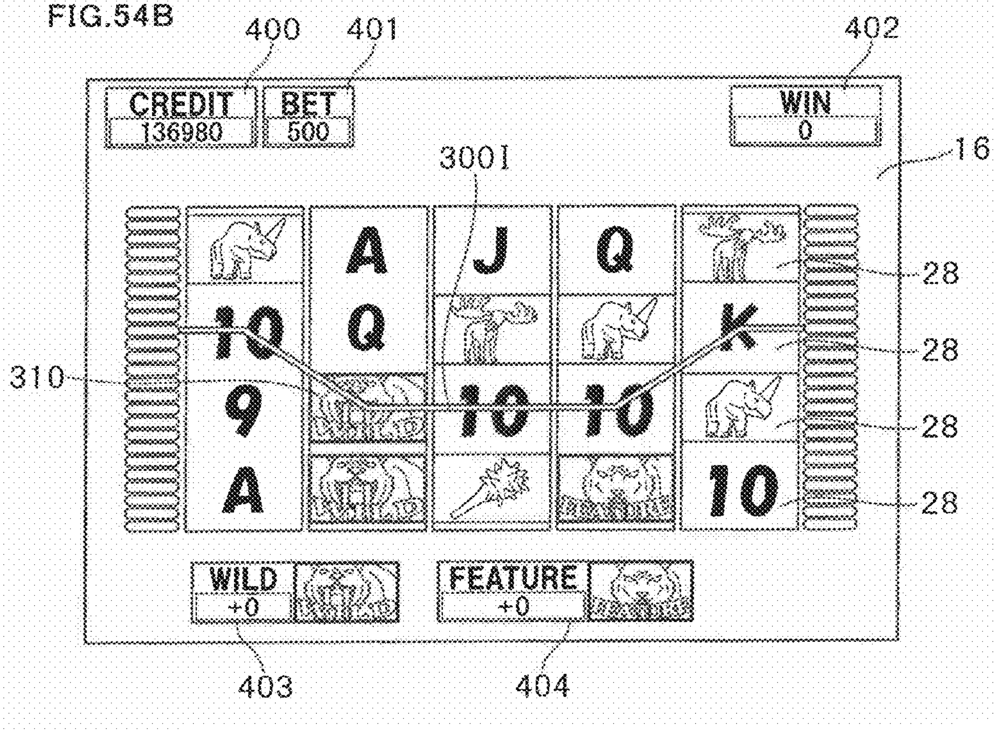
FIG. 54B shows an exemplary image displayed on the lower image display panel of a slot machine of fourth embodiment, according to the present invention.

Next, FIG. 54A shows an exemplary image displayed on the lower image display panel of a slot machine 10 of the present embodiment, according to the present invention. FIG. 54B shows an exemplary image displayed on the lower image display panel of a slot machine of the present embodiment, according to the present invention.

When symbols 310 are arranged as shown in FIG. 54A, after the scroll display control process of S14, a payline 300I as shown in FIG. 54B is displayed. Along the payline 300I are arranged three "10", one "WILD", and one "K". In this case, the symbol "10" is deemed as to be arranged in four blocks, and the amount of payout given from this combination will be 3000 coins which is the product of 500 coins placed as a bet multiplied by 6. Further, the symbol "K" is deemed as to be rearranged in two blocks, the amount of payout given from this combination will be 5000 coins which is the product of 500 coins placed as a bet multiplied by 10. Further, the payout is doubled every "WILD" arranged on a winning-achieved payline 300. Thus, the total amount of payout is 16000 coins which is a double of the sum of 3000 coins and 5000 coins (i.e. 8000 coins).

When accumulating the coins, the main CPU 41 performs a process for adding a credit amount corresponding to the amount of payout thus determined. On the other hand, when paying out the coins, the main CPU 41 transmits a control signal to the hopper 66 to pay out a predetermined amount of coins corresponding to the amount of payout determined.

On the other hand, when it is determined that a winning is not achieved in S15 or after S16, the main CPU 41 determines whether three or more feature symbols 310*b* are rearranged (S17). In this process, whether or not three or more feature symbols 310*b* are rearranged in the display blocks 28 is determined, without taking into consideration the payline 300.

In S17, when it is determined that three or more feature symbols 310*b* are rearranged, the main CPU 41 executes a feature game running process (S18). In the feature game running process, the feature game is run with an increased number of the wild symbols 310*a*. The feature game running process is detailed later with reference to FIG. 65.

In S17, when it is determined that three or more feature symbols 310*b* are not rearranged or after S18, the main CPU 41 executes a rescue process (S19). The rescue process is detailed later with reference to FIG. 70. After the process of S19, the main CPU 41 ends this sub routine.

Figure 64:
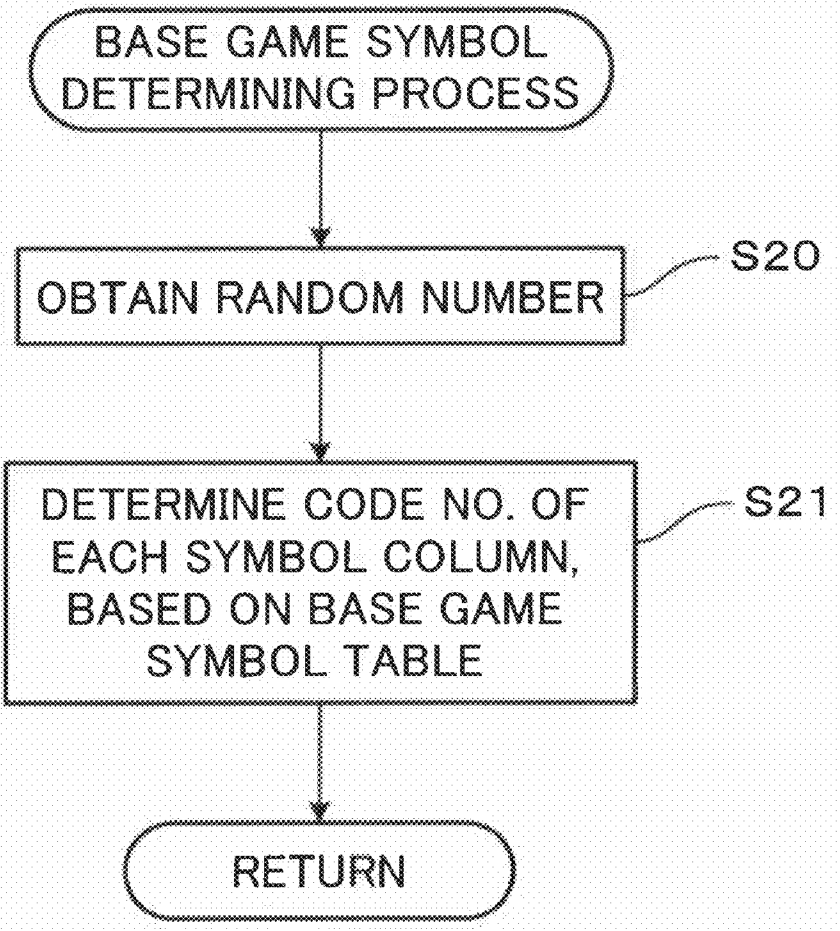
FIG. 64 is a flowchart showing a sub routine of the base game symbol determining process.

FIG. 64 is a flowchart showing a sub routine of the base game symbol determining process. This process is executed by the main CPU 41 running a symbol determining program stored in the RAM 43.

First the main CPU 41 obtains the random number from the random number generating circuit 64 (S20). In this process, the main CPU 41 obtains five random numbers corresponding to the symbol columns of the display blocks 28.

Next, the main CPU 41 determines the code No. of the symbol column of the display block 28, at the time of stopping the symbols, based on the five random numbers obtained and the base game symbol table (see FIG. 55) (S21). For example, when the random number for the first column is 23035, the code No. for the first column is 07. Note that the code number of a symbol column corresponds to the code number of a symbol rearranged in the first row of the display blocks 28, amongst those arranged in four rows. After the process of S21, the main CPU 41 ends this sub routine.

The present embodiment deals with a case where the random number generating circuit 64 is provided and a random number (so-called hardware random number) is sampled from the random number generating circuit. However, the present invention may be adapted so that a random number is generated in a program (so-called software random number).

(Feature Game Running Process)

Figure 65:
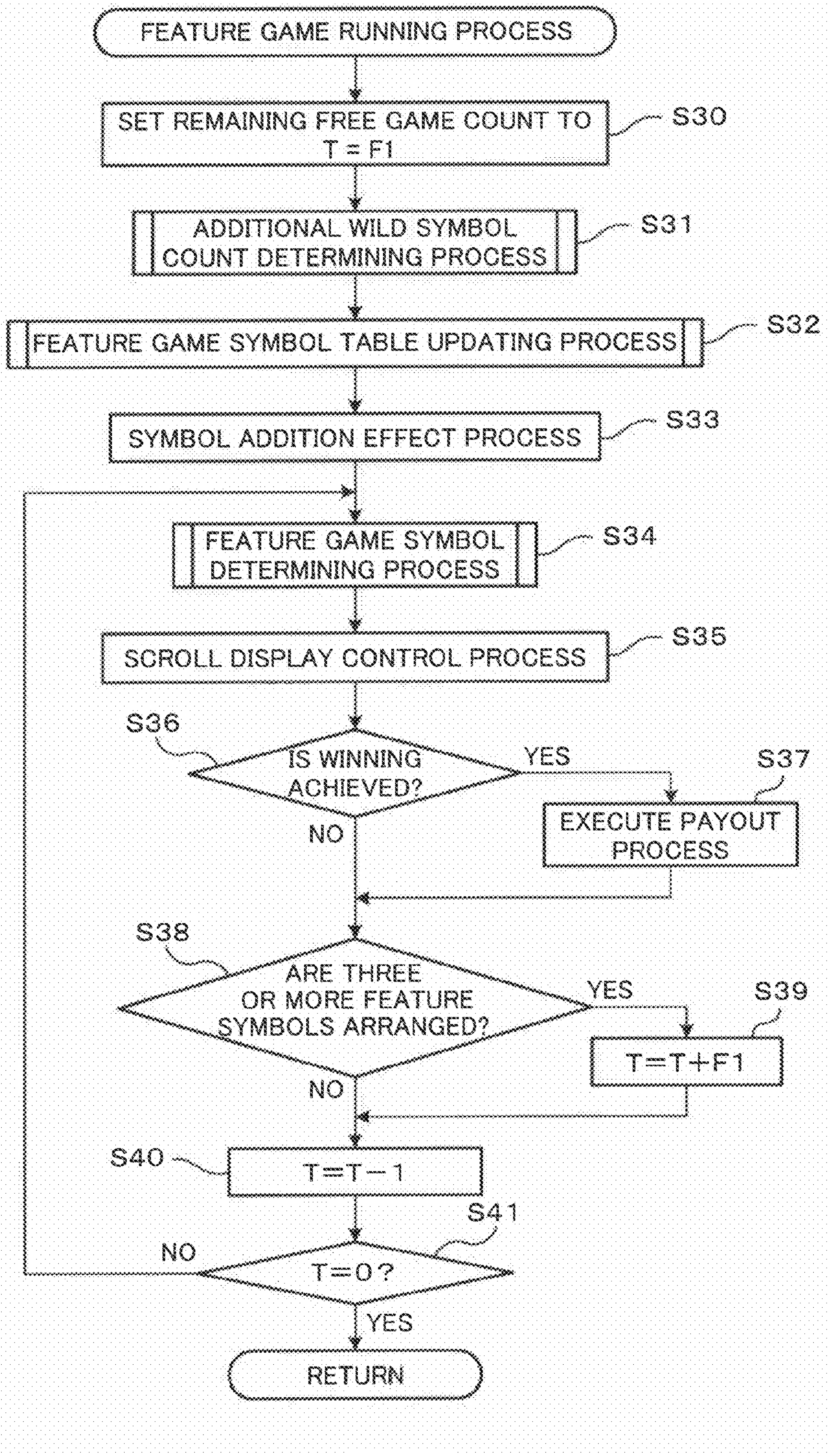
FIG. 65 is a flowchart showing a sub routine of the feature game running process.

Next, the following describes a feature game running process, with reference to FIG. 65. FIG. 65 is a flowchart showing a sub routine of the feature game running process. A feature game is a game which allows the player to play without requiring a bet of a coin. First, the main CPU 41 sets a remaining free game count T to T=F1(=first specific number of times=20) in the free game count storage area of the RAM 43 (S30).

Next, the main CPU 41 displays a feature game occurrence image on the lower image display panel 16.

Next, the main CPU 41 executes an additional wild symbol count determining process (S31). In the additional wild symbol count determining process, the main CPU 41 determines the number of additional wild symbols 310*a* based on a selectable image 302 selected by the player (See FIG. 66A). The additional wild symbol count determining process is detailed later with reference to the drawings.

Further, the main CPU 41 executes a feature game symbol table updating process (S32). In the feature game symbol table updating process, the main CPU 41 updates the feature game symbol table based on an increase in the number of wild symbols 310*a* determined in the additional wild symbol count determining process. The feature game symbol table updating process is detailed later with reference to the drawings.

In S33, the main CPU 41 executes a symbol addition effect process. The symbol addition effect process is detailed later with reference to the drawings.

Next, the main CPU 41 executes a feature game symbol determining process (S34).

Note that FIGS. 60A and 60B shows exemplary feature game symbol tables indicating (i) a symbol of a display block forming a symbol column and (ii) a code No. and a random number associated with the symbol.

In the feature game symbol table, the wild symbol 310*a* is added or replaces another symbol 310. The wording "replacing" means that new symbol data is written over already existing symbol data. The wording "added" means that a new set symbol data is added to the already existing sets of symbol data, thus increasing the number of sets of symbol data. The number of additional symbols or the number of symbols replacing the other symbols, or the symbol column in which the addition or replacement takes place may be randomly determined or determined beforehand. In the present embodiment, an increase is determined based on the additional wild symbol count determination table of FIG. 57. When symbol data is replaced with another set of symbol data, an image based on the overwritten data (replacement data) may be displayed, in place of a symbol 310 having been stopped and displayed.

The feature game symbol table shown in FIGS. 60A and 60B is stored in the RAM 43 through the later-mentioned feature game symbol table updating process.

In the feature game symbol determining process, the main CPU 41 determines a code No. at the time of stopping the symbols 310, by running a symbol determining program stored in the RAM 43. More specifically, the main CPU 41 obtains a random number, and determines the code No. of each symbol column of the display blocks 28, at the time of stopping the symbols 310, based on the random number obtained, and the feature game symbol table. The feature game symbol determining process is detailed later with reference to the drawings.

Next, in S35, the main CPU 41 performs a scroll display control process. This process is a display control whereby scrolling of symbols 310 is started and symbols 310 determined in S34 are rearranged thereafter.

Next, the main CPU 41 determines whether a winning is achieved (S36). In the present embodiment, a winning is achieved when at least one type of symbols 310 out of "10", "J", "Q", "K", "REINDEER", "RHINO", "CLUB", and "BUFFALO" is rearranged in two or more display blocks 28 along a single payline 300, as is mentioned hereinabove. The "WILD" which is the wild symbol 310*a* is a symbol substitutable for any type of symbol 310. In the feature game, the number of wild symbols 310*a* is increased compared to that of the base game. Therefore, the possibility of winning is higher.

In S36, the main CPU 41 counts the number of each type of symbols 310 rearranged along each payline 300 in S34. Then, the main CPU 41 determines if there is a counted value which equals or surpasses "2".

If it is determined that a winning is achieved, the main CPU 41 performs a process related to coin payout (S37). Further explanation is omitted here, since this process is similar to S16.

On the other hand, when it is determined in S36 that a winning is not achieved or after S36, the main CPU 41 determines whether three or more feature symbols 310*b* are rearranged (S38). In this process, whether or not three or more feature symbols 310*b* are rearranged in the display blocks 28 is determined, without taking into consideration the payline 300.

When it is determined in S38 that three or more feature symbols 310*b* are rearranged, the main CPU 41 sets the remaining free game count stored in the free game count storage area of the RAM 43 so that T=T+F1, where F1 is the first specific number of times (20 times in the present embodiment) (S39).

When it is determined in S38 that the number of feature symbols 310*b* rearranged is less than three or after S39, the main CPU 41 sets the remaining free game count stored in the free game count storage area of the RAM 43 so that T=T−1 (S40).

Next, the main CPU 41 determines whether T=0 based on the remaining game count data stored in the free game count storage area of the RAM 43 (S41).

When it is determined that it is not T=0, the main CPU 41 brings the process back to S34. On the other hand, when it is determined that T=0, the main CPU 41 ends this sub routine.

(Additional Wild Symbol Count Determining Process)

Next, the following describes the additional wild symbol count determining process of S31 shown in FIG. 65.

Figure 66A:
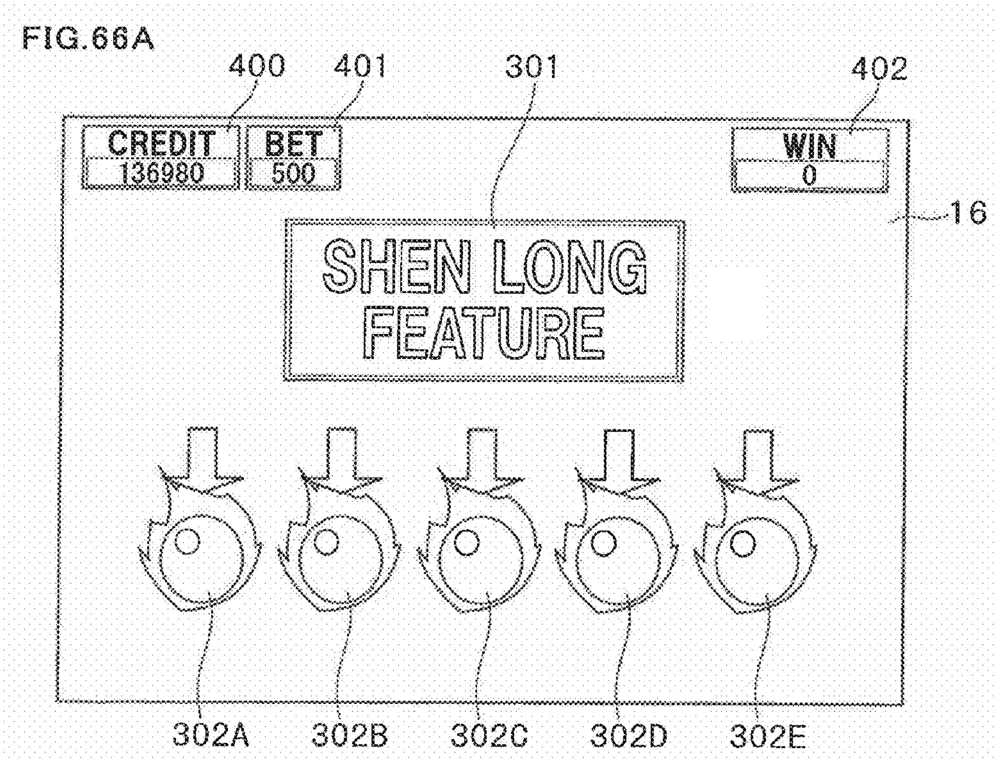
FIG. 66A shows an exemplary image displayed on the lower image display panel of a slot machine of fourth embodiment, according to the present invention.
Figure 66B:
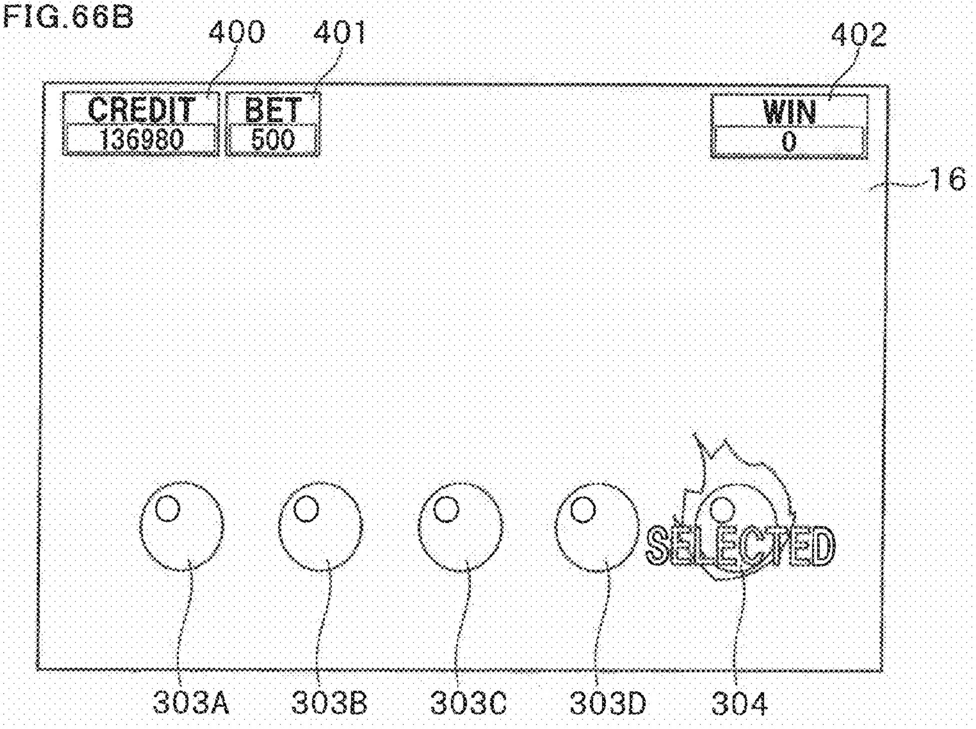
FIG. 66B shows an exemplary image displayed on the lower image display panel of a slot machine of fourth embodiment, according to the present invention.
Figure 66C:
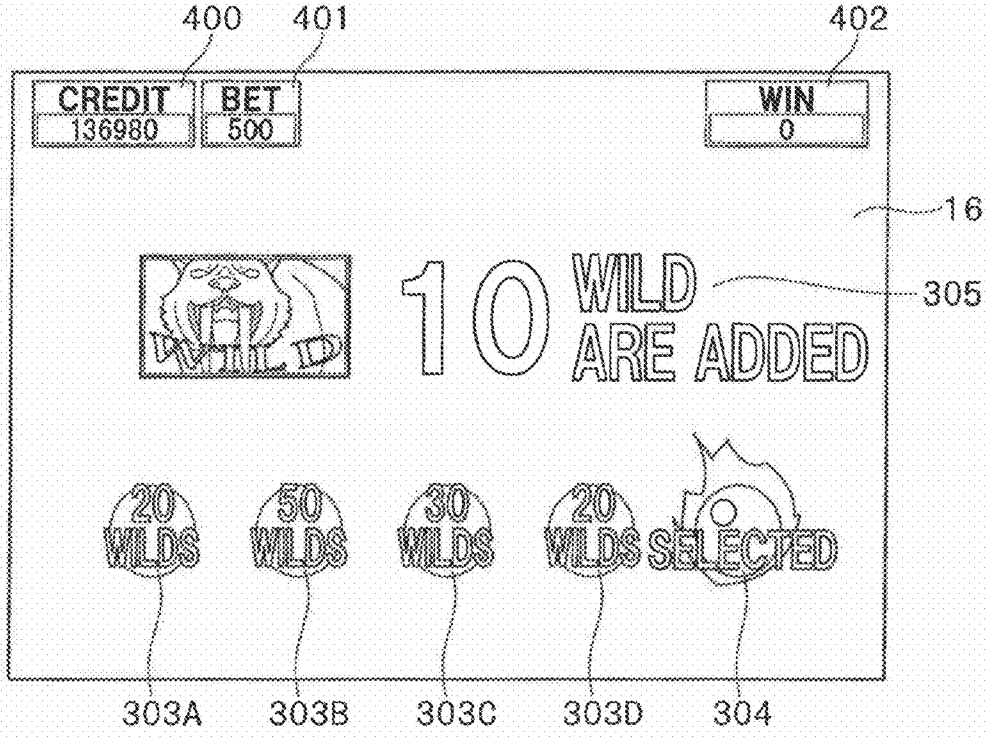
FIG. 66C shows an exemplary image displayed on the lower image display panel of a slot machine of fourth embodiment, according to the present invention.

Each of FIGS. 66A to 66C shows an exemplary image displayed on the lower image display panel 16 of the slot machine 10 of the present embodiment, according to the present invention.

The lower image display panel 16 displays an image as shown in FIG. 66A, when three feature symbols 310*b* are rearranged. As shown in FIG. 66A, a feature game start image 301 is displayed at the center portion of the lower image display panel 16.

Further, lower portion of the lower image display panel 16 displays five selectable images 302 (302A to 302E). A player is able to select any of the selectable images 302 by touching the touch panel 69 on the lower image display panel 16 by his/her finger or the like. Based on the selectable image 302 selected by the player, an increase in the number of wild symbols 310*a* is determined.

For example, as illustrated in FIG. 66B, when the player selects the selectable image 302E, a selection image 304 is displayed in place of the selectable image 302E on the lower image display panel 16. Further, not-selected images 303 (303A to 303D) are respectively displayed in places of the selectable images 302 which were not selected.

After an image shown FIG. 66B is displayed, a determined-increase image 305 which indicates the number of additional wild symbols 310*a* is displayed at the center portion of the lower image display panel 16, as illustrated in FIG. 66C. In FIG. 66C, the determined-increase image 305 indicates that the number of wild symbols 310*a* is increased by ten.

Figure 67:
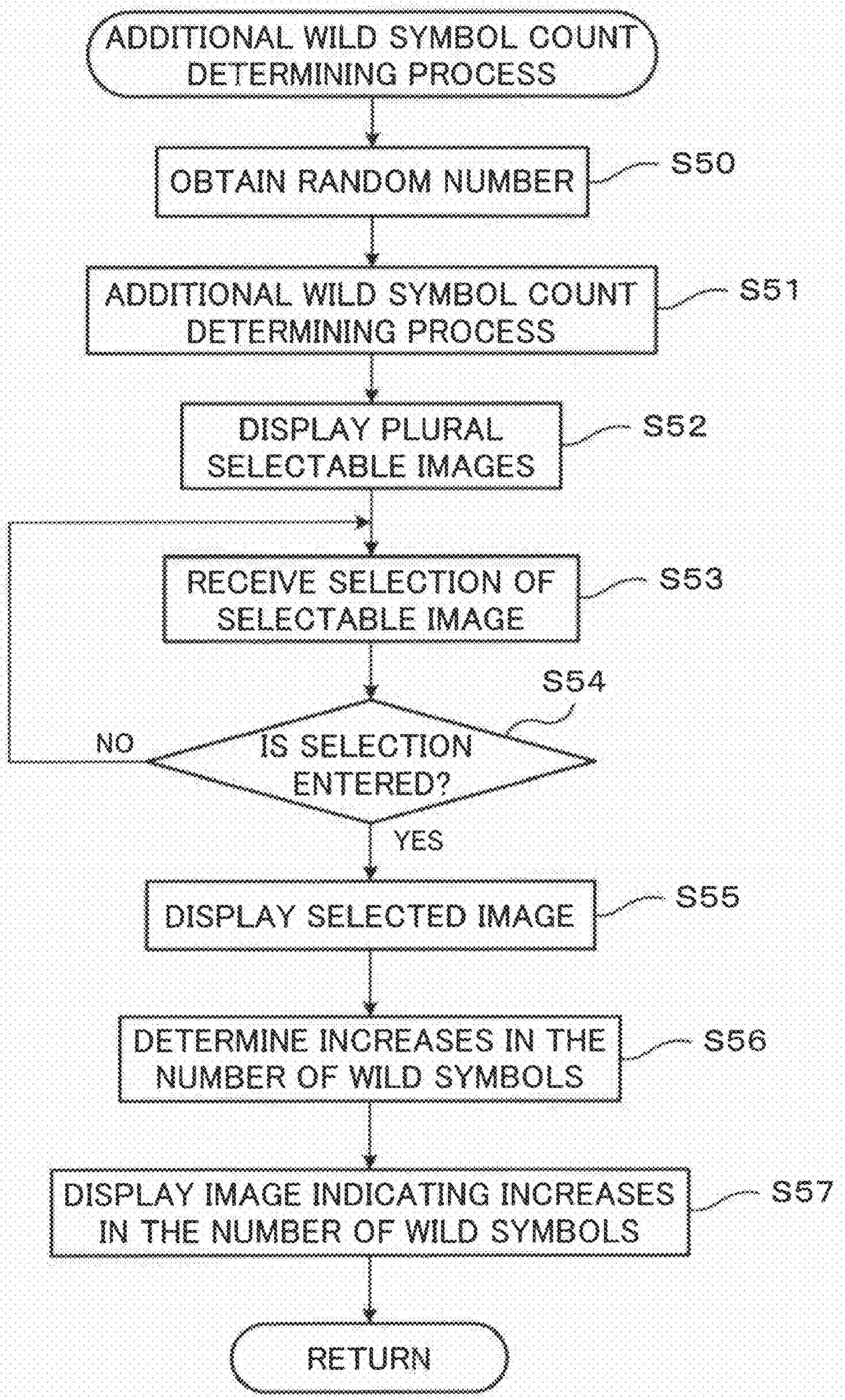
FIG. 67 is a flowchart showing a sub routine of an additional wild symbol count determining process.

FIG. 67 is a flowchart showing a sub routine of an additional wild symbol count determining process.

First the main CPU 41 obtains the random number from the random number generating circuit 64 (S50). In this process, the main CPU 41 obtains five random numbers for the selectable images 302 (302A to 302E) of FIG. 66A.

Next, the main CPU 41 associates, with each of the selectable images 302, a number by which the number of wild symbols are increased (S51). In this step, the main CPU 41 determines the number by which the number of wild symbols are increased, for each of the selectable images 302, based on the random numbers obtained in S50, and the additional wild symbol count determination table of FIG. 57.

FIG. 57 shows an additional wild symbol count determination table.

The additional wild symbol count determination table indicates a list of additional wild symbol counts and associated random numbers.

For example, where random numbers corresponding to the selectable images 302A to 302E are 17235, 63123, 32387, 22332, and 3423 respectively, the amounts of increase in the number of wild symbols, associated to these images are 20, 50, 30, 20, and 10 respectively.

Next, the main CPU 41 displays selectable images 302A to 302E at the lower portion of the lower image display panel 16 (S52). Next, the main CPU 41 allows an entry of player's selection of any of the selectable images 302 (S53).

Next, the main CPU 41 determines whether a player-selection of any of the selectable images 302 is input (S54). In this process, the main CPU 41 determines whether a selection input signal in relation to the selectable images 302 is received from the touch panel 69. When a finger or the like of a player touches a selectable image 302E or the nearby area on the lower image display panel 16, a selection input signal in relation to the selectable images 302E is transmitted from the touch panel 69 to the main CPU 41. When it is determined that there is no input of the player-selection of any of the selectable images 302, the main CPU 41 brings back the process to S53.

On the other hand, when it is determined in S54 that a player-selection of any of the selectable images 302 is input, the main CPU 41 displays a selection image 304 (see FIG. 66B) (S55)

Next, the main CPU 41 sets the number associated with the selectable image 302 selected by the player as the number by which the number of the wild symbols 310*a* increases (S56).

For example, when the amounts of increase in the number of wild symbols associated with the selectable images 302A to 302E are 20, 50, 30, 20, and 10 respectively, and when the player selects the selectable image 302E, the amount of increase in the number of the wild symbols is set to 10. Next, the main CPU 41 displays, at the center portion of the lower image display panel 16, a determined-increase image 305 (see FIG. 66C) indicating the amount of increase in the number of wild symbols 310*a* (S56).

After S57, the main CPU 41 ends this sub routine.

The present embodiment deals with a case where the number associated with each selectable image 302, by which number the number of wild symbols is increased, is determined based on a random number obtained and the additional wild symbol count determination table of FIG. 57. The present invention however is not limited to this, and the number associated with each selectable image 302 may be determined in advance.

(Feature Game Symbol Table Updating Process)

Figure 68:
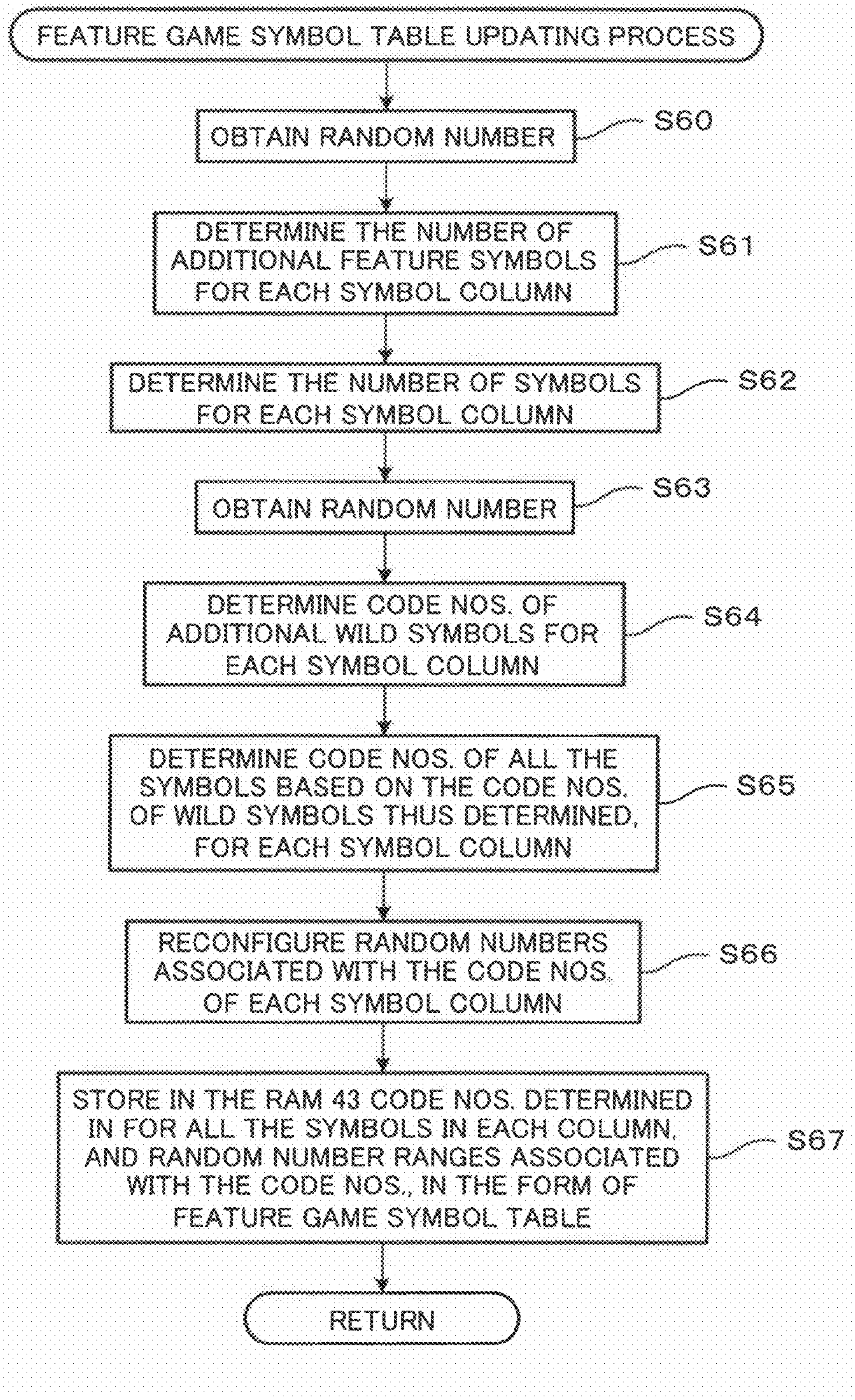
FIG. 68 is a flowchart showing a sub routine of feature game symbol table updating process.

FIG. 68 is a flowchart showing a sub routine of feature game symbol table updating process.

First the main CPU 41 obtains the random number from the random number generating circuit 64 (S60). In this process, the main CPU 41 obtains the same number of random numbers as the number of additional wild symbols 310*a* determined in S55.

Next, the main CPU 41 determines the number of additional wild symbols 310*a* for each symbol column (S61). In this process, the main CPU 41 determines the number of additional wild symbols 310*a* for each symbol column based on the random numbers obtained in S60 and the symbol column determination table of FIG. 58.

FIG. 58 is a diagram of a symbol column determination table.

The symbol column determination table indicates a symbol column No. and a random number associated with the symbol column. The symbol column No. 1 corresponds to the first column of the display blocks 28; the symbol column No. 2 to the second column of the display blocks 28; the symbol column No. 3 to the third column of the display blocks 28; the symbol column No. 4 to the fourth column of the display blocks 28; and the symbol column No. 5 to the fifth column of the display blocks 28.

For example, suppose the random numbers obtained in S60 are 2313, 3123, 12382, 17325, 28768, 30223, 45235, 48766, 58776, and 62356. In this case, the symbol column No. 1 (first column) increases by three. Likewise, the number of wild symbols 310*a* in the symbol column No. 2 (second column) increases by one. The number of wild symbols 310*a* in the symbol column No. 3 (third column) increases by two. The number of wild symbols 310*a* in the symbol column No. 4 (fourth column) increases by two. The number of wild symbols 310*a* in the symbol column No. 5 (fifth column) increases by two.

The present embodiment deals with a case where the number of additional wild symbols 310*a* is determined for each symbol column based on the random numbers obtained and the symbol column determination table of FIG. 58. The present invention however is not limited to this. For example, the number of additional wild symbols 310*a* may be determined in advance for each of the symbol columns, in the additional wild symbol count determining process.

Next, the main CPU 41 determines the number of symbols in each symbol column (S62). In this process, the main CPU 41 determines a total number of symbols in each symbol column based on the number of additional wild symbols 310*a* determined in S61 for each symbol column. Specifically, the total number of symbols in each symbol column is the sum of the number of additional wild symbols determined in S61 and "20" which is the number of symbols in each symbol column indicated in the base game symbol table.

First, the main CPU 41 obtains random numbers from the random number generating circuit 64 (S63). In this process, the main CPU 41 obtains the same number of random numbers as the number of additional wild symbols 310*a* determined in S61 for each symbol column. That is, when the number of additional wild symbols 310*a* for the symbol column No. 1 (first column), three random numbers are obtained for the symbol column No. 1.

Next, for each symbol column, the main CPU 41 determines code No. of each wild symbol 310*a* to be added to the symbol column, based on the random numbers obtained in S63 and the code No. determination table of FIG. 59 (S64).

FIG. 59 shows a code No. determination table.

The code number determination table indicates a code number and a random number associated with the code number For example, when the random numbers for the symbol column No. 1 (the first column) are 40567, 63535, 65323, then "13", "end", and "end" are selected as the code numbers, respectively.

The present embodiment deals with a case where the code No. of each wild symbol 310*a* to be added is determined for each of the symbol columns based on the random numbers obtained and code No. determination table of FIG. 59. The present invention however is not limited to this. For example, the code No. of each wild symbol 310*a* to be added may be determined in advance for each symbol column.

Next, for each symbol column, the main CPU 41 determines code No. of each symbol based on the code No. of the wild symbol 310*a* determined in S64 (S65). In this process, to each symbol column indicated by the base game symbol table of FIG. 55, addition or replacement of wild symbols 310*a* is performed based on the code No. of the wild symbols 310*a* determined in S64. For example, when it is determined in S64 that code Nos. of wild symbols 310*a* to be added to the symbol column No. 1 (first column) are "13", "end", and "end", a wild symbol "WILD" is assigned to code No. 13 of the symbol column No. 1 in the base game symbol table. The symbol "REINDEER" which is originally assigned to code No. 13 is shifted to code No. 14, and the following symbols are shifted likewise. Since there are two specific symbols whose code Nos. are "end", the wild symbol "WILD" is added to the code No. 21 and No. 22 which are ends of the symbol column No. 1. For other symbol columns, code No. of each symbol is determined in the similar manner.

The main CPU 41 reconfigures the random numbers associated with the code Nos. of each symbol column (S66). In this process, the main CPU 41 reconfigures each code No. and the associated random numbers within the range of 0 to 65535, based on the total symbol count of each symbol column determined in S62.

The main CPU 41 stores in the RAM 43 the code Nos. determined in S65 for all the symbols in each symbol column, and random numbers associated with the code Nos. which is determined in S66, in the form of feature game symbol table (S67). The feature game symbol table stored in the RAM 43 is referred to at the time of executing a feature game symbol determining process.

Each of FIGS. 60A and 60B shows an exemplary feature game symbol table indicating each symbol 310 in a symbol column formed by display blocks, and code No. and random number associated with the symbol 310.

As is understood from FIG. 60A, wild symbols 310*a* are added to the code Nos. 13, 21 and 22 of the symbol column No. 1 (first column). Further, a wild symbol 310*a* is added to the code No. 12 of the symbol column No. 2 (second column). Further, a wild symbol 310*a* is added to the code Nos. 6 and 13 of the symbol column No. 3 (third column). Further, as is understood from FIG. 60*b*, a wild symbol 310*a* is added to the code Nos. 11 and 12 of the symbol column No. 4 (fourth column). Further, wild symbols 310*a* are added to the code Nos. 19 and 20 of the symbol column No. 5 (fifth column).

After the process of S67, the main CPU 41 ends this sub routine.

(Feature Game Symbol Determining Process)

Figure 69:
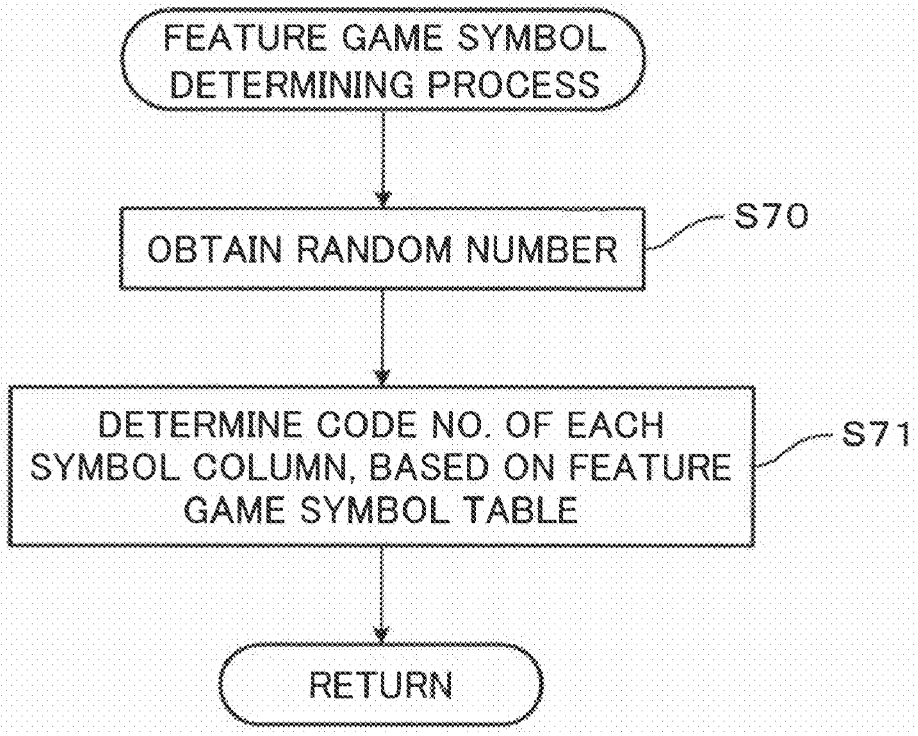
FIG. 69 is a flowchart showing a sub routine of the feature game symbol determining process.

FIG. 69 is a flowchart showing a sub routine of the feature game symbol determining process.

This process is executed by the main CPU 41 running a symbol determining program stored in the RAM 43.

First the main CPU 41 obtains the random number from the random number generating circuit 64 (S70). In this process, the main CPU 41 obtains five random numbers corresponding to the symbol columns of the display blocks 28.

Next, the main CPU 41 determines the code No. of the symbol column of the display block 28, at the time of stopping the symbols 310, based on the five random numbers obtained and the feature game symbol table (S71). For example, when the random number for the first column is 23035, the code No. for the first column is 08. Note that the code number of a symbol column corresponds to the code number of a symbol 310 rearranged in the first row of the display blocks 28, amongst those arranged in four rows.

After the process of S71, the main CPU 41 ends this sub routine.

(Rescue Process)

Figure 70:
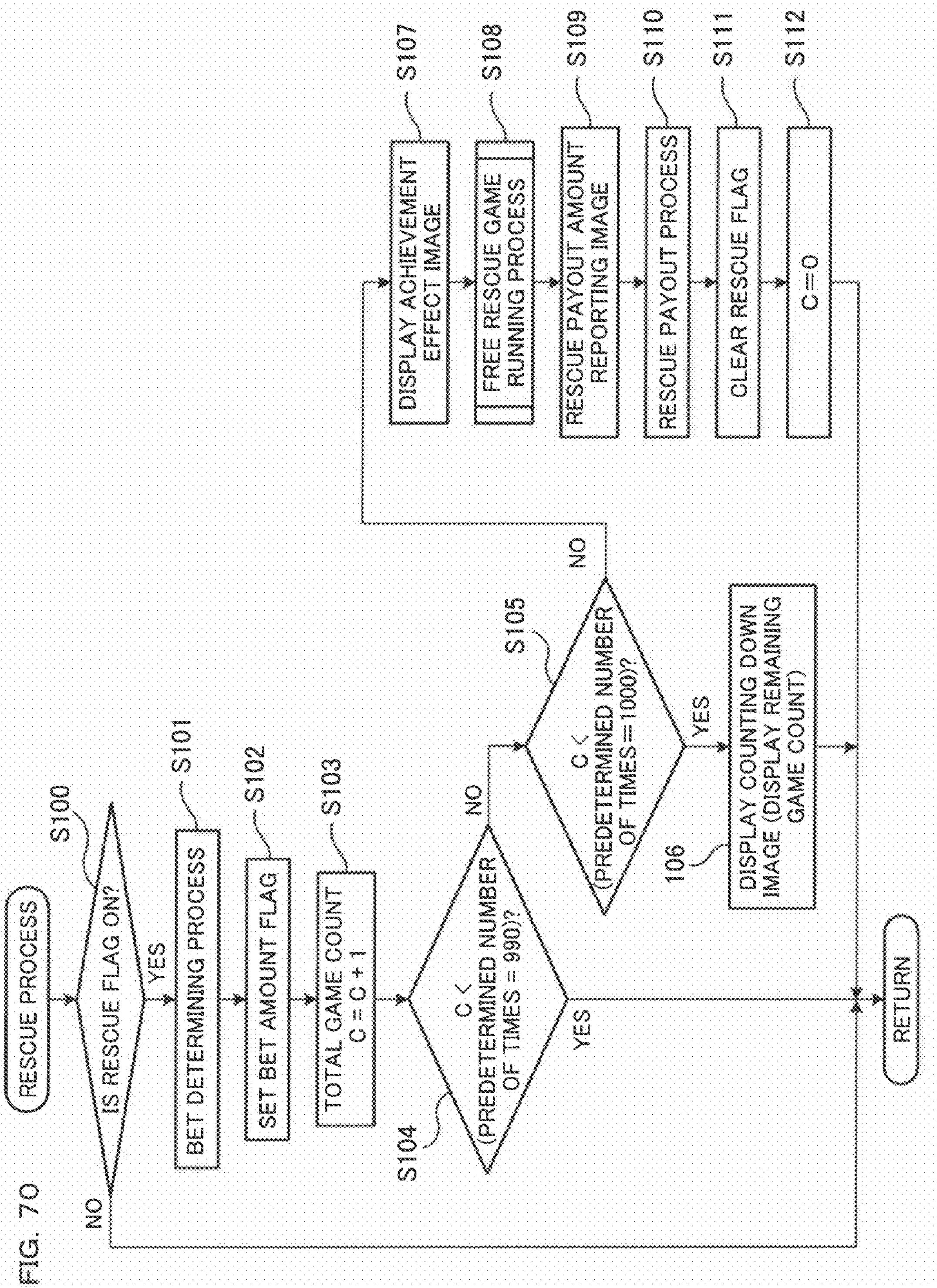
FIG. 70 is a flowchart indicating a sub routine of a rescue process.

Nest, the following describes with reference to FIG. 70 the rescue process performed in S19 of FIG. 63. FIG. 70 is a flowchart indicating a sub routine of a rescue process.

First, the main CPU 41 determines whether a rescue flag is set (S100). A rescue flag is a flag which is set when the rescue bet button 90 is operated (see S122 of FIG. 71).

Figure 71:
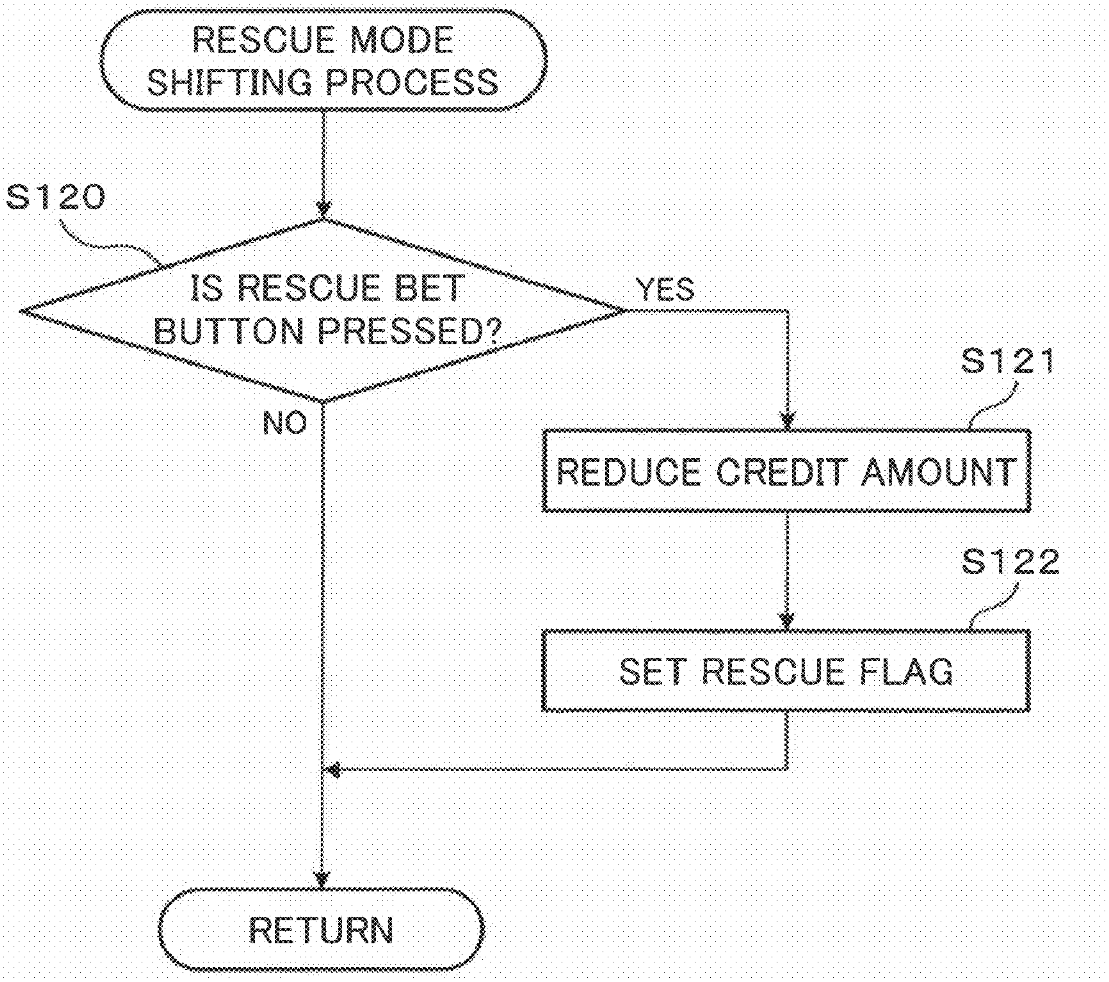
FIG. 71 is a flowchart indicating a sub routine of rescue mode shifting process.

The following describes the rescue flag with reference to FIG. 71. FIG. 71 is a flowchart indicating a sub routine of rescue mode shifting process.

First, the main CPU 41 determines whether the rescue bet button 90 is pressed at a predetermined timing (S120). In this process, the main CPU 41 determines whether an input signal output from the rescue bet switch 90S when the rescue bet button 90 is pressed is received.

When it is determined that the rescue bet button 90 is not pressed, the main CPU 41 ends this sub routine.

On the other hand, when it is determined that the rescue bet button 90 is pressed, the main CPU 41 subtract a predetermined amount (10 dollars in this embodiment) from the credited amount stored in the RAM 43 (S121).

Then, the main CPU 41 sets the rescue flag (S122) and ends this sub routine thereafter.

Note that, when the above predetermined amount surpasses the credited amount stored in the RAM 43, the main CPU 41 ends this sub routine without performing S121 and S122.

Thus, the rescue flag is described hereinabove with reference to FIG. 71. Return now to FIG. 70.

In S100, when it is determined that the flag is not set, the main CPU 41 ends this sub routine.

On the other hand in S100, if it is determined that the rescue flag is set, the main CPU 41 executes a bet amount determining process (S101). In this process, there is determined whether the bet amount entered by the player in the base game is the maximum bet. After the bet amount determining process, the main CPU 41 sets a bet amount flag (S102). Then, the main CPU 41 sets the total game count C in the total game count storage area of the RAM 43 so that C=C+1 (S103).

Next, the main CPU 41 determines whether the total game count C is less than a notified setting value (990 times), based on the total game count data stored in the total game count storage area of the RAM 43 (S104).

When the total game count C is less than the notified setting value (990 times), the main CPU 41 ends this sub routine (S102: Yes).

On the other hand, when it is determined that the total game count C equals or surpasses the notified setting value, the main CPU 41 determines whether the total game count C is less than a predetermined number of times (1000 times in the present embodiment) (S104).

When it is determined that the total game count C is less than the predetermined number of times, the main CPU 41 displays a counting down image 501 on the lower image display panel 16. The counting down image 501 is an image indicating the number of games remaining before the number of base games having been played reaches the predetermined number of times (1000 times).

Figure 72A:
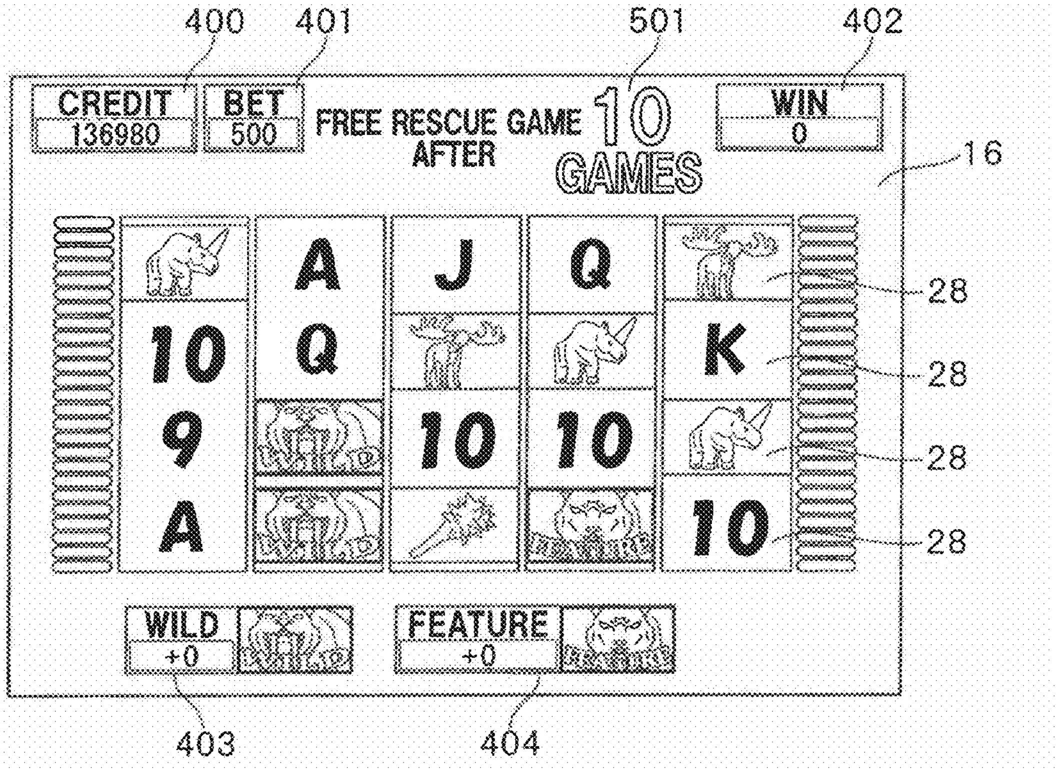
FIG. 72A shows an exemplary image displayed on the lower image display panel of a slot machine of fourth embodiment, according to the present invention.
Figure 72B:
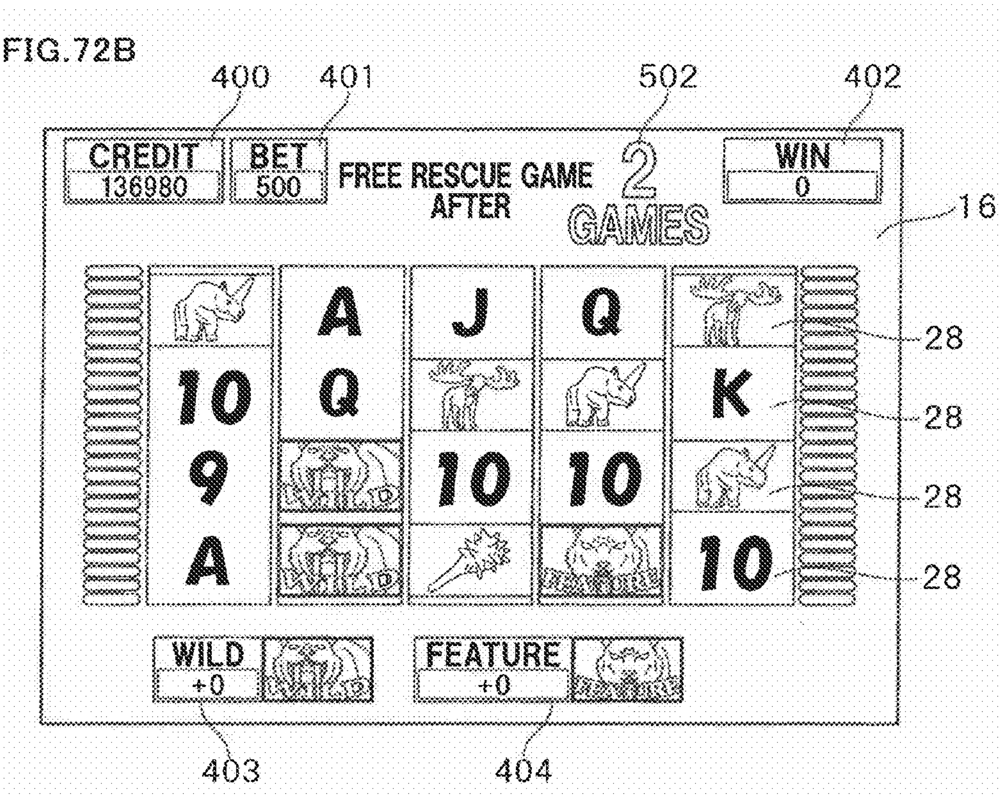
FIG. 72B shows an exemplary image displayed on the lower image display panel of a slot machine of fourth embodiment, according to the present invention.
Figure 72C:
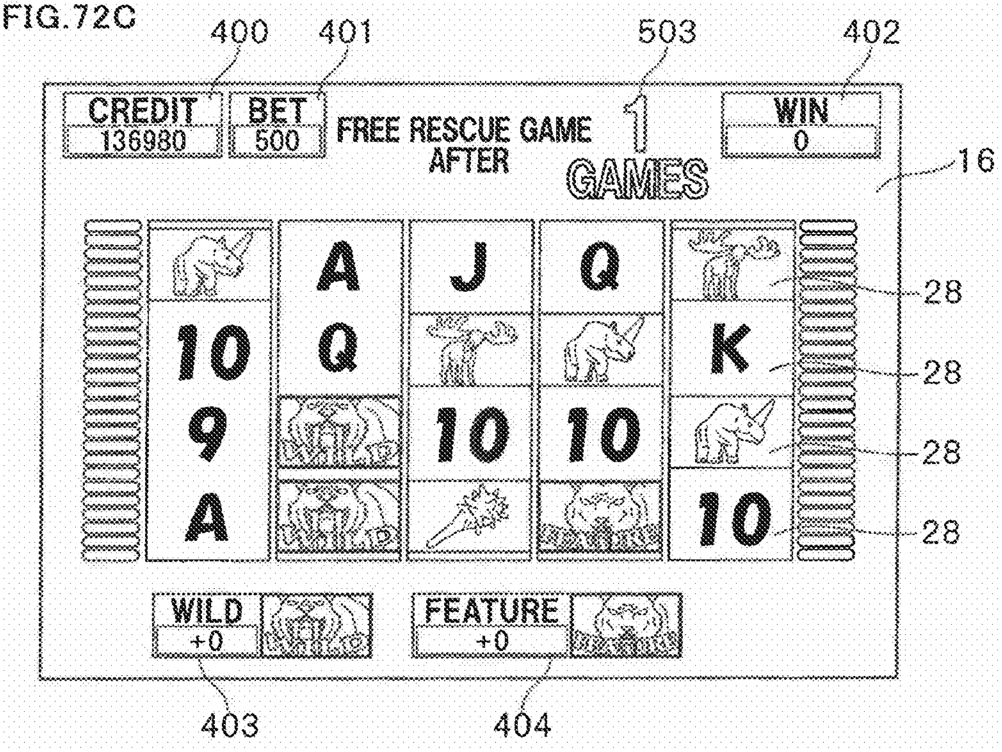
FIG. 72C shows an exemplary image displayed on the lower image display panel of a slot machine of fourth embodiment, according to the present invention.

Here, with reference to FIG. 72A to FIG. 72C, the following describes how the remaining number of games is reduced until the counted base game reaches the predetermined number of times (1000 times).

Note that FIG. 72 to FIG. 72C are diagrams each showing an exemplary image displayed on the lower image display panel 16.

FIG. 72C shows the number of base games counted reaches the predetermined number (1000 times) of times after ten more games. FIG. 72B shows the number of base games counted reaches the predetermined number of times (1000 times) after two more games. FIG. 72C shows the number of base games counted reaches the predetermined number of times (1000 times) after one more game.

After the process of S106, the main CPU 41 ends this sub routine.

When it is determined in S105 that the total game count C equals the predetermined number of times (1000 times), the main CPU 41 displays a achievement effect image on the lower image display panel 16.

Next, the main CPU 41 executes a free rescue game running process (S108). The free rescue game running process is detailed later with reference to FIG. 74.

Next, the main CPU 41 displays the rescue payout amount reporting image (see FIG. 75) on the lower image display panel 16 (S109).

Figure 75:
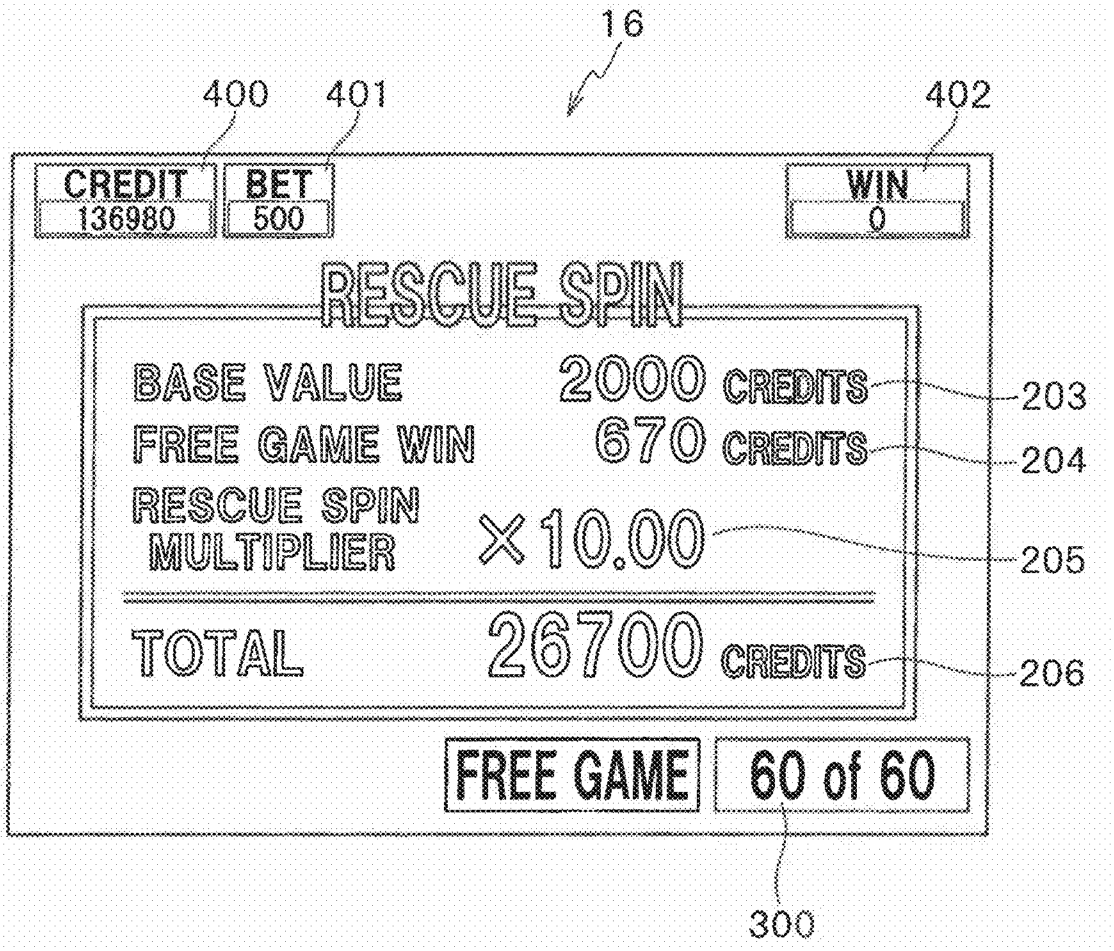
FIG. 75 shows an exemplary image displayed on the lower image display panel of a slot machine of fourth embodiment, according to the present invention.

The following describes the rescue payout amount reporting image with reference to FIG. 75.

FIG. 75 is a diagram showing an exemplary image displayed on the lower image display panel. The rescue payout amount reporting image includes: a fixed payout image 203, a free rescue game total payout image 204, a rescue multiplier image 205, and a rescue payout image 206.

The fixed payout image 203 indicates a predetermined number (e.g. 2000). This number is referred to as "BASE VALUE".

The free rescue game total payout image 204 indicates the number of coins corresponding to the free rescue game total payout amount. This number is referred to as "FREE GAME WIN".

The rescue multiplier image 205 indicates the total number of feature symbols 310*b* rearranged in the free rescue game (feature symbol count). This number is referred to as "RESCUE MULTIPLIER".

The rescue payout image 206 indicates the total number of coins to be paid out when the number of base games counted reaches the predetermined number (e.g. 1000 times).

In the present embodiment, the number of coins paid out as insurance is calculated by multiplying the sum of "BASE VALUE" and "FREE GAME WIN" by the "RESCUE MULTIPLIER".

In the example illustrated in FIG. 75, the "BASE VALUE" is 2000, the "FREE GAME WIN" is 670, and "RESCUE MULTIPLIER" is 10. Accordingly the insurance is (2000+670)×10=26700.

Thus, rescue payout amount reporting image displayed in S109 of FIG. 70 is described with reference to FIG. 75. The main CPU 41 calculates an insurance payout based on the total payout amount data stored in the total payout amount storage area of the RAM 43, and the feature symbol count data stored in the feature symbol count storage area of the RAM 43. Then, the main CPU 41 displays on the lower image display panel 16 an image indicating the amount of payout calculated, as the rescue payout image 206.

After S109, the main CPU 41 performs a process related to paying out of a predetermined number of coins according to the amount of payout thus calculated (S110).

When accumulating the coins, the main CPU 41 performs a process for adding a credit amount corresponding to the amount of payout thus determined. On the other hand, when paying out the coins, the main CPU 41 transmits a control signal to the hopper 66 to pay out a predetermined amount of coins corresponding to the amount of payout determined.

Next, the main CPU 41 clears the rescue flag (Sill).

Then, the main CPU 41 sets the total game count C in the total game count storage area of the RAM 43 so that C=0 (S111).

Then, the main CPU 41 ends this sub routine.

(Free Rescue Game Running Process)

Figure 74:
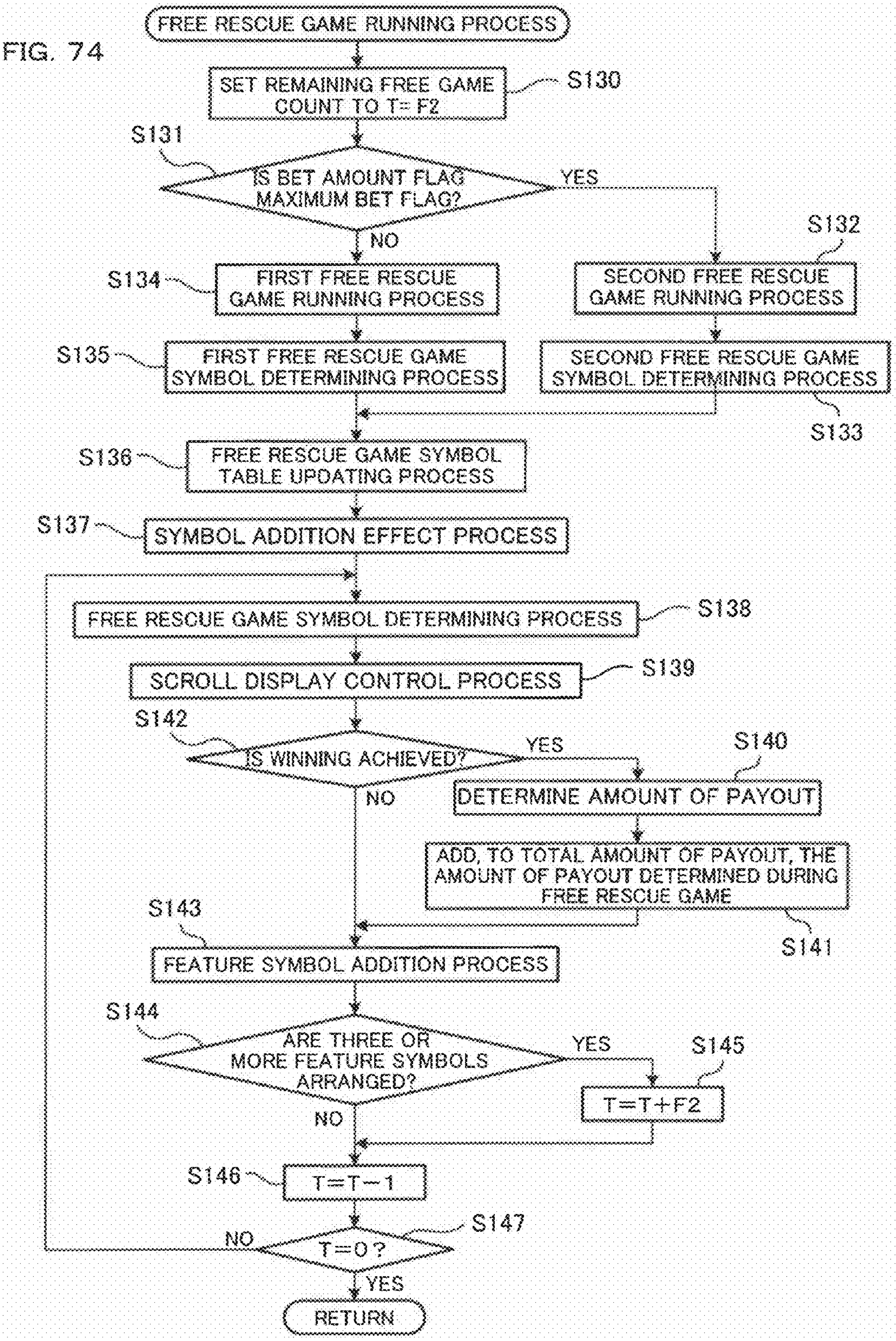
FIG. 74 is a flowchart showing a sub routine of the free rescue game running process of fourth embodiment, according to the present invention.

Next, the following describes the free rescue game running process, with reference to FIG. 74.

FIG. 74 is a flowchart showing a sub routine of the free rescue game running process.

First, the main CPU 41 sets a remaining free game count T to T=F↓2↓ (=second specific number of times=third specific number of times=30) in the free game count storage area of the RAM 43 (S130).

Next, the main CPU 41 determines whether a bet amount flag set in S102 of the rescue process (see FIG. 70) is a flag related to the maximum bet. When it is determined that the flag is related to a maximum bet, the second free rescue game running process is executed (S132), and subsequently, the second free rescue game symbol determining process (S133).

On the other hand in S131, if it is determined that the flag is not related to the maximum bet, the first free rescue game running process is executed (S134), and subsequently, the first free rescue game symbol determining process (S135).

The following describes the first free rescue game symbol determining process and the second free rescue game symbol determining process performed in S133 and S135 of FIG. 74.

FIGS. 73A to 73D are diagrams each showing an exemplary image displayed on the lower image display panel 16 of the slot machine 10 of the present embodiment, according to the present invention.

Figure 73A:
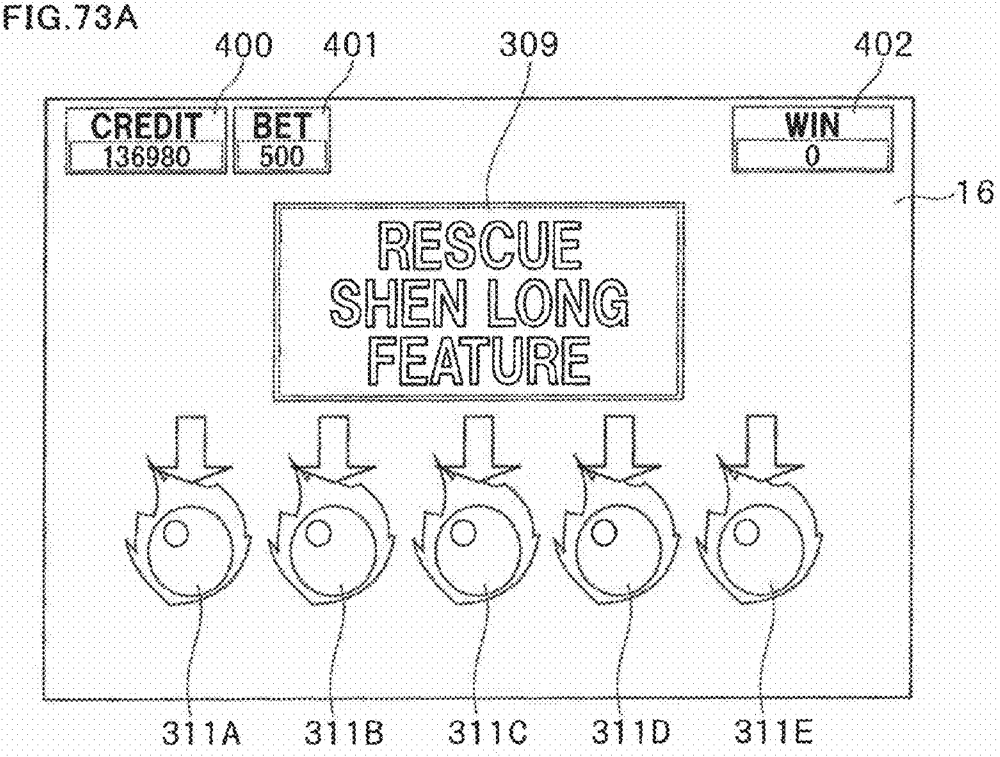
FIG. 73A shows an exemplary image displayed on the lower image display panel of a slot machine of fourth embodiment, according to the present invention.

When the rescue game starts, the lower image display panel 16 displays an image shown in FIG. 73A. As illustrated in FIG. 73A, in the center portion of the lower image display panel 16 is displayed a free rescue game starting image 309 indicating the start of the free rescue game.

Further, lower portion of the lower image display panel 16 displays five selectable images 311 (311A to 311E). A player is able to select any of the selectable images 311 by touching the touch panel 69 on the lower image display panel 16 by his/her finger or the like. Based on a selectable image 311 selected by the player, an increase in the number of wild symbols 310*a* and that in the number of feature symbols 310*b* are determined.

Figure 73B:
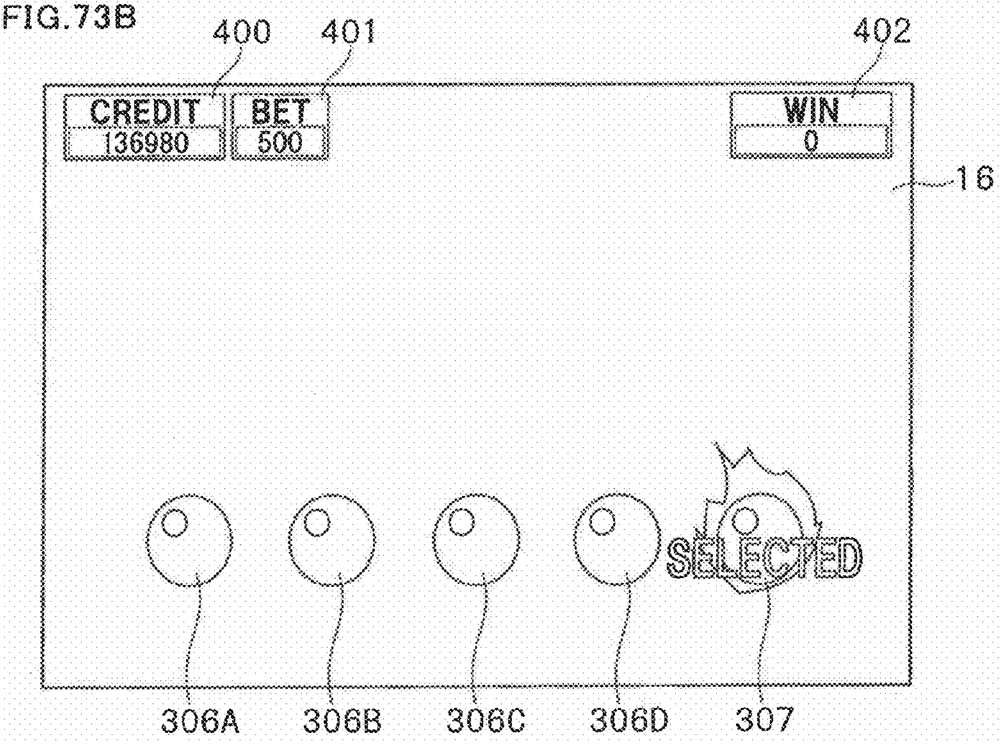
FIG. 73B shows an exemplary image displayed on the lower image display panel of a slot machine of fourth embodiment, according to the present invention.

For example, as illustrated in FIG. 73B, when the player selects the selectable image 311E, a selection image 307 is displayed in place of the selectable image 311E on the lower image display panel 16. Further, not-selected images 306 (306A to 306D) are respectively displayed in places of the selectable images 311 which were not selected.

Figure 73C:
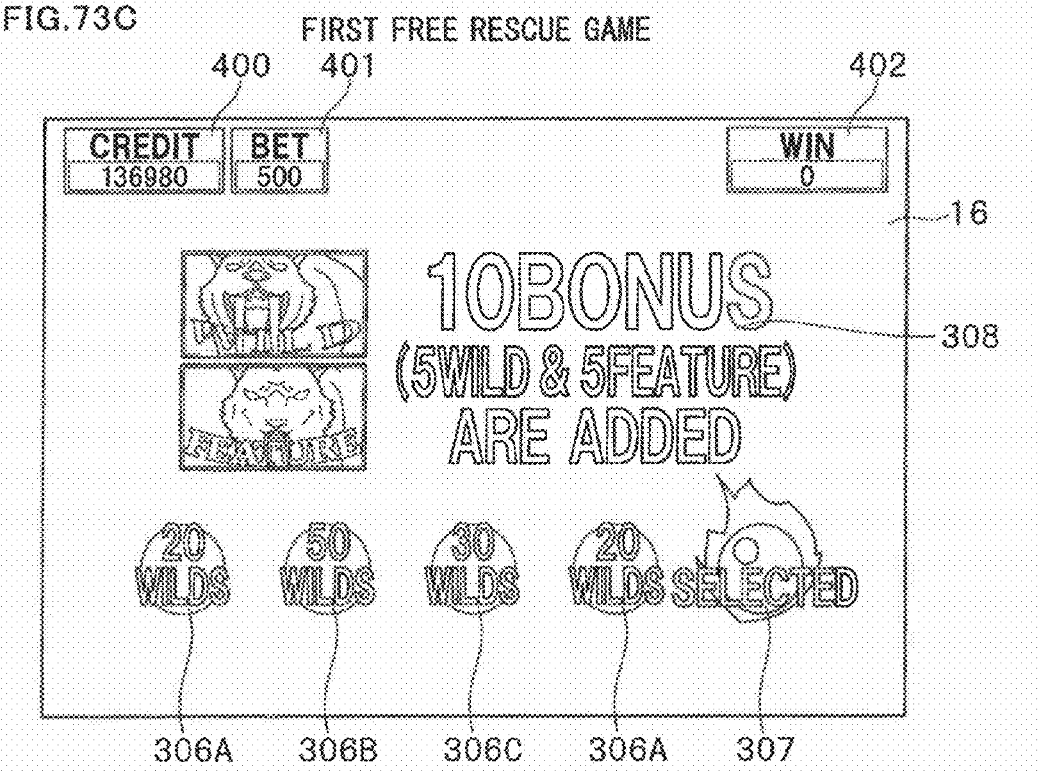
FIG. 73C shows an exemplary image displayed on the lower image display panel of a slot machine of fourth embodiment, according to the present invention.
Figure 73D:
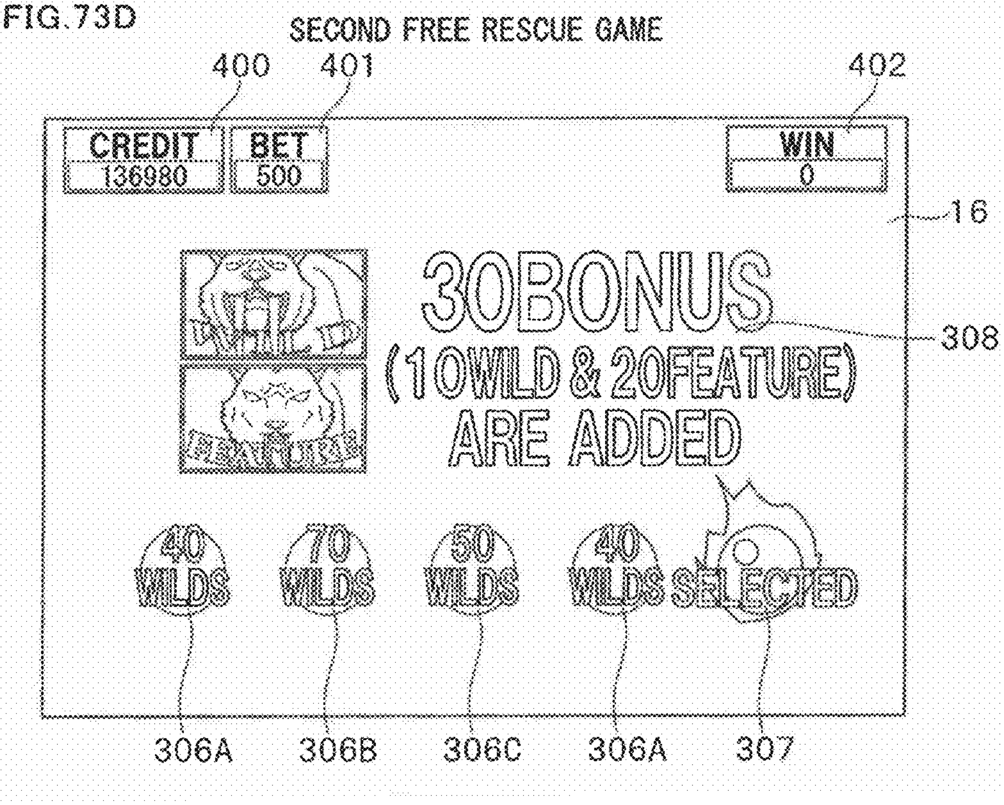
FIG. 73D shows an exemplary image displayed on the lower image display panel of a slot machine of fourth embodiment, according to the present invention.

After an image shown in FIG. 73B is displayed, a determined-increase image 308 which indicates the number of additional wild symbols 310*a* and the number of additional feature symbols 310*b* is displayed at the center portion of the lower image display panel 16, as illustrated in FIG. 73C or 73D.

FIG. 73C indicates the number of additional wild symbols 310*a* and the number of additional feature symbols 310*b* in the first free rescue game. Further, FIG. 73D shows the number of additional wild symbols 310*a* and the number of additional feature symbols 310*b* in the second free rescue game.

As shown in FIGS. 73C and 73D, the increases in the number of wild symbols 310*a* and that of feature symbols 310*b* are different between the first free rescue game and the second free rescue game, even if the selectable image 311 at the same position in FIG. 73A is selected. Specifically, in the first free rescue game, the number of wild symbols 310*a* and that of feature symbols 310*b* both increases by five in cases of "10 BONUS". On the other hand, in the second free rescue game, the number of wild symbols 310*a* increases by 10 and the number of feature symbols 310*b* increases by twenty, in cases of "30 BONUS".

As described, in the present embodiment, the number of additional wild symbols 310*a* and that of the additional feature symbols 310*b* vary depending on whether a maximum bet has been made in any of the 1000 base games counted before the free rescue game, the 1000 base games having been counted after the rescue bet button 90 is operated by the player.

Returning to FIG. 74, the main CPU 41 executes a free rescue game symbol table updating process (S136). In the free rescue game symbol table updating process, the main CPU 41 updates the free rescue game symbol table based on the number of additional wild symbols 310*a* and that of additional feature symbols 310*b*.

FIGS. 61A and 61B each shows an exemplary feature game symbol table indicating each symbol in a symbol column formed by display blocks during the first free rescue game, and code No. and random number associated with the symbol. FIGS. 62A and 62B each shows an exemplary feature game symbol table indicating each symbol in a symbol column formed by display blocks during the second free rescue game, and code No. and random number associated with the symbol.

In FIG. 61A, the wild symbol 310*a* is added to the code Nos. 13 and 22 of the symbol column No. 1 (first column), and the feature symbol 310*b* to the code No. 21. Further, the feature symbol 310*b* is added to the code No. 12 of the symbol column No. 2 (second column). Further, the wild symbol 310*a* is added to the code No. 6 of the symbol column No. 3 (third column), and the feature symbol 310*b* to the code No. 13. Further, in FIG. 61B, the wild symbol 310*a* is added to the code No. 11 of the symbol column No. 4 (fourth column), and the feature symbol 310*b* to the code No. 12. Further, the wild symbol 310*a* is added to the code No. 20 of the symbol column No. 5 (fifth column), and the feature symbol 310*b* to the code No. 19.

On the other hand in FIG. 62A, the wild symbol 310*a* is added to or replaces the code Nos. 13 and 22 of the symbol column No. 1 (first column), and the feature symbol 310*b* is added to or replaces the code Nos. 1, 4, 9, 18, and 21. Further, the wild symbol 310*a* is added to or replaces the code Nos. 8 and 11 of the symbol column No. 2 (second column), and the feature symbol 310*b* is added to or replaces the code Nos. 2, 12, and 17. Further, the wild symbol 310*a* is added to or replaces the code Nos. 5 and 17 of the symbol column No. 3 (third column), and the feature symbol 310*b* is added to or replaces the code Nos. 1, 3, 10, 11, and 13. Further, in FIG. 62B, the wild symbol 310*a* is added to or replaces the code Nos. 12 and 17 of the symbol column No. 4 (fourth column), and the feature symbol 310*b* is added to or replaces the code Nos. 4, 8, and 13. Further, the wild symbol 310*a* is added to or replaces the code Nos. 15 and 20 of the symbol column No. 5 (fifth column), and the feature symbol 310*b* is added to or replaces the code Nos. 2, 11, 13, and 20.

Subsequently, the main CPU 41 executes S137 and S138. These steps are not described here, as they are similar to S33 and S34 of FIG. 65.

When it is determined in S142 that a winning is achieved, the main CPU 41 determines an amount of payout (S140). This process is similar to S16 of FIG. 63 which is already described. Note however that, in the process, the main CPU 41 only determines the amount of payout, and unlike S16 of FIG. 63, the main CPU 41 does not add a credit amount corresponding to the payout amount determined or payout a predetermined number of coins according to the payout amount determined.

Next, the main CPU 41 adds a payout amount determined in S140 to the free rescue game total payout amount indicated by the total payout amount data stored in the total payout amount storage area of the RAM 43 (S141).

When it is determined in S142 that no winning has been achieved or after S141, the main CPU 41 executes a feature symbol addition process (S143). In this process, the main CPU 41 adds the number of feature symbols 310*b* rearranged on the display blocks 28 in the currently running game to the number of feature symbols indicated by the feature symbol count data stored in the feature symbol count storage area of the RAM 43.

Next, the main CPU 41 determines whether three or more feature symbols 310*b* are rearranged (S145). In this process, whether or not three or more feature symbols 310*b* are rearranged in the display blocks 28 is determined, without taking into consideration the payline 300.

When it is determined in S145 that three or more feature symbols 310*b* are rearranged, the main CPU 41 sets the remaining free game count stored in the free game count storage area of the RAM 43 so that T=T+F2 (F2=second specific number of times=third specific number of times=30) (S144).

Further, the main CPU 41 displays a free game addition image on the lower image display panel 16.

When it is determined in S145 that the number of feature symbols 310*b* rearranged is less than three or after S144, the main CPU 41 sets the remaining free game count stored in the free game count storage area of the RAM 43 so that T=T−1 (S146).

Next, the main CPU 41 determines whether T=0, based on the remaining game count data stored in the free game count storage area of the RAM 43 (S147).

When it is determined that it is not T=0, the main CPU 41 brings the process back to S138. On the other hand, when it is determined that T=0, the main CPU 41 ends this sub routine.

The free rescue game running process executed in S108 of FIG. 70 is described hereinabove with reference to FIG. 74.

In the slot machine 10 of the present embodiment, when the rescue bet button 90 is operated by a player during a base game, the number of base games run thereafter is counted. When the number of base games counted reaches 1000 times, there is determined whether the player has made a maximum bet in any of the 1000 base games. When it is determined that a maximum bet is made, the second free rescue game is run which includes more wild symbols 310*a* and feature symbols 310*b* than those in the first free rescue game, and which is more advantageous to the player than the first free rescue game. This motivates the player to make the maximum bet to play more advantageous second free rescue game. As a result, a large number of game media is trafficked, leading to the gain of the gaming facility. Further, a player having made a maximum bet is given more advantages than a player who did not make the maximum bet. Thus, there will be no feeling of unfairness attributed to the difference between the bet amount.

In the slot machine 10 of the present embodiment, when the rescue bet button 90 is operated by a player during a base game, the number of base games run thereafter is counted. This allows the player to decide to which one of the first free rescue game and the second free rescue game the transition occurs. Thus, the player may be able to experience the excitement and fun of involvement in the game, and be encouraged to bet more game media.

Thus, fourth embodiment of the present invention is described hereinabove. Note that the present invention is not limited to this.

Fourth embodiment deals with a case where the number of paylines 300 is 25; however, the number of paylines is not limited in the present invention. For example, the number of paylines 300 may be 30.

Fourth embodiment deals with a case where the free rescue game is run when the number of base games, which are counted after the operation of the rescue bet button 90 by the player, reaches 1000 times. However, the present invention is not limited to such a case, and the number of base games which have to be played before the free rescue game is run is not particularly limited. For example, the free rescue game may be run after 500 base games or 1500 base games.

Further, in fourth embodiment, whether or not a maximum bet is entered in any of the base games counted is determined as one of conditions for running the second free rescue game. The present invention however is not limited to this. For example, it is possible to determine whether a bet of 250 game media or more is entered.

Further, in fourth embodiment, whether or not a maximum bet is entered in at least one of the base games counted is determined as one of conditions for running the second free rescue game. The present invention however is not limited to this. For example, it is possible to determine whether a maximum bet is entered in at least a half of the base games counted.

Further, in fourth embodiment, the free game is a game in which displaying of symbols 310 on display blocks 28 are varied and stopped, and then an amount of payout is determined according to the symbols 310 having stopped or a combination of the stopped symbols 310 (i.e. a game normally run in a slot machine). However, the free game of the present invention is not limited to this, and the free game may be different from a game run in a slot machine 10. Examples of the free game include: a card game such as poker, a shooting game, a fighting game, or the like. The free game may be a game that awards a game medium or a game awarding no game medium.

Further, the following is also possible. Namely, a free game is run on condition that the number of base games counted during the rescue mode reaches a predetermined number Then, when the number of base games counted during the rescue mode once again reaches a predetermined number, a free rescue game which is different from the previous free rescue game is run.

Fifth Embodiment

The present invention is not limited to the above mentioned embodiments. The following describes Fifth embodiment of the present invention with reference to FIGS. 76 to 88. The same symbols are given to the members that have the same functions as those in the foregoing fourth embodiment, and the descriptions of those members are omitted here as a matter of convenience.

Fifth embodiment of the present invention differs from fourth embodiment in that, in a feature game, one or more wild symbols 310*a* (e.g. 12 wild symbols), the number of which is decided through a lottery, are added as one or more bonus symbols, and a predetermined number of feature symbols 310*b* (e.g. 12 symbols) are also added. When a feature game related to a maximum bet is run, a predetermined number of feature symbols 310*b* (e.g. 6 symbols) are further added as a bonus. A feature game related to a maximum bet, specifically, is a feature game run as a result of having entered a maximum bet in a base game. A feature game related to a maximum bet may be also a feature game run if a maximum bet was entered in all of a predetermined number of base games (e.g. 500 base games) having run after the previous feature game or free rescue spin game. Alternatively, a feature game related to a maximum bet may be a feature game run if a maximum bet was entered in any one of a predetermined number of base games (e.g. 500 base games) run after the previous feature game or free rescue spin game. Alternatively, a feature game related to a maximum bet may be a feature game run if the total amount of bet entered in a predetermined number of base games (e.g. 500 base games) run after the previous feature game or free rescue spin game equals or surpasses a predetermined value.

This motivates the player to make the maximum bet to play more advantageous feature game. As a result, a large number of game media is trafficked, leading to the gain of the gaming facility. Further, a player having made a maximum bet is given more advantages than a player who did not make the maximum bet. Thus, there will be no feeling of unfairness attributed to the difference between the bet amount.

Further, Fifth embodiment of the present invention differs from fourth embodiment in that, if the number of base games played without a feature game counts a predetermined number of times (500 times), 1000 credit is given to the player and a free rescue spin game is run for the purpose of rescuing the player. In other words, the number of base games to run a free rescue spin game is always counted, even if a rescue bet button 90 is not operated by the player. In the free rescue spin game, one or more wild symbols 310*a*, the number of which is decided through lottery, are added as bonus symbols, and a predetermined number of feature symbols 310*b* (e.g. 18 feature symbols) are also added at the same time. Further, when a free rescue spin game related to a maximum bet is run, a predetermined number of feature symbols 310*b* (e.g. 6 feature symbols) are further added. The free rescue spin game related to a maximum bet is, specifically, a free rescue spin game run if a maximum bet was entered in all of a predetermined number of base games (500 base games) run after the previous feature game or the free rescue spin game. Alternatively, a free rescue spin game related to a maximum bet may be a free rescue spin game run if a maximum bet was entered in any one of a predetermined number of base games (e.g. 500 base games) run after the previous feature game or free rescue spin game. Alternatively, the rescue spin free game related to a maximum bet may be a free rescue spin game run if the total amount of bet entered in a predetermined number of base games (e.g. 500 base games) run after the previous feature game or free rescue spin game equals or surpasses a predetermined value.

This motivates the player to make the maximum bet to play more advantageous free rescue spin game. As a result, a large number of game media is trafficked, leading to the gain of the gaming facility. Further, a player having made a maximum bet is given more advantages than a player who did not make a maximum bet. Thus, there will be no feeling of unfairness attributed to the difference between the bet amount.

(Displaying on Lower Image Display Panel)

Figure 76:
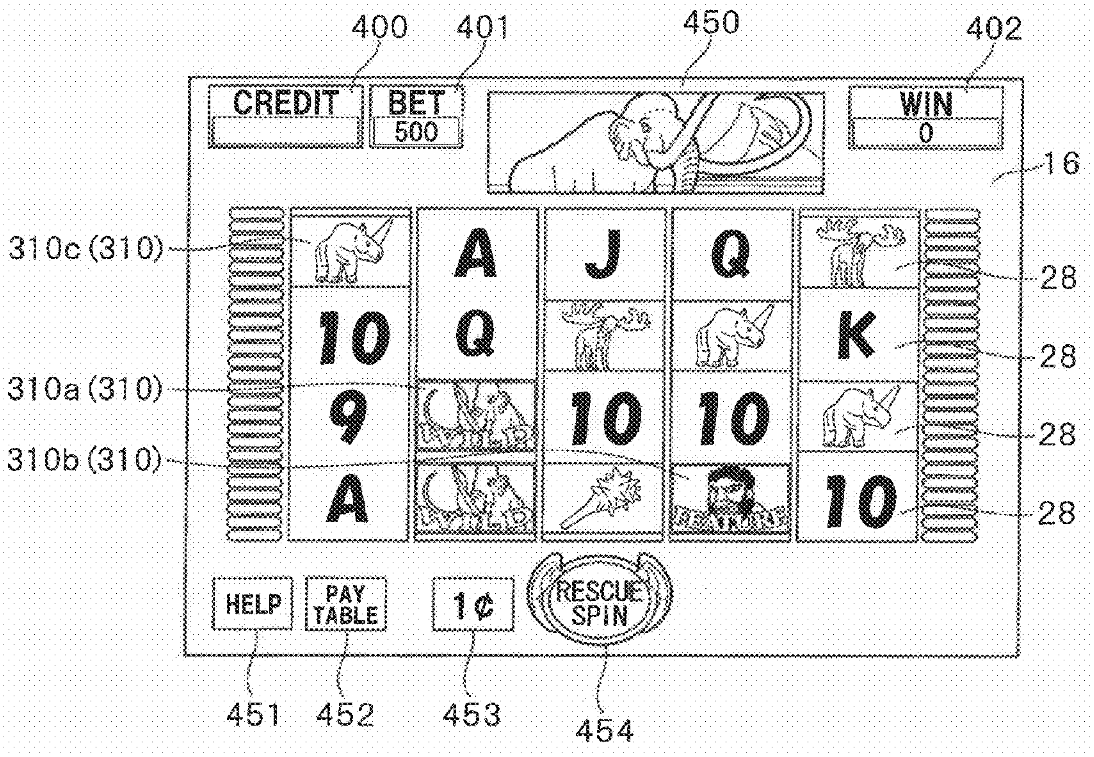
FIG. 76 shows an exemplary image displayed on the lower image display panel of a slot machine of fifth embodiment, according to the present invention.

FIG. 76 shows an exemplary image displayed on the lower image display panel 16 of a slot machine 10 of Fifth embodiment, according to the present invention. Further, a not-shown touch panel 69 is disposed at the front of the lower image display panel 16, and a player is able to input various instructions by operating the touch panel 69.

Further, as illustrated in FIG. 76, on the display blocks 28 of the lower image display panel 16 are displayed symbols 310 to be scrolled and stopped. The credit amount indicator 400 of the lower image display panel 16 displays thereon a credit amount stored in the RAM 43. Further, the bet value indicator 401 of the lower image display panel 16 displays the number of coins bet. Further, the payout indicator 402 of the lower image display panel 16 displays the number of coins paid out.

Further, in a design image 450 on the lower image display panel 16 is displayed images of various games run in the slot machine 10 of Fifth embodiment.

Further, below the lower image display panel 16 are arranged a help button 451, a paytable button 452, a bet unit display unit 453, and a rescue spin touch button 454.

The help button 451, when pressed by a player, activates a help mode. The help mode provides a player with information to solve his/her problem regarding the game. The paytable button 452, when pressed by a player, activates a payout display mode in which an amount of payout is displayed. The payout display mode displays an explanatory screen indicating relation of a winning combination to the odds.

The bet unit display unit 453 displays a bet unit (payout unit) at the current point. With the bet unit display unit 453, the player is able to know that, for example, the minimum game value required for participating in a unit game is one cent, and that s/he is able to raise his/her bet in increments of one cent.

Further, the rescue spin touch button 454 located below the lower image display panel 16 lights in blue, when the player has entered a maximum bet in a base game. On the other hand, the rescue spin touch button 454 lights in gray, when the player has not entered a maximum bet in a base game. Note that the colors of light emitted from the rescue spin touch button 454 may be set to any desirable colors. Further, the rescue spin touch button 454 lights in blue when the number of later-mentioned lost games is 10 or less times minus a predetermined number of times (e.g. 500 times), and lights in gray when the number of lost games is more than 10 times minus the predetermined number of times.

(Base Game Running Process)

Figure 83:
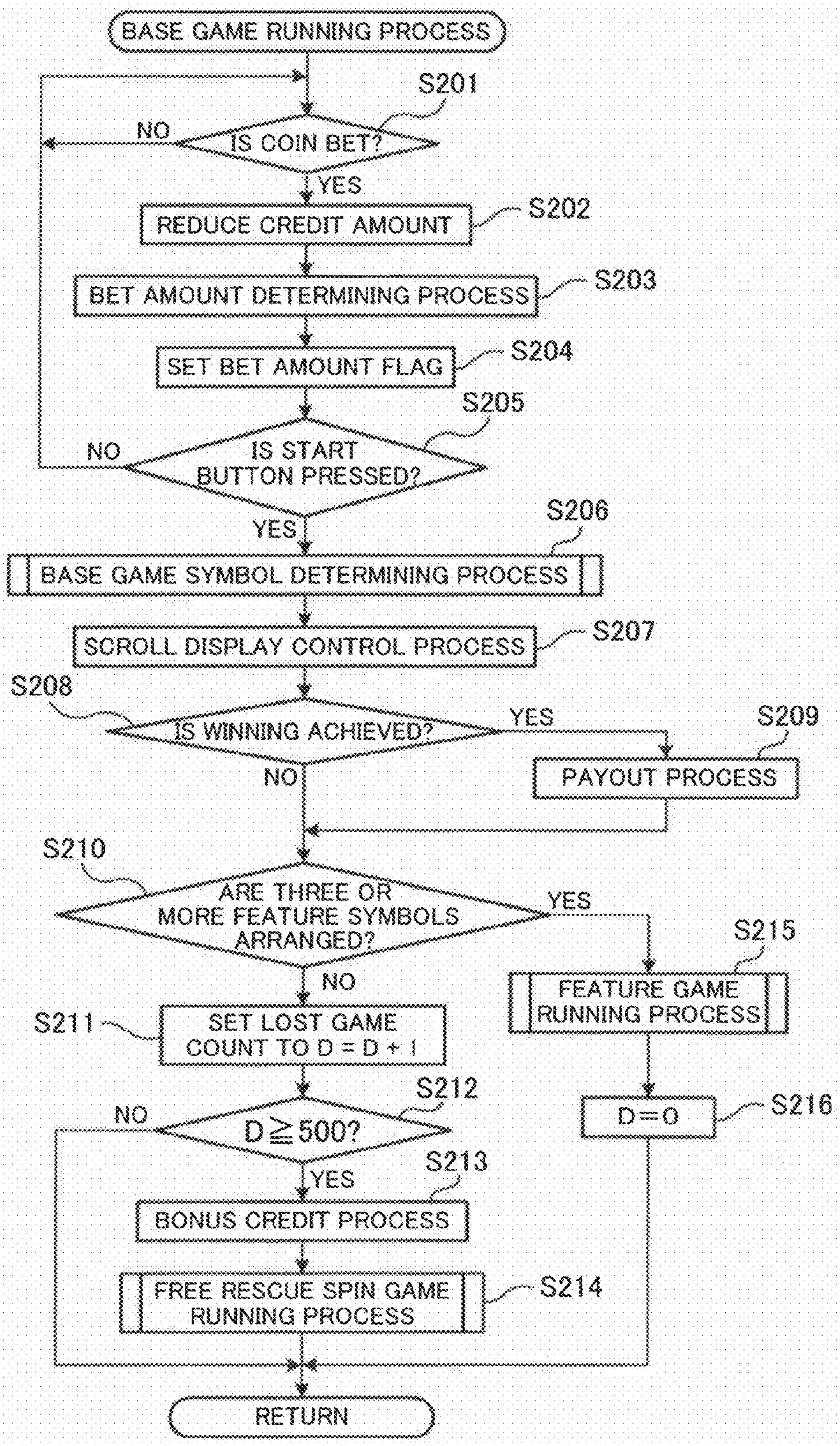
FIG. 83 shows a flowchart of a base game running process of fifth embodiment.

In Fifth embodiment, a base game running process shown in FIG. 83 is executed in place of the base game running process shown in FIG. 63. As shown in FIG. 83, the main CPU 41 first determines whether or not a coin is bet (S201). In this process, the main CPU 41 determines whether an input signal is received. The input signal may be an input signal output from the 1-bet switch 26S when the 1-bet button 26 is operated, or an input signal output from the maximum bet switch 27S when the maximum bet button 27 is operated. When it is determined that no coin is bet, the process goes back to S201.

On the other hand in S201, if it is determined that a coin is bet, the main CPU 41 performs a process of reducing the credit amount stored in the RAM 43, by the amount of coins having been bet (S202).

Next, the main CPU 41 executes a bet amount determining process (S203). In this process, there is determined whether a amount of bet entered by the player in the base game is the maximum bet. After the bet amount determining process, the main CPU 41 sets a bet amount flag (S204).

Next, the main CPU 41 determines whether the start button 23 is pressed (S205). In this process, the main CPU 41 determines whether an input signal output from the start switch 23S is received, when the start button 23 is pressed. If it is determined that the start button 23 is not pressed, the process goes back to S201. Note that when the start button 23 is not pressed (e.g. when the start button 23 is not pressed and an instruction to end the game is input), the main CPU 41 cancels the result of the reduction in S202.

On the other hand in S205, if it is determined that the start button 23 is pressed, the main CPU 41 executes a base game symbol determining process (S206) shown in FIG. 64.

Next, in S207, the main CPU 41 performs a scroll display control process. This process is a display control whereby scrolling of symbols 310 is started and symbols 310 determined in S206 are rearranged thereafter.

Next, the main CPU 41 determines whether a winning is achieved (S208). More specifically, in S208, the main CPU 41 counts the number of each type of symbols 310 rearranged along each payline 300 in S207. Then, the main CPU 41 determines if there is a counted value which equals or surpasses "2".

If it is determined that a winning is achieved, the main CPU 41 performs a process related to coin payout (S209). In this process, the main CPU 41 refers to the odds data stored in the RAM 43 (see FIG. 56), and determines the amount of payout based on the number of certain symbols rearranged along the payline 300.

On the other hand, when it is determined that a winning is not achieved in S208 or after S209, the main CPU 41 determines whether three or more feature symbols 310*b* are rearranged (S210). In this process, whether or not three or more feature symbols 310*b* are rearranged in the display blocks 28 is determined, without taking into consideration the payline 300.

Figure 84:
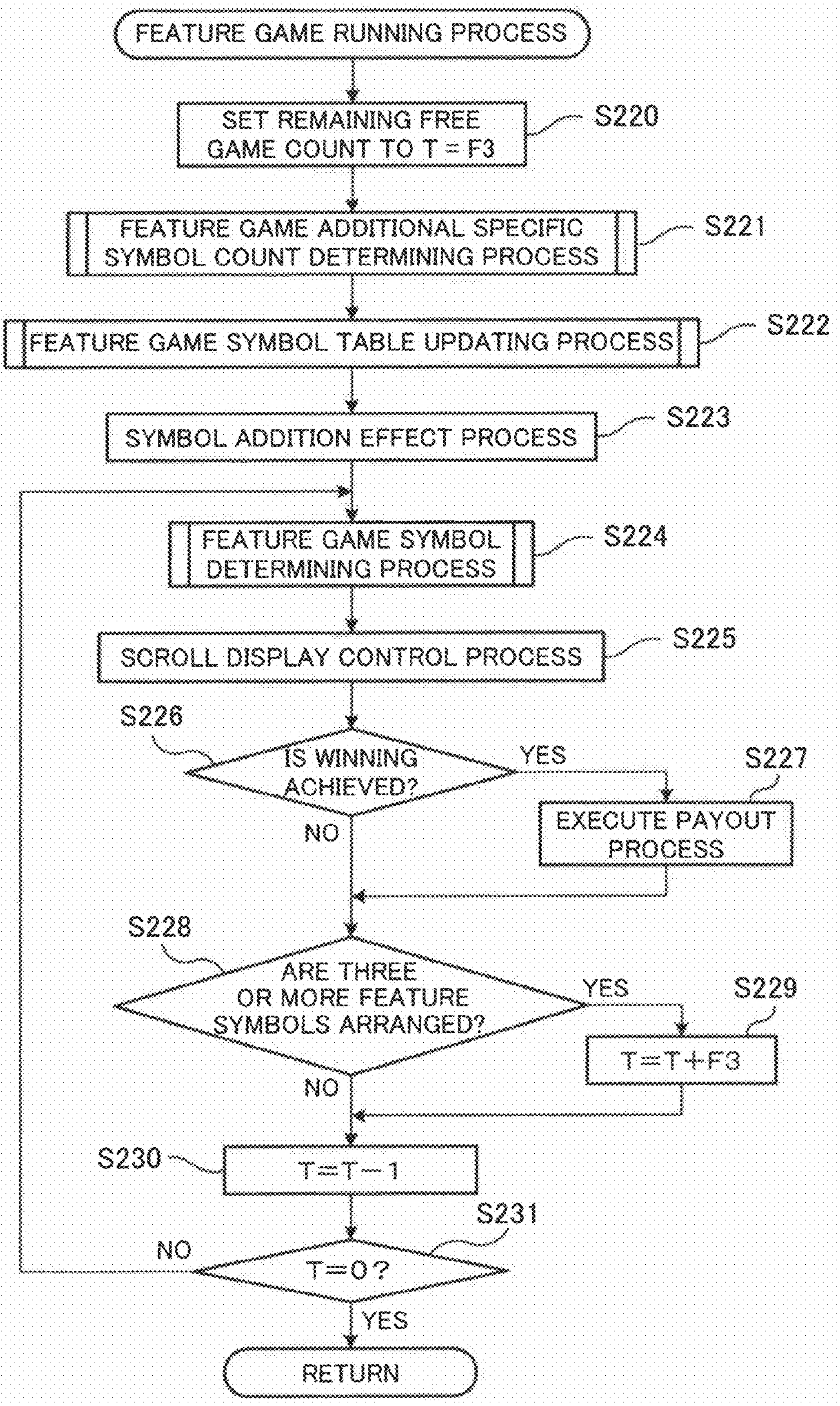
FIG. 84 is a flowchart showing a sub routine of the feature game running process of fifth embodiment.

In S210, when it is determined that three or more feature symbols 310*b* are rearranged, the main CPU 41 executes a feature game running process shown in FIG. 84 (S215). In the feature game running process, the feature game is run with an increased number of the wild symbols 310*a* and feature symbols 310*b*. The feature game running process is detailed later with reference to the drawings.

In Fifth embodiment, RAM 43 further has a lost game count storage area in which the number of base games which did not transit to the feature game are stored. When it is determined in S210 that three or more feature symbols 310*b* are not rearranged, the main CPU 41 sets the lost game count stored in the lost game count storage area of the RAM 43 to D=D+1 (S211).

Next, the main CPU 41 determines whether the lost game count surpasses a predetermined number of times (500 times) (S212). When it is determined that the lost game count is more than the predetermined number of times (500 times), a credit bonus process is executed (S213). In this bonus credit process, 1000 credits are given to the player for the purpose of rescuing the player.

Figure 88:
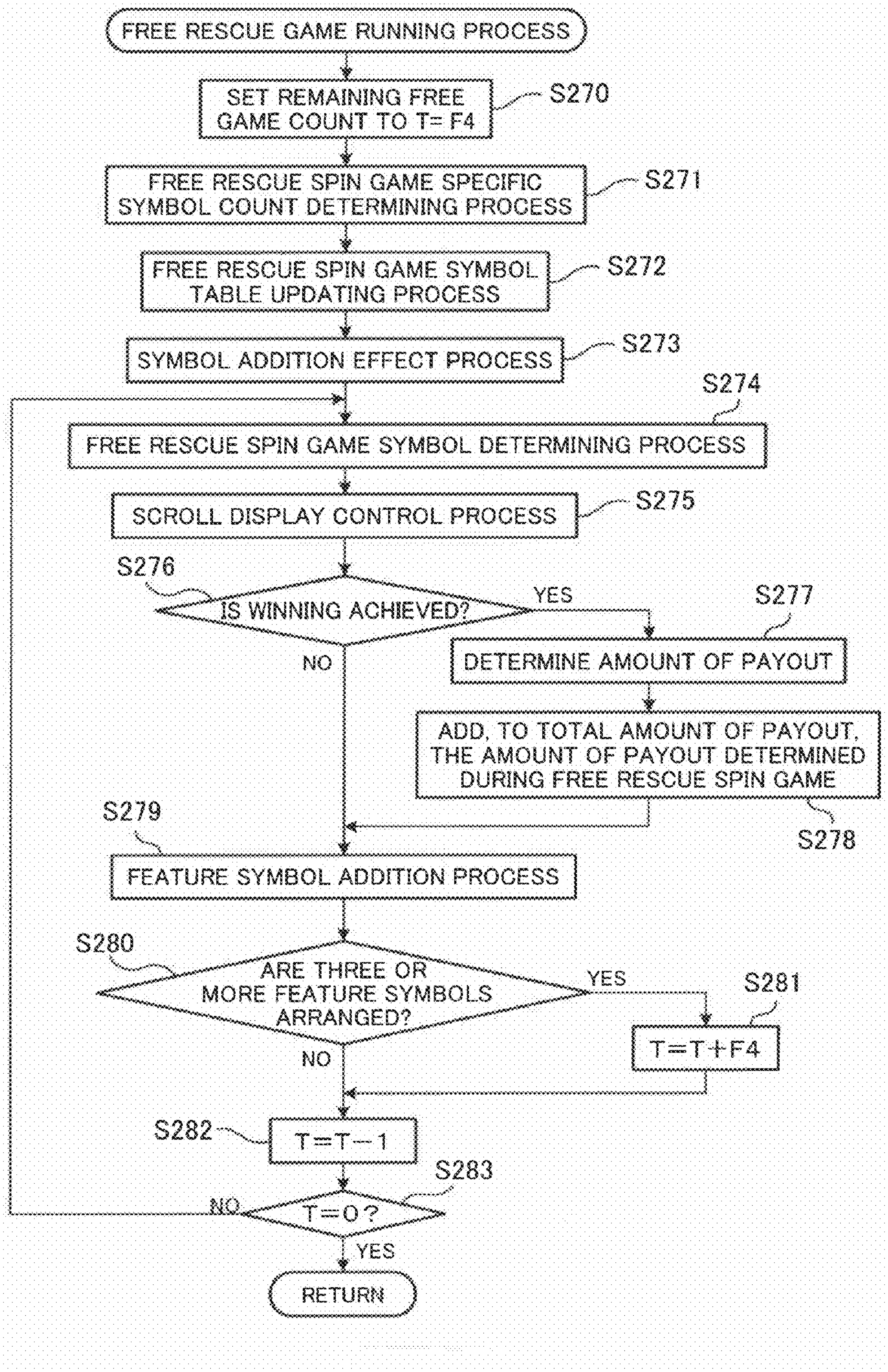
FIG. 88 is a flowchart showing a sub routine of the free rescue game running process of fifth embodiment, according to the present invention.

Next, the main CPU 41 executes a free rescue spin game running process shown in FIG. 88 (S214). The free rescue spin game running process is detailed later with reference to the drawings.

Figure 82:
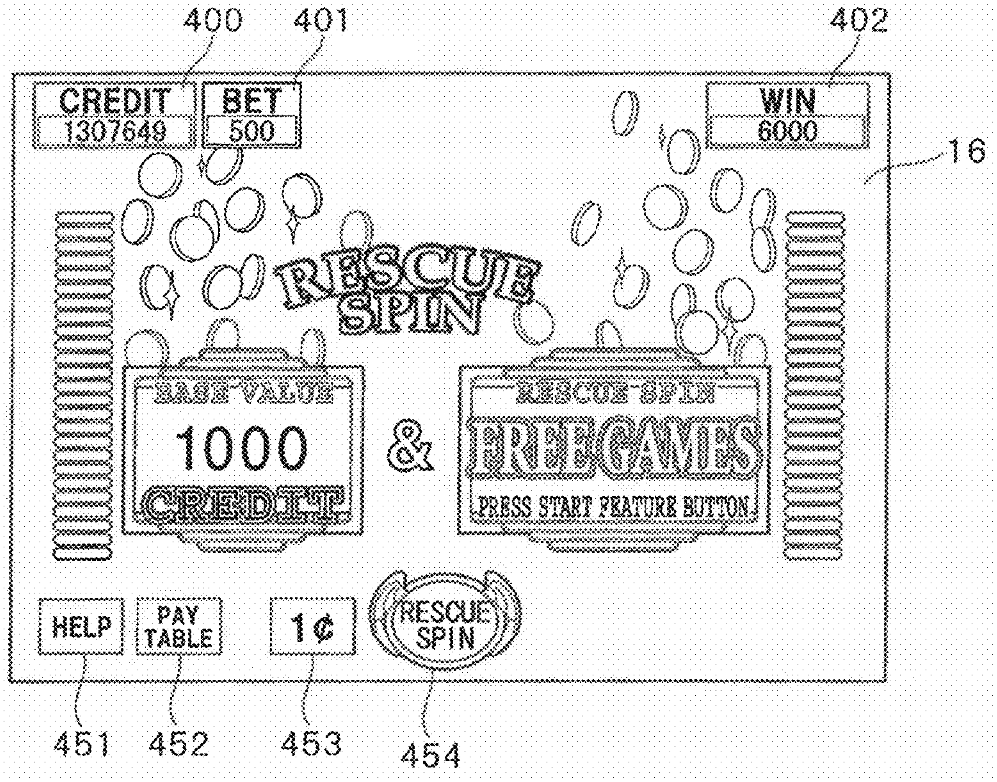
FIG. 82 shows an exemplary image displayed on the lower image display panel of a slot machine of fifth embodiment, according to the present invention.

FIG. 82 shows an exemplary image displayed on the lower image display panel 16 of a slot machine 10 of Fifth embodiment, according to the present invention. As shown in FIG. 82, if it is determined that the lost game count D is more than the predetermined number of times (500 times) in S212, the lower image display panel 16 performs displaying to inform the player that 1000 credits are given and free rescue spin game is started for the purpose of rescuing the player.

On the other hand, when it is determined in S212 that the lost-game count D is less than the predetermined number of times (500 times), the main CPU 41 ends the sub routine.

Further after the feature game running process is executed in S215, the lost game count D in the lost game count storage area of RAM 43 is set to D=0 (S216). Then, the main CPU 41 ends this sub routine.

Fifth embodiment of the present invention deals with a case where the random number generating circuit 64 is provided and a random number (so-called hardware random number) is sampled from the random number generating circuit. However, the present invention may be adapted so that a random number is generated in a program (so-called software random number).

(Feature Game Running Process)

In Fifth embodiment, a feature game running process shown in FIG. 84 is executed in place of the feature game running process shown in FIG. 65. Next, the following describes a feature game running process of Fifth embodiment, with reference to FIG. 84. A feature game is a game which allows the player to play without requiring a bet of a coin.

First, the main CPU 41 sets a remaining free game count T so that T=F3 (=fourth specific number of times=8) in the free game count storage area of the RAM 43 (S220).

Further, the main CPU 41 displays a feature game occurrence image on the lower image display panel 16.

Figure 85:
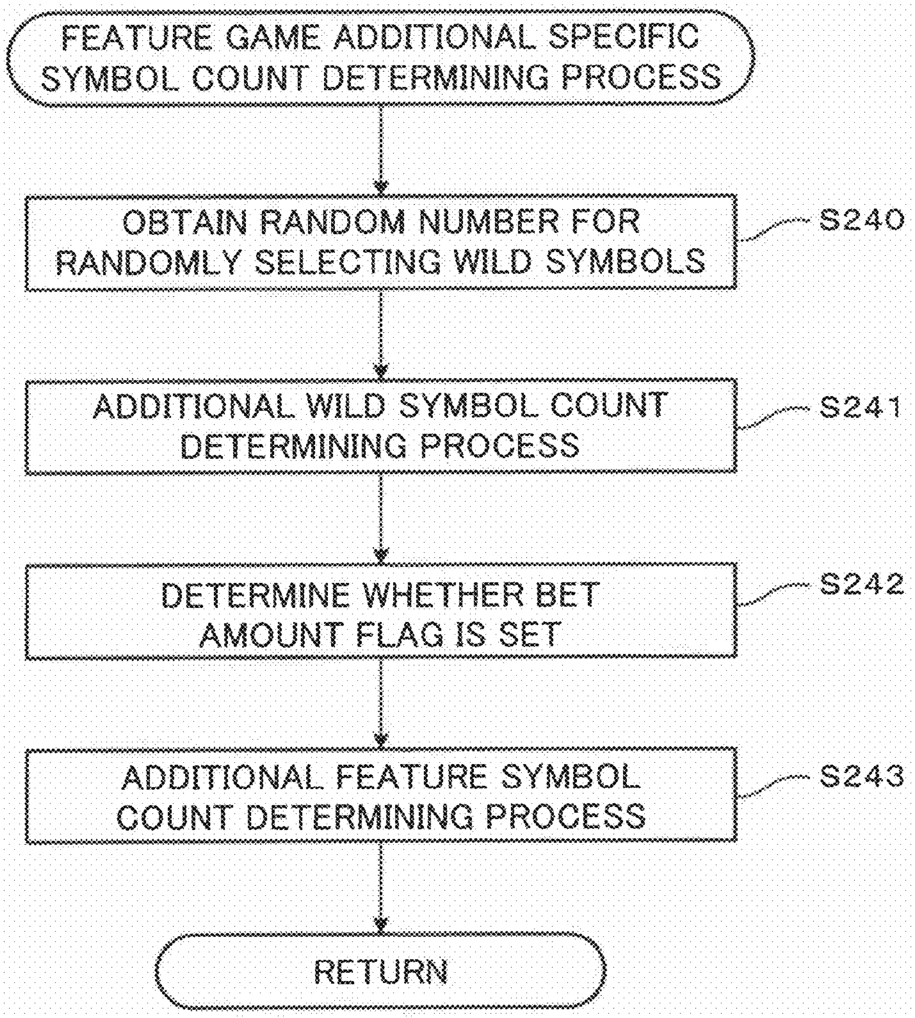
FIG. 85 is a flowchart showing a sub routine of the feature game additional specific symbol count determining process of fifth embodiment.

Next, the main CPU 41 executes a feature game additional specific symbol count determining process of FIG. 85 (S221). The feature game additional specific symbol count determining process is detailed later with reference to the drawings.

Figure 86:
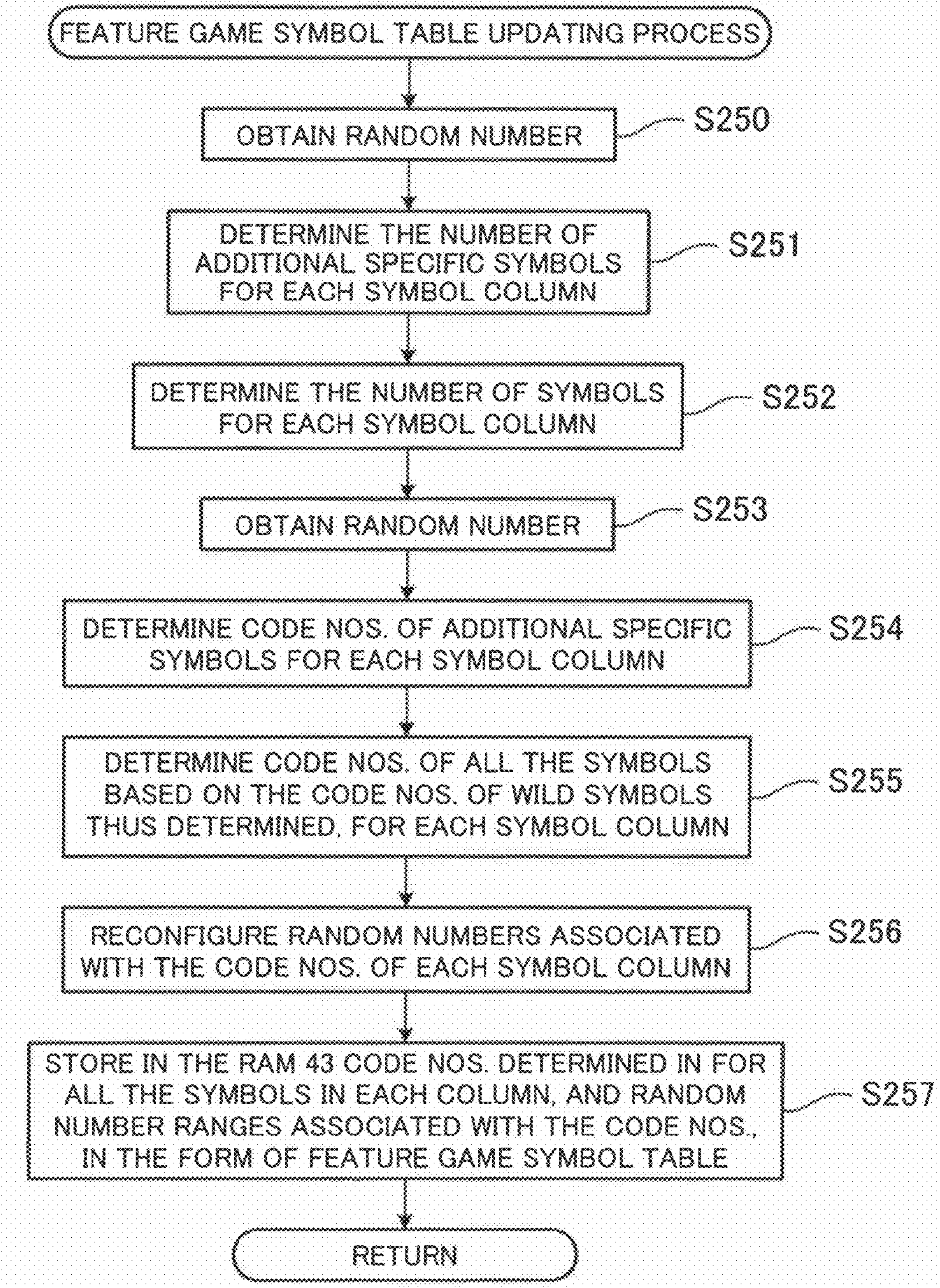
FIG. 86 is a flowchart showing a sub routine of feature game symbol table updating process of fifth embodiment.

Further, the main CPU 41 executes the feature game symbol table updating process of FIG. 86 (S222). In the feature game symbol table updating process, the main CPU 41 updates the feature game symbol table based on an increase in the numbers of wild symbols 310*a* and feature symbols 310*b* determined in the feature game additional specific symbol count determining process. The feature game symbol table updating process is detailed later with reference to the drawings.

Next, the main CPU 41 executes a symbol addition effect process and adds the symbols to be increased (S223)

Figure 87:
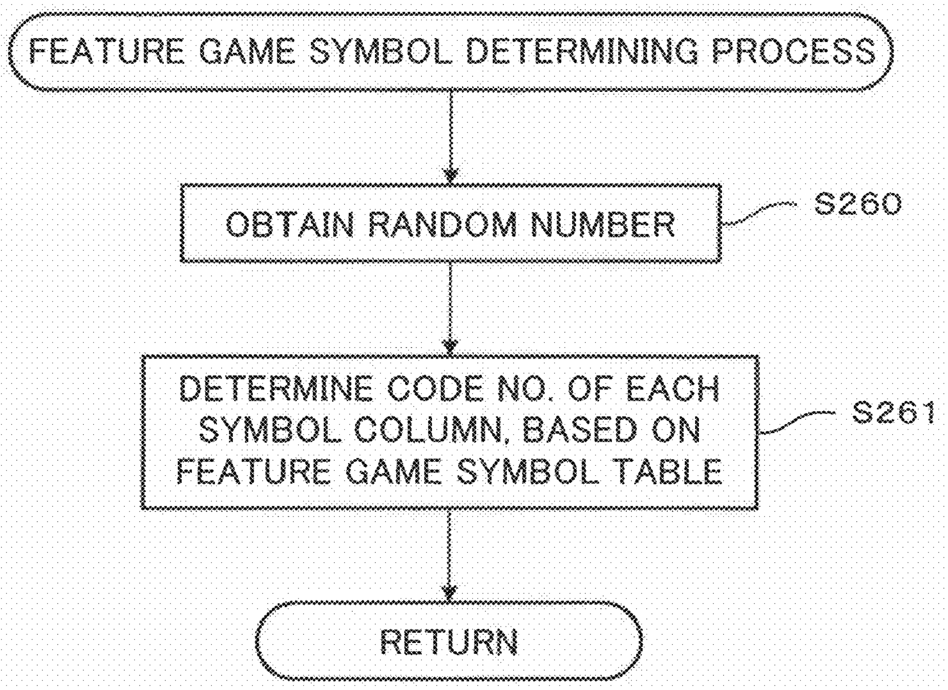
FIG. 87 is a flowchart showing a sub routine of the feature game symbol determining process of fifth embodiment.

Next, the main CPU 41 executes a feature game symbol determining process of FIG. 87 (S224). The feature game symbol determining process is detailed later with reference to the drawings.

Each of FIGS. 80A and 80B, and FIGS. 81A and 81B is an exemplary feature game symbol table of Fifth embodiment indicating each symbol in a symbol column formed by display blocks, and code No. and random number associated with the symbol.

In the feature game symbol table of Fifth embodiment, the wild symbol 310*a* and feature symbol 310*b* are added or replace other symbols 310. The wording "replacing" means that new symbol data is written over already existing symbol data. The wording "added" means that a new set symbol data is added to the already existing sets of symbol data, thus increasing the number of sets of symbol data. The number of additional symbols or the number of symbols replacing the other symbols, or the symbol column in which the addition or replacement takes place may be randomly determined or determined beforehand. In Fifth embodiment, an increase is determined based on the feature game additional wild symbol count determination table of FIG. 77. When symbol data is replaced with another set of symbol data, an image based on the overwritten data (replacement data) may be displayed, in place of a symbol 310 having been stopped and displayed.

The later-mentioned feature game symbol table of Fifth embodiment shown in FIGS. 80A and 80B and FIGS. 81A and 81B is stored in the RAM 43 through the feature game symbol table updating process.

In the later-mentioned feature game symbol determining process, the main CPU 41 determines a code No. at the time of stopping the symbols 310, by running a symbol determining program stored in the RAM 43. More specifically, the main CPU 41 obtains a random number, and determines the code No. of each symbol column of the display blocks 28, at the time of stopping the symbols 310, based on the random number obtained, and the feature game symbol table.

Next, in S225 of FIG. 84, the main CPU 41 performs a scroll display control process. This process is a display control whereby scrolling of symbols is started and symbols 310 determined in S223 are rearranged thereafter.

Next, the main CPU 41 determines whether a winning is achieved (S226). In the present embodiment, a winning is achieved when at least one type of symbols 310 out of "10", "J", TIQII, "K", "REINDEER", "RHINO", "CLUB", and "BUFFALO" is rearranged in two or more display blocks 28 along a single payline 300, as is mentioned hereinabove. The "WILD" which is the wild symbol 310*a* is a symbol 310 substitutable for any type of symbol. Each feature symbols 310*b* ("FEATURE") is a symbol 310 serving as a trigger for starting at least various types of free games such as a feature game. In the feature game, the number of wild symbols 310*a* and that of the feature symbols 310*b* are increased compared to those of the base game. Therefore, the possibility of winning is higher.

More specifically, in S226, the main CPU 41 counts the number of each type of symbols 310 rearranged along each payline 300 in S224. Then, the main CPU 41 determines if there is a counted value which equals or surpasses "2".

If it is determined that a winning is achieved, the main CPU 41 performs a process related to coin payout (S227). Further explanation is omitted here, since this process is similar to S209 of FIG. 83.

On the other hand, when it is determined in S226 that a winning is not achieved or after S227, the main CPU 41 determines whether three or more feature symbols 310*b* are rearranged (S228). In this process, whether or not three or more feature symbols 310_b_ are rearranged in the display blocks 28 is determined, without taking into consideration the payline 300.

When it is determined in S228 that three or more feature symbols 310_b_ are rearranged, the main CPU 41 sets the remaining free game count stored in the free game count storage area of the RAM 43 so that T=T+F3 (F3=fourth specific number of times=8) (S229).

When it is determined in S228 that the number of feature symbols 310_b_ rearranged is less than three or after S229, the main CPU 41 sets the remaining free game count stored in the free game count storage area of the RAM 43 so that T=T−1 (S230).

Next, the main CPU 41 determines whether T=0 based on the remaining game count data stored in the free game count storage area of the RAM 43 (S231).

When it is determined that it is not T=0, the main CPU 41 brings the process back to S224. On the other hand, when it is determined that T=0, the main CPU 41 ends this sub routine.

(Feature Game Additional Specific Symbol Count Determining Process)

Next, the following describes the feature game additional specific symbol count determining process of S221 shown in FIG. 84. FIG. 85 is a flowchart showing a sub routine of the feature game additional specific symbol count determining process of fifth embodiment.

First the main CPU 41 obtains the random number from the random number generating circuit 64 (S240). Next, the main CPU 41 randomly decides the number of additional wild symbols (S241). In this step, the main CPU 41 determines the number by which the number of wild symbols are increased, based on the random numbers obtained in S240, and the feature game additional wild symbol count determination table of Fifth embodiment shown in FIG. 77.

FIG. 77 shows an exemplary feature game additional wild symbol count determination table of fifth embodiment.

The feature game additional wild symbol count determination table of Fifth embodiment indicates a list of additional wild symbol counts for the feature game and associated random numbers. For example, when the random number sampled is 17235, the corresponding increase in the number of wild symbols is “40”.

Next, the main CPU 41 determines whether a bet amount flag set in S204 of the base game running process (see FIG. 83) is a flag related to the maximum bet (S242).

A flag related to a maximum bet, specifically, is a flag in cases where a maximum bet has been entered at the time of transiting to the feature game. Alternatively, a flag related to a maximum bet may be understood as a flag in cases where a maximum bet has been entered in all of a predetermined number of base games (e.g. 500 base games) played after the previous feature game or free rescue spin game. Alternatively, a flag related to a maximum bet may be understood as a flag in cases where a maximum bet has been entered in at least one of a predetermined number of base games (e.g. 500 base games) played after the previous feature game or free rescue spin game. Alternatively, a flag related to a maximum bet may be understood as a flag in cases where the total amount of bet entered in a predetermined number of base games (e.g. 500 base games) run after the previous feature game or free rescue spin game equals or surpasses a predetermined value.

Next, the main CPU 41 executes an additional feature symbol count determining process (S243). In this process, the number of additional feature symbols 310_b_ is determined based on the result of S242. Specifically, when the bet amount flag is not related to a maximum bet, the number of additional feature symbols 310_b_ is 12. When the bet amount flag is related to a maximum bet the number of additional feature symbols 310_b_ is 18. As is understood from the above, when the bet amount flag relates to a maximum bet, there will be 6 more additional feature symbols 310_b_ than the number of additional symbols 310_b_ given when the bet amount flag is not related to a maximum bet. This therefore is more advantageous to the player.

Note that the number of additional feature symbols 310_b_ given in the additional feature symbol count determining process of S243 may be set to any desirable setting. In that case, the number of additional feature symbols 310_b_ is preferably set so that more additional feature symbols 310_b_ are given when a flag related to a maximum bet is set, than the number of additional feature symbols 310_b_ given when no flag related to a maximum bet is set.

After the process of S243, the main CPU 41 ends this sub routine.

FIG. 78 shows a table indicating re-trigger ratio for each game type, in relation to fifth embodiment. As illustrated in FIG. 78, the re-trigger ratio per spin of a reel is approximately 1/150 in the base game. On the other hand, the re-trigger ratio per spin of a reel is higher in a feature game and is approximately 1/30 to 1/40. The re-trigger ratio is even higher in a feature game with a flag related to a maximum bet being set, and is approximately 1/20 to 1/26. This is attributed to the different settings of the numbers of additional wild symbols 310_a_ and feature symbols 310_b_ among a base game, a feature game, and a feature game with a flag related to a maximum bet being set. As described, the respective levels of advantages given by a base game, a feature game, and a feature game with a flag related to the maximum bet being set are different. Therefore, it is possible to provide a game that hardly bores a player.

(Feature Game Symbol Table Updating Process)

FIG. 86 is a flowchart showing a sub routine of feature game symbol table updating process of fifth embodiment.

First the main CPU 41 obtains random numbers from the random number generating circuit 64 (S250). In this process, the main CPU 41 samples the same number of random numbers as the number of additional wild symbols 310_a_ and feature symbols 310_b_ determined in the feature game additional specific symbol count determining process.

Next, the main CPU 41 determines the number of additional wild symbols 310_a_ and the number of additional feature symbols 310_b_ for each symbol column (S251). In this process, the main CPU 41 determines the number of additional wild symbols 310_a_ and the number of additional feature symbols 310_b_ for each symbol column based on the random numbers obtained in S250 and the symbol column determination table of FIG. 58.

Next, the main CPU 41 determines the number of symbols in each symbol column (S252). In this process, the main CPU 41 determines a total number of symbols in each symbol column based on the number of additional wild symbols 310_a_ and the number of additional feature symbols 310_b_ determined in S251 for each symbol column.

First, the main CPU 41 obtains random numbers from the random number generating circuit 64 (S253). In this process, the main CPU 41 obtains the same number of random numbers as the number of additional wild symbols 310_a_ and additional feature symbols 310_b_ determined in S251 for each symbol column. That is, when the number of additional wild symbols 310_a_ for the symbol column No. 1 (first column), three random numbers are obtained for the symbol column No. 1.

Next, for each symbol column, the main CPU 41 determines code No. of each wild symbol 310_a_ and that of each feature symbol 310*b* to be added to the symbol column, based on the random numbers obtained in S63 and the code No. determination table (S254). In this process, the main CPU 41 determines the number of additional wild symbols 310*a* for each symbol column based on the random numbers obtained in S60 and the symbol column determination table of FIG. 13.

Next, for each symbol column, the main CPU 41 determines code No. of each symbol based on the code No. of the wild symbol 310*a* and the code No. of feature symbol 310*b* determined in S254 (S255). In this process, to each symbol column indicated by the base game symbol table of FIG. 55, addition or replacement of wild symbols 310*a* and feature symbols 310*b* is performed based on the code No. of the wild symbols 310*a* and the code No. of feature symbols 310*b* determined in S254.

The main CPU 41 reconfigures the random numbers associated with the code Nos. of each symbol column (S256) In this process, the main CPU 41 reconfigures each code No. and the associated random numbers within the range of 0 to 65535, based on the total symbol count of each symbol column determined in S252.

The main CPU 41 stores in the RAM 43 the code Nos. determined in S255 for all the symbols in each symbol column, and random numbers associated with the code Nos. which is determined in S256, in the form of feature game symbol table (S257). The feature game symbol table stored in the RAM 43 is referred to at the time of executing a feature game symbol determining process.

Each of FIGS. 80A and 80B and FIGS. 81A and 81B shows an exemplary feature game symbol table indicating each symbol 310 in a symbol column formed by display blocks, and code No. and random number associated with the symbol 310.

Note that FIGS. 80A and 80B are an exemplary feature game symbol table in cases where it is determined, in the feature game additional specific symbol count determining process of S242 shown in FIG. 85, that a flag not related to a maximum bet is set.

As illustrated in FIGS. 80A and 80B, 40 wild symbols 310*a* and 12 feature symbols 310*b* are added or replace other symbols 310, as a bonus in the feature game. In FIG. 80A, the wild symbol 310*a* is added to or replaces the code Nos. 0, 4, 8, 9, 10, 13, 18, 19, 21, and 22 of the symbol column No. 1 (first column), and the feature symbol 310*b* is added to or replaces the code Nos. 3 and 16. Further, the wild symbol 310*a* is added to or replaces the code Nos. 1, 11, 12, 13, and 17 of the symbol column No. 2 (second column), and the feature symbol 310*b* is added to or replaces the code Nos. 2, and 15. Further, the wild symbol 310*a* is added to or replaces the code Nos. 0, 1, 6, 8, 9, 10, 11, 13, and 17 of the symbol column No. 3 (third column), and the feature symbol 310*b* is added to or replaces the code Nos. 3 and 15. Further, in FIG. 80B, the wild symbol 310*a* is added to or replaces the code Nos. 0, 1, 3, 6, 7, 8, 11, and 12 of the symbol column No. 4 (fourth column), and the feature symbol 310*b* is added to or replaces the code Nos. 4, 13, and 15. Further, the wild symbol 310*a* is added to or replaces the code Nos. 0, 1, 2, 9, 10, 14, 19, and 20 of the symbol column No. 5 (fifth column), and the feature symbol 310*b* is added to or replaces the code Nos. 3, 4, and 15.

Next, FIGS. 81A and 81B are an exemplary feature game symbol table in cases where it is determined, in the feature game additional specific symbol count determining process of S242 shown in FIG. 85, that a flag related to a maximum bet is set.

As illustrated in FIGS. 81A and 81B, 40 wild symbols 310*a* and 18 feature symbols 310*b* are added or replace other symbols 310, as a bonus in the feature game. In FIG. 81A, the wild symbol 310*a* is added to or replaces the code Nos. 0, 4, 8, 9, 10, 13, 18, 19, 21, and 22 of the symbol column No. 1 (first column), and the feature symbol 310*b* is added to or replaces the code Nos. 3, 12, and 16. Further, the wild symbol 310*a* is added to or replaces the code Nos. 1, 11, 12, 13, and 17 of the symbol column No. 2 (second column), and the feature symbol 310*b* is added to or replaces the code Nos. 2, 8, and 15. Further, the wild symbol 310*a* is added to or replaces the code Nos. 0, 1, 6, 8, 9, 10, 11, 13, and 17 of the symbol column No. 3 (third column), and the feature symbol 310*b* is added to or replaces the code Nos. 3, 15, and 19. Further, in FIG. 81B, the wild symbol 310*a* is added to or replaces the code Nos. 0, 1, 3, 6, 7, 8, 11, and 12 of the symbol column No. 4 (fourth column), and the feature symbol 310*b* is added to or replaces the code Nos. 4, 13, 15, and 18. Further, the wild symbol 310*a* is added to or replaces the code Nos. 0, 1, 2, 9, 10, 14, 19, and 20 of the symbol column No. 5 (fifth column), and the feature symbol 310*b* is added to or replaces the code Nos. 3, 4, 8, 12, and 15.

After the process of S257 of FIG. 86, the main CPU 41 ends this sub routine.

(Feature Game Symbol Determining Process)

FIG. 87 is a flowchart showing a sub routine of the feature game symbol determining process of fifth embodiment.

This process is executed by the main CPU 41 running a symbol determining program stored in the RAM 43.

First, the main CPU 41 obtains random numbers from the random number generating circuit 64 (S260). In this process, the main CPU 41 obtains five random numbers corresponding to the symbol columns of the display blocks 28.

Next, the main CPU 41 determines the code No. of the symbol column of the display block 28, at the time of stopping the symbols 310, based on the five random numbers obtained and the feature game symbol table (S261). For example, when the random number for the first column is 23035, the code No. for the first column is 08. Note that the code No. of a symbol column corresponds to the code No. of a symbol 310 rearranged in the first row of the display blocks 28, amongst those arranged in four rows.

After the process of S261, the main CPU 41 ends this sub routine.

(Free Rescue Spin Game Running Process)

In Fifth embodiment, the free rescue spin game running process of FIG. 88 is executed in place of the free rescue game running process of FIG. 74. Next, the following describes the free rescue spin game running process, with reference to FIG. 88. A player can play a free rescue spin game without betting a coin.

First, the main CPU 41 sets a remaining free game count T to T=F4 (=fifth specific number of times=30) in the free game count storage area of the RAM 43 (S270).

Next, the main CPU 41 displays a free rescue spin game occurrence image on the lower image display panel 16.

Next, the main CPU 41 executes a free rescue spin game specific symbol count determining process (S271). The free rescue spin game additional specific symbol count determining process is the same as the feature game additional specific symbol count determining process shown in FIG. 85, and no further explanation is provided here. Note that in a free rescue spin game, there are further added 20 more wild symbols 310*a* than those added in the feature game, and 6 more feature symbols 310*b* than those added in a feature game.

FIG. 79 shows a table indicating the number of additional wild symbols 310*a* and feature symbols 310*b* for each game type, in relation to fifth embodiment. As shown in FIG. 79, in an ordinary feature game, and a feature game with a flag related to a maximum bet being set, the number of additional wild symbols 310*a* is 40 to 90. In comparison to this, in an ordinary free rescue spin game and a free rescue spin game with a flag related to a maximum bet being set, the number of additional wild symbols 310*a* is 60 to 110. That is, 20 more wild symbols 310*a* are added in both of the free rescue spin game. Further, in relation to the number of added feature symbols 310*b*, there are added 12 feature symbols 310*b* in an ordinary feature game, while 18 feature symbols 310*b* are added in a feature game with a flag related to a maximum bet being set, i.e., 6 more feature symbols 310*b* than those added in the ordinary feature game are added in a feature game with a flag related to a maximum bet being set. While the number of feature symbols 310*b* added in a feature game with a flag related to a maximum bet being set is 18, the number of feature symbols 310*b* added in a free rescue spin game with a flag related to a maximum bet being set is 24. That is, there is added six more feature symbols 310*b* in the free rescue spin game with a flag related to maximum bet being set, than the number of feature symbols 310*b* added in the feature game with a flag related to maximum bet being set. As described, the respective levels of advantages given by an ordinary feature game, a feature game with a flag related to the maximum bet being set, an ordinary free rescue spin game, and a free rescue spin game with a flag related to the maximum bet being set are different. Therefore, it is possible to provide a game that hardly bores a player.

Returning to FIG. 88, the main CPU 41 executes a free rescue spin game symbol table updating process (S272). In the free rescue spin game symbol table updating process, the main CPU 41 updates the free rescue spin game symbol table based on the number of additional wild symbols 310*a* and that of additional feature symbols 310*b* determined in the free rescue spin game specific symbol count determining process. The free rescue spin game symbol table updating process is the same as the feature game symbol table updating process of FIG. 86, and no further explanation is provided here.

Next, in S273, the main CPU 41 executes a symbol addition effect process and adds symbols to be increased (S273).

Next, the main CPU 41 executes a free rescue spin game symbol determining process of FIG. 88 (S274). The free rescue spin game symbol determining process is the same as the feature game symbol determining process of FIG. 87, and no further explanation is provided here.

Next, in S275, the main CPU 41 performs a scroll display control process (S275). This process is a display control whereby scrolling of symbols 310 is started and symbols 310 determined in S274 are rearranged thereafter.

Next, the main CPU 41 determines whether a winning is achieved (S276). When it is determined that a winning is achieved, the main CPU 41 determines an amount of payout (S277)

Next, the main CPU 41 adds a payout amount determined in S277 to the free rescue spin game total payout amount indicated by the total payout amount data stored in the total payout amount storage area of the RAM 43 (S278).

When it is determined in S276 that no winning has been achieved or after S278, the main CPU 41 executes a feature symbol addition process (S279). In this process, the main CPU 41 adds the number of feature symbols 310*b* rearranged on the display blocks 28 in the currently running game to the number of feature symbols 310*b* indicated by the feature symbol count data stored in the feature symbol count storage area of the RAM 43.

Next, the main CPU 41 determines whether three or more feature symbols 310*b* are rearranged (S280). In this process, whether or not three or more feature symbols 310*b* are rearranged in the display blocks 28 is determined, without taking into consideration the payline 300.

When it is determined in S280 that three or more feature symbols 310*b* are rearranged, the main CPU 41 sets the remaining free game count stored in the free game count storage area of the RAM 43 to T=T+F4 (F4=fifth specific number of times=30) (S281).

Further, the main CPU 41 displays a free game addition image on the lower image display panel 16.

When it is determined in S280 that the number of feature symbols 310*b* rearranged is less than three or after S281, the main CPU 41 sets the remaining free game count stored in the free game count storage area of the RAM 43 so that T=T−1 (S282).

Next, the main CPU 41 determines whether T=0 based on the remaining game count data stored in the free game count storage area of the RAM 43 (S283).

When it is determined that it is not T=0, the main CPU 41 brings the process back to S274. On the other hand, when it is determined that T=0, the main CPU 41 ends this sub routine.

The free rescue spin game running process executed in S214 of FIG. 83 is described hereinabove with reference to FIG. 88.

Thus, Fifth embodiment of the present invention is described above. Note that the present invention is not limited to this.

Fifth embodiment deals with a case where the number of paylines 300 is 25; however, the number of paylines is not limited in the present invention. For example, the number of paylines 300 may be 30.

Further, Fifth embodiment deals with a case where 1000 credits is given as a bonus credit, and a free rescue spin game is run for the purpose of rescuing a player, when it is determined that the number of lost game D of base games surpasses 500. The present invention however is not limited to this. The above mentioned number of lost game D may be 1000 times, or any given number. Further, the credit bonus may be 500 credits or any given amount of credits.

Further, in Fifth embodiment, the free game is a game in which display of symbols 310 on display blocks 28 are varied and stopped, and then an amount of payout is determined according to the symbols 310 having stopped or a combination of the stopped symbols (i.e. a game normally run in a slot machine). However, the free game of the present invention is not limited to this, and the free game may be different from a game run in a slot machine 10. Examples of the free game include: a card game such as poker, a shooting game, a fighting game, or the like. The free game may be a game that awards a game medium or a game awarding no game medium.

The free game in the present invention may be suitably designed, and is not particularly limited, as long as the free game requires no bet of a game medium.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

The following describes, with reference to FIGS. 89 to 123, sixth embodiment of a slot machine and a playing method thereof, according to the present invention. Note that the reference numbers given to each member and symbols indicating steps of flowcharts in the above mentioned drawings, and description referring to these reference numbers and symbols refers to members and steps which are described in the above mentioned embodiments, and do not refer to those described in other embodiments.

Sixth Embodiment

The following will describe a slot machine and a playing method thereof of sixth embodiment of the present invention.

(Gaming Machine Overview)

Figure 89:
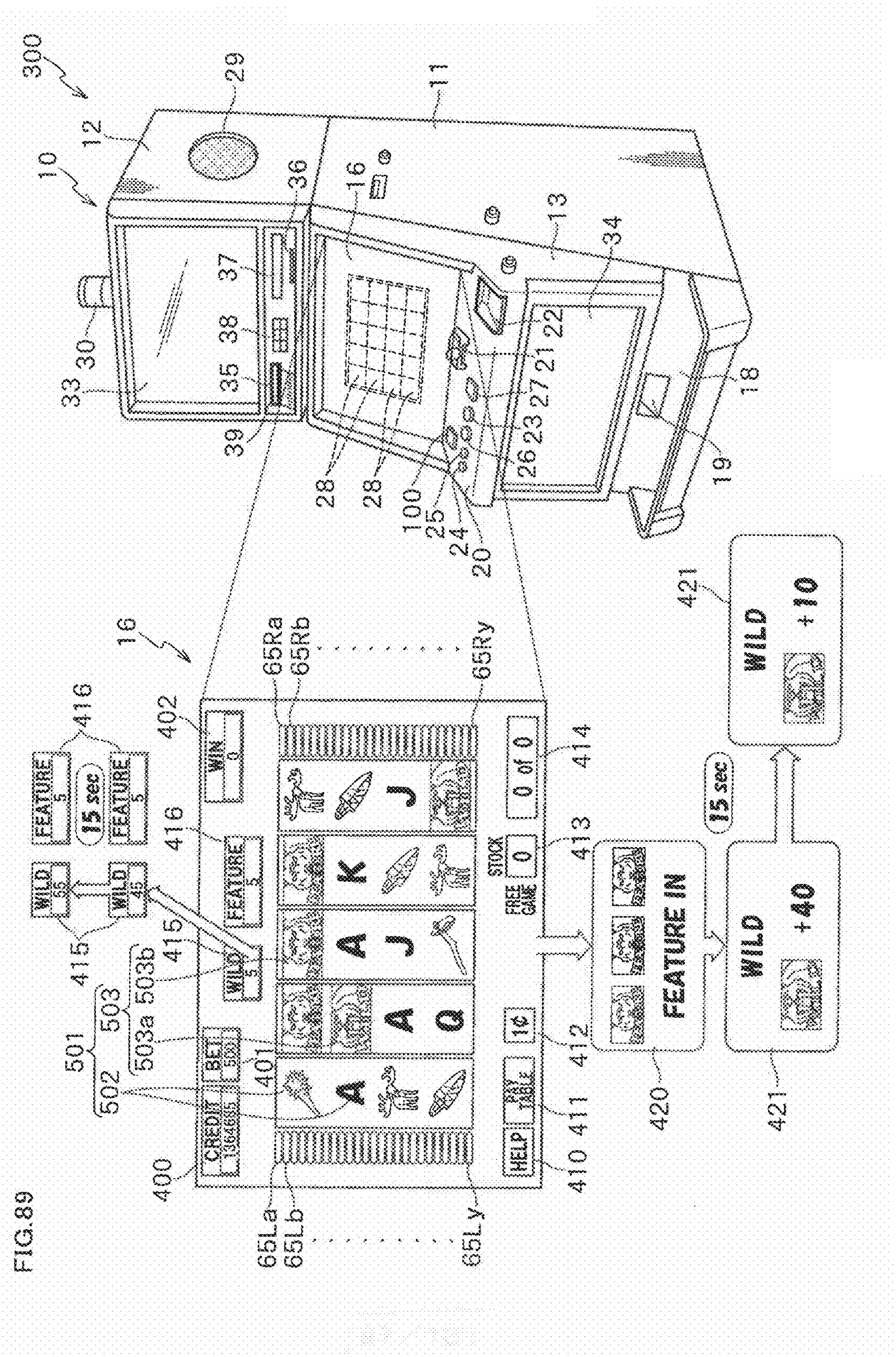
FIG. 89 is an explanatory diagram illustrating a playing method of a gaming machine.
Figure 90:
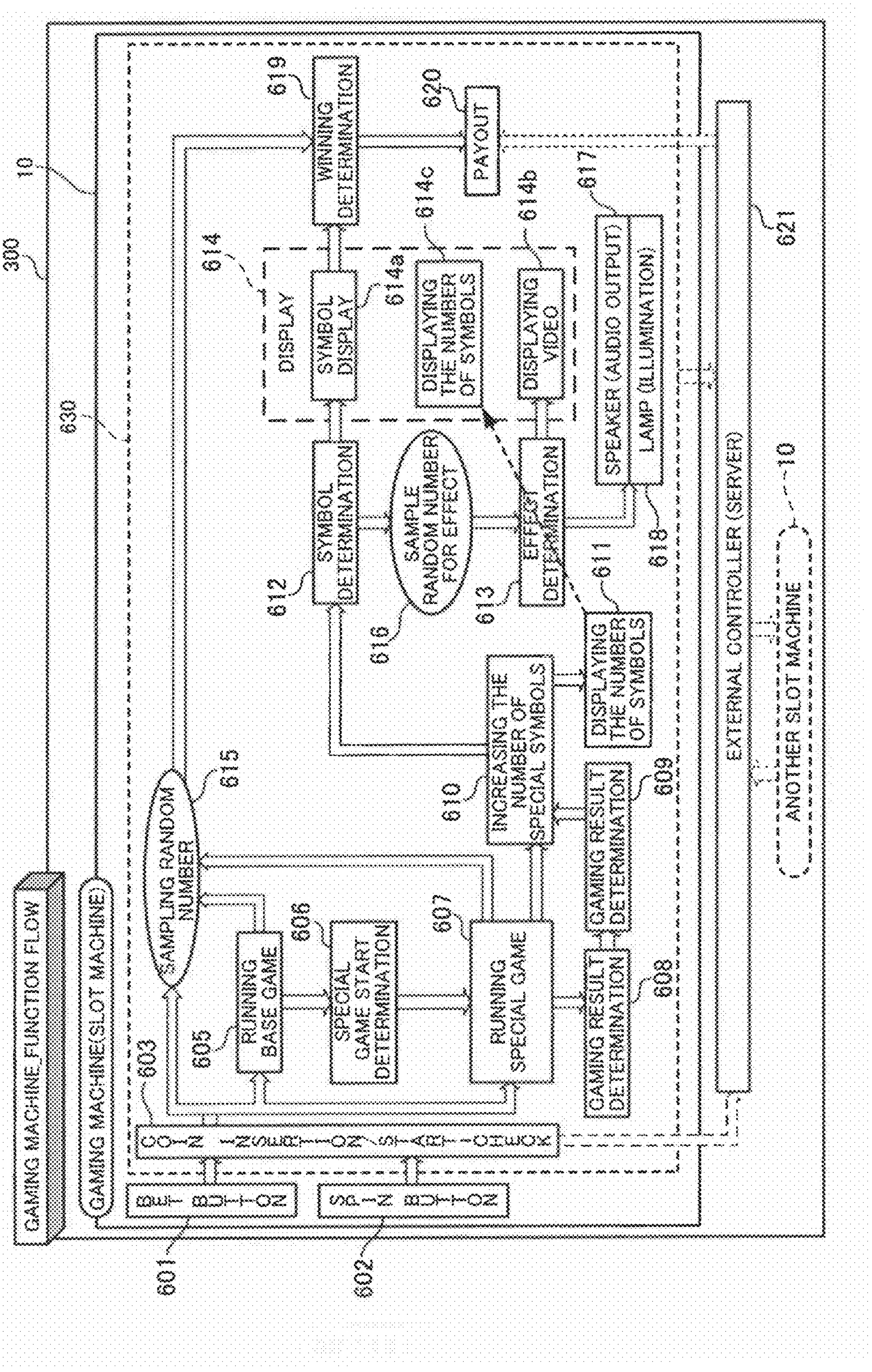
FIG. 90 is a block diagram of the gaming machine.
Figure 92:
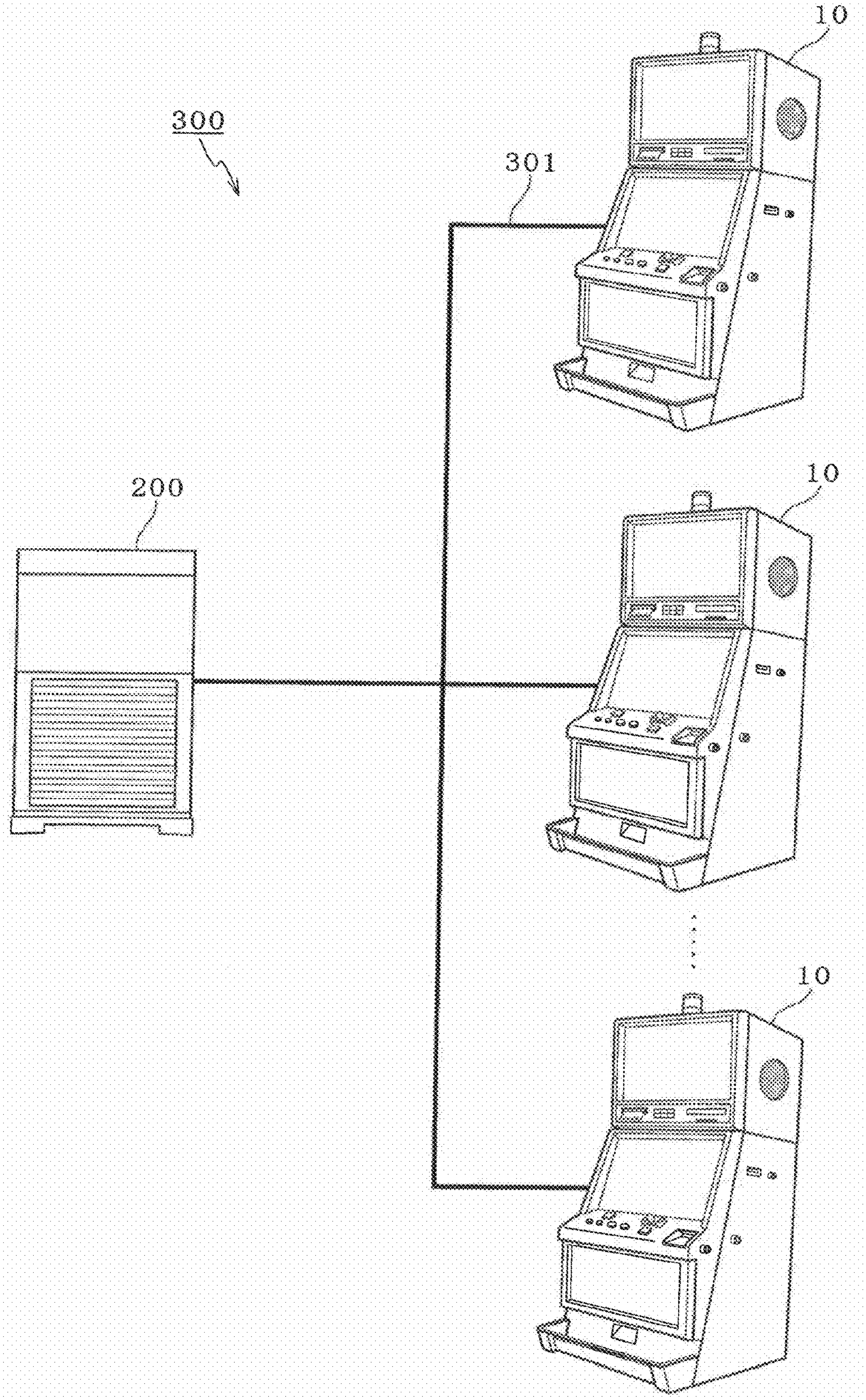
FIG. 92 is a schematic diagram illustrating a system of the gaming machine.

As illustrated in FIG. 89, the gaming machine 300 has a slot machine 10 capable of increasing stepwise the number of specific symbols 503 in a special game which runs a free game more than once. This slot machine 10 in the present embodiment may be an independent slot machine 10 intended for a single player, or a slot machine 10 connected to and in communication with another slot machine 10 so as that the and the other slot machines 10 as a whole enable participation of plural players as illustrated in FIG. 92. The present embodiment deals with a case where the entire structure and system enables participation of plural players, and where each slot machine 10 is capable of serving as an independent gaming machine 300.

A game runnable with a bet of less game media than the base game is referred to as "free game". Note that "bet of less game media" encompasses betting of zero game media. The "free game" therefore may be a game runnable without a bet of game medium, which awards an amount of game media according to symbols 501 having been rearranged. In other words, "free game" is a game which is started without the premise of consuming a game medium. To the contrary, a later-mentioned "base game" is a game runnable on condition that a game medium is bet, which awards an amount of game media according to symbols 501 rearranged. In other words, "base game" is a game which starts on the premise that a game media is consumed.

The expression "rearrange" means dismissing an arrangement of symbols 501, and once again arranging symbols 501. An "arrangement" in this specification means a state of symbols 501, which can be visibly confirmed by a player. Further, "special game" is a game in which the free game is repeated a predetermined number of times corresponding to a game repeat count. The symbols 501 include "specific symbols 503" in addition to ordinary symbols 502. That is, the "symbols 501" is a superordinate conception of the specific symbols 503 and ordinary symbols 502. The specific symbols 503 include a wild symbol 503*a* and a trigger symbol 503*b*. The wild symbol 503*a* is a symbol substitutable for any type of symbol 501. Trigger symbol 503*b* is a symbol serving as a trigger for starting at least a special game. That is the trigger symbol 503*b* triggers transition from the base game to the special game, and triggers stepwise increases in the number of specific symbols 503 at an interval from the start of the special game. Further, the trigger symbol 503 triggers increases in the number of specific symbols 503 in the special game, that is, the trigger symbol 503*b* triggers increases in the number of trigger symbols 503*b* and/or wild symbols 503*a*. Note that the trigger symbol 503*b* may trigger an increase in the game repeat count of the free game in the special game.

Specifically, the slot machine 10 includes a symbol display device 16 which rearranges symbols 501 including the specific symbols 503, and a controller programmed to execute the following processes of (g1) to (g6).

In (g1), a base game, which awards game medium according to symbols 501 rearranged on the symbol display device 16, is run on condition that a game medium is bet. In (g2), a free game, which awards game medium according to symbols 501 rearranged on the symbol display device 16, is run without condition that a game medium is bet. In (g3), the base game is run by rearranging, on the symbol display device 16, symbols 501 randomly selected from a group of symbols 501. In (g4), when a specific symbol 503 is rearranged so as to satisfy a predetermined condition in the base game, the number of specific symbols 503 in the group of symbols 501 is increased stepwise. The "predetermined condition" is for example the number or positions of particular symbols rearranged, positional relation among the specific symbols 503, a combination of these conditions, or the like.

In (g5), when a specific symbol 503 is rearranged so as to satisfy a predetermined condition in the base game, a special game is run which repeats the free game a predetermined number of times corresponding to a game repeat count. In (g6), when a specific symbol is rearranged in the special game, a gaming result is determined in relation to the number of the specific symbols 503 rearranged.

Note that the gaming result may be a gain to be awarded to the player. In this case, (g1) to (g6) performed in a first structure of the slot machine 10 may be re-written as follows.

That is, in (g1) performed by the first structure, a base game is run by rearranging, on the symbol display device 16, symbols 501 randomly selected from a group of symbols 501. In (g2), when a specific symbol 503 is rearranged so as to satisfy a first predetermined condition in the base game, the number of specific symbols 503 in the group of symbols 501 is increased stepwise. In (g3), when a specific symbol 503 is rearranged so as to satisfy the first predetermined condition in the base game, a special game is run which repeats the free game a predetermined number of times corresponding to a game repeat count. In (g4), when a specific symbol 503 is rearranged so as to satisfy a second predetermined condition in the special game, a gain is awarded to the player.

Here, the "first predetermined condition" and "second predetermined condition" are for example the number or positions of particular symbols rearranged, positional relation among the specific symbols 503, a combination of these conditions, or the like. The second predetermined condition and the first predetermined condition may be the same or different from each other. Further, the "gain" in this specification means, for example, an increase in the number of specific symbols 503, an increase in the game repeat count of a special game or the free game, an in crease in the payout odds, or the like.

The slot machine 10 (gaming machine 300) having the above described structure realizes a gaming method whereby the number of specific symbols 503 is increased stepwise in the special game which runs a free game more than once. In other words, the slot machine 10 (gaming machine 300) is operable at least by a control method which increases stepwise the number of specific symbols 503 in the special game which runs a free game more than once.

Specifically, a gaming method (control method) of the slot machine 10 includes the steps of: running the base game requiring a bet of a game medium, in which symbols 501 randomly selected from a group of symbols 501 including specific symbols 503 are rearranged, and a predetermined number of game media is awarded according to symbols 501 rearranged; when a specific symbol 503 is rearranged so as to satisfy a predetermined condition in the base game, increasing stepwise at an interval the number of specific symbols 503 in the group of symbols 501; when a specific symbol 503 is rearranged so as to satisfy a predetermined condition in the base game, running a special game in which free game runnable without a bet of a game medium is repeated a predetermined number of times corresponding to a game repeat count, the free game rearranging symbols 501 randomly selected from the group of symbols 501 and awarding an amount of game medium according to the symbols 501 rearranged; and determining a gaming result in relation to the number of specific symbols 503 rearranged in the special game.

Incidentally, since the free game is played without consuming a game medium, players in general plays a game with a strong hope for occurrence of the free game. However, in cases where the free game is repetitively run more than once upon meeting a predetermined condition, the free game which is repeated in the same manner is not so interesting. With the gaming machine 300 or the playing method (control method) including the above mentioned steps, a special game which runs a free game more than once is run, when a specific symbol 503 is rearranged in the base game so as to satisfy a predetermined condition. In this special game, the number of specific symbols 503 in the group of symbols 501 is increased stepwise at an interval. Thus, when a specific symbol 503 is rearranged in a free game during the special game, the gaming result is determined in relation to the number of specific symbols 503 rearranged. The player therefore stands higher chances of winning a gain. As a result, whether the stepwise increases in the number of specific symbols 503 occur before or during the free game, a player is able to enjoy more and expect more from the free game repeated.

Suppose that the special game which runs a free game more than once is run simultaneously and in parallel to the stepwise increases in the number of specific symbols 503 in the group of symbols 501 at an interval. In this case, the number of specific symbols 503 increases stepwise at an interval during the special game. Therefore, a free game subsequent to another free game having previously run during the same special game stands higher chances of having more specific symbols 503 rearranged than those rearranged in the other free game. Then, when a specific symbol 503 is rearranged in the free game during the special game, the gaming result is determined in relation to the number of specific symbols 503 rearranged. That is, the possibility of having a specific symbol 503 arranged increases with the progress of the special game, and the gaming result is determined in relation to the number of specific symbols 503 rearranged. The player therefore stands higher chances of winning a gain.

Determining the gaming result in relation to the number of specific symbols 503 rearranged during the special game allows the player to sense the stepwise increase in the number of specific symbols 503. Further, determining the gaming result in this manner gives the player a hope for a possible increase in the number of specific symbols 503 during the special game, and a satisfaction from recognizing an increase in the number of specific symbols 503. Particularly, when the gaming result determined in relation to the number of specific symbols 503 rearranged causes an increase in the gain to the player, the player's expectation and satisfaction are further improved.

Further, in addition to the first structure, the gaming machine 300 has a second structure in which a gaming result in a free game (special game) is an increase in the number of wild symbols 503*a*. Specifically, in the second structure, the specific symbols 503 includes a wild symbol 503*a* substitutable for any type of symbol 501, and a trigger symbol 503*b* serving as a trigger for starting at least a special game.

Further, the controller increases the number of wild symbols 503*a* in the group of symbols 501 as a gaming result of the special game With the gaming machine 300 having the first and the second structures, the possibility of having the wild symbol 503*a* rearranged increases with the progress of the special game. The player therefore stands higher chances of winning a gain. Accordingly, during the special game, the player is able to sense an increase in the number of wild symbols 503*a*. This gives the player a hope for a possible increase in the number of wild symbols 503*a*, when starting the special game, and gives a satisfaction when the player recognizes an increase in the number of wild symbols 503*a*.

Further, the gaming machine 300 has, in addition to the first and second structures, a third structure in which a gaming result in a free game (special game) is a stepwise increase in the number of wild symbols 503*a*. Specifically, the third structure is such that the controller increases stepwise at an interval the number of wild symbols 503*a* in symbols 501 rearranged.

With the gaming machine 300 having the first, second and third structures, the possibility of having a wild symbol 503*a* rearranged increases with the progress of the special game. The player therefore stands higher chances of winning a gain. The increase in the frequency of winning a gain during the special game causes the player to sense stepwise increases in the number of wild symbols 503. This gives the player a hope for a possible increase in the number of wild symbols 503*a* during the special game, and gives a satisfaction when the player recognizes an increase in the number of wild symbols 503*a*.

Further, in addition to the first structure, the gaming machine 300 has a fourth structure in which, among the specific symbols 503, the number of wild symbols 503*a* or the number of trigger symbols 503*b* is increased stepwise. Note that the fourth structure may be added to a gaming machine 300 having the first and second structures, or a gaming machine 300 having the first to third structures. Specifically, in the fourth structure, the specific symbols 503 includes a wild symbol 503*a* substitutable for any type of symbol 501, and a trigger symbol 503*b* serving as a trigger for starting at least the special game. When a specific symbol 503 is rearranged so as to satisfy a predetermined condition in the base game, the controller randomly selects the wild symbol 503*a* or the trigger symbol 503*b*. The controller then increases the number of wild symbols 503*a* or trigger symbols 503*b* stepwise at an interval.

The gaming machine 300 further including the fourth structure gives a player a hope for a possible increase in the number of wild symbols 503*a* or trigger symbols 503*b*, at the time of transition from the base game to the special game.

Further, the gaming machine 300 may include a fifth structure which displays the number of specific symbols 503. Specifically, the fifth structure includes a symbol display device 16 which displays the number of specific symbols 503 in the group of symbols 501.

With the gaming machine 300 having the fifth structure, the number of specific symbols 503 is displayed on the symbol display device 16. Therefore, the player is able to directly recognize an increasing status of the specific symbols 503. By looking at the symbol display device 16, the player is given a sufficient hope and satisfaction for and from an increase in the number of specific symbols 503 (i.e. an increase in a gain to the player) during the special game.

(Functional Blocks of Gaming Machine 300)

As illustrated in FIG. 100, the gaming machine 300 structured as described above includes: plural slot machines 10, an external controller 621 (server) connected to and in communication with the slot machines 10. Each slot machine 10 includes a bet button unit 601, a spin button unit 602, a display unit 614, and a game controller 630 which controls these units.

The bet button unit 601 has a function of accepting a player's operation for entering a bet amount. The spin button unit 602 has a function of accepting a player's operation for starting a game. The display unit 614 has a function of displaying, in the form of a still image, various symbols 501, numerical values, marks, or the like, and displaying moving pictures such as an effect video. The display unit 614 has a symbol display region 614*a*, a video display region 614*b*, and a symbol count display region 614*c*. The symbol display region 614*a* displays symbols 501, as illustrated in FIG. 89. The video display region 614*b* displays various effect video information to be displayed during a game, in the form of moving image or still image. The symbol count display region 614*c* displays the number of specific symbols 503 which are randomly selectable, as illustrated in FIG. 89.

The game controller 630 includes: a coin insertion/start-check unit 603; a base game running unit 605; a special game start determination unit 606; a special game running unit 607; a gaming result determining unit 608; a gaming result determining unit 609; a specific symbol increasing unit 610; a symbol count display unit 611; a random number sampling unit 615; a symbol determining unit 612; an effect-use random number sampling unit 616; an effect determining unit 613; a speaker unit 617; a lamp unit 618; a winning determining unit 619; and a payout unit 620.

The base game running unit 605 has a function of running a base game on condition that the bet button unit 601 is operated. The special game start determination unit 606 determines whether to run a special game, based on a combination of rearranged symbols 501 resulted from the base game. That is, the special game start determination unit 606 has functions of: (a) determining that the player is entitled to a special game, when a trigger symbol 503*b* is rearranged so as to satisfy a predetermined condition; and (b) activating the special game running unit 607 so as to run a special game from the subsequent unit game.

Note that a unit game includes a series of operations performed within a period between a start of receiving a bet to a point where a winning may be resulted. For example, bet reception, rearrangement of symbols 501 having been stopped, and payout process to award a payout are performed once each within a single unit game of the base game.

The special game running unit 607 has a function of running the special game which is started simply by operating the spin button unit 602, and which repeats a free game a predetermined number of times corresponding to a game repeat count. The special game running unit 607 also has a function of outputting special game running information to the specific symbol increasing unit 610 and the gaming result determining unit 608. The specific symbol increasing unit 610 has: a function of detecting a start of the special game based on the special game running information; a function of increasing stepwise the number of specific symbols 503 in the group of symbols 501, at an interval from the beginning of the special game; a function of outputting to the symbol determining unit 612 information on an increase in the number of specific symbols 503, as symbol-increase information; and a function of outputting the symbol-increase information to the symbol count display unit 611. The symbol count display unit 611 has a function of outputting the symbol-increase information to the symbol count display region 614*c* of the display unit 614.

The symbol determining unit 612 has: a function of determining symbols 501 to be rearranged, by using a random number given by the random number sampling unit 615; a function of rearranging selected symbols 501 on the symbol display region 614*a* of the display unit 614; a function of outputting information of the symbols 501 rearranged, to the winning determining unit 619; a function of, based on symbol-increase information from the specific symbol increasing unit 610, increasing the number of specific symbols 503 in the group of symbols 501 from which symbols to be rearranged are selected; a function of replacing at least one of the symbols 501 in the group, with some or all of the specific symbols 503 having increased in number; and a function of outputting an effect designation signal to the effect-use random number sampling unit 616, based on the conditions of the rearrangement of the symbols 501.

The effect-use random number sampling unit 616 has functions of, when receiving the effect instruction signal from the symbol determining unit 612, sampling an effect-use random number; and outputting an effect-use random number to the effect determining unit 613. The effect determining unit 613 has: a function of determining an effect by using the effect-use random number; a function of outputting, to a video display region 614*b* of the display unit 614, video information in the effect thus determined; and a function of outputting audio information and illumination information to the speaker unit 617 and the lamp unit 618, respectively.

The winning determining unit 619 has a function of determining whether a winning is resulted when information of symbols 501 rearranged and displayed on the display unit 614 is given; a function of calculating a payout when it is determined that a winning has resulted, based on the winning combination; and a function of outputting to the payout unit 620 a payout signal which is based on the amount of payout.

Further, the gaming result determining unit 608 which receives special game running information from the special game running unit 607 has: a function of determining whether a specific symbol 503 is rearranged in the special game, based on the information given from the symbol determining unit 612 and the winning determining unit 619; and a function of outputting determination result information to the gaming result determining unit 609. The gaming result determining unit 609 has a function of determining a gaming result in relation to the number of specific symbols 503 rearranged, and a function of awarding a gain to the player based on the determination result information. For example, to achieve the function of awarding a gain, the gaming result determining unit 609 has a function of outputting to the specific symbol increasing unit 610 an instruction signal for causing an increase in the number of specific symbols 503.

It is possible to perceive the gaming machine thus structured has the following structure and executes the following playing method.

Namely, a gaming machine 300 has a symbol display device 16 which rearranges plural symbols 501, and a controller programmed to execute the following processes of (g1) to (g6). (g1) Running a base game requiring a bet of a predetermined amount of game media, in which game a predetermined amount of game media is awarded according to symbols 501 rearranged on the symbol display device 16. (g2) Running a free game runnable with a bet of less game media than the base game, in which free game a predetermined amount of game media is awarded according to symbols 501 rearranged on the symbol display device 16. (g3) Running the base game by rearranging symbols 501 selected from a group of symbols 501 on the symbol display device 16. (g4) When a predetermined condition is met in the base game, increasing the number of specific symbols 503 in the group of symbols 501. (g5) Displaying, on the symbol display device 16, stepwise increases in the number of specific symbols 503 in the group of symbols 501. (g6) when the predetermined condition is met in the base game, running a special game in which the free game is repeated more than once according to a game repeat count, with the number of specific symbols 503 in the group of symbols 501 increased.

Further, a gaming method of a gaming machine includes the steps of: running a base game requiring a bet of a game medium, in which game symbols 501 randomly selected from a group of symbols 501 including specific symbols 503 are rearranged, and an amount of game media according to symbols 501 rearranged is awarded; running a free game runnable with a bet of less game media than the base game, in which free game a predetermined amount of game media is awarded according to symbols 501 rearranged; running the base game by rearranging symbols 501 selected from a group of symbols 501; when a predetermined condition is met in the base game, increasing the number of specific symbols 503 in the group of symbols 501; displaying stepwise increases in the number of specific symbols 503 in the group of symbols 501; and when the predetermined condition is met in the base game, running a special game in which the free game is repeated more than once according to a game repeat count, with the number of specific symbols 501 in the group of symbols 501 increased.

The symbol display device 16 shows that the number of specific symbols 503 in the group of symbols 501 is increased stepwise. Thus, before or during the free game, the player is excited and wonders how long the number keeps increasing. As a result, the free game which is repetitively run is made more interesting.

The gaming machine 300 may be adapted so that; the specific symbols includes a wild symbol 503*a* substitutable for any type of symbol 501, and a trigger symbol 503*b* serving as a trigger for starting at least the special game; and in (g4), when the predetermined condition is met in the base game, the controller randomly selects the wild symbol 503*a* or the trigger symbol 503*b*, and increases stepwise the number of wild symbols 503*a* or trigger symbols 503*b* according to the selection made. Thus, the free game which is repetitively run is made even more interesting.

(Operation of Gaming Machine 300)

Figure 91:
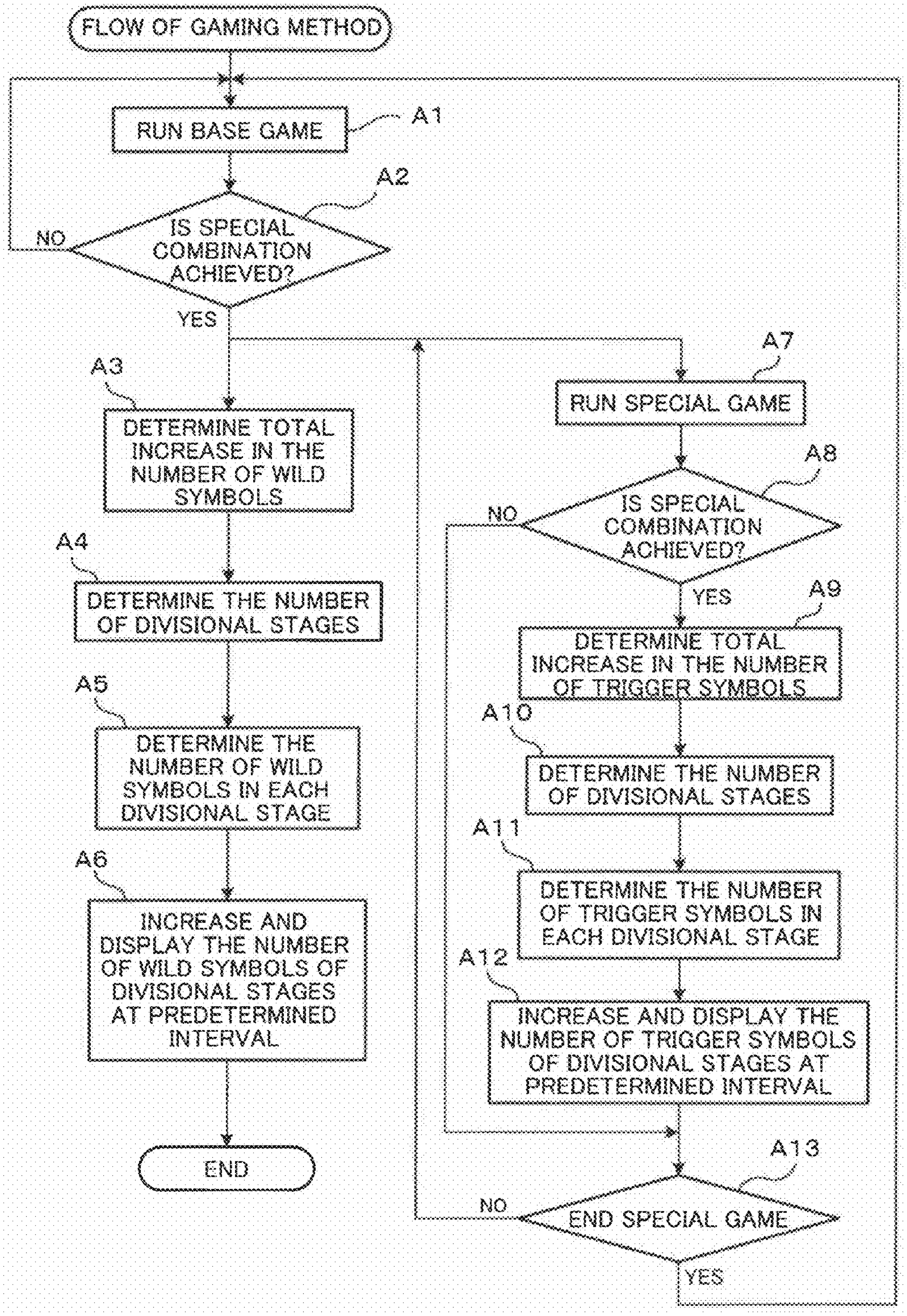
FIG. 91 is a flowchart illustrating the playing method of the gaming machine.

The following describes, with reference to the flowchart of FIG. 91, an operation of the gaming machine 300 having the above described functional blocks.

First, a base game is run (A1). Specifically, a series of the following operations are performed.

(Coin Insertion/Start-Checking)

First, the gaming machine 300 checks if the bet button unit 601 is pressed by a player, and if the spin button unit 602 is pressed by the player.

(Symbol Determination)

Next, when the player presses the spin button unit 602, the gaming machine 300 samples a random number for symbol determination. Then, for each video reel displayed on the display unit 614, the gaming machine 300 determines symbols 501 to be presented to the player when scrolling of symbol columns is stopped.

(Symbol Display)

Next, the gaming machine 300 starts scrolling the symbol column on the video reels, and stops the scrolling so as to present to the player the selected symbols 501.

(Winning Determination)

When the scrolling of the symbol columns on the video reels is stopped, the gaming machine 300 determines whether the combination of the symbols 501 presented to the player relates to a winning.

(Payout)

Next, when it is determined that the combination of the symbols 501 presented to the player relates to a winning, the gaming machine 300 awards a benefit to the player according to the combination of the symbols 501.

For example, when the combination of symbols 501 displayed relates to payout of coins, the gaming machine 300 pays out to the player a predetermined number of coins according to the combination of the symbols 501.

Next, whether a special combination is formed is determined (A2). If a special combination is not formed (A2: NO), A1 is re-executed and the base game is repeated. On the other hand, if a special combination is formed (A2: YES), a series of operations (A7 to A13) for running a special game and another series of operations (A3 to A6) for increasing stepwise the number of wild symbols 503*a* (specific symbols 503) are performed in a parallel manner.

More specifically, when the combination of symbols 501 is related to triggering of a bonus game (A2: YES), the gaming machine 300 starts a bonus game (special game) (A7). In the present embodiment, the free game is repeated a predetermined number of times in the bonus game. That is, symbols to be stopped are randomly selected a predetermined number of times without consumption of coins.

Note that the "bonus game" is a synonym of "special game" and "feature game", in this specification. In the present embodiment, the bonus game is a game in which a free game is repeated. However, the bonus game is not particularly limited and may be any type of game, provided that the bonus game is more advantageous than the base game for a player. Another bonus game may be adopted in combination, provided that the player is given a more advantageous playing conditions than the base game. For example, the bonus game may be a game that provides a player with a chance of winning more coins than the base game or a game that provides a player with a higher chance of winning coins than the base game. Alternatively, the bonus game may be a game that consumes less number of coins than the base game. Further, the bonus game may be a game that provides a combination of these and other advantageous conditions to a player.

Further, when the group of symbols 501 includes a symbol related to triggering a jackpot, and when a symbol combination related to triggering a jackpot is displayed, the gaming machine 300 awards a jackpot prize to the player. A jackpot in this specification is a function of (i) partially accumulating coins consumed by a player of each slot machine 10 as a jackpot prize, and (ii) when the jackpot trigger is established in a slot machine 10, awarding the jackpot prize through that slot machine 10.

In each game, the gaming machine 300 calculates an amount accumulated as a jackpot prize (accumulation amount) and transmits the accumulation amount to the external controller 621. The external controller 621 adds to the jackpot prize the accumulation amount received from each slot machine 10.

Further, the gaming machine 300 may have a benefit such as mystery bonus or insurance, in addition to the above mentioned benefit.

Mystery bonus is a predetermined amount of payout awarded to a winner of a special lottery. When the spin button unit 602 is pressed, the gaming machine 300 samples a random number for a mystery bonus, and determines whether or not a mystery bonus is achieved by means of lottery.

Insurance is a function provided for the purpose of salvaging a player when the bonus game is not run for a long period of time. In the present embodiment, the activation of the insurance is selectable by a player. The insurance is activated in exchange of a predetermined amount of game media for purchasing the insurance.

When the insurance is activated, the gaming machine 300 starts counting the number of games played. Then, when the counted number of games played reaches a predetermined number without any award of a large amount of game media from a bonus game or the like, the gaming machine 300 awards an amount of game media set as the insurance.

(Determination of Effect)

The gaming machine 300 provides an effect in the form of an image displayed on the display unit 614, illumination by the lamp unit 618, or a sound produced from the speaker unit 617. The gaming machine 300 samples an effect-use random number and determines an effect, based on symbols 501 having been determined through a lottery, or the like.

When the special game is run as described above, there is determined whether or not a special combination is formed in the special game (g7). If the special combination is not formed (A7: No), there is determined whether or not a special game has ended (A13). On the other hand, if the special combination is formed (A7: Yes), a total increase in the number of trigger symbols, which is the number of trigger symbols 503*b*, is determined (A9). Then, the number of divisional stages is determined (A10), and the number of trigger symbols of each stage is determined (A11). The number of trigger symbols of each divisional stage is increased at a predetermined interval, and the number of trigger symbols having increased is displayed (A12). Thus, while the special game is repetitively run, the number of trigger symbols is increased stepwise, and the stepwise increases in the number of the trigger symbols is displayed, in the gaming machine 300.

Then, there is determined whether the special game has ended (A13). If the special game has not ended (A13: NO), A7 is re-executed, and the special game is repeated. If the special game has ended (A13: YES), A1 is executed and the base game is re-executed.

While the above series of operations (A7 to A13) for running the special game are executed, another series of operations (A3 to A6) are executed in parallel to the series of operations (A7 to A13), for increasing stepwise the number of wild symbols 503*a* which are the specific symbols 503.

Specifically, a total increase in the number of wild symbol which is a total number by which in the wild symbol 503*a* increases is determined (A3). Then, the number of divisional stages is determined (A4), and the number of wild symbols of each stage is determined (A5). The number of wild symbols of each divisional stage is increased at a predetermined interval, and the number of wild symbols having increased is displayed (A6). Thus, while the special game is repetitively run, the number of wild symbols is increased stepwise, and the stepwise increases in the number of wild symbols is displayed, in the gaming machine 300.

(System Structure of Gaming Machine 300)

The gaming machine 300 includes plural slot machines 10, and an external controller 200 connected to the slot machines 10 via a communication line 301.

The external controller 200 is for controlling the slot machines 10. In the present embodiment, the external controller 200 is a so-called hall-server provided in a gaming facility having plural slot machines 10. Each slot machine 10 is given a unique identification number. The external controller 200 identifies the source of data from any slot machine 10, by referring to the identification number. The identification number is also used for designating the destination, when transmitting data from the external controller 200 to any slot machine 10.

Note that the gaming machine 300 may be built in plural gaming facilities or a single gaming facility such as a casino where various games are provided. Further, when building the gaming machine 300 in a single gaming facility, the system of the gaming machine 300 may be built in each floor or each section of the gaming facility. The communication line 301 may be wired or wireless. For example, an exclusive line, switched line, or the like may be adopted.

(Specific Structure of Gaming Machine 300)

Next, the following describes the specific structure of the gaming machine 300.

Figure 93:
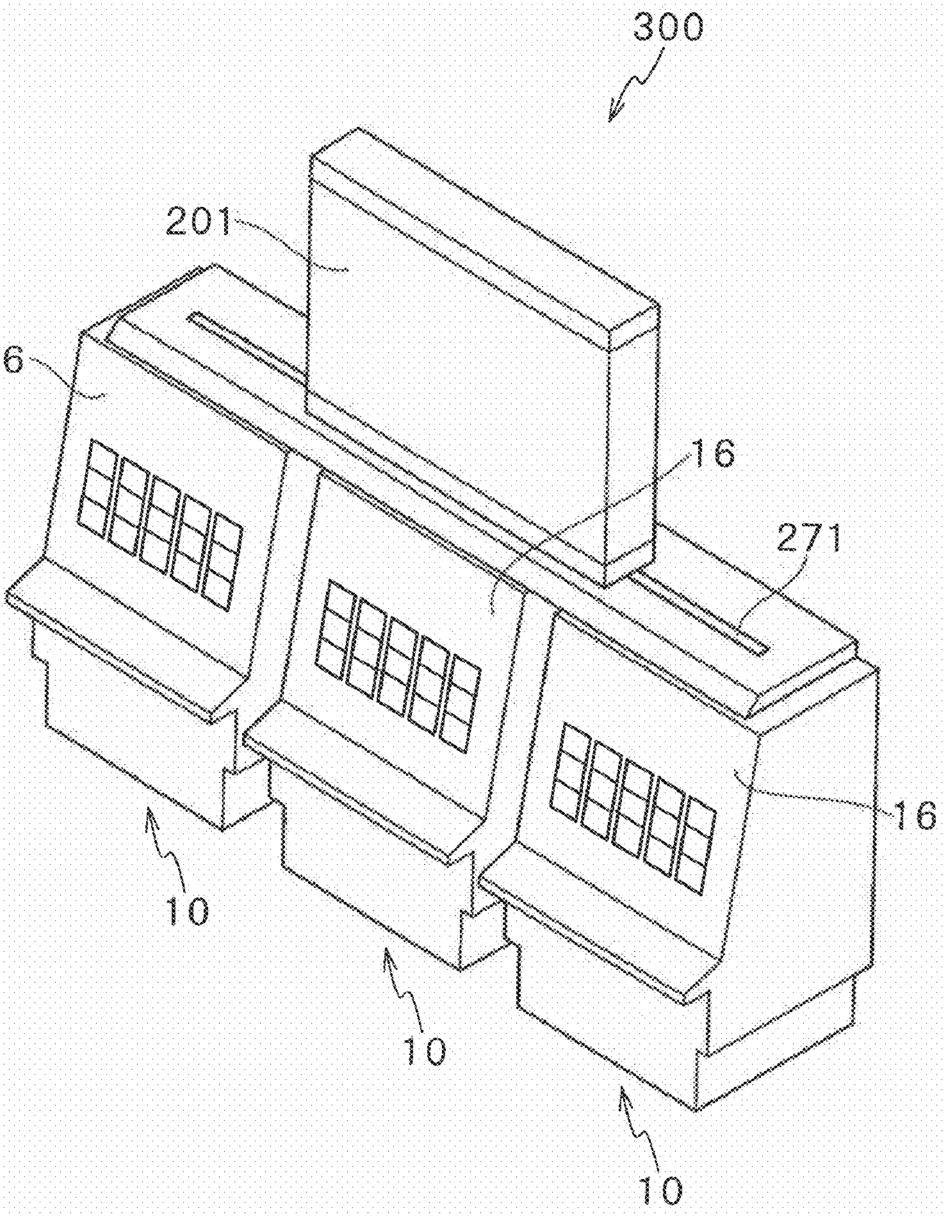
FIG. 93 is a perspective view illustrating the entire gaming machine.

As illustrated in FIG. 93, the gaming machine 300 has a common display 201, a rail 271, a not-shown drive motor, and the not-shown external controller 200. The common display 201 is connected to and in communication with the slot machines 10 each of which is a terminal device capable of running a game independently of the others. This common display 201 displays an image related to a common game. The rail 271 and the drive motor moves the common display 201 to immediately above any of the slot machines 10.

(Mechanical Structure of Slot Machine 10)

Figure 94:
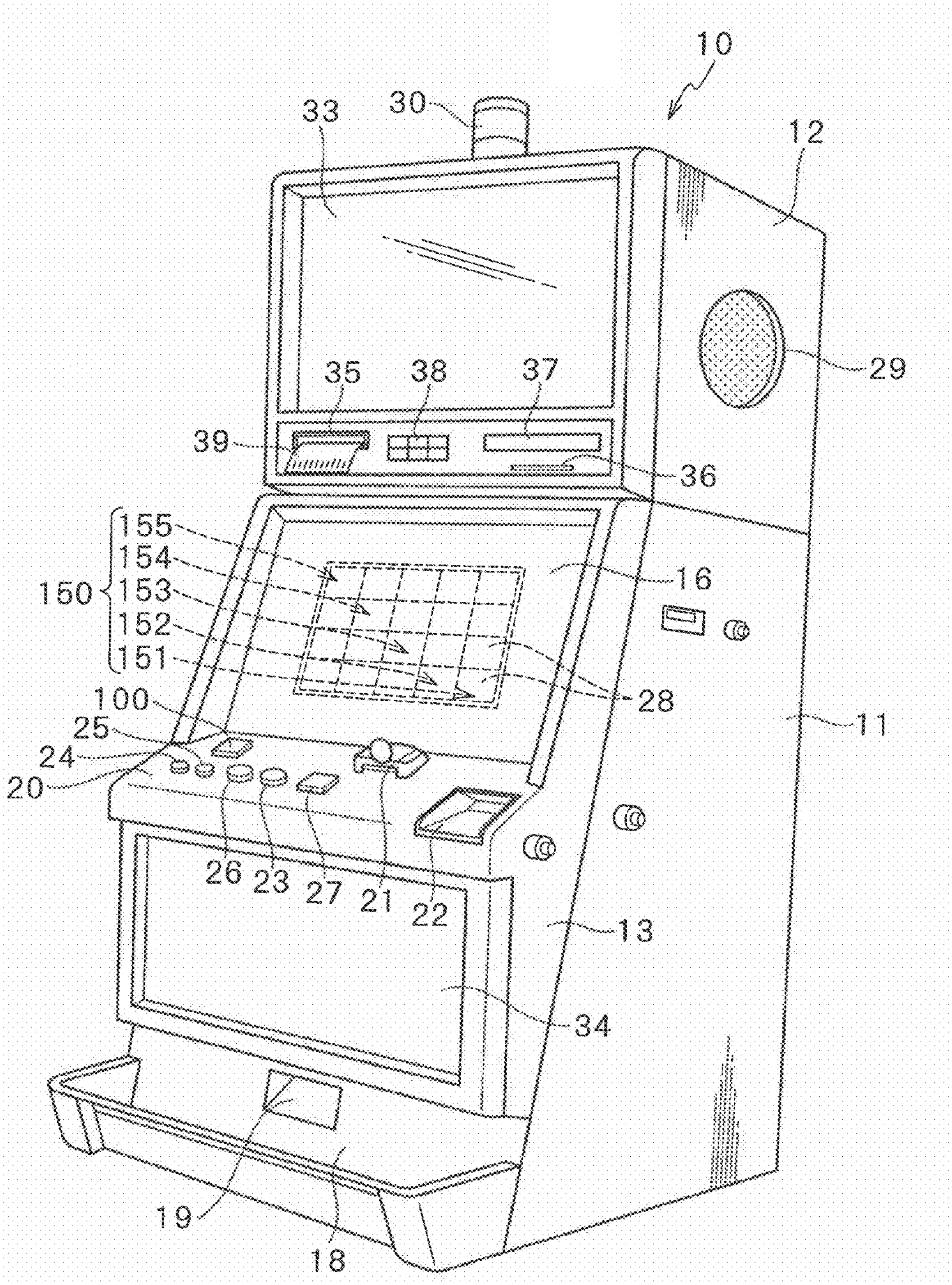
FIG. 94 is a perspective view of a slot machine in the gaming machine.

As illustrated in FIG. 94, the slot machine 10 runs a unit game when a game value is spent. The game value is a coin, bill, or valuable information corresponding to these. Note that the game value in the present invention is not particularly limited. Examples of the game value includes medals, tokens, cyber money, tickets. The ticket is not particularly limited, and a later-mentioned ticket with a barcode may be adopted for example.

The slot machine 10 includes: a cabinet 11, a top box 12 provided above the cabinet 11, and a main door 13 provided on the front surface of the cabinet 11.

The main door 13 has a symbol display device 16 which is also referred to as lower image display panel. The symbol display device 16 includes a transparent liquid crystal panel. The symbol display device 16 has a display window 150 at its center portion. The display window 150 includes 20 display blocks 28 which are arranged in five columns and four rows. The columns form pseudo reels 151 to 155, each having four display blocks 28. The four display block 28 in each of the pseudo reels 151 to 155 are displayed as if all the display blocks 28 are moving downward at various speed. This enables rearrangement in which symbols 501 respectively displayed in the display blocks 28 are rotated in a longitudinal direction and stopped thereafter.

Figure 106:
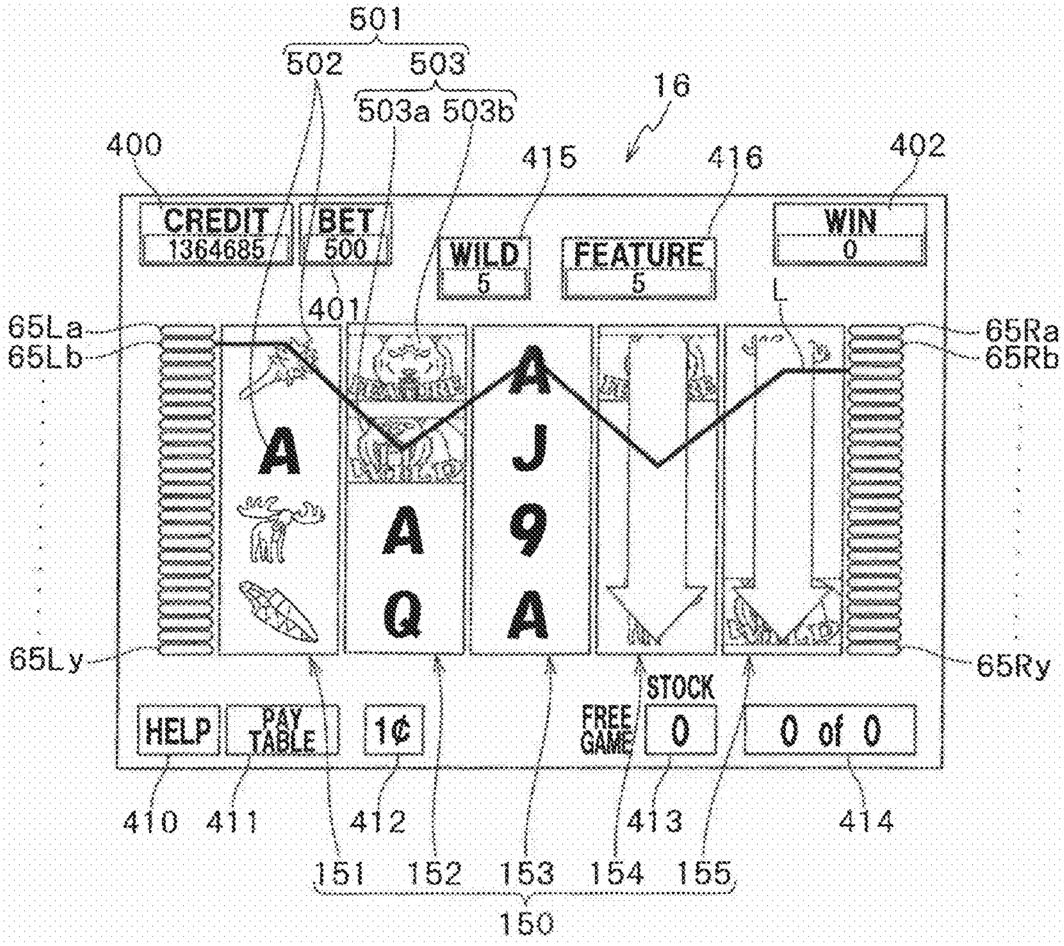
FIG. 106 is an explanatory diagram illustrating a display state of the symbol display device.

On both sides of the display window 150 are payline occurrence columns which are symmetrically arranged. As illustrated in FIG. 106, a payline occurrence column on the left when viewed from the front side includes 25 payline occurrence parts 65L (65La to 65Ly).

On the other hand, a payline occurrence column on the right when viewed from the front side includes 25 payline occurrence parts 65R (65Ra to 65Ry).

Each payline occurrence part 65L is paired with one of the payline occurrence parts 65R. For each pair of the payline occurrence parts 65L and 65R, there is a prescribed payline L which extends from the payline occurrence part 65L to the payline occurrence part 65R paired with that payline occurrence part 65L. Although there are 25 paylines, FIG. 106 only shows one payline L for the sake of easier understanding.

Each payline L is activated when the payline L connects a pair of payline occurrence parts 65L and 65R. The payline L otherwise is inactive. The number of active paylines L is determined base on the bet amount. When the bet amount is the maximum, the maximum number of paylines L (i.e. 25 paylines L) are activated. Each active payline L forms various winning combinations of symbols 501. The winning combination is detailed later.

The present embodiment deals with a case where the slot machine 10 is a video slot machine. However, the slot machine 10 of the present invention may partially adopt a mechanical reel in place of the pseudo reels 151 to 155.

Further, a not-shown touch panel 69 is disposed at the front of the symbol display device 16, and a player is able to input various instructions by operating the touch panel 69. From the touch panel 69, an input signal is transferred to the main CPU 41.

Below the lower image panel 16 are control panel 20, a coin receiving port 21, and a bill identifier 22. The control panel 20 includes plural buttons 23 to 27 and 100 by which a player is able to input an instruction related to progression of a game. The coin receiving port 21 receives a coin and takes it into the cabinet 11.

The control panel 20 has: a start button 23, a change button 24, a cash-out button 25, a 1-bet button 26, a maximum bet button 27, and an insurance bet button 100. The start button 23 is for inputting an instruction to start scrolling symbols. A change button 24 is used when requesting a gaming facility staff member to exchange money. The cash-out button 25 is for inputting an instruction to pay out credited coins to a coin tray 18.

The 1-bet button 26 is for inputting an instruction to bet a single coin out of the credited coins. The maximum bet button 27 is for inputting an instruction to bet the maximum number of coins bettable in one game (500 coins in this embodiment), out of the credited coins. The insurance bet button 100 is for inputting an instruction of transition from the non-insured mode to the insured mode.

The bill identifier 22 is for validating the legitimacy of a bill input, and takes into the cabinet 11 those recognized as legitimate. The bill identifier 22 may be also capable of reading a barcode on a later-mentioned barcode-attached ticket 39. On the lower front surface of the main door 13, that is, below the control panel 20, there is provided a belly glass 34 with a character or the like of the slot machine 10 being drawn thereon.

On the front surface of the top box 12 is an upper image display panel 33. The upper image display panel 33 has a liquid crystal panel, and displays thereon an image or text which provides introduction to the game, the rules of the game, or the like information.

Further, the top box 12 is provided with speakers 29. Below the upper image display panel 33 are a ticket printer 35, a card reader 36, a data displayer 37, and a key pad 38. The ticket printer 35 prints on a ticket a barcode and outputs the ticket as a barcode-attached ticket 39. A barcode is encoded data containing a credit amount, date, an identification number of the slot machine 10, or the like. A player is able to exchange the barcode-attached ticket 39 with bill or the like at a predetermined location in the gaming facility (e.g. change booth of a casino).

The card reader 36 reads/writes data from/into a smart card. The smart card is carried by a player, and stores therein data for identifying the player, data relating to a history of games played by the player, or the like. The smart card may store data of coins, bill, or a credit card. Further, it is possible to adopt a magnet stripe card instead of the smart card. The data displayer 37 includes a fluorescent display or the like, and displays the data read by the card reader 36 and the data input by the player through the key pad 38. The key pad 38 is for entering instructions or data relating to issuing of a ticket or the like.

(Electric Structure of Slot Machine 10)

Figure 95:
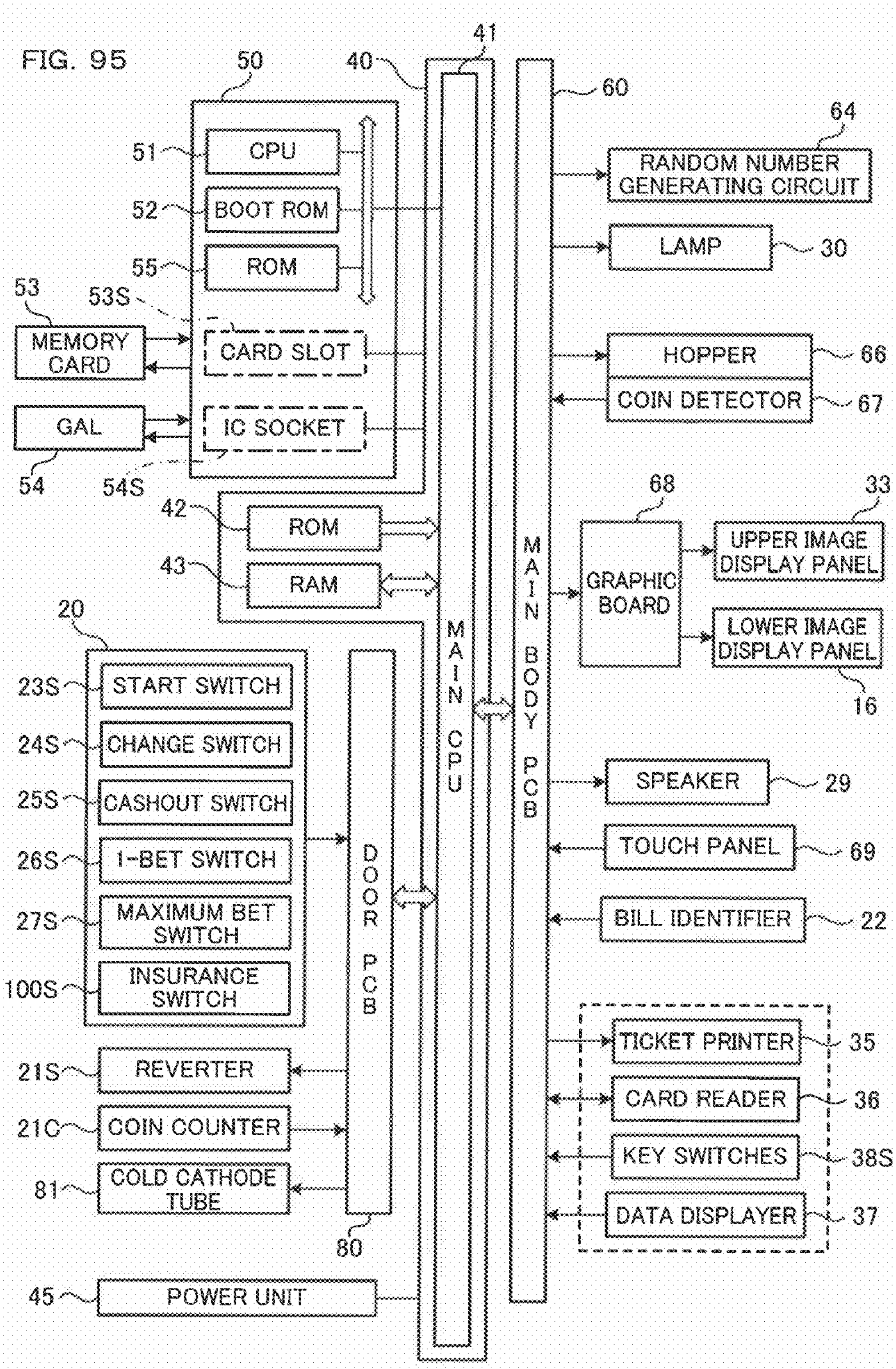
FIG. 95 is a block diagram illustrating a control circuit of the gaming machine.

FIG. 95 is a block diagram illustrating an internal structure of the slot machine 10 illustrated in FIG. 93. The gaming board 50 is provided with a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 is made of an involatile memory such as a compact flash (®) or the like, and stores a game program. The game program includes a symbol determination program. The symbol determination program is a program for determining symbols to be rearranged on the display blocks 28.

The card slot 53S is structured so as to allow the memory card 53 to be attached/detached to/from the card slot 53S. This card slot 53S is connected to the motherboard 40 through an IDE bus. Thus, the type and content of a game run by a slot machine 10 can be modified by detaching the memory card 53 from the card slot 53S, write a different game program into the memory card 53, and inserting the memory card 53 back into the card slot 53S. The game program includes a program according to a game progress. This image data may be data of free game occurrence image 200, achievement effect image 201, free game addition image 202 or the like.

The game program includes odds data (see FIG. 103) and data of, for example, the following tables: a base game symbol table (see FIG. 96), an additional wild symbol count determination table (see FIG. 101), an additional trigger symbol count determination table (see FIG. 102), and a symbol code No. determination table (see FIG. 100) indicating the symbol column determination table. The base game symbol table indicates (i) a symbol of a display block forming a symbol column and (ii) a code No. and a random number associated with the symbol. The odds data indicates the number and types of symbols rearranged on a payline L and a corresponding amount of award.

The CPU 51, the ROM 55 and the boot ROM 52 connected through an internal bus are connected to the motherboard 40 through the PCI bus. The PCI bus communicates signals between the motherboard 40 and the gaming board 50 and supplies power from the motherboard 40 to the gaming board 50.

The motherboard 40 is structured by using a marketed general-purpose motherboard which is a printed circuit board having basic components of a personal computer, and includes: a main CPU 41; a ROM (Read Only Memory) 42; and a RAM (Random Access Memory) 43. The motherboard 40 corresponds to the controller of the present invention.

The ROM 42 is made of a memory device such as a flash memory, and stores permanent data and a program such as BIOS (Basic Input/Output System) which is run by the main CPU 41. Running the BIOS by the main CPU 41 initializes predetermined peripherals and starts loading of a game program in a memory card 53 via the gaming board 50. Note that, in the present invention, the ROM 42 may be rewritable or non-rewritable.

The RAM 43 stores data used during operation of the main CPU 41 and a program such as a symbol determination program. Further, the RAM 43 is capable of storing a game program.

Further, the RAM 43 stores a credit amount, and an input amount and a payout amount for each game (unit game)

Further, the RAM 43 stores data of a bonus game symbol table (see FIGS. 97, 98, and 99) or the like. The bonus game symbol table indicates (i) a symbol of a display block forming a symbol column and (ii) a code No. and a random number associated with the symbol. The bonus game is a type of special game and is also referred to as "feature game".

Further, the RAM 43 has a free game count recording region, a total game count recording region, and a total payout amount recording region, and a trigger symbol count recording region. The trigger symbol is also referred to as "feature symbol". In the free game count recording region is stored remaining game data which indicates a remaining free game count T. In the total game count recording region is stored total game count data indicating a total game count C. The total game count C is the number of base games played after a transition to the insured mode. The trigger symbol count recording region stores trigger symbol count data indicating a trigger symbol count. The trigger symbol count is the total number of the trigger symbols that may be rearranged during a free game.

Further, the main RAM 43 is provided with a storage region for an insurance flag. Insurance flag is a flag which is activated when the insurance BET button 100 is pressed down. The insurance flag storage region is, for example, a storage region of a predetermined bits, and the insurance flag is turned on and off according to contents of the storage region. The insurance flag in the on state corresponds to the insured mode. The insurance flag in the off state corresponds to the non-insured mode.

When the bonus game is run in the insured mode, an increase in the number of trigger symbols and/or that of wild symbols may be greater than the non-insured mode. Further, when a bonus combination (special combination) is achieved during a bonus game, an increase in the number of trigger symbols and/or that of wild symbols may be greater than the non-insured mode.

The motherboard 40 is connected to a later-mentioned main body PCB (Printed Circuit Board) 60 and a door PCB 80 via a USB. The motherboard 40 is also connected to the power unit 45.

To the main body PCB 60 and door PCB 80 are connected equipment and devices which generate input signals to be input to the main CPU 41 or which are controlled by control signals output from the main CPU 41. The man CPU 41 runs a game program stored in the RAM 43 based on an input signal input to the main CPU 41, thereby storing a result of a predetermined computation in the RAM 43 or transmitting control signals to the equipment and devices to control the same.

To the main PCB 60 are connected: a lamp 30, a hopper 66, a coin detector 67, a graphic board 68, a speaker 29, a touch panel 69, a bill identifier 22, a ticket printer 35, a card reader 36, a key switches 38S, a data displayer 37, and a random number generating circuit 64. The lamp 30 flashes in a predetermined pattern, based on a control signal output from the main CPU 41.

The hopper 66 is installed inside the cabinet 11, and outputs a predetermined number of coins from the coin payout port 19 to the coin tray 18, based on a control signal output from the main CPU 41. The coin detector 67, when detecting that a predetermined number of coins is output from the coin payout port 19, outputs an input signal to the main CPU 41.

The graphic board 68 controls image displaying on the upper image display panel 33 and the symbol display device 16, based on a control signal output from the main CPU 41. On the upper image display panel 33 and display blocks 28 of the symbol display device 16 are displayed symbols which are scrolled and stopped. The credit amount display unit 400 of the symbol display device 16 displays thereon a credit amount stored in the RAM 43. Further, the bet amount display unit 401 of the symbol display device 16 displays the number of coins bet. Further, the payout display unit 402 of the symbol display device 16 displays the number of coins paid out. The graphic board 68 has a VDP (Video Display Processor) which generates image data based on control signal output from the main CPU 41, a video RAM which temporarily stores image data generated by the VDP, or the like. The image data used at the time of generating image data by the VDP is in a game program which is read out from the memory card 53 and stored in the RAM 43.

The bill identifier 22 validates whether a bill is legitimate, and only receives a legitimate bill into the cabinet 11. The bill identifier 22, when receiving a legitimate bill, outputs an input signal indicating the value of the bill to the main CPU 41. The main CPU 41 stores in the RAM 43 a credit amount corresponding to the value of the bill indicated by the input signal.

Based on a control signal from the main CPU 41, the ticket printer 35 prints on a ticket a barcode and outputs the ticket as a barcode-attached ticket 39. The barcode is encoded data containing the credit amount stored in the RAM 43, date, and the identification number of the slot machine 10. The card reader 36 reads out data from a smart card and transmits the data to the main CPU 41, or writes data into a smart card based on a control signal from the main CPU 41. The key switches 38S are provided to the key pad 38, and transmit a predetermined input signal to the main CPU 41 when a player operates the key pad 38. The data displayer 37 displays data read out by the card reader 36 based on a control signal from the main CPU 41, or data input by the player through the key pad 38.

The random number generating circuit 64 generates a random number at a predetermined timing. Note that random numbers generated by the random number generating circuit 64 ranges from 0 to 65535.

The door PCB 80 is connected to a control panel 20, a reverter 21S, a coin counter 21C and a cold cathode tube 81. The control panel 20 is provided with a start switch 23S corresponding to the start button 23, a change switch 24S corresponding to the change button 24, a cash-out switch 25S corresponding to a cash-out button 25, 1-bet switch 26S corresponding to the 1-bet button 26, a maximum bet switch 27S corresponding to the maximum bet button 27, and an insurance bet switch 100S corresponding to the insurance bet button 100. Each of the switches 235 to 275 and 90S outputs an input signal to the main CPU 41 when corresponding one of the buttons 23 to 27 and 100 is operated.

The coin counter 21C is provided inside the coin receiving port 21, and validates whether a coin input by a player to the coin receiving port 21 is legitimate coin. Any non-legitimate coin is output from the coin payout port 19. Further, the coin counter 21C, when detecting a legitimate coin, outputs an input signal to the main CPU 41.

The reverter 21S operates based on a control signal from the main CPU 41, and delivers coins that are recognized as legitimate by the coin counter 21C into a not-shown cash box or hopper 66 in the slot machine 10. That is, when the hopper 66 is full of coins, legitimate coins are delivered by the reverter 21S to the cash box. On the other hand, if the hopper 66 is not full of coins, legitimate coins are delivered to the hopper 66. The cold cathode tube 81 functions as a back light disposed at the back sides of the symbol display device 16 and the upper display panel 33. This cold cathode tube 81 lights based on a control signal output from the CPU 41.

(Symbols, Combinations, or the Like)

Symbols displayed on the pseudo reels 151 to 155 of the slot machine 10 form symbol columns each including plural symbols 501. Each symbol 501 forming a symbol column is given any of the code Nos. 0 to 19 or more, as shown in FIGS. 96 to 99. Each symbol column has a combination of symbols 501 which are: "WILD", "FEATURE", "A", "Q", F"JY", "K", "BAT", "HAMMER", "SWORD", "RHINOCEROS", "BUFFALO", and "DEER".

Any four consecutive symbols 501 of a symbol column are displayed (arranged) in the uppermost stage, upper stage, lower stage, and lowermost stage of the corresponding one of the pseudo reels 151 to 155, respectively, thereby forming a symbol matrix of five columns and four rows on the display window 150. Symbols 501 forming a symbol matrix are scrolled at least when the start button 23 is pressed to start a game. The scrolling of the symbols 501 stops (symbols 501 are rearranged), when a predetermined period elapses after the start of scrolling.

Further, for each symbol 501, various winning combinations are set beforehand. Each winning combination means a winning is achieved. A winning combination is a combination of symbols 501 stopped on the payline L, which is advantageous for a player. The wording "advantageous" means that: a predetermined number of coins according to the winning combination are paid out; a bonus game is started; or the like.

In the present embodiment, a winning combination is a combination of symbols 501 which is rearranged on an activated payline L and includes a predetermined number of at least one of the following symbols 501: "WILD", "FEATURE", "A", "Q", "J", "K", "BAT", "HAMMER", "SWORD", "RHINOCEROS", "BUFFALO", and "DEER". When a predetermined type of symbols 501 is set as a scatter symbol, a winning combination is regarded as to be formed if a predetermined number or more of scatter symbols are rearranged, irrespective of the activation/inactivation status of the paylines L.

Specifically, a winning combination with "FEATURE" (a trigger symbol 503*b*) stopped on a payline L serves as a bonus trigger and causes (i) transition of the gaming mode from the base game to the bonus game and (ii) a payout according to the bet amount. Further, when the winning combination includes a symbol 501 "BAT" stopped on the payline L during the base game, there is paid out an amount of coins (value) which is a product of a basic payout amount multiplied by the bet amount. The paying out process is detailed later with reference to the payout table of FIG. 104.

(Base Game Symbol Table)

FIG. 96 shows a table used for determining symbols 501 to be rearranged during a base game. The base game symbol table indicates a symbol 501 on a display block 28 forming a symbol column, a code No. associated with the symbol 501, and a number range associated with the code No. The number range is one of twenty ranges which cover 0 to 65535.

Note that the above numbers may be equally divided into twenty ranges or unequally divided into twenty ranges. The latter case enables adjustment of a winning possibility for each symbol 501 by adjusting the associated range of random numbers. Further, the range of random numbers associated with a specific symbol 503, i.e. "FEATURE" serving as the trigger symbol 503*b* or "WILD" serving as a wild symbol 503*a*, may be narrower than ranges of random numbers associated with other symbols 501. This allows easier adjustment of winning or losing, by adjusting the possibility of winning a valuable symbol 501.

For example, when a random number randomly selected for the first column is "10000", the symbol "J" whose code No. "3" is associated with a range of random numbers including "10000" is selected as a symbol to be rearranged in the first pseudo reel 151. Further, for example, when a random number randomly selected for the fourth column is "40000", the symbol "FEATURE" whose code No. "12" is associated with a range of random numbers including "40000" is selected as a symbol to be rearranged in the fourth pseudo reel 151.

(Bonus Game Symbol Table)

FIGS. 97 to 99 are tables each for use at the time of determining symbols 501 to be rearranged during a bonus game. As is the base game symbol table, the bonus game symbol table contains a symbol 501 of a display block 28 of a symbol column, a code No. associated with the symbol 501, and a number range associated with the code No. The number range is one of twenty ranges which cover 0 to 65535. These numbers 0 to 65535 are divided into the ranges as is the case of the base game symbol table.

Further, the bonus game symbol table includes additional specific symbols 503 or specific symbols 503 replacing the other symbols. The wording "replacing" means that new symbol data is written over already existing symbol data. The number of additional symbols or the number of symbols replacing the other symbols, or the symbol column in which the addition or replacement takes place may be randomly determined or determined beforehand. In the present embodiment, an increase is determined based on the additional wild symbol count determination table of FIG. 102 and the additional trigger symbol count determination table of FIG. 103. When symbol data is replaced with another set of symbol data, an image based on the overwritten data (replacement data) may be displayed, in place of a symbol 501 having been stopped and displayed.

For example, in the bonus game symbol table of FIG. 97, ten wild symbols 503*a* are evenly added to symbol columns (L1) to (L5). This achieves conditions whereby a wild symbols 503*a* is more likely to be selected through random selection, in all the symbol columns (L1) to (L5).

Further, for example, the bonus game symbol table of FIG. 98 is that of FIG. 97 with five trigger symbols 503*b* being added to at least the first symbol column (L1). This achieves conditions whereby a trigger symbols 503*b* is more likely to be selected through random selection, in the first symbol column (L1).

For example, the bonus game symbol table of FIG. 99 is the same as the table of FIG. 97 except in that a predetermined number of symbols are replaced with the wild symbols 503*a*. This achieves conditions whereby a wild symbol 503*a* is more likely to be selected through random selection, although odds table used is the same as that for the base game. Note that the replacement is done so that the fifth symbol column (L5) in FIG. 99 only includes specific symbols 503. A player therefore is encouraged by having a feeling that a specific symbol 503 is always selected through the random selection in the fifth symbol column (L5).

(Symbol Column Determination Table)

FIG. 100 illustrates a symbol column determination table used at the time of determining a symbol column, out of the symbol columns (L1) to (L5), in which addition of or replacement with the specific symbols 503 takes place. The symbol column determination table indicates a symbol column No. and a random number associated with the symbol column. The symbol column No. 1 corresponds to the first column of the display blocks 28; the symbol column No. 2 to the second column of the display blocks 28; the symbol column No. 3 to the third column of the display blocks 28; the symbol column No. 4 to the fourth column of the display blocks 28; and the symbol column No. 5 to the fifth column of the display blocks 28.

The present embodiment deals with a case where an increase in the number of specific symbols 503 or the number of specific symbols 503 to replace the other symbols is determined for each symbol column based on the random number sampled and the symbol column determination table. The present invention however is not limited to this. For example, the number of specific symbols 503 increased or substituted may be determined in advance for each symbol column. Further, an increase in the number of specific symbols 503 or the number of specific symbols 503 to replace the other symbols may be determined for each type of the specific symbols 503.

(Code No. Determination Table)

FIG. 101 shows a code No. determination table. The code No. determination table indicates a code No. and a random number associated with the code No. For example, when the random numbers for the first symbol column No. (the first column) are 40567, 63535, 65323, then “12”, “end”, and “end” are selected as the code Nos., respectively.

The present embodiment deals with a case where the code Nos. of specific symbols to be increased is determined for each of the symbol columns based on the random numbers obtained and code No. determination table. The present invention however is not limited to this. For example, the code No. of a specific symbol 503 to be increased may be set in advance for each symbol column.

(Additional Wild Symbol Count Determination Table)

FIG. 102 shows an additional wild symbol count determination table. The additional wild symbol count determination table indicates a list of additional wild symbol counts and associated random numbers. The list of increases in the number of wild symbols includes five numbers: “10”, “30”, “50”, “70”, and “90”. For example, when the random number is 17235, the additional wild symbol count selected is “30”. Note that the list of increases in the number of wild symbols is not particularly limited provided that the list includes more than one integers of 1 or greater. Further, the list of increases may be variable at a predetermined timing; e.g. at every unit game.

(Additional Trigger Symbol Count Determination Table)

FIG. 103 shows an additional trigger symbol count determination table. The additional trigger symbol count determination table indicates a list of additional trigger symbol counts and associated random numbers. The list of increases in the number of trigger symbols includes five numbers: “2”, “4”, “6”, “8”, and “10”. For example, when the random number is 17235, the additional trigger symbol count selected is “4”. Note that the list of increases in the number of trigger symbols is not particularly limited provided that the list includes more than one integers of 1 or greater. Further, the list of increases, in the table, may be variable at a predetermined timing; e.g. at every unit game.

(Payout Table)

FIG. 104 is a payout table for managing payout awarded based on the winning combination, when the amount of bet is 20. This payout table is stored in the ROM 242 of the main control board 71, and payout information is associated with each winning combination. For example, a payout corresponding to a winning combination including three “A” is “100”. A payout corresponding to a winning combination including five “BUFFALO” is “5000”. Note that the setting of payouts for the base game is the same as that of the free game; however, the present invention is not limited to this. That is, the setting of payouts may be different between the base game and the free game.

(Divisional Stage Count Determination Table)

FIG. 105 shows a divisional stage count determination table determining a divisional stage count. The divisional stage count is the number of steps whereby the number of specific symbols 503 is increased. This determination table is stored in the ROM 242 of the main control board 71. The list of divisional stage counts includes the following five values: “0”, “1”, “2”, “3”, and “4”. For example, when the random number is 17235, the divisional stage count selected is “1”. In this case, the number of specific symbols 503 increases in two steps. Further, when the random number is 14, the divisional stage count selected is “0”. In this case, the number of specific symbol 503 increases in one step. That is, when the divisional stage count is “0”, the number of specific symbols 503 increases only once. Note that the list of divisional stage counts is not particularly limited provided that the list includes more than one integers of 1 or greater. Further, the list of divisional stage counts in the table may be variable at a predetermined timing; e.g. at every unit game.

(Display Status)

The following describes an exemplary display status of the symbol display device 16 in the operation of the slot machine 10.

(Base Game Screen: During Game)

FIG. 106 illustrates an exemplary base game screen which is a screen displayed on the symbol display device 16, during the base game.

More specifically, the base game screen is arranged in a center portion, and includes: a display window 150 having five pseudo reels 151 to 155, and payline occurrence parts 65L and 65R which are arranged on both sides of the display window 150 and symmetrical with respect to the display window 150. Note that FIG. 106 illustrates a base game screen in which first to third pseudo reels 151, 152, and 153 are stopped, while the fourth and fifth pseudo reels 154 and 155 are rotating.

Above the display window 150 are: credit amount display unit 400, a bet amount display unit 401, a wild symbol count display unit 415, a trigger symbol count display unit 416, and a payout display unit 402. These units 400, 401, 415, 416, and 402 are sequentially arranged in this order from the left side to the right side of the player.

The credit amount display unit 400 displays a credit amount. The bet amount display unit 401 displays a bet amount in a unit game in progress. The wild symbol count display unit 415 displays the number of wild symbols 503*a* in a unit game in progress. With this, it is possible to notify the player that there are five wild symbols 503*a* in the base game. The trigger symbol count display unit 416 displays the number of trigger symbols 503*b* in a unit game in progress. With this, it is possible to notify the player that there are five trigger symbols 503*b* in the base game. The payout display unit 402 displays the number of coins to be paid out when a winning combination is achieved.

Blow the display window 150 are: a help button 410; a pay-table button 411; a bet unit display unit 412; a stock display unit 413; and a free game count display unit 414. These units 410, 411, 412, 413, 414 are sequentially arranged in this order from the left side to the right side of the player.

The help button 410, when pressed by a player, activates a help mode. The help mode provides a player with information to solve his/her problem regarding the game. The pay-table button 411, when pressed by a player, activates a payout display mode in which an amount of payout is displayed. The payout display mode displays an explanatory screen indicating relation of a winning combination to the odds.

The bet unit display unit 412 displays a bet unit (payout unit) at the current point. With the bet unit display unit 412, the player is able to know that, for example, the minimum game value required to participate in a unit game is one cent, and that s/he is able to raise his/her bet in increments of one cent.

The stock display unit 413 displays the number of bonus games carried over. Here, the "number of bonus games carried over" means the remaining number of bonus games runnable subsequently to an end of the currently-run bonus game. That is, when the stock display unit 413 displays "3", three more bonus games are runnable after the currently-run bonus game. Note that "0" is displayed during the base game.

The free game count display unit 414 displays the total number of times the bonus game is to be repeated, and how many times the bonus game has been repeated. That is, when the free game count display unit 414 displays "0 OF 0", the total number of free games is 0; that is, the game running is not a bonus game. Further, when the free game count display unit 414 displays "5 OF 8" during the bonus game, the total number of free games is eight, and the current game in progress is the fifth free game.

(Base Game Screen: when Winning Bonus)

Figure 107:
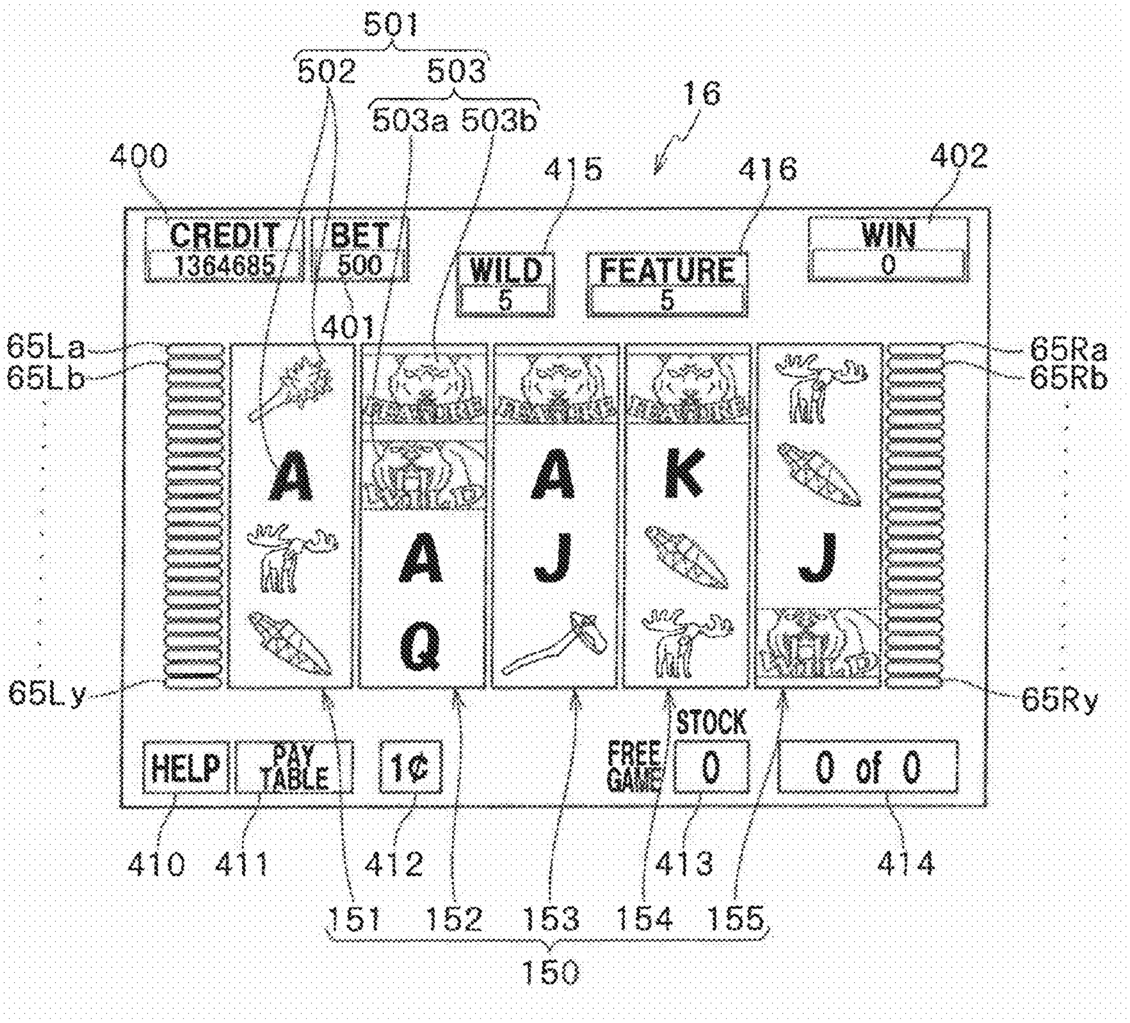

FIG. 107 shows a base game screen displayed when a bonus is won. More specifically, the base game screen shows that a bonus is won with three trigger symbols 503*b* being rearranged. The trigger symbol 503*b* preferably has a readable text such as "FEATURE", so as to have a player clearly understand the symbol relates to winning of a bonus.

(Bonus-Win Screen in Base Game)

Figure 108:
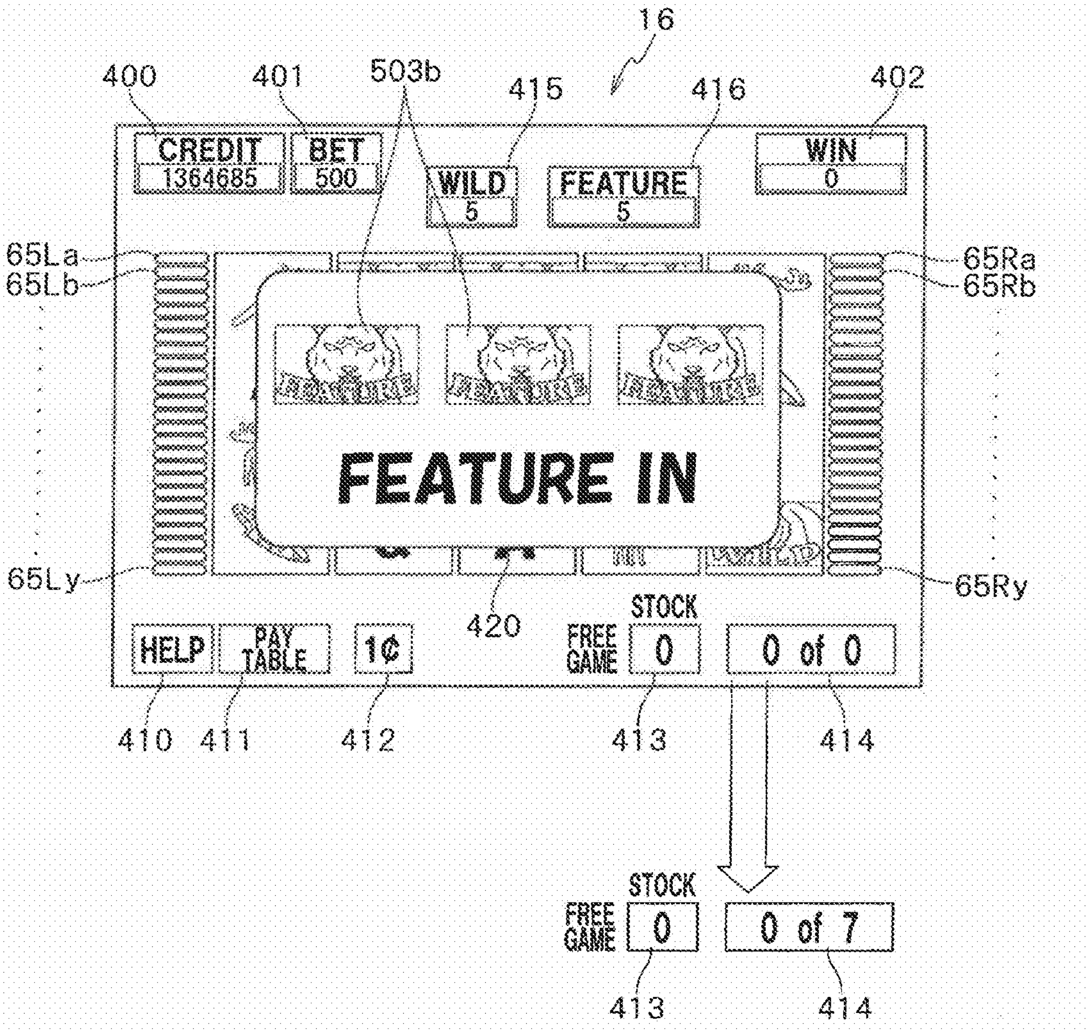

FIG. 108 shows a screen displayed for a predetermined period after a winning of bonus. More specifically, the winning of bonus is notified by pop-up displaying a bonus-win screen 420. The bonus-win screen 420 notifies the winning of bonus by a symbol image and an image of text such as "FEATURE IN". Then, at the same time or immediately after the displaying of the bonus-win screen 420, the number "0" on the free game count display unit 414 is switched to "7". Thus, the player is able to know that s/he won a bonus, and that the game will transit to a bonus game in which the free game is repeated seven times.

(Bonus-Win Screen in Base game: during Stepwise Increase)

Figure 109:
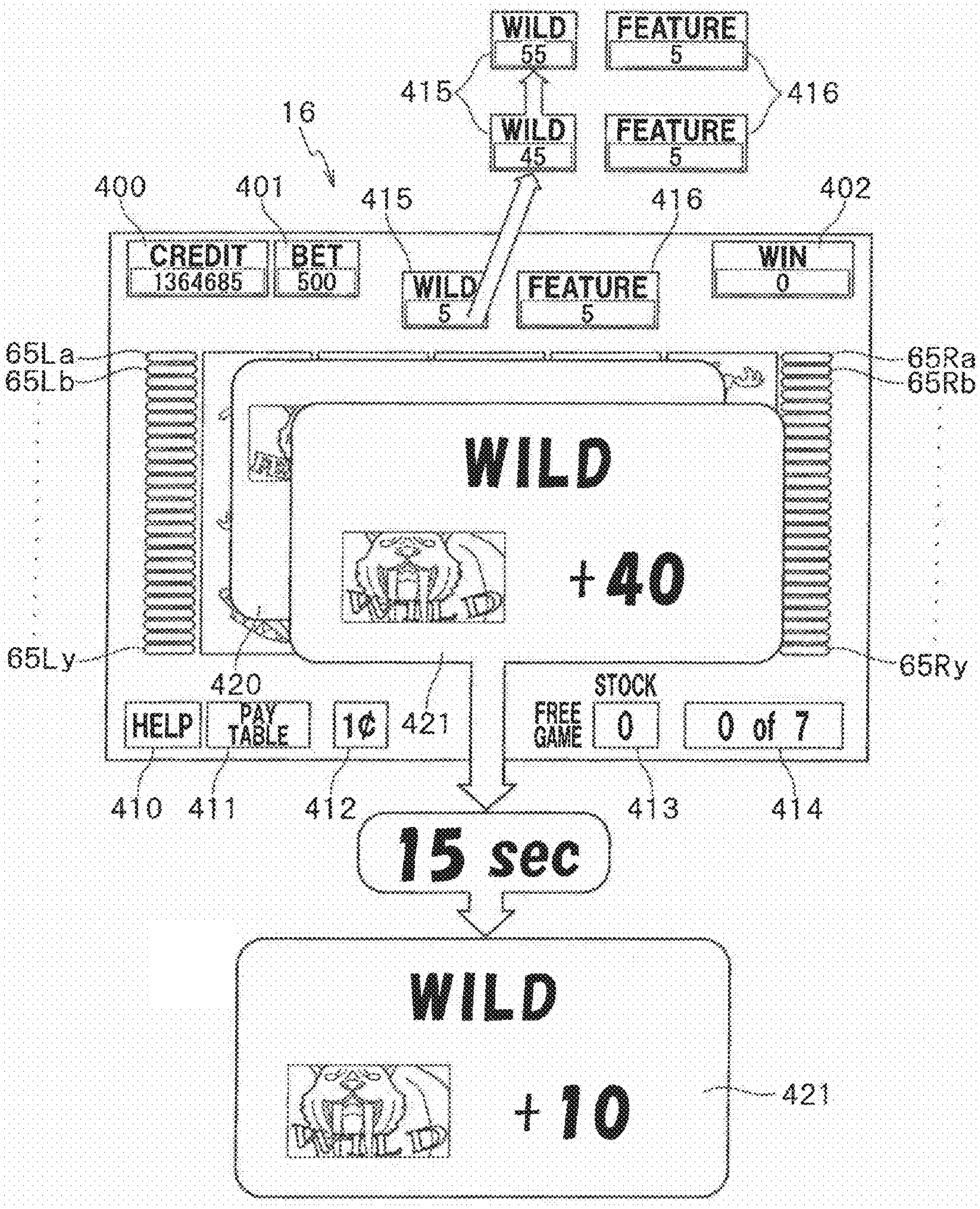
Figure 110:
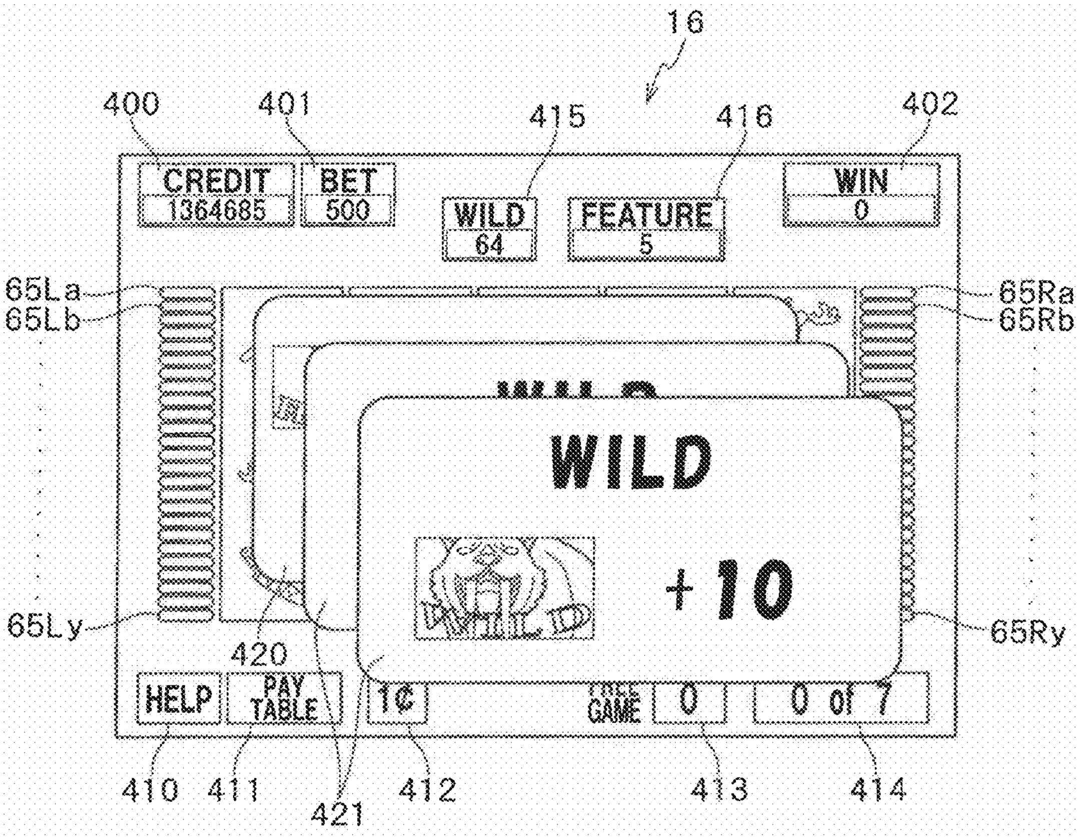

FIG. 109 shows a screen displayed for a stepwise-increase displaying period, after a bonus is won. More specifically, after the bonus-win screen 420 is pop-up displayed, a wild symbol count increasing screen 421 indicating an increase in the number of wild symbols 503*a* is pop-up displayed and superimposed over the bonus-win screen 420. Then, several seconds later, the bonus-win screen 420 and the wild symbol count increasing screen 421 are closed, and the original screen for running thereon a slot game is recovered. Then, upon elapse of a predetermined standby period (e.g. 15 sec.), yet another wild symbol count increasing screen 421 is pop-up displayed and superimposed over the bonus-win screen 420 and the wild symbol count increasing screen 421. That is, the displayed screens will look as illustrated in FIG. 110. The screens pop-up displayed are then closed several seconds later so as not to disturb the game in progress. Note that the standby period may be a fixed period or a period randomly set before the wild symbol count increasing screen 421 is pop-up displayed.

Thus, the first pop-up displaying of the wild symbol count increasing screen 421 notifies the player of an increase in the number of wild symbols 503*a*, before the transition to the bonus game. The second and any of the subsequent pop-up displaying of the wild symbol count increasing screen 421 directly notify the player of further increases in the number of wild symbols 503*a* during the bonus game.

Note that the wild symbol count increasing screen 421 does not have to be pop-up displayed after the second time. In this case, it is possible to notify the player of an increase in the number of wild symbols 503*a*, by having him/her sense an increase in the frequency of a wild symbol 503*a* being rearranged. Further, when the number of wild symbols 503*a* is increased in three steps or more, whether to perform pop-up displaying may be randomly selected. This increases the degree of freedom in the effect.

Further, every time the wild symbol count increasing screen 421 is pop-up displayed, the number indicated on the wild symbol count increasing screen 421 is added to the current number on the wild symbol count display unit 415, thus updating the displaying on the wild symbol count display unit 415. With this wild symbol count display unit 415, the player is always able to confirm the current total number of the wild symbols 503*a*.

(Bonus Game: During Game)

Figure 111:
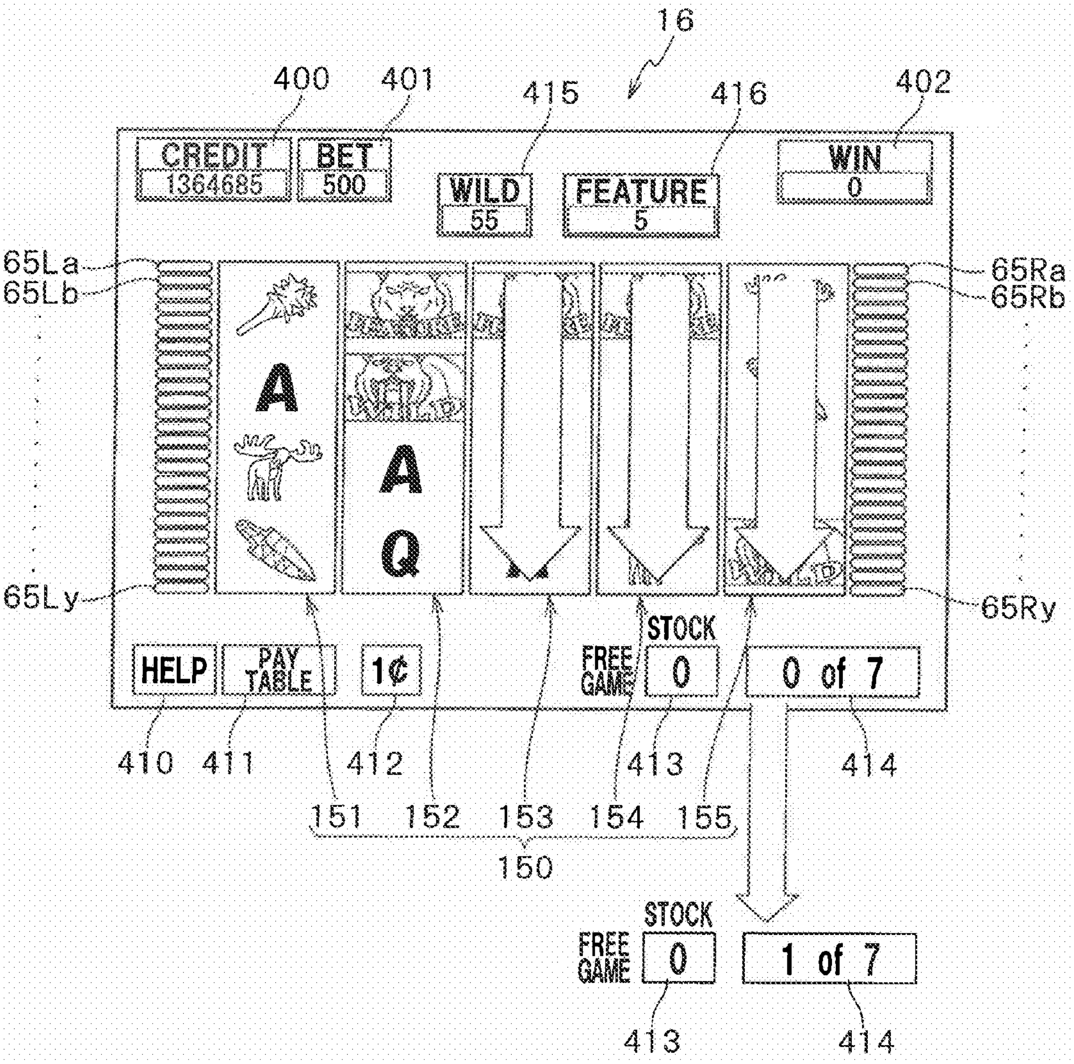

FIG. 111 illustrates an exemplary bonus game screen which is a screen displayed on the symbol display device 16, during the bonus game.

Specifically, the free game count display unit 414 displays the total number of free games and the current game repeat count. For example, the free game count display unit 414 indicates that the first free game out of seven free games is running. Other operations are the same as the base game.

(Bonus-Win Screen in Bonus Game)

Figure 112:
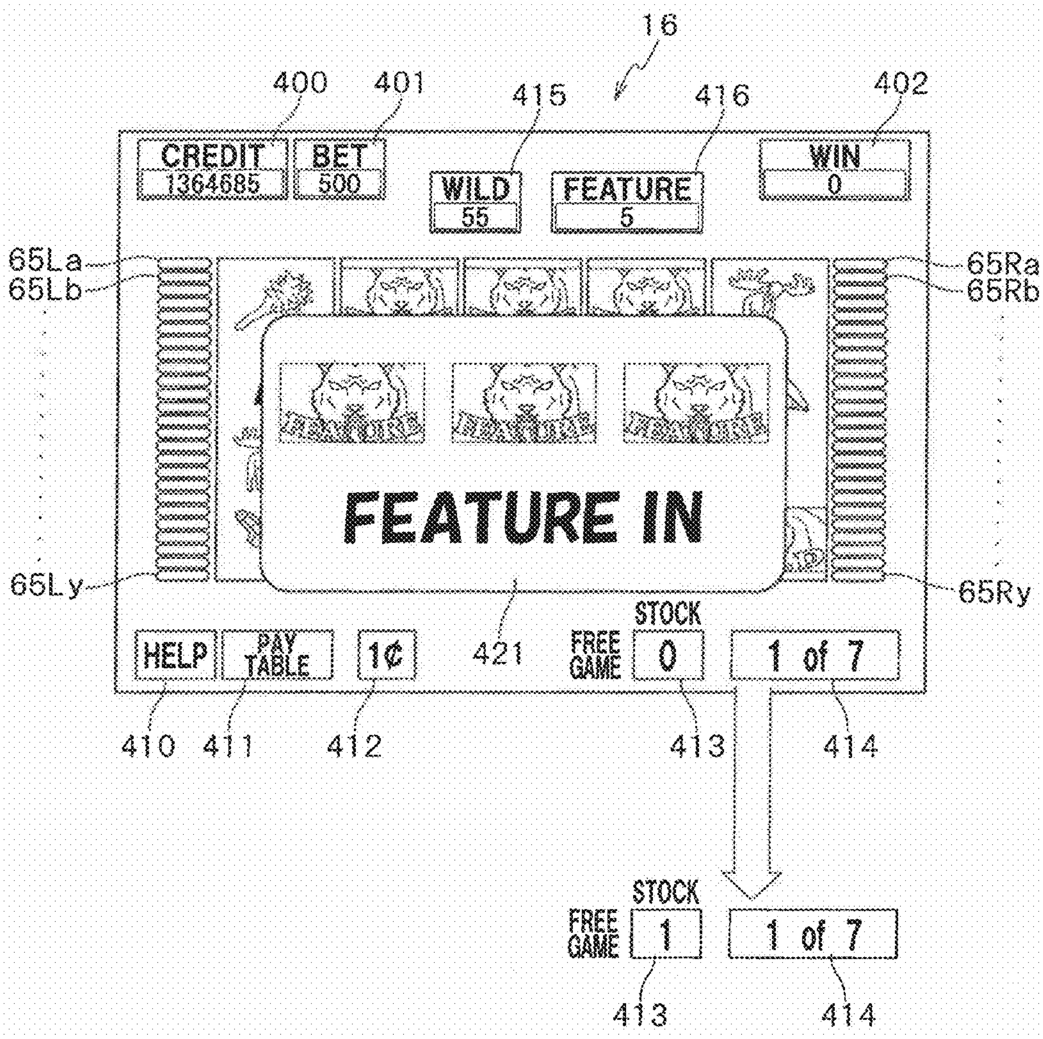

FIG. 112 shows a screen displayed for a predetermined period after a winning of bonus. Specifically, when three or more trigger symbols 503*b* are rearranged thus resulting in a winning of bonus, a bonus-win screen 420 is pop-up displayed on the bonus game screen to notify the winning of bonus. Then, at the same time or immediately after the displaying of the bonus-win screen 420, "1" is added to the carry-over number on the stock display unit 413. Thus, the player is able to recognize that s/he won a bonus, and that the carry-over number of the bonus game has increased.

(Bonus-Win Screen in Bonus Game: during Stepwise Increase)

Figure 113:
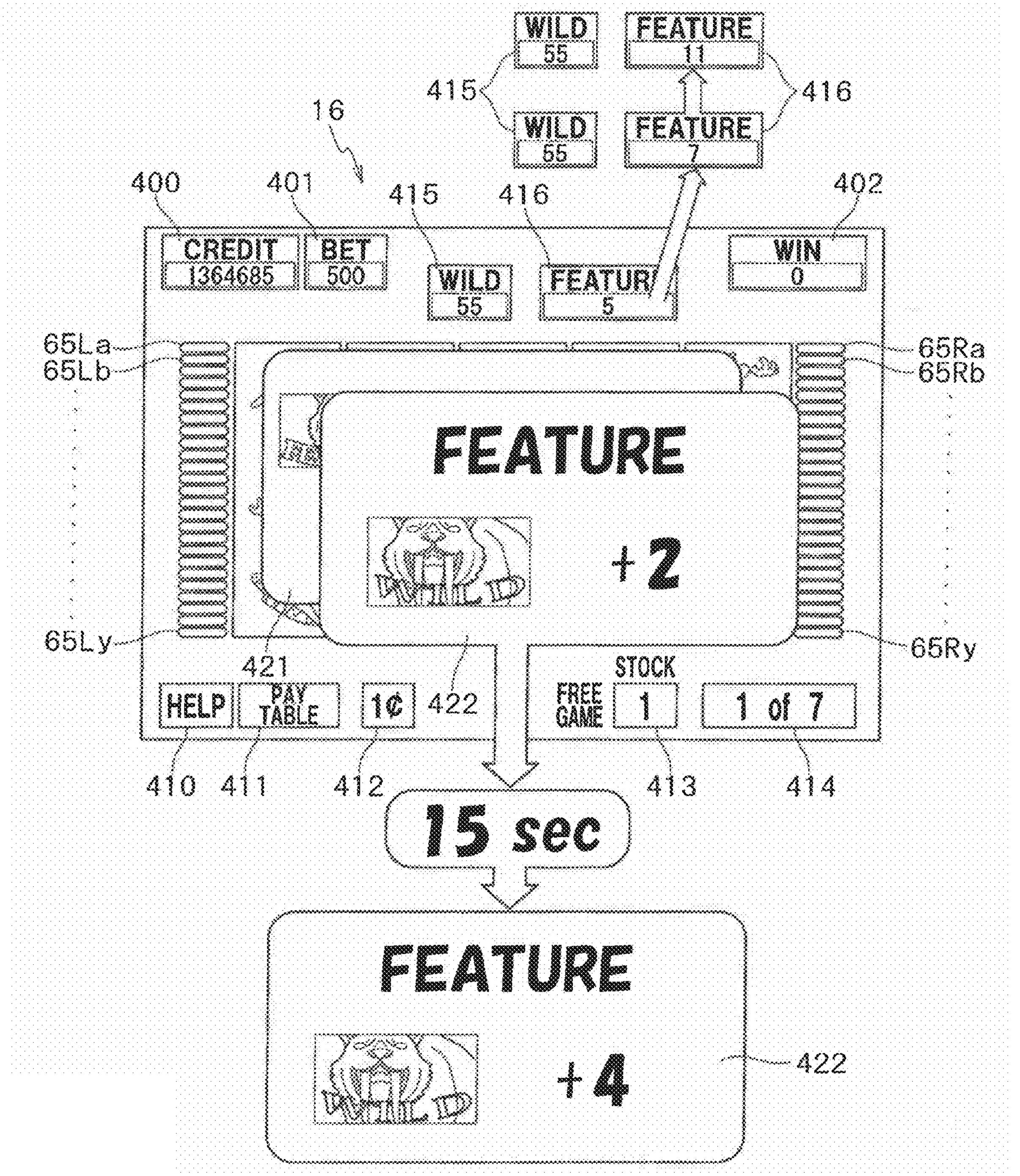
Figure 114:
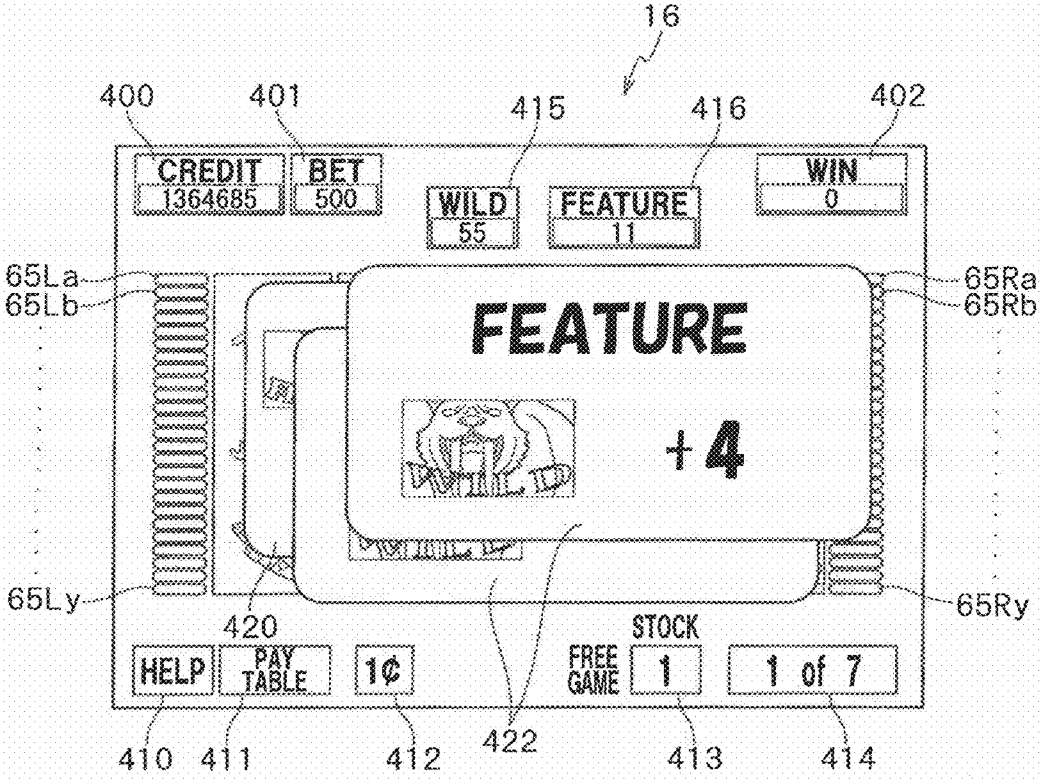

FIG. 113 shows a screen displayed for a stepwise-display period, after winning of a bonus. More specifically, after the bonus-win screen 420 is pop-up displayed, a trigger symbol count increasing screen 422 indicating an increase in the number of trigger symbols 503*b* is pop-up displayed and superimposed over the bonus-win screen 420. Then, several seconds later, the bonus-win screen 420 and the trigger symbol count increasing screen 422 are closed, and the original screen for running thereon a slot game is recovered. Then, upon elapse of a predetermined standby period (e.g. 15 sec.), yet another trigger symbol count increasing screen 422 is pop-up displayed and superimposed over the bonus-win screen 420 and the trigger symbol count increasing screen 422. That is, the displayed screens will look as illustrated in FIG. 114. The screens pop-up displayed are then closed several seconds later so as not to disturb the game in progress. Note that the standby period may be a fixed period or a period randomly set before the trigger symbol count increasing screen 422 is pop-up displayed.

Thus, the first pop-up displaying of the trigger symbol count increasing screen 422 notifies the player of an increase in the number of trigger symbols 503*b*, during the bonus game. The second and any of the following pop-up displaying of the trigger symbol count increasing screen 422 directly notify the player of further increases in the number of trigger symbols 503*b*.

Note that the trigger symbol count increasing screen 422 does not have to be pop-up displayed more than once. In this case, it is possible to notify the player of an increase in the number of trigger symbols 503*b*, by having him/her sense an increase in the frequency of a trigger symbol 503*b* being rearranged. Further, when the number of trigger symbols 503*b* is increased in three steps or more, whether to perform pop-up displaying may be randomly selected. This increases the degree of freedom in the effect.

Further, every time the trigger symbol count increasing screen 422 is pop-up displayed, the number indicated in the trigger symbol count increasing screen 422 is added to the current number on the trigger symbol count display unit 416, thus updating the displaying on the trigger symbol count display unit 416. With this trigger symbol count display unit 416, the player is always able to confirm the current total number of the trigger symbols 503*b*.

(Operations of Slot Machine 10: Base Game Running Process)

Figure 115:
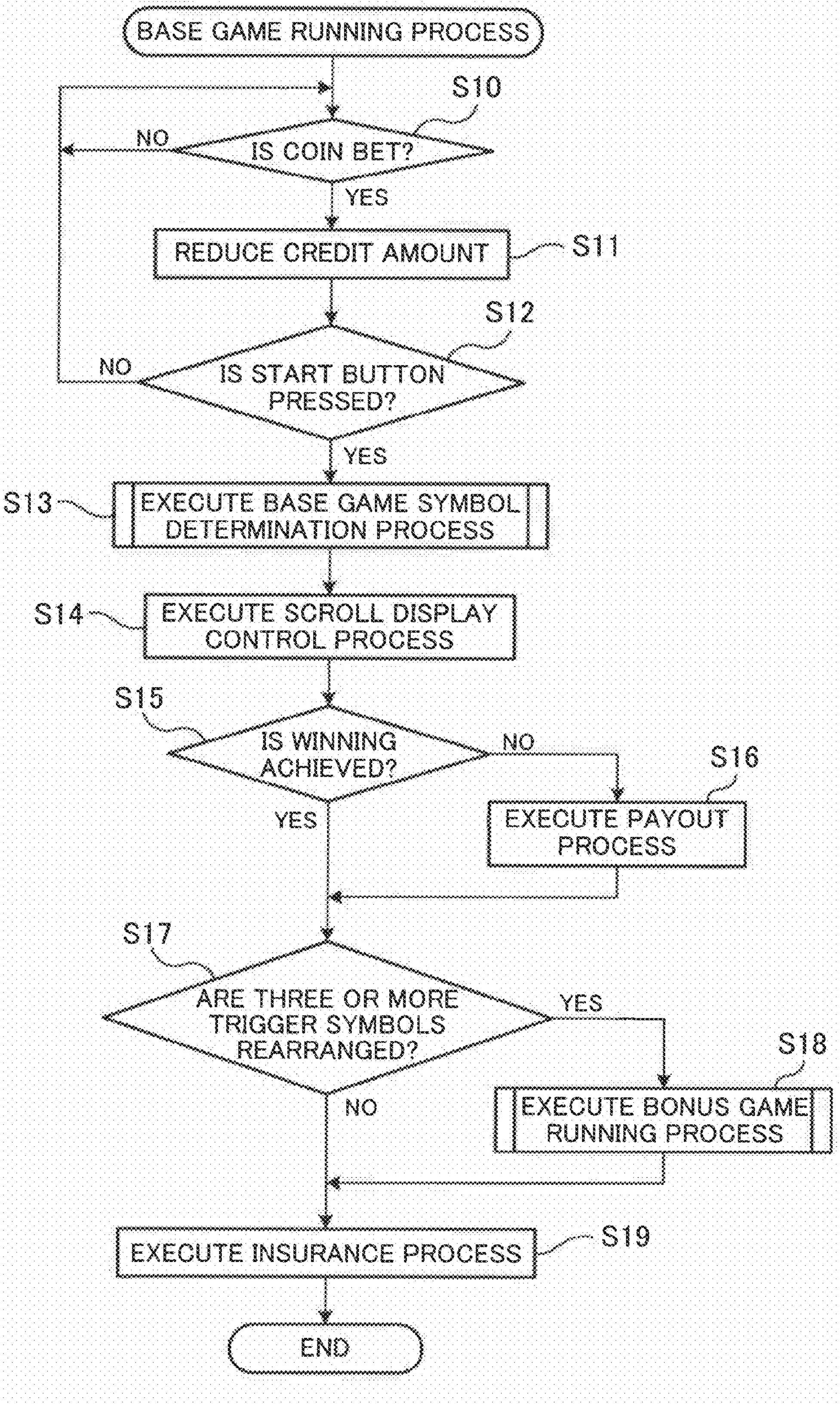

The following describes an operation of the slot machine 10 having the above structure, with reference to FIGS. 115 to 120. The base game running process shown in FIG. 115 is run by the main CPU 241 of the slot machine 10. One routine shown in FIG. 115 constitute a unit game. It is assumed that the slot machine 10 is booted in advance, and the variables used in the main CPU of the external controller 621 side shown in FIG. 100 is initialized to a preset value, so that the slot machine 10 is in regular operation.

As shown in FIG. 115, the main CPU 41 determines whether or a coin is bet (S10). In this process, the main CPU 41 determines whether an input signal is received. The input signal may be an input signal output from the 1-bet switch 26S when the 1-bet button 26 is operated, or an input signal output from the maximum bet switch 27S when the maximum bet button 27 is operated. When it is determined that no coin is bet, the process goes back to S10.

On the other hand in S10, if it is determined that a coin is bet, the main CPU 41 performs a process of reducing the credit amount stored in the RAM 43, by the amount of coins having been bet (S11). Note that when the number of coins bet surpasses the credit amount stored in the RAM 43, the process of reducing the credit amount in the RAM 43 is not performed and the process goes back to S10. Further, if the number of coins bet surpasses the maximum number of coins bettable in one game (500 coins in this embodiment), the process of reducing the credit amount in the RAM 43 is not performed and the process goes to S12.

Next, the main CPU 41 determines whether the start button 23 is pressed (S12). In this process, the main CPU 41 determines whether an input signal output from the start switch 23S, when the start button 23 is pressed. If it is determined that the start button 23 is not pressed, the process goes back to S10. Note that when the start button 23 is not pressed (e.g. when the start button 23 is not pressed, and an instruction to end the game is input), the main CPU 41 cancels the result from the reduction in S11.

On the other hand in S12, if it is determined that the start button 23 is pressed, the main CPU 41 executes a base game symbol determination process (S13). In the base game symbol determining process, the main CPU 41 runs a symbol determination program stored in the RAM 43 to determine the code No. at the time of stopping the symbols. Specifically, the main CPU 41 obtains a random number, and determines the code No. at the time of stopping each symbol column formed by the display blocks 28, based on the random number obtained, and the base game symbol table of FIG. 96. The base game symbol determining process is detailed later with reference to the drawings.

As illustrated in FIG. 96, there are 14 wild symbols (also referred to as specific symbol) in the base game symbol table. The wild symbol is a symbol substitutable for any symbol.

Next, in S14, the main CPU 41 performs a scroll display control process. As illustrated in FIG. 106, this process controls displaying so that symbols determined in S13 are rearranged after scrolling of symbols is started.

Next, the main CPU 41 determines whether a winning is achieved (S15). More specifically in S15, the main CPU 41 counts the number of each type of symbols rearranged along the same payline L in S14. Then, the main CPU 41 determines if there is a counted value which equals or surpasses "2".

If it is determined that a winning is achieved, the main CPU 41 performs a process related to coin payout (S16). In this process, the main CPU 41 refers to the odds data stored in the RAM 43, and determines the amount of payout based on the number of certain symbols rearranged along the payline L. The odds data is data indicating the number of certain symbols rearranged along a single payline L and the associated amount of payout (See FIG. 104). Note that the payout is doubled every "WILD" arranged on a winning-achieved payline L. That is, if three "WILD" is displayed along the winning-achieved payline L, the payout is eight times as much of the original payout amount.

The present embodiment deals with a case where it is determined that a winning is achieved when symbols arranged along a single payline L includes at least two symbols of the same type. The present embodiment however is not limited to this. For example, the paylines may be omitted from the present invention, and it is possible to determine that a winning is achieved when symbols rearranged in the display blocks 28 includes at least two symbols of the same type.

When it is determined that a winning is not achieved in S15, or after the process of S16, the main CPU 41 determines whether three or more trigger symbols 503*b* are rearranged (S17). In this process, whether or not three or more trigger symbols 503*b* are rearranged in the display blocks 28 is determined, without taking into consideration the paylines L. In S17, if it is determined that three or more trigger symbols 503*b* are rearranged as illustrated in FIG. 107, the main CPU 41 executes the bonus game running process (S18). In the bonus game running process, the free game is run with an increased number of the wild symbols. The bonus game running process is detailed later.

When it is determined that the number of trigger symbols 503*b* rearranged is less than three in S17, or after the process of S18, the main CPU 41 executes an insurance process (S19). The insurance process is detailed later. After the process of S19, the main CPU 41 ends this sub routine.

Figure 116:
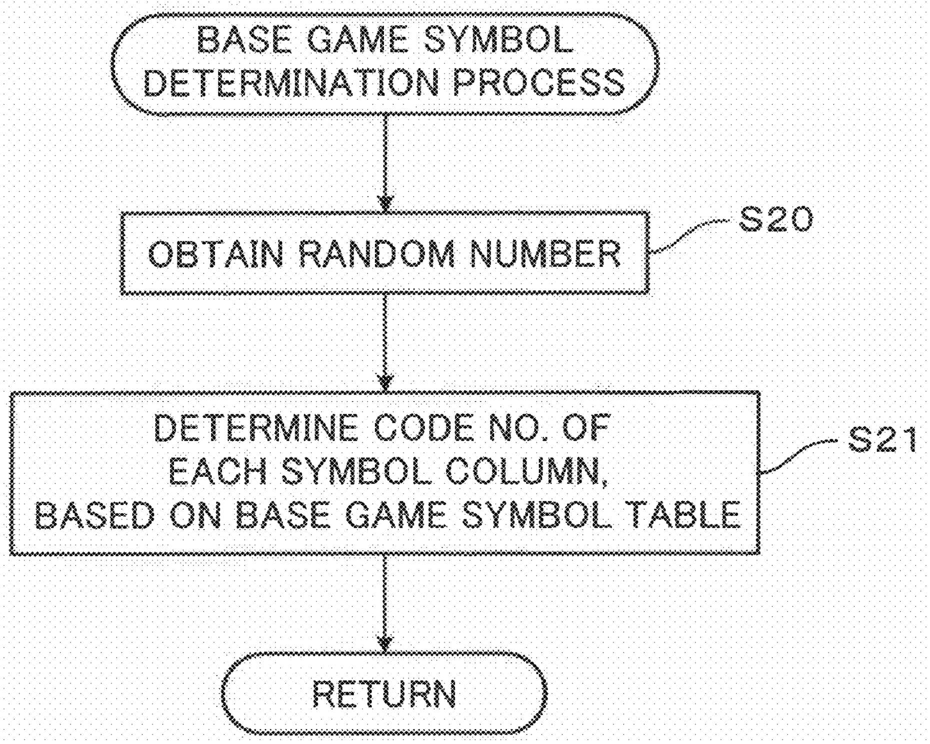

FIG. 116 is a flowchart showing a sub routine of the base game symbol determining process. This process is executed by the main CPU 41 running a symbol determination program stored in the RAM 43. First the main CPU 41 obtains the random number from the random number generating circuit 64 (S20). In this process, the main CPU 41 obtains five random numbers corresponding to the symbol columns of the display blocks 28.

Next, the main CPU 41 determines the code No. of the symbol column of the display block 28, at the time of stopping the symbols, based on the five random numbers obtained and the base game symbol table (S21). For example, when the random number for the first column is 23035, the code No. for the first column is 07. Note that the code No. of a symbol column corresponds to a code No. of a symbol rearranged in the first row of the display blocks 28, amongst those arranged in four rows. After the process of S21, the main CPU 41 ends this sub routine.

The present embodiment deals with a case where the random number generating circuit 64 is provided and a random number (so-called hardware random number) is sampled from the random number generating circuit. However, the present invention may be adapted so that a random number is generated in a program (so called software random number).

Figure 117:
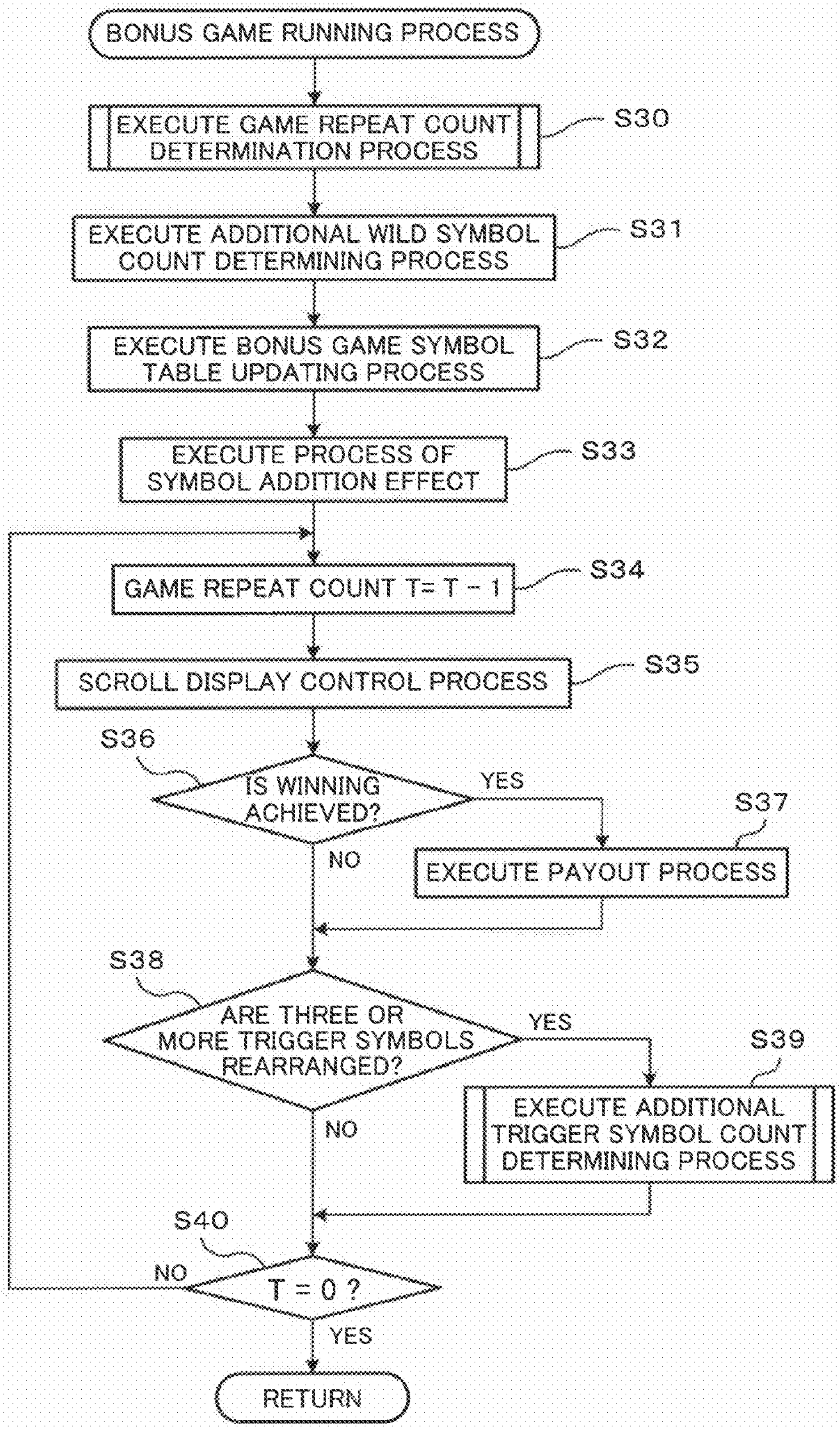

Next, the following describes a bonus game running process, with reference to FIG. 117. FIG. 117 is a flowchart showing a sub routine of the bonus game running process. A bonus game is a game which allows the player to play without requiring a bet of a coin. First, the main CPU 41 sets a remaining free game count T to T=F1(=specific number of times=7) in the free game count recording region of the RAM 43 (S30). Further, the main CPU 41 causes pop-up displaying of a bonus-win screen 420 on the symbol display device 16, as illustrated in FIG. 108.

Next, the main CPU 41 executes an additional wild symbol count determining process (S31). The additional wild symbol count determining process is detailed later with reference to the drawings. The present embodiment deals with a case where the additional wild symbol count determining process is executed in parallel to running of the free game, so that the entire process is completed either before the start of the first free game in a bonus game or while the free game is repeated. However, the additional wild symbol count determining process may be executed so that the entire process is completed at least one of the following occasions; (i) before the start of the free game; or (ii) while the free game is repeated.

Further, the main CPU 41 executes a bonus game symbol table updating process (S32). In the bonus game symbol table updating process, the main CPU 41 updates the bonus game symbol table based on an increase in the number of wild symbols determined in the additional wild symbol count determining process. The bonus game symbol table updating process is detailed later with reference to the drawings.

Next, the main CPU 41 executes a bonus game symbol determining process (S33). In the bonus game symbol determining process, the main CPU 41 determines a code No. at the time of stopping the symbols, by running a symbol determination program stored in the RAM 43. More specifically, the main CPU 41 obtains a random number, and determines the code No. of each symbol column of the display blocks 28, at the time of stopping the symbols, based on the random number obtained, and the bonus game symbol table. The bonus game symbol determining process is detailed later with reference to the drawings.

Next in S34, the main CPU 41 executes a scroll display control process as illustrated in FIG. 111. This process is a display control whereby scrolling of symbols is started and symbols determined in S33 are rearranged thereafter.

Next, the main CPU 41 determines whether winning is achieved (S35). In the present embodiment, a winning is achieved when symbols arranged along a payline L includes at least two symbols of the same kind. The “WILD” which is the wild symbol is a symbol substitutable for any type of symbol. In the bonus game, the number of wild symbols is increased compared to that of the base game. Therefore, the possibility of winning is higher. In S35, the main CPU 41 counts the number of each type of symbols rearranged along the same payline L in S34. Then, the main CPU 41 determines if there is a counted value which equals or surpasses “2”.

If it is determined that a winning is achieved, the main CPU 41 performs a process related to coin payout (S36).

When it is determined that a winning is not achieved in S35, or after the process of S36, the main CPU 41 determines whether three or more trigger symbols 503*b* are rearranged (S37). In this process, whether or not three or more trigger symbols 503*b* are rearranged in the display blocks 28 is determined, without taking into consideration the paylines L. In S38, if it is determined that the number of trigger symbols 503*b* rearranged is less than three, then the CPU 41 executes the additional trigger symbol count determining process, adds “1” to the bonus game stock number (carry-over number), and displays the stock number on the bonus game stock display unit 413. The additional trigger symbol count determining process is detailed later.

Next, the main CPU 41 determines whether the remaining count (T) is “0”, based on the remaining free game count data stored in the free game count recording region of the RAM 43 (S39). If it is determined that the remaining free game count (T) is not “0”, the main CPU 41 brings the process back to S34. On the other hand, if it is determined that the remaining free game count (T) is “0”, the main CPU 41 ends this sub routine on condition that the carry-over number of the bonus game is “0”. If the bonus game carry-over number is not “0”, the bonus game is run until the carry-over number is “0”.

Figure 118:
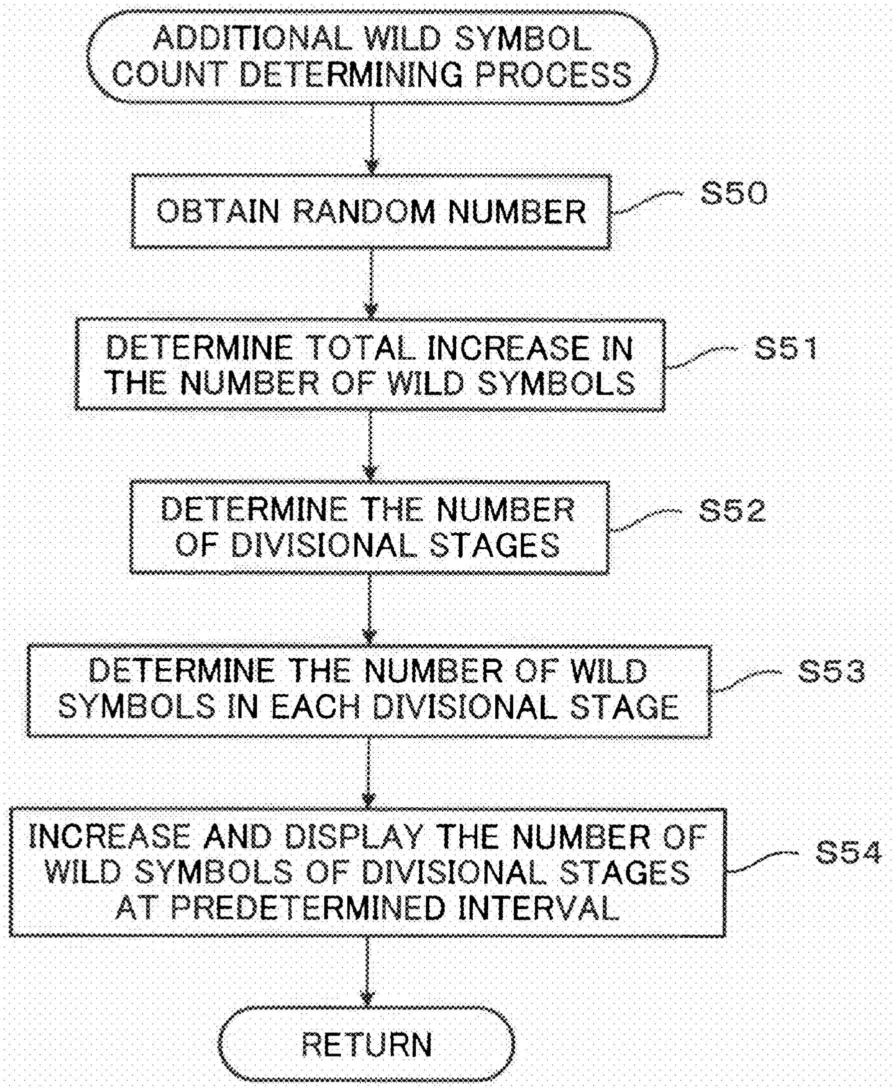

Next, with reference to FIG. 118, the following describes the additional wild symbol count determining process performed in S31 of FIG. 117.

As shown in FIG. 107, when three or more trigger symbols 503*b* are rearranged, a random number is first obtained (S50). Then, a total increase in the number of wild symbols is determined based on that random number and the additional wild symbol count determination table shown in FIG. 102 (S51). Next, another random number is obtained, and a divisional stage count is determined based on the other random number and the divisional stage count determination table shown in FIG. 105 (S52). Then, the wild symbol count is determined for each divisional stage count (S53). After this, apart from this routine, the wild symbol count of the divisional stage is increased stepwise at a predetermined interval, and the wild symbol count is displayed stepwise (S54).

The following describes a case where the total increase in the number of wild symbols is "50", and the divisional stage count is "2".

First, as illustrated in FIG. 108, after a winning of bonus is notified by pop-up displaying a bonus-win screen 420, another bonus-win screen 420 is pop-up displayed as illustrated in FIG. 109. Then, a wild symbol count increasing screen 421 indicating an increase in the number of wild symbols 503*a* is pop-up displayed and superimposed over the wild symbol count increasing screen 421. Several seconds later, the bonus-win screen 420 and the wild symbol count increasing screen 421 are closed, and the original screen for running thereon a slot game is recovered. Then, upon elapse of a predetermined standby period (e.g. 15 sec.), yet another wild symbol count increasing screen 421 is pop-up displayed and superimposed over the bonus-win screen 420 and the wild symbol count increasing screen 421. That is, the displayed screens will look as illustrated in FIG. 110. The screens pop-up displayed are then closed several seconds later so as not to disturb the game in progress.

Thus, the player is able to notice an increase in the number of wild symbols 503*a* before the transition to the bonus game, by the first pop-up displaying of the wild symbol count increasing screen 421. Further, with the second time pop-up displaying of the wild symbol count increasing screen 421, the player is able to notice that there was an addition of the wild symbols 503*a* during the bonus game.

Further, every time the wild symbol count increasing screen 421 is pop-up displayed, the number indicated on the wild symbol count increasing screen 421 is added to the current number on the wild symbol count display unit 415, thus updating the displaying on the wild symbol count display unit 415. Thus, the player is always able to confirm the current total number of the wild symbols 503*a* by looking at the wild symbol count display unit 415.

Next, the following describes an additional trigger symbol count determining process performed in S39 of FIG. 117, with reference to FIG. 119.

As shown in FIG. 112, when three or more trigger symbols 503*b* are rearranged, a random number is first obtained (S60). Then, a total increase in the number of trigger symbols is determined based on that random number and the additional trigger symbol count determination table shown in FIG. 103 (S61). Next, another random number is obtained, and a divisional stage count is determined based on the other random number and the divisional stage count determination table shown in FIG. 105 (S62). Then, the trigger symbol count is determined for each divisional stage count (S63). After this, apart from this routine, the trigger symbol count of the divisional stage is increased stepwise at a predetermined interval, and the trigger symbol count is displayed stepwise (S64).

The following describes a case where the total increase in the total increase in the number of trigger symbols is "50", and the divisional stage count is "2".

First, as illustrated in FIG. 112, after a winning of bonus is notified by pop-up displaying a bonus-win screen 420, another bonus-win screen 420 is pop-up displayed as illustrated in FIG. 113. Then, a trigger symbol count increasing screen 422 indicating an increase in the number of trigger symbols 503*b* is pop-up displayed and superimposed over the trigger symbol count increasing screen 422. The bonus-win screen 420 and the trigger symbol count increasing screen 422 are closed several seconds later, and the original screen for running thereon a slot game is recovered. Then, upon elapse of a predetermined standby period (e.g. 15 sec.), yet another trigger symbol count increasing screen 422 is pop-up displayed and superimposed over the bonus-win screen 420 and the trigger symbol count increasing screen 422. That is, the displayed screens will look as illustrated in FIG. 114. The screens pop-up displayed are then closed several seconds later so as not to disturb the game in progress.

Thus, the player is able to notice an increase in the number of trigger symbols 503*b* before the transition to the bonus game, by the first pop-up displaying of the trigger symbol count increasing screen 422. Further, with the second time pop-up displaying of the trigger symbol count increasing screen 422, the player is able to notice that there was an addition of the trigger symbols 503*b* during the bonus game.

Further, every time the trigger symbol count increasing screen 422 is pop-up displayed, the number indicated on the trigger symbol count increasing screen 422 is added to the current number on the trigger symbol count display unit 416, thus updating the value displayed on the trigger symbol count display unit 416. By looking at this trigger symbol count display unit 416, the player is always able to confirm the current total number of the trigger symbols 503*b*.

Alternative Example

Next the following describes an alternative form of the above embodiment. Namely, the alternative form may be adapted so that the additional wild symbol count determining process and running of the free game are sequentially performed so that the entire additional wild symbol count determining process is completed before the start of the first free game in a bonus game. That is, as illustrated in FIG. 120, it is possible to sequentially execute the game repeat count determining process (S30), the additional wild symbol count determining process (S31), and the bonus game symbol table updating process (S32). In this case, as illustrated in FIG. 121, the number of wild symbols 503*a* is increased stepwise after winning of a bonus game (special game), before the actual start of a free game. This entertains the player before the free game. Note that no explanation is provided for steps S30 to S39, A1 to A13 of FIGS. 120 and 121, as these steps are the same as those already described hereinabove.

Further, a specific symbols 503 adding pattern may be determined beforehand. Specifically, as illustrated in FIG. 122, after the total additional count of the specific symbols 503 is determined (A3), an increase pattern corresponding to the total increase number is obtained (B4). Then, based on the increase pattern, the number of wild symbols is increased at a predetermined interval, and the number of wild symbols increased is displayed (B5).

Specifically, the increase pattern is determined based on a data table having lists of total increases and increase patterns as illustrated in FIG. 123. That is, for example, when the total increase is "10", an increase pattern of "10" is selected, and the number of specific symbols 503 is increased according to the increase pattern, and the number of specific symbols 503 increased is displayed. In this case, the displaying and increase take place only once. Further, when the total increase is "30", the increase pattern is "10-->10-->10". Therefore, the number of specific symbols 503 is increased in this pattern, and the number of specific symbols 503 increased is displayed. Further, when the total increase is "50", the increase pattern is "10--10-->30". Therefore, the number of specific symbols 503 is increased in this pattern, and the number of specific symbols 503 increased is displayed.

Thus, the number of specific symbol 503 is increased in a predetermined increase pattern; that is, addition of specific symbols 503 occurs according to a certain rule. Therefore, if "10" is added to the number of specific symbols 503, the player who knows the rule is able to have, before the start of a free game, a big hope that the "10" or "20" may be added. Note that the number of specific symbols added does not have to be 10, 20, 30, or the like. It is possible to increase the number of specific symbols little by little, e.g. one at a time.

The above described stepwise increases in an increase pattern may performed while the free game is repeated. Doing so allows a player to enjoy a free game, and have a hope at the same time.

The present embodiment deals with a case where the number of payline L is 25; however, the number of paylines is not limited. For example, the number of paylines may be 30.

The present embodiment deals with a case where winning of bonus is achieved when three or more trigger symbols are rearranged. However, winning of bonus is not limited to this. For example, winning of bonus may be achieved when a predetermined time has elapsed since the last bonus game has ended.

Further, in the present embodiment, the free game is a game in which displaying of symbols on display blocks 28 are varied and stopped, and then an amount of payout is determined according to the symbols having stopped or a combination of the stopped symbols (i.e. a game normally run in a slot machine). However, the free game of the present invention is not limited to this, and the free game may be different from a game run in a slot machine. Examples of the free game include: a card game such as poker, a shooting game, a fighting game, or the like. The free game may be a game that awards a game medium or a game awarding no game medium. Further, the following is also possible. Namely, a free game is run on condition that the number of base games counted during the insured mode reaches a predetermined number. Then, when the number of base games counted during the insured mode once again reaches a predetermined number, a free game which is different from the previous free game is run. The free game in the present invention may be suitably designed, and is not particularly limited, as long as the free game requires no bet of a game medium.

The above embodiment thus described solely serves as a specific example of the present invention, and the present invention is not limited to such an example.

Specific structures and various means may be suitably designed or modified. Further, the effects of the present invention described in the above embodiment are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A gaming machine, comprising:

a symbol display device which rearranges plural symbols including a specific symbol;

a bet receiving device which receives, in a base game, betting of a game medium within a predetermined range;

a controller programmed to execute the following steps of:

(a1) on condition that the game medium is bet, running the base game in which a predetermined amount of game media is awarded according to the symbols rearranged on the symbol display device;

(a2) if in the base game the specific symbol is rearranged with a first predetermined condition, establishing a special status in which the specific symbol is added to the plural symbols in a special game;

(a3) when in the base game the specific symbol is rearranged with the first predetermined condition, running the special game in which a free game is repeated plural times in the special status, the free game being arranged so that it is possible to reduce the number of betted game media to be smaller than the number in the base game and a game medium is awarded with an amount determined in accordance with the symbols rearranged by the symbol display device; and (a4) if in the special game the specific symbol is rearranged with a second predetermined condition, further adding a free game and making the free game runnable;

wherein the controller further adds the specific symbol to the plural symbols in the special status when an amount of the game medium received by the bet receiving device is a value greater than minimum bet value in base game the predetermined range.

2. The gaming machine according to claim 1, wherein, the controller executes the step (a2) when an amount of the game medium received by the bet receiving device is not lower than a predetermined value within the predetermined range.

3. The gaming machine according to claim 1, wherein, the controller executes the step (a2) when an amount of the game medium received by the bet receiving device is at a maximum within the predetermined range.

4. The gaming machine according to claim 1, wherein, the controller further adds the specific symbol to the plural symbols in the special status, when an amount of the game medium received by the bet receiving device is at a maximum within the predetermined range.

5. The gaming machine according to claim 1, wherein, the symbol display device rearranges the plural symbols after a symbol column constituted by the plural symbols are displayed and scrolled, and in the step (a2), when in the base game the specific symbol is rearranged with the first predetermined condition, the controller changes the symbol column, which is displayed and scrolled by the symbol display device, from a symbol column for the base game to a symbol column for the special game which column has more specific symbols than the symbol column for the base game.

6. The gaming machine according to claim 1, wherein, when in the special game the specific symbol is rearranged with the second predetermined condition, the controller further adds the specific symbol to the plural symbols with the special status in the special game.

7. The gaming machine according to claim 3, wherein, in the step (a4), when the specific symbol is rearranged with the second predetermined condition in the special game, the controller further adds another free game and make the free game runnable, until reaching a predetermined upper limit.

8. A gaming machine, comprising:

a bet receiving device which receives a bet of game media within a range of a minimum bet to a maximum bet; and a controller, wherein the controller performs the processes of:

(b1) running a base game requiring a bet of a predetermined amount of game media, in which game a predetermined amount of game media is awarded according to a predetermined symbol combination;

(b2) when a first predetermined condition is met during the base game, counting the number of base games run thereafter;

(b3) when the number of base games counted reaches a predetermined number, running a free rescue game upon a bet of game media that is less than the predetermined amount of game media required for a base game; and (b4) determining whether a bet of a predetermined amount or more has been entered via the bet receiving device during the counting of the number of base games thereafter, and when it is determined that a bet which is greater than the minimum bet value in the base game is entered in one of the base games, running a special free rescue game which is more advantageous than the free rescue game.

9. The gaming machine according to claim 8, further comprising:

a player-operable rescue requesting button, wherein, when the rescue requesting button is operated during a base game, the controller starts counting the number of subsequent base games run.

10. The gaming machine according to claim 1, wherein:

the controller is programmed to execute the processes of:

(g1) displaying, on the symbol display device, stepwise increases in a number of specific symbols in the plural symbols.

11. The gaming machine according to claim 10, wherein the specific symbols include a wild symbol substitutable for any type of symbol, and a trigger symbol serving as a trigger for starting at least the special game.

12. The gaming machine according to claim 10, wherein the specific symbols include: a wild symbol substitutable for any type of symbol; and a trigger symbol serving as a trigger for starting at least the special game, and wherein, in (a2), when the predetermined condition is met during the base game, the controller randomly selects the wild symbol or the trigger symbol, and increases stepwise the number of wild symbols or trigger symbols according to the selection made.

13. The gaming machine according to claim 10, further comprising: a symbol count display device which displays thereon the number of specific symbols.

14. The gaming machine according to claim 1, wherein an additional wild symbol is provided in a special free rescue game.

* * * * *